(12) United States Patent
Horinouchi et al.

(10) Patent No.: US 7,920,443 B2
(45) Date of Patent: Apr. 5, 2011

(54) OBJECTIVE LENS, OPTICAL PICK-UP DEVICE, AND OPTICAL DISK DEVICE

(75) Inventors: Shogo Horinouchi, Fukuoka (JP); Takashi Haruguchi, Fukuoka (JP); Taiichi Mori, Koga (JP); Hideki Yoshinaka, Chikushino (JP); Nobuyuki Tokubuchi, Saga (JP); Shin Ishibashi, Fukuoka (JP); Hitoshi Asahi, Kasuga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/860,649

(22) Filed: Aug. 20, 2010

(65) Prior Publication Data

US 2010/0315936 A1    Dec. 16, 2010

Related U.S. Application Data

(62) Division of application No. 11/866,837, filed on Oct. 3, 2007, now Pat. No. 7,813,235.

(51) Int. Cl.
*G11B 7/00* (2006.01)
(52) U.S. Cl. ............... 369/44.14; 369/44.25; 369/44.37; 369/112.23; 369/112.24; 369/112.01
(58) Field of Classification Search .................. None
See application file for complete search history.

(56) References Cited

U.S. PATENT DOCUMENTS

| | | | |
|---|---|---|---|
| 5,629,514 A | 5/1997 | Lee | |
| 5,892,749 A | 4/1999 | Yamanaka | |
| 6,009,066 A | 12/1999 | Yoo | |
| 6,081,498 A | 6/2000 | Yoo | |
| 6,111,827 A * | 8/2000 | Miike | 369/44.14 |
| 6,172,958 B1 | 1/2001 | Mochizuki | |
| 6,256,283 B1 | 7/2001 | Fukakusa | |
| 6,266,314 B1 | 7/2001 | Fukakusa | |
| 6,339,511 B1 | 1/2002 | Tanaka | |
| 6,396,791 B1 | 5/2002 | Wakao | |
| 6,442,124 B1 | 8/2002 | Chung | |
| 6,556,533 B1 | 4/2003 | Fukakusa | |
| 6,650,612 B1 | 11/2003 | Matsuzaki | |
| 6,829,203 B2 * | 12/2004 | Yonezawa et al. | 369/44.27 |

(Continued)

FOREIGN PATENT DOCUMENTS

EP    0 777 219    6/1997

(Continued)

OTHER PUBLICATIONS

PCT International Search Report dated Mar. 22, 2005.

(Continued)

*Primary Examiner* — Muhammad N Edun
(74) *Attorney, Agent, or Firm* — Dickinson Wright PLLC

(57) ABSTRACT

An optical pickup device includes light sources for respectively emitting a plurality of different wavelengths of light, a unit structured for causing at least a part of the light emitted from the light sources to pass a same optical path; and a focusing unit for focusing the light. The focusing unit includes at least first and second focusing parts, the first focusing part being to focus mainly a wavelength of light different from a wavelength of light to be mainly focused by the second focusing part. The optical pickup device and optical disk device are capable of realizing at least one of thickness reduction, size reduction and suppression against characteristic deterioration even where coping with various wavelengths of laser including a blue laser.

14 Claims, 67 Drawing Sheets

U.S. PATENT DOCUMENTS

| | | | |
|---|---|---|---|
| 6,928,043 | B2 | 8/2005 | DeVries |
| 7,193,954 | B2 | 3/2007 | Yagi |
| 7,301,864 | B2 * | 11/2007 | Horinouchi et al. ....... 369/44.37 |
| 2002/0067553 | A1 | 6/2002 | Maeda |
| 2002/0110076 | A1 | 8/2002 | Yanagisawa |
| 2002/0181366 | A1 | 12/2002 | Katayama |
| 2003/0095347 | A1 | 5/2003 | Kobayashi |
| 2003/0095487 | A1 | 5/2003 | Nishizawa |
| 2004/0109401 | A1 | 6/2004 | Ogasawara |

FOREIGN PATENT DOCUMENTS

| | | |
|---|---|---|
| EP | 1 202 259 | 5/2002 |
| EP | 1 341 166 | 9/2003 |
| EP | 1 365 270 | 11/2003 |
| JP | 9-153229 | 11/1995 |
| JP | 09-017003 | 1/1997 |
| JP | 9-212905 | 8/1997 |
| JP | 10-154346 | 6/1998 |
| JP | 10-334494 | 12/1998 |
| JP | 11-224436 | 8/1999 |
| JP | 11-273136 | 10/1999 |
| JP | 11-296890 | 10/1999 |
| JP | 2000-123394 | 4/2000 |
| JP | 2001-23202 | 1/2001 |
| JP | 2001-184695 | 7/2001 |
| JP | 2002-245660 | 8/2002 |
| JP | 2003-217119 | 7/2003 |
| JP | 2004-103135 | 4/2004 |
| JP | 2004-319062 | 11/2004 |
| JP | 2005-32286 | 2/2005 |
| TW | 347476 | 12/1986 |
| WO | 97/42631 | 11/1997 |
| WO | 02/061488 | 8/2002 |
| WO | 03/048834 | 6/2003 |

OTHER PUBLICATIONS

T. Shimano, et al., "Measuring Spherical Aberration for the Dynamic Compensation of Substrate-Thickness Errors," Proceedings of the SPIE—The International Society for Optical Engineering, vol. 4342, XP002317227, Jan. 2002, pp. 457-464.

R. Katayama, et al., "Blue NA0.85/DVD/CD Compatible Optical Head," 2002 International Symposium on Optical Memory and Optical Data Storage Topical Meeting, Functional Devices Research Laboratories, NEC Corporation, R&D Technical Support Center, XP010600162, 2002, pp. 168-170.

S. Kimura, et al., "A Module of a Blue-Violet Laser Diode and Photodiodes for Adaptive Compensation of Spherical-Aberration," 2002 International Symposium on Optical Memory and Optical Data Storage Topical Meeting, Hitachi Ltd., Central Research Laboratory, XP010600261, 2002, pp. 25-27.

H. Hoffman, et al., "Blue Laser Phase Change Recording System," Journal of Magnetism and Magnetic Materials, Elsevier, Amsterdam, NL, Thomson Multimedia Corporate Research, Optical Recording, Deutsche Thomson-Brandt GmbH, vol. 249, No. 3, XP004389871, Sep. 2002, pp. 499-503.

Japanese Office Action dated Jul. 28, 2009, with English translation thereof.

Japanese Notification of Reasons for Refusal dated Jul. 27, 2010 with English Translation.

Taiwanese Office Action dated Oct. 26, 2010.

* cited by examiner

FIG. 49

| | CERAMICS | | | | | | LCP | |
|---|---|---|---|---|---|---|---|---|
| | HIGH-PURITY ALUMINA 99.99% Al2O3 | ZIRCONIA ZrO2 | MAS 2MgO 2Al2O3 5SiO2 | SILICON CARBIDE SiC | SILICON NITRIDE HOT PRESS Si3N4 | SILICON NITRIDE REACTION SINTERING Si3N4 | CONTAINING CARBON FIBER | CONTAINING GLASS FIBER |
| SPECIFIC GRAVITY kg/m $\times 10^{-3}$ | 4.0 | 6.0 | 2.0 | 3.2 | 3.3 | 2.6 | 1.5 | 1.6 |
| BENDING ELASTIC MODULUS Gpa | 382 | 196 | 20 | 440 | 310 | 215 | 35 | 18 |
| SPECIFIC RIGIDITY BENDING ELASTIC MODULUS/SPECIFIC GRAVITY $\times 10^{+3}$ | 96.2 | 32.6 | 10.0 | 137.5 | 95.4 | 82.7 | 23.3 | 11.3 |

OBJECTIVE LENS, OPTICAL PICK-UP DEVICE, AND OPTICAL DISK DEVICE

This is a divisional application of application Ser. No. 11/866,837 filed Oct. 3, 2007, which is a continuation of application Ser. No. 10/885,415 filed Jul. 6, 2004, which is based on Japanese Application Numbers 2003-192670 filed Jul. 7, 2003, JP 2003-312459, filed Sep. 4, 2003, JP 2003-331155 filed Sep. 24, 2003, JP 2003-408627 filed Dec. 8, 2003, and JP 2003-414473 filed Dec. 12, 2003, the entire contents of which are incorporated by reference herein.

BACKGROUND OF THE INVENTION

1. Field of the Invention

The present invention relates to an objective lens, an optical pick-up device and an optical disk device which are used for recording and reproduction in a high density recording disk such as a DVD and an optical disk such as a compact disk.

2. Description of the Related Art

In an optical disk device, a laser diode for emitting a laser beam having a long wavelength such as an infrared laser beam or a red laser beam has been used. Recently, higher density recording is carried out by using a blue laser beam as compared with the case in which each of the laser beams is used as such JP-A-11-224436, JP-A-2000-123394, JP-A-10-334494.

In a video recorder for recording and reproducing an optical disk corresponding to a blue laser, however, the size of an device itself is very large. For this reason, an optical design can easily be carried out by using means such as a beam expander even if the blue laser is used for an optical system. In addition, also in the case in which recording and reproduction can be carried out over both an optical disk corresponding to the blue laser and an optical disk corresponding to a red laser, there is no particular problem because the device is very large and separate optical systems corresponding to wavelengths can be thus constituted in the device.

In a comparatively thin and small optical disk drive device which can carry out at least one of recording and reproduction over the two optical disks having different wavelengths and is incorporated in electronic equipment such as a notebook computer, however, it is impossible to provide an optical system corresponding to each of the blue laser beam, the infrared laser beam and the red laser beam. In addition, the blue laser beam has a greater spherical aberration than the other laser beams and it is very hard to process the blue laser beam with a common optical system. In addition, the integration of the optical system deteriorates an optical characteristic.

If an inertia center and a thrust center are not designed identically in a conventional optical pick-up actuator moving part, furthermore, an AC tilt is greatly generated when a driving coil is driven in a high frequency region. Consequently, the reliability of the conventional optical pick-up device is deteriorated considerably.

Therefore, the inertia center and the thrust center are designed identically in the conventional optical pick-up actuator moving part, resulting in a reduction in the AC tilt generated on the rolling resonance point of the conventional optical pick-up actuator moving part. However, the inertia center and the thrust center are identical to each other in the conventional optical pick-up actuator moving part. For this reason, the shape of an objective lens holding cylinder in the conventional optical pick-up actuator moving part is limited and the rigidity of the optical pick-up actuator moving part is hindered from being increased.

On the other hand, in a coil for generating a thrust (focus or tracking), a coil effective length is to be decreased in order to adapt a coil driving point position to be a thrust center thereof to the inertia center of the optical pick-up actuator moving part. As a result, the thrust is reduced, that is, a sensitivity is lowered.

In an optical pick-up actuator moving part disclosed in the (JP-A-2001-23202), a mass balance is added and an inertia center and a thrust center are caused to be coincident with each other. The addition of an extra mass balance reduces the rigidity of the optical pick-up actuator moving part, and furthermore, the weight of the optical pick-up actuator moving part is also increased, resulting in a reduction in a thrust.

Moreover, the addition of the mass balance further increases the costs of a component and an assembly.

Further, in the conventional optical pickup device and the conventional optical disk device, a part of a light beam used for recording and reproduction is caused to enter a monitor so as to measure the quantity of light. However, this method is inferior in optical usability and brings about stray light. Additionally, the measurement of the quantity of light has been conventionally performed such that light emitted from an optical unit is measured without changing a light intensity distribution. This method is inferior in signal sensibility and inferior in the accuracy of the writing and readout of information.

SUMMARY OF THE INVENTION

The invention solves the conventional problems and has an object to provide an optical pick-up device and an optical disk device which can implement at least one of a reduction in a thickness, a reduction in a size and the suppression of a deterioration in characteristics corresponding to laser beams having various wavelengths including a blue laser beam.

Furthermore, it is an object to provide an optical pick-up device and an optical disk device which can implement a high rigidity and a high sensitivity and can realize a low cost and a high reliability also in an optical pick-up actuator in which a thrust center and an inertia center are not designed identically.

The present invention aims to provide an optical pickup device capable of realizing at least one of thickness reduction, size reduction, optical usability improvement, signal sensibility improvement, etc., in accordance with light emitted from an optical unit.

The invention set forth in claim 1 is an optical pickup device comprising: a first optical unit for emitting a first wavelength of light; a second optical unit for emitting at least one or more of wavelengths of light longer than the first wavelength of light; a light-receiving member for receiving a light reflected from an optical disk; a correcting member for correcting for spherical aberration of the first wavelength; an optical member for guiding the first wavelength of light and the wavelength of light longer than the first wavelength of light to substantially a same optical path; and focusing member for focusing a light of from the optical member; wherein the first wavelength of light emitted from the first optical unit is passed through the correcting member and the optical member, and then focused by the focusing member and illuminated onto the optical disk while the first wavelength of light reflected upon the optical disk is passed through the focusing member, the optical member and the correcting member, and then entered to the light-receiving element. Structure is simplified hence to realize size and thickness reduction.

The invention set forth in claim 2 is an optical pickup device according to claim 1, wherein the first optical unit is mounted with one laser diode while the second optical unit is mounted with a plurality of laser diodes separately or with a laser diode having a plurality of light-emitting layers within one member. Structure is simplified to realize size and thickness reduction.

The invention set forth in claim 3 is an optical pickup device according to claim 2, wherein the laser diode mounted on the first optical unit is to emit a light of from substantial blue to substantial blue purple while the laser diode mounted on the second optical unit is to emit a light of from substantial infrared to substantial red. At least one of data recording and reproducing can be realized to and from an optical disk compatible with high-density recording and an optical disk having the conventional recording density.

BRIEF DESCRIPTION OF THE DRAWINGS

FIG. 49 is a material characteristic table for explaining the material of the objective lens holding cylinder in the optical pick-up device according to the embodiment of the invention.

DESCRIPTION OF THE PREFERRED EMBODIMENTS

Embodiment 1

Figure 1:
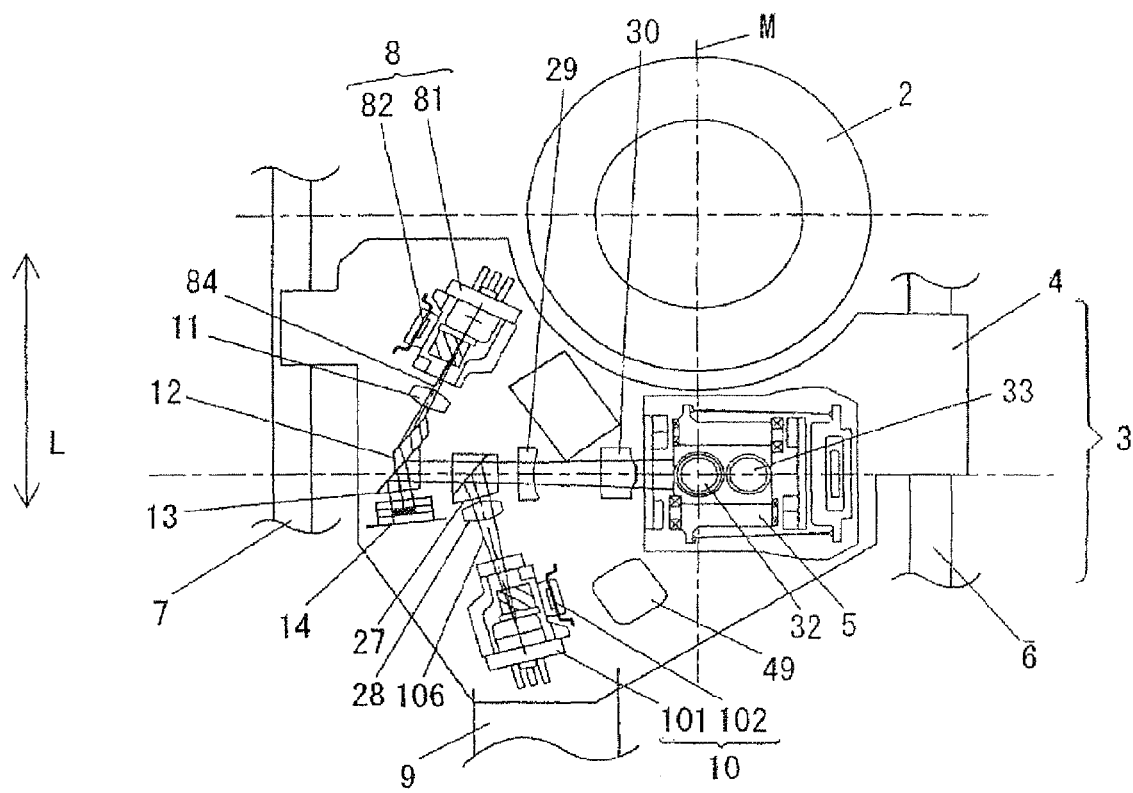
FIG. 1 is a plan view showing an optical pickup in one embodiment of the present invention.

Explanation is now made on an optical pickup device according to embodiment 1 of the present invention, with reference to the drawings. FIG. 1 is a plan view showing an optical pickup device in one embodiment of the invention while FIG. 2 is a side view of the optical pickup device of the one embodiment of the invention.

Figure 2:
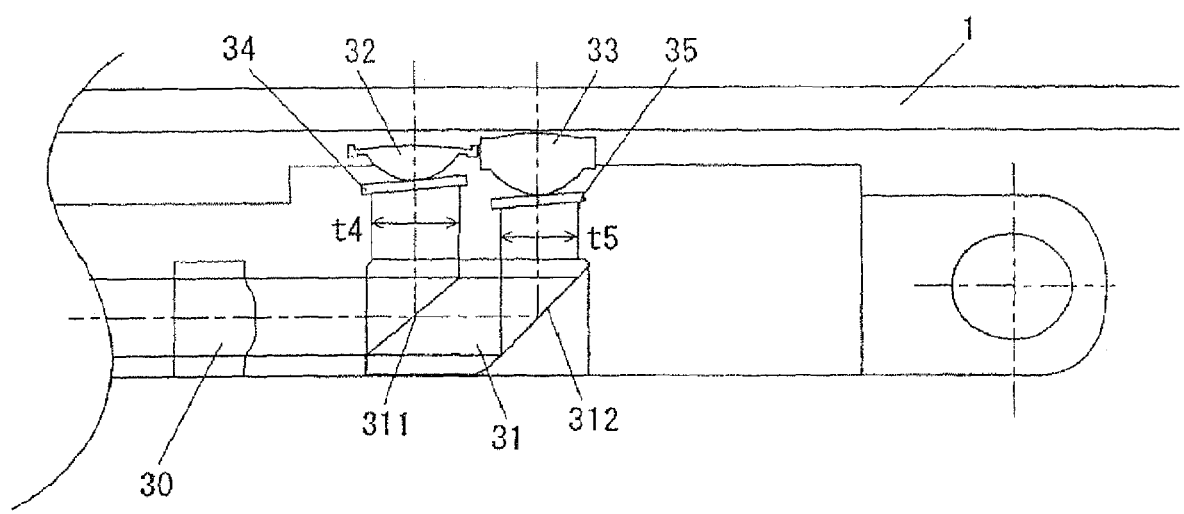
FIG. 2 is a side view showing the optical pickup in the one embodiment of the invention.

In FIGS. 1 and 2, 1 denotes an optical disk. The optical disk 1 is capable of effecting at least one of reproducing and recording information by an illumination of light. Specifically, the optical disk 1 suitably uses a CD-ROM disk, a DVD-ROM disk or the like exclusive for reproducing information, a CD-R disk, a DVD-R disk or the like for recording information in addition to reproducing information, or a CD-RW disk, a DVD-RW disk, a DVD-RAM disk or the like for recording/erasing information in addition to reproducing information. Meanwhile, the optical disk 1 can use a structure having a recording layer for effecting at least one of recording and reproducing information through use of a nearly red part of light, a structure having a recording layer for effecting at least one of recording and reproducing information through use of a nearly infrared part of light, or a structure having a recording layer for effecting at least one of recording and reproducing information through use of a nearly blue to blue-purple part of light. Furthermore, the optical disk 1, although can use a disk form in a size of any diameter, suitably uses a disk form having a diameter of preferably 3-12 cm.

2 denotes a spindle motor for rotating the optical disk 1. The spindle motor 2 is provided with a chuck part (not shown) for supporting the optical disk 1. The spindle motor 2 can rotate the optical disk 1 at a constant angular velocity or at a variable angular velocity. How to control the angular velocity at constant or variable is made by switching over through spindle-motor drive means and optical-disk-device control section, not shown, depending upon a situation thereof. Incidentally, this embodiment, although used the spindle motor 2 as rotation drive means of the optical disk 1, may cause rotational driving by use of a motor in other kind or another means.

3 denotes an optical pickup for recording information to the optical disk 1 and reproducing information from the optical disk 1, by an illumination of light to the optical disk 1.

4 denotes a carriage serving as a base of the optical pickup 3. 5 denote an optical-pickup actuator which is to move an objective lens, referred later, nearly three dimensionally. The carriage 4 is held at least by a support shaft 6 and a guide shaft 7, to be allowed to move between the inner and outer peripheries of the optical disk 1. Meanwhile, the carriage 4 is mounted thereon with the optical-pickup actuator 5 and an optical part or light source.

Figure 3:
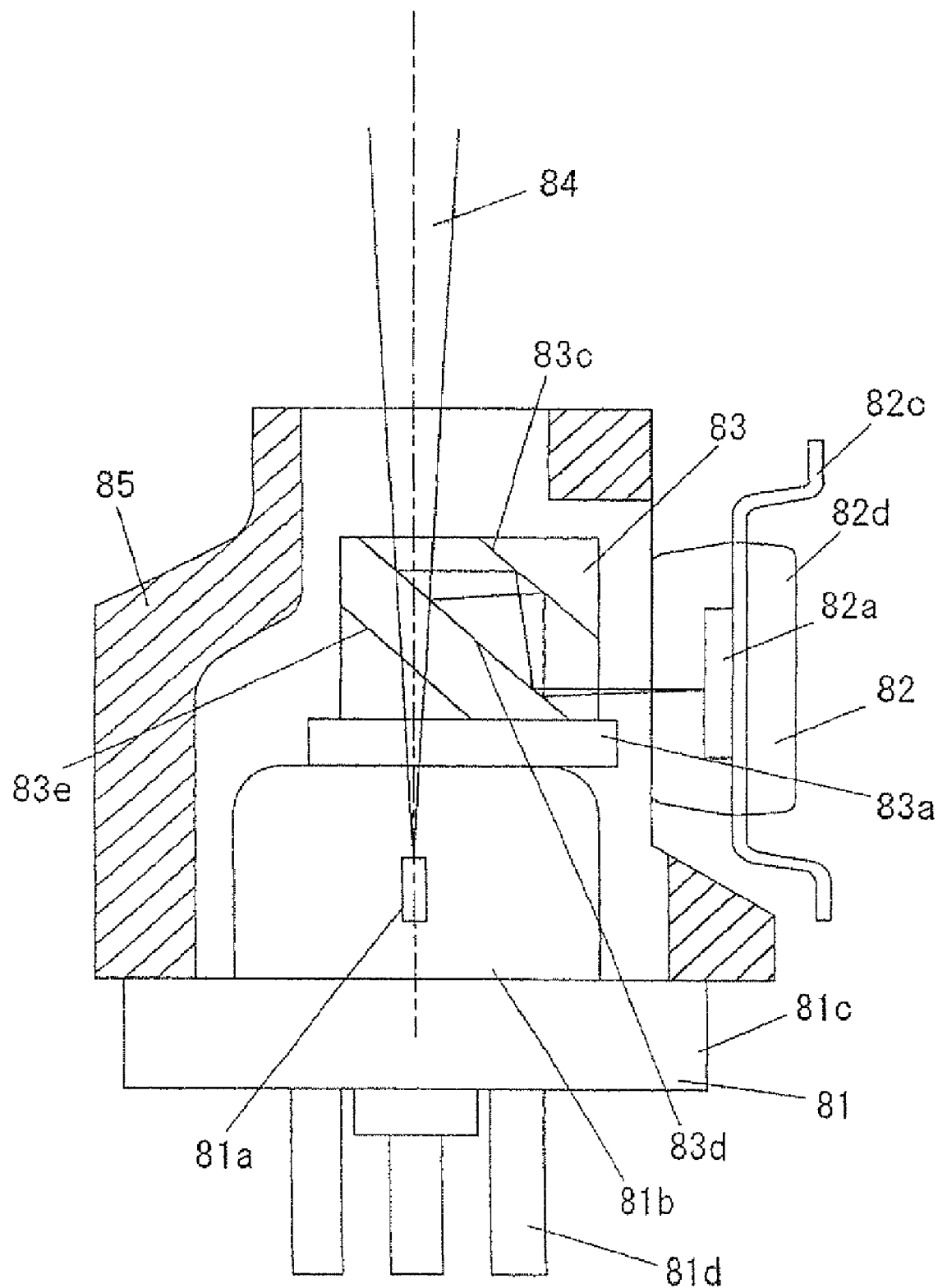
FIG. 3 is a fragmentary magnifying view showing the optical pickup in the one embodiment of the invention.

8 denotes an integrated device having a blue-purple laser part 81 and a light-receiving element part 82, the detail of which will be explained with using FIG. 3. The laser part 81 has a laser diode 81a for generating a laser light of 405 nm. The laser diode 81a is arranged within a closed space structured by a base 81c and a cover 81b.

Incidentally, this embodiment, although used the laser diode 81a for emitting a blue-purple part of light, may employ a laser diode for emitting a blue to purple part of light. Incidentally, the laser diode for emitting such a short wavelength of laser light suitably employs a structure having an active layer of GaN added with a luminescent center of In or the like, sandwiched by a p-type layer based on GaN doped with a p-type impurity and an n-type layer based on GaN doped with an n-type impurity. It suitably uses so-called a nitride semiconductor laser.

Meanwhile, the base 81c has a plurality of terminals 81d extending vertical to the same. The terminals 81d are constituted by a grounding terminal, a terminal for supplying electric current to the laser diode 81a, and so on.

Meanwhile, the cover 81b is provided with an opening (not shown) of glass or the like through which light is allowed to enter and exit. A transparent plate (not shown) is provided on the cover 81b by means of such a technique as bonding, in a manner closing the opening. 83 is a prism directly attached on the cover 81b by means of such a technique as bonding, over the opening of the cover 81b. This prism allows to pass the laser light 84 emitted from the laser diode 81a and changes it into an illumination light toward the optical disk 1, and guides a return light from the optical disk 1 to the light-receiving element part 82. The prism 83 is provided with a diffraction grating (not shown) for monitoring the laser light 84. Furthermore, there is provided a diffraction grating (not shown) for splitting the laser light 84 having a wavelength of 405 nm, at a position guided to the light-receiving element part 82. This enables focus detection, tracking detection, spherical aberration detection, detection of a signal, etc. recorded on the optical disk 1, and extraction of control signals. Incidentally, in this embodiment, a transparent cover member 83a is provided between the prism 83 and the cover 81b. This cover member 83a is directly bonded on the cover 81b by means of such a technique as bonding. The prism 83 has slant surfaces 83c-83e provided slanted nearly parallel one with another. On the slant surfaces 83c-83e, arranged are optical elements including a beam splitter film and a hologram. The slant surfaces 83c-83e are equivalent to junction planes of between transparent glass blocks or resin blocks. Although this embodiment provided three slant surfaces, they may be one or a plurality in the number. Incidentally, in this embodiment, although the laser part 81 is structured that the opening provided in the cover 81b is closed by a not-shown transparent plate to thereby fill an inert gas within the space constituted by the cover 81b and the base 81c, the opening may be closed by the cover member 83a instead of closing the opening by a not-shown transparent plate. Meanwhile, a diffraction grating (not shown) for establishing three beams is fabricated on the cover member 83a as required and on the prism 83 at a side close to the laser part 81. The cover member 83a can be integrated or arranged with other optical parts besides the diffraction grating. The diffraction grating, to be provided on the cover member 83a, suitably uses a structure for making non-uniform the intensity distribution of a light emitted from the laser diode 81a (e.g. structure for decreasing the luminescence at a center of a light spot but increasing the luminescence at an outer periphery thereof), a structure for guiding a part of the light toward a direction different from a direction toward the optical disk 1 in order to use the guided light as a monitor light, and so on. Furthermore, in case the prism 83 is attached on the cover member 83a by means of such a technique of bonding, it is possible to relax the adhesion protruding outward of the slant surfaces 83c-83e as junction planes or a recess caused in the slant surfaces 83c-83e. Namely, because of optical design or the like, should the light emitted from the laser diode 81a impinge upon a concave or convex formed at the outer surface of the slant surface 83c-83e as noted above, there is a possible affection upon recording/reproducing characteristic. Accordingly, the provision of a cover member 83a on the prism 83 at a side close to the laser diode 81a makes it possible to relax a concavo-convex even in case such a concave or convex is formed, thus preventing against deterioration in recording characteristic. Furthermore, instead of the structure closing the opening by the cover member 83a, the cover member 83a may be omitted to directly close the opening by the prism 83.

Incidentally, this embodiment was structured to hermetically seal the interior of the laser part 81. However, a port may be provided through the cover 81b differently from the light exit port to make the interior of the laser part 81 in a non-closed state. Such a structure can prevent the optical member and the like provided at the exit port of the laser part 81 from clouding.

The light-receiving element part 82 has a light-receiving element 82 covered by a case 82b including a transparent member. Moreover, from the case 82b, a terminal 82c electrically connected with the light-receiving element 82a is extended outward of the case 82b.

85 denotes a coupling member, which is a member to align the laser part 81 with the light-receiving element part 82. The terminal 82c of the light-receiving element part 82 is connected with a flexible board (not shown). The flexible board is bonded to a laser flexible board 9 by solder or the like.

Figure 4:
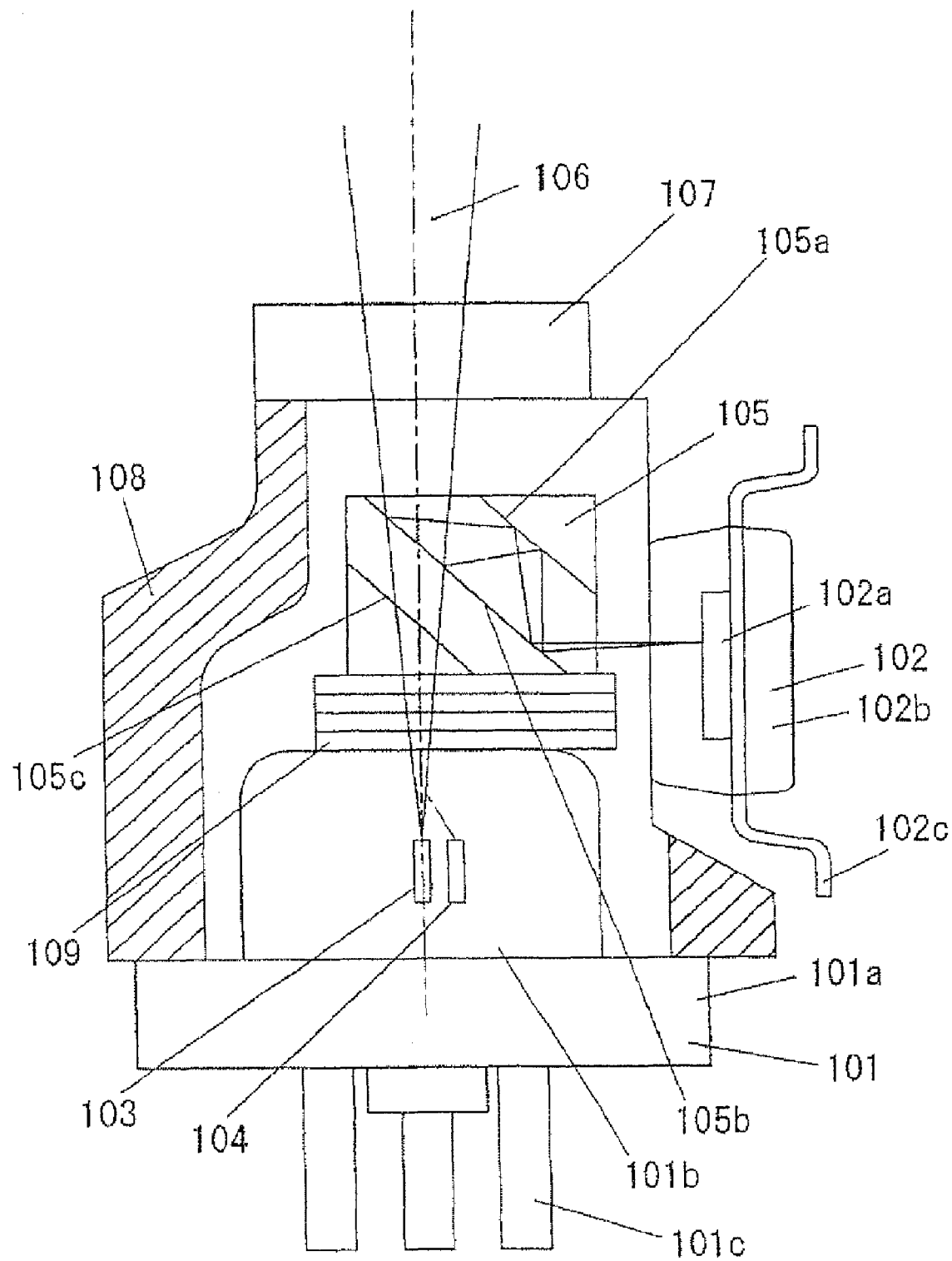
FIG. 4 is a fragmentary magnifying view showing the optical pickup in the one embodiment of the invention.
Figure 5:
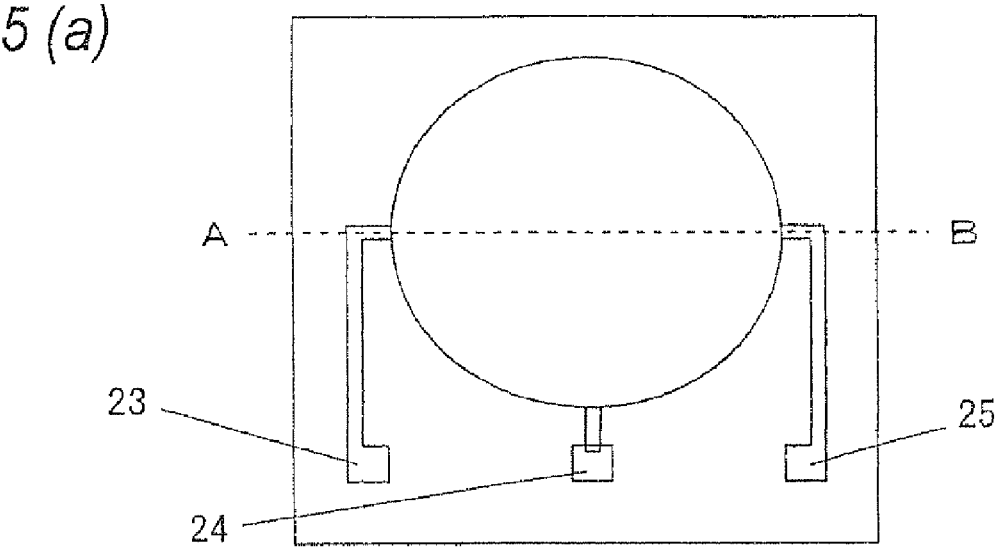
FIG. 5 is a view showing an aberration correcting mirror to be used in the optical pickup in the one embodiment of the invention.
Figure 5:
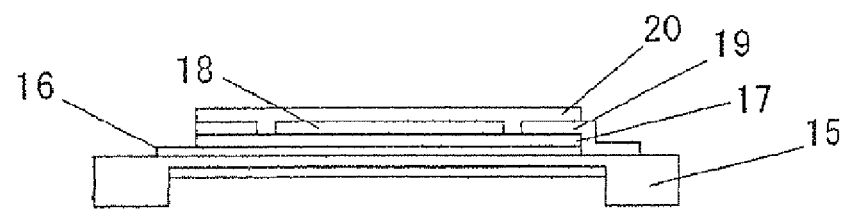
Figure 5:
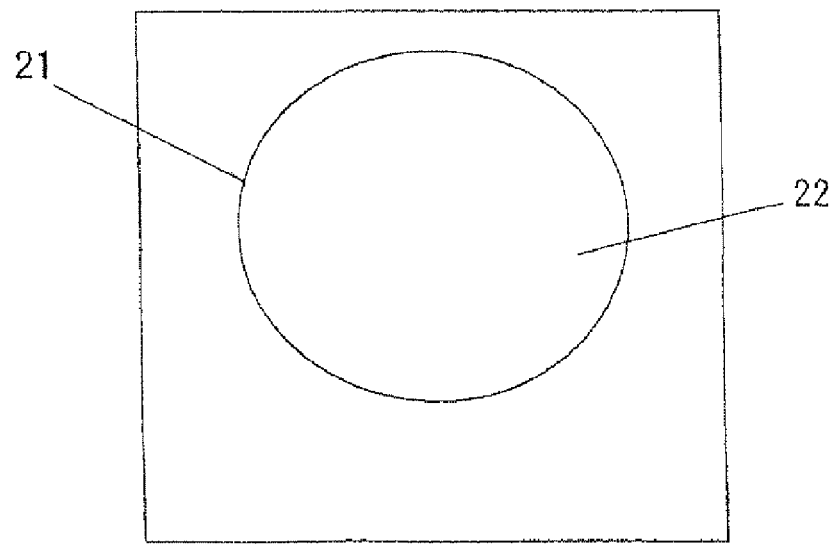

10 denotes an integrated device having a red-and-infrared laser part 101 and a light-receiving element part 102, which will be detailed by using FIG. 4. In the laser part 101, there are provided a laser diode 103 for emitting a laser light having a wavelength of approximately 660 nm and a laser diode 104 for emitting a laser light having a wavelength of approximately 780 nm. The laser diode 103, 104 is arranged within a closed space constituted by a base 101a and a cover 101.

Incidentally, in this embodiment, the laser diodes 103, 104 were respectively arranged within a closed space, as light-emitter blocks different from each other. Alternatively, a plurality of light-emitting layers may be provided in one light-emitter block, to arrange the one light-emitter block within a closed space. Meanwhile, this embodiment mounted two laser diodes different in wavelength. Alternatively, three or more laser diodes different in wavelength may be provided within a closed space.

Meanwhile, a plurality of terminals 101c are vertically provided on the base 101a. The terminals 101c are constituted by a ground terminal, a terminal for supplying electric current to the laser diode 103, 104, an output terminal for monitoring light. Meanwhile, the cover 101b is provided with an opening (not shown) through which light is allowed to exit and enter. A transparent plate (not shown), e.g. of glass, is provided in a manner closing the opening by means of such a technique as bonding. 105 denotes a prism for allowing a laser light 106 to transmit and guiding a return light to the light-receiving element part 102. The prism 105 is provided with a diffraction grating (not shown) for monitoring the laser light 106. Furthermore, there is provided a diffraction grating (not shown) for splitting the laser light 106 having a wavelength of 780 nm or 660 nm, in a position guided close to the light-receiving element 102. This enables focus detection, tracking detection, and detection of signals recorded on the optical disk 1 and control signals, etc. The prism 105 has slant surfaces 105a-105c provided slanted nearly parallel one with another. On the slant surfaces 105a-105c, there are arranged optical elements including a beam splitter film and a hologram. The slant surfaces 105a-105e are equivalent to junction planes of between transparent glass blocks or resin blocks. Incidentally, in this embodiment, although the slant surfaces were provided three, they may be provided one or a plurality in the number.

107 denotes a polarizing-hologram diffraction grating for a wavelength of 660 nm or 780 nm, which is provided spaced by the prism 105 thus enabling tracking detection and detection of signals described on the optical disk 1. Meanwhile, the polarizing hologram 107 has a less effect upon the laser light having a wavelength of 780 nm when acted at a wavelength of 660 nm. Meanwhile, when acted at a wavelength of 780 nm, it has less effect upon the laser light having a wavelength of 660 nm. Meanwhile, a diffraction grating (not shown) for establishing three beams is formed, as required, on the prism 105 at a side close to the laser part 101. Thus, there is provided a three-beam diffraction grating utilizing polarization light for example, in order to prevent one laser wavelength from being affected by the other wavelength.

108 denotes a coupling member, which is to align the laser part 101 with the light-receiving element part 102. 109 is a diffraction grating having a beam-combiner function, which is made not to act at a wavelength 660 nm but to act at a wavelength 780 nm. The apparent virtual light-emitting point at a wavelength 780 nm is given coincident with the virtual light-emitting point at a wavelength 660 nm. Meanwhile, the diffraction grating 109 is optically permissible unless having the beam-combiner function.

The diffraction grating 109 is structured by a plurality of plate members layered one over another. A grating is provided on at least one of the plate members in plurality. Meanwhile, the diffraction grating 109 is bonded directly on the cover 101b in a manner closing the opening of the cover 101b, by means of such a technique as bonding. Incidentally, in the present embodiment, the opening as a light exit port of the cover 101b was closed by the transparent plate. However, by structuring to close the opening by the diffraction grating 109 itself without using the transparent plate, the transparent plate is not required thus simplifying the structure.

Incidentally, in this embodiment, the laser part 101 was structured closed at the interior thereof. However, a port different from the light exit port may be provided through the cover 101b, to make the interior of the laser part 101 in a non-closed state. Such a structure can prevent the optical member, etc. provided at the exit port of the laser part 101 from clouding.

The light emitted from any one of the laser diodes 103, 104 passes the opening of the case 101b, and guided to the optical disk 1 through the diffraction grating 109, the prism 105 and the polarizing-hologram diffraction grating 107. The light reflected upon the optical disk 1 passes the polarizing-hologram diffraction grating 107 and the prism 105, then being guided to the light-receiving element part 102. At this time, in the prism 105, the reflection light from the optical disk 1 is reflected between the slant surface 105a and the slant surface 105b, to enter the light-receiving element part 102 located laterally of a line connecting between the laser part 101 and the polarizing-hologram diffraction grating 107.

The light-receiving element part 102 has a light-receiving element 102a covered with a case 102b including a transparent member. Moreover, from the case 102b, a terminal 102c electrically connected with the light-receiving element 102a is extended outward of the case 102b.

The terminal 102c of the light-receiving element part 102 is connected with a flexible board (not shown) bonded to a laser flexible board 9 by solder or the like.

11 denotes a collimator lens for a wavelength 405 nm, which is to be used to change the scatter laser light outputted from the laser part 81 into nearly a collimated light. Meanwhile, the collimator lens 11 has a function to correct for chromatic aberration as caused under the influence of wavelength variation, temperature change or the like. 12 denotes a beam shaping prism, which is to correct the intensity distribution of the laser light 84 into nearly a circular form. 13 denotes a critical angle prism, which is to be used for separate the laser light 84. 14 denotes an aberration correcting mirror, which is to be used for correcting for spherical aberration as caused by errors in thickness or the like of the optical disk 1.

Here, explanation is made on the aberration correcting mirror by using FIGS. 5 to 8.

FIGS. 5(a)-5(c) are respectively a schematic plan view (uppermost plane), a sectional view on the broken line A-B and a sectional view in the plan view (lowermost plane) of an aberration correcting mirror for use in an optical pickup according to the present embodiment. There are formed, on a substrate 15, a lower electrode 16, a piezoelectric member 17, upper electrodes 18, 19 and an elastic member 20. The substrate 15 has, in a backside (lower in the figure), a circular cavity 21, forming a reflection film 22. The lower electrode 16 is patterned and extended to the electrode pad 23. Similarly, the upper electrodes 18, 19 are patterned and extended respectively to the electrode pads 24, 25.

Figure 6:
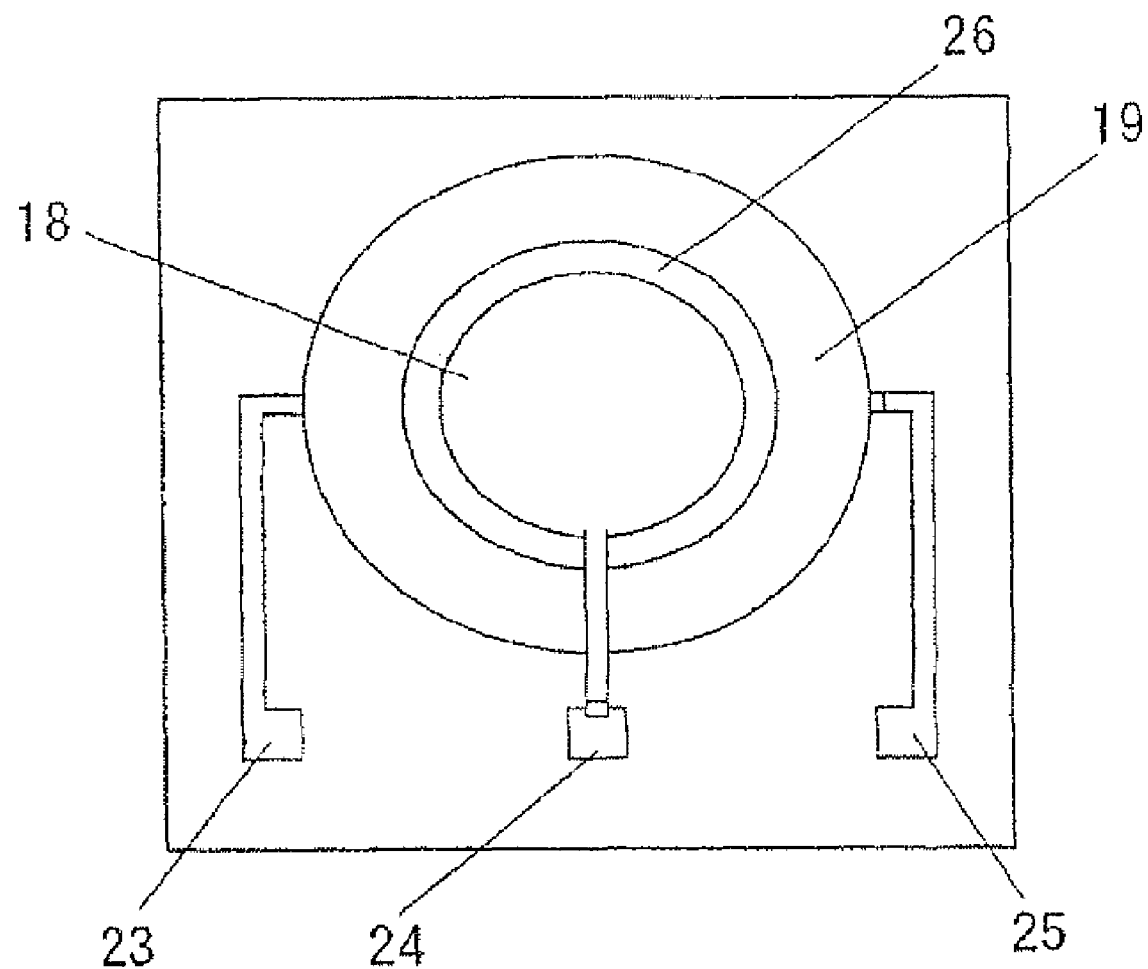
FIG. 6 is a view showing an aberration correcting mirror to be used in the optical pickup in the one embodiment of the invention.

FIG. 6 shows a structure of the upper electrode 18, 19. The upper electrodes 18, 19 are insulated from each other by an insulator part 26. In this example, the upper electrode 18 is circular, and the upper electrode 18 is made as an annular electrode common in its center to the upper electrode 18. From the upper electrode 18, a wiring is extended and connected to the electrode pad 24. Similarly, from the upper electrode 19, a wiring is extended to the electrode pad 25. Incidentally, in this embodiment, although division was made into two as the upper electrodes 18, 19, division may be into three or more. Moreover, in this embodiment, the upper electrodes 18, 19 were structured circular in outer shape, those may be square, polygonal more than a rectangular, or triangular.

Figure 7:
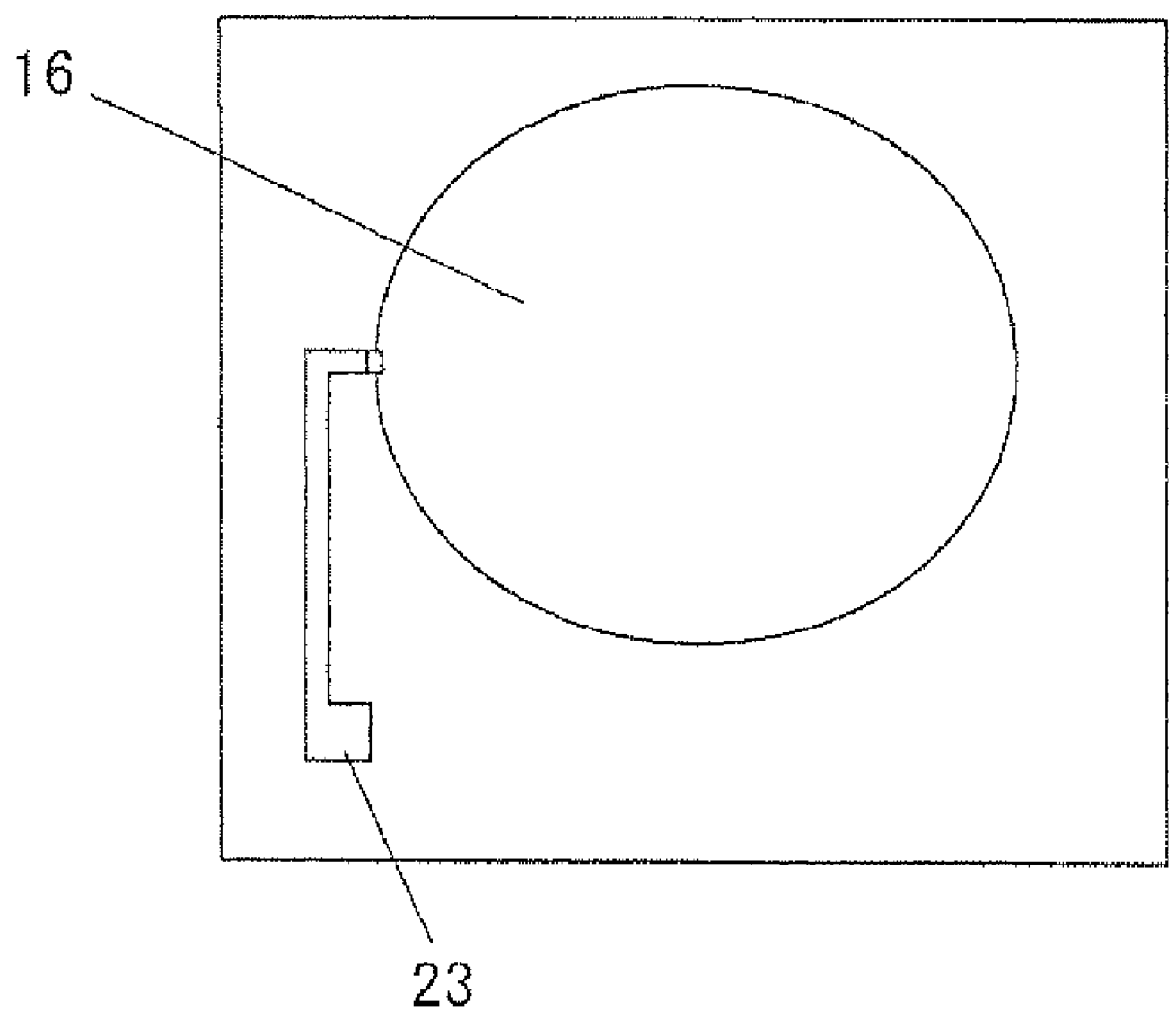
FIG. 7 is a view showing an aberration correcting mirror to be used in the optical pickup in the one embodiment of the invention.

FIG. 7 shows a structure of the lower electrode. The lower electrode 16 sandwiches the piezoelectric member 17 cooperatively with the upper electrodes 18, 19. Moreover, the lower electrode 16 is wired to the electrode pad 23.

Figure 8:
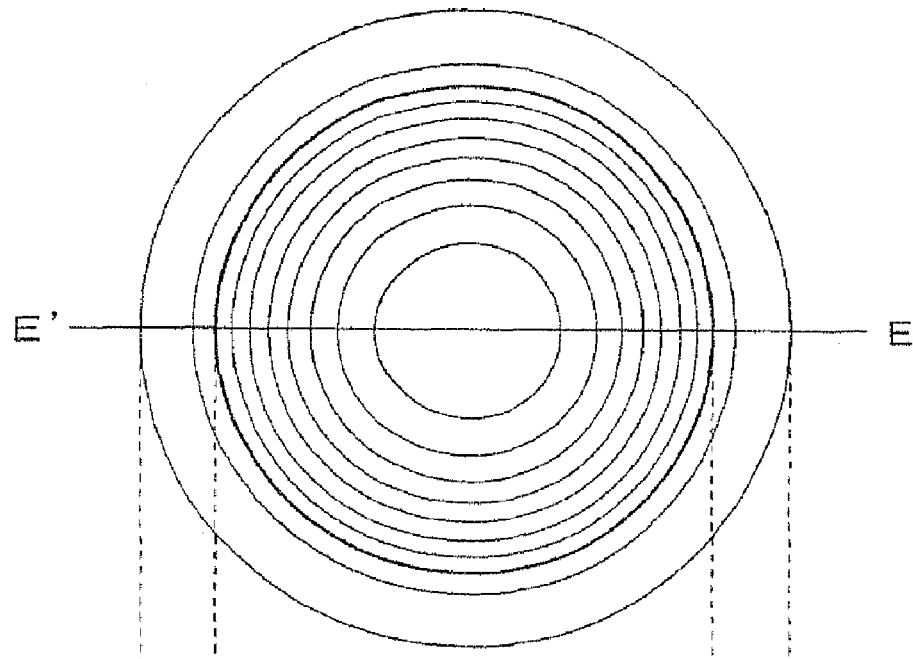
FIG. 8 is a view showing an aberration correcting mirror to be used in the optical pickup in the one embodiment of the invention.
Figure 8:
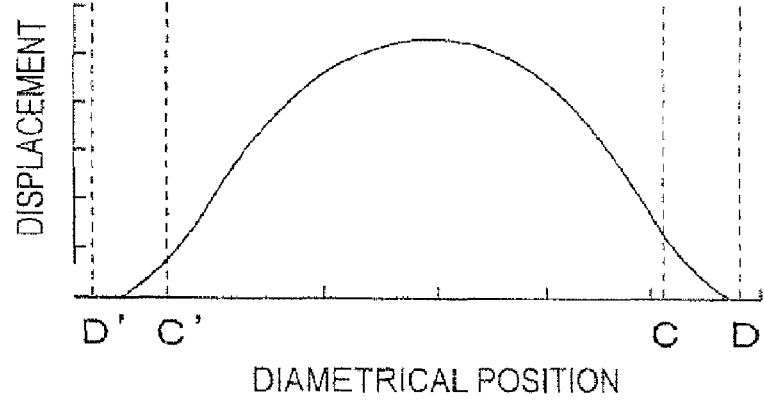

In FIG. 8, there are shown a contour of displacement (a) and a displacement diagram (b) of the reflection film 22 in the case that, in the above structure, the lower electrode 16 is grounded while the upper electrode 18 and the upper electrode 19 are respectively given with a positive voltage and a negative voltage. In the figure, C, C' and D, D' respectively correspond to outer peripheral positions of the insulator part 26 and the cavity 21. The positions of D, D' correspond to the outer periphery of the cavity 21 wherein the outer periphery is bound, hence being zero in displacement. The displacement is convex downward in an annular region corresponding to C-D, C'-D', and assumes an upward convex in a region corresponding to a diameter of C-C' with respect to a boundary of C, C'. Although a non-spherical form is generally required in correcting for spherical aberration, the curved-surface form in C-C' is truly in a non-spherical form. Accordingly, the present invention employs the curved-surface region in C-C', i.e. a corresponding part of the reflection film 22 to the form of the upper electrode 18 or the inside thereof. Due to this, the aberration correction mirror is a functional part capable of realizing a quite accurate aberration correction. Incidentally, although this embodiment provided the aberration-correcting mirror using the film-formed piezoelectric member 17, it may be structured by a bulk piezoelectric member. Otherwise, the aberration-correcting mirror may be driven by using other displacable member. Meanwhile, spherical aberration can be corrected by combining a plurality of lenses without using a piezoelectric member 17 and moving at least one of the lenses in plurality.

Now, 27 denotes a beam splitter, which is to be used for separating and combining a laser light 84 and laser light 106 emitted from the integrated device 8 and integrated device 10. 28 denotes a collimator lens for a wavelength of 660 nm and 780 nm, which is to be used to change the scattering laser light outputted from the laser part 101 into nearly a collimated light. Meanwhile, it is possible to provide a function to correct for a chromatic aberration as caused under the influence of wavelength variation, temperature change or the like.

29 denotes a concave lens having a negative power while 30 is a convex lens having a positive power. By the combination of the concave lens 29 and the convex lens 30, the laser light 84 and 106 is magnified into a desired beam diameter. 31 denotes a erecting prism, which has a first surface 311 formed with a dielectric multi-layered film having a function to reflect a laser light 106 having a wavelength of 660 nm and 780 nm and a function to transmit a wavelength of 405 nm. Meanwhile, a second surface 312 is adapted to reflect 405 nm. 32 denotes an objective lens for an optical disk (DVD) 1 corresponding to a wavelength 660 nm. This is an objective lens having a function capable of focusing a collimated light onto an optical disk (CD) 1 corresponding to a wavelength 780 nm. 33 is an objective lens for an optical disk (blu-ray or AOD) corresponding to a wavelength 405 nm at a desired recording point. In the embodiment, the objective lens 32 is arranged at a center position of the spindle motor while the objective lens 33 is arranged on a side opposite to the convex lens 30 with respect to the objective lens 32, i.e. tangentially of the optical disk 1. Meanwhile, the objective lens 33 is structured greater in thickness than the objective lens 32. By an arrangement that the light emitted from the light source first raises a comparatively long wavelength of light at the first surface 311 and then raises a comparatively short wavelength of light at the second surface 312 after passed the first surface 311, i.e. an arrangement that the objective lens 32 corresponding to a longer wavelength is arranged closer to the laser part 81, 101 while the objective lens 33 is provided at a position distant farer than the objective lens 32, it is possible to increase the path of routing of a light before entering the raise-up prism, thus facilitating optical design.

Figure 11:
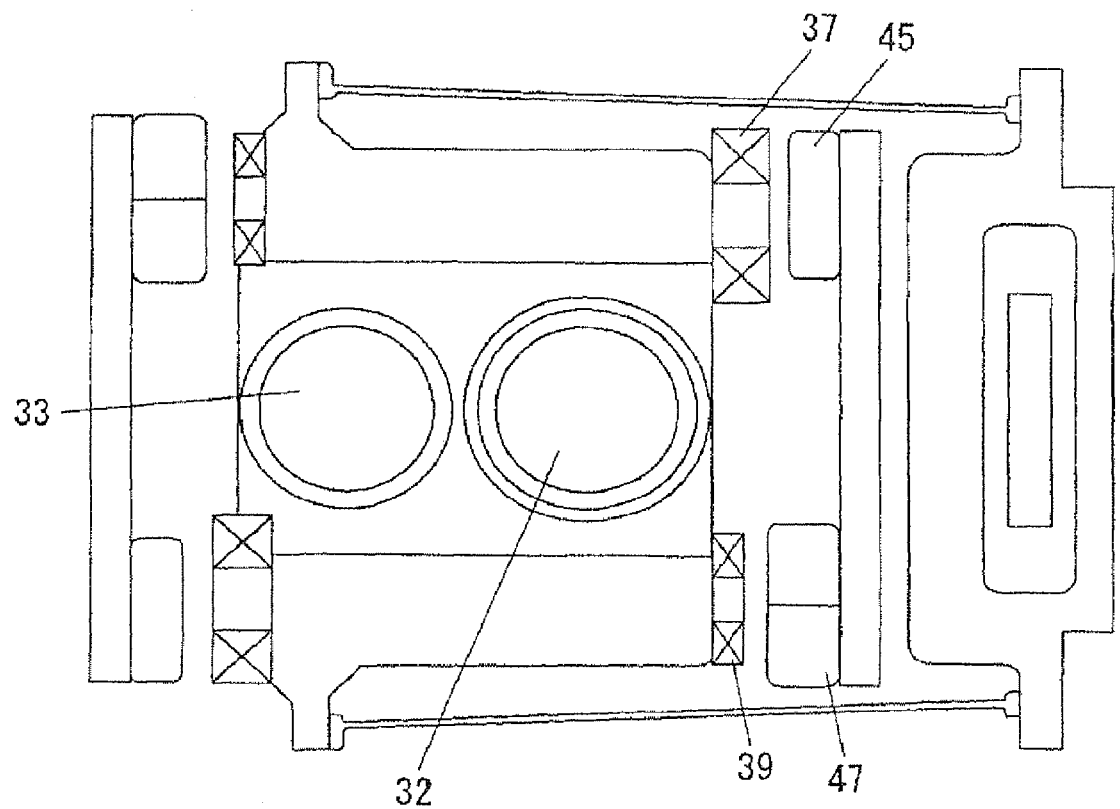
FIG. 11 is a front view showing an actuator of the optical pickup device in the one embodiment of the invention.
Figure 12:
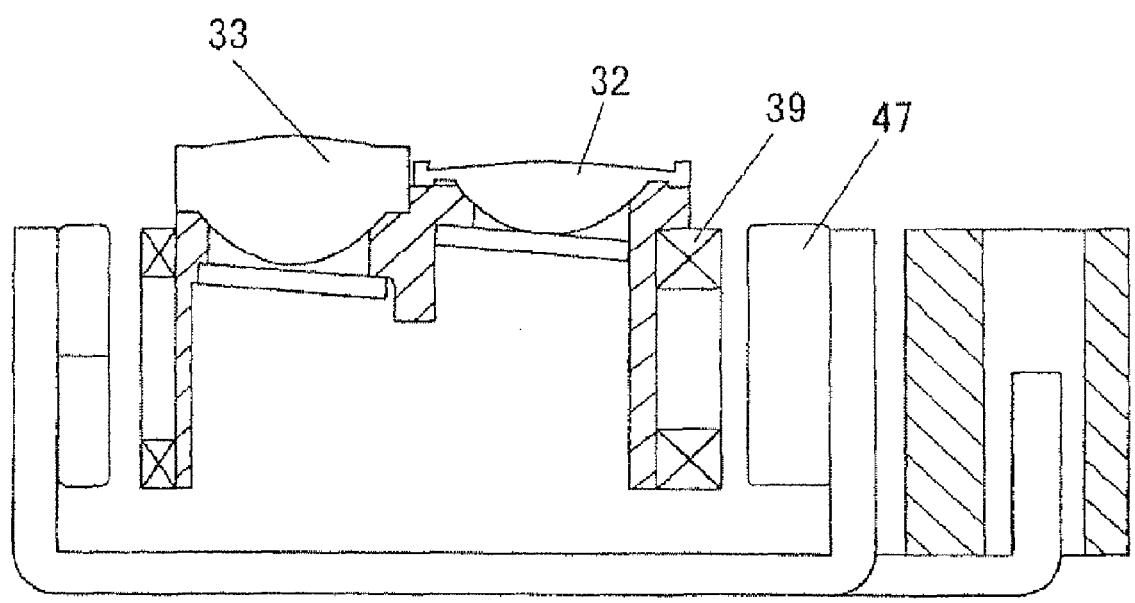
FIG. 12 is a sectional view showing an actuator of the optical pickup device in the one embodiment of the invention.

However, in case the erecting prism 31 is configured to transmit a laser light 106 of a wavelength 660 nm or 780 nm and reflect a laser light 84 of a wavelength 405 nm at the first surface 311 and to reflect a laser light 106 of a wavelength 660 nm or 780 nm at the second surface 312, the objective lens 33 can be structurally arranged close to the laser part side with respect to the objective lens 32 (see FIGS. 11 and 12). This structure, despite somewhat increases the size of the objective lens holder cylinder, can increase the gap between a tracking coil 39 and a tracking magnet 47 with a result that at least one of the tracking coil 39 and the tracking magnet 47 can be increased in size or the like. It is possible to obtain a drive force for sufficiently driving the objective lens 32, 33 and hence to realize high-speed access.

34 denotes an aperture filter for realizing a numerical aperture required to cope with a CD or DVD optical disk, which is realized by means of a dielectric multi-layered film, a hologram opening and the like. Meanwhile, the aperture filter 34 is integrally formed with a $\lambda/4$ plate corresponding to a wavelength of 660 nm or 780 nm, to provide a nearly 90-degree polarization in polarization direction on between the incoming and outgoing paths. 35 denotes a $\lambda/4$ plate for a wavelength of 405 nm, to provide a nearly 90-degree polarization in polarization direction on between the incoming and outgoing paths. The $\lambda/4$ plates 34, 35 can be arranged on a passage common between the wavelengths of 405 nm, 660 nm and 780 nm.

Figure 9:
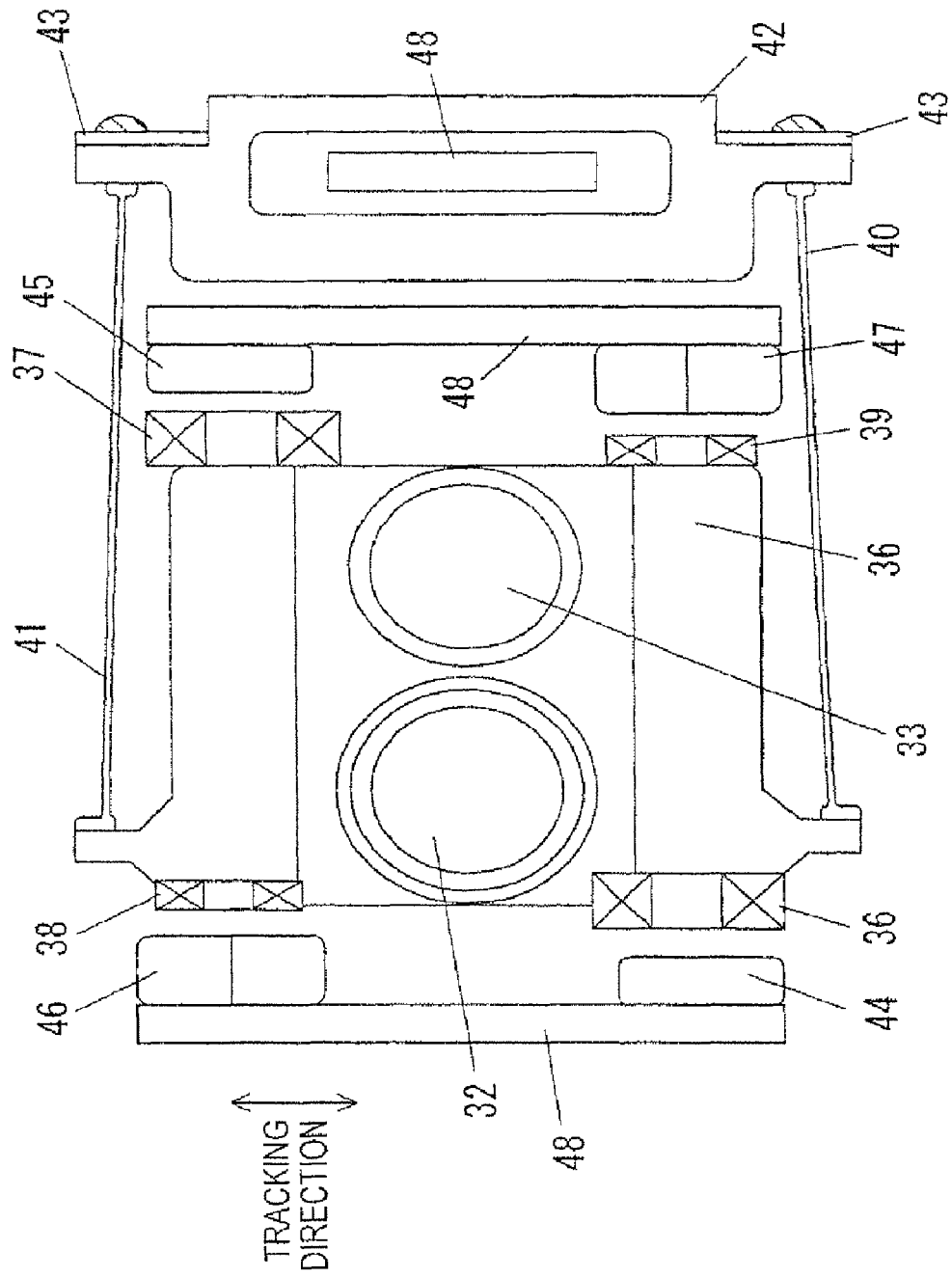
FIG. 9 is a front view showing an actuator of the optical pickup device in the one embodiment of the invention.
Figure 10:
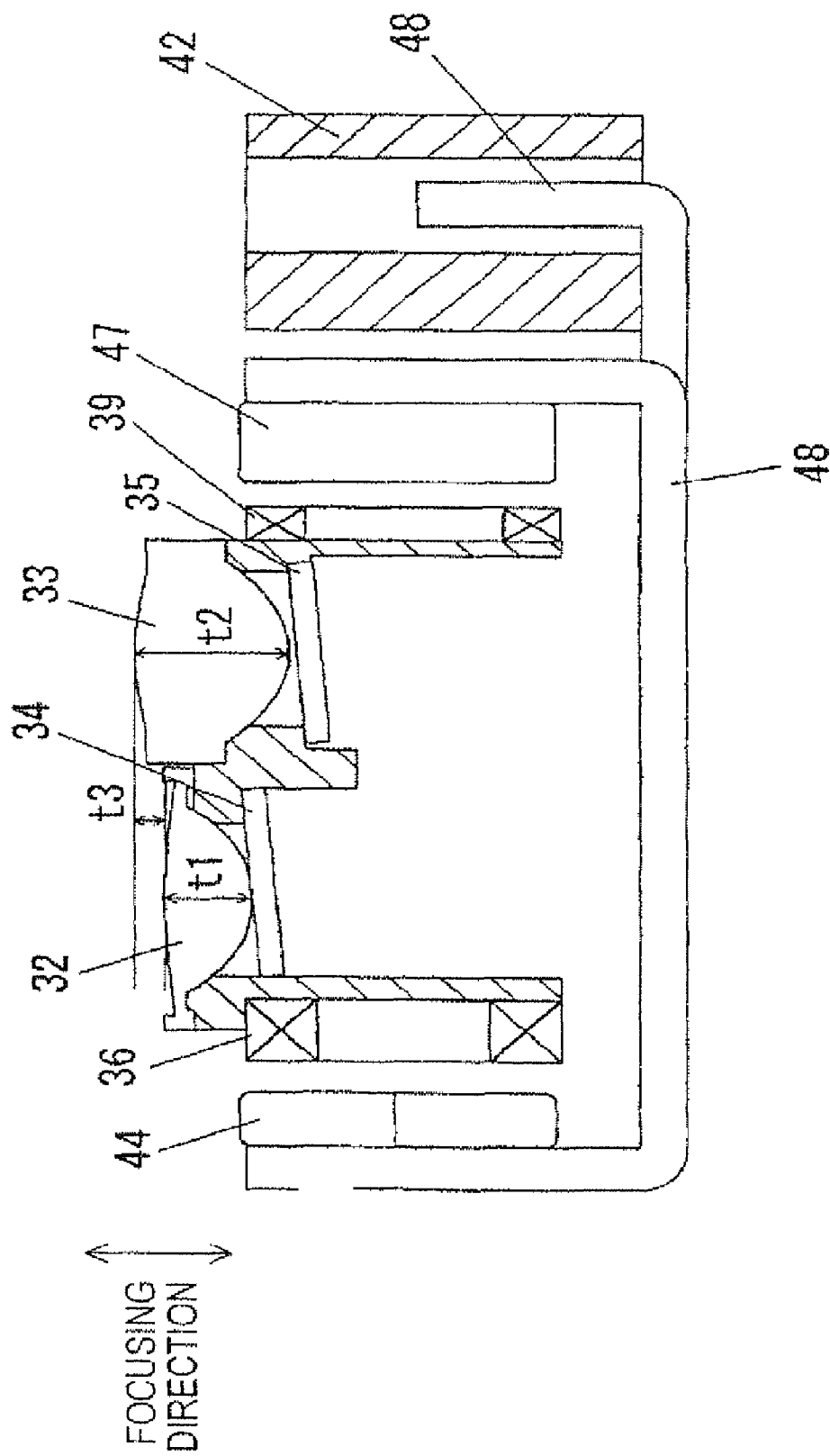
FIG. 10 is a sectional view showing an actuator of the optical pickup device in the one embodiment of the invention.

Now explanation is made on the actuator holding the objective lenses 32 and 34, by using FIGS. 9 and 10. FIG. 9 is a front view showing an actuator of the optical pickup device in one embodiment of the invention while FIG. 10 shows a sectional view thereof.

In FIG. 9, 36 is an objective-lens holder cylinder capable of fixing objective lenses 32, 33, an aperture filter with $\lambda/4$ plate 34 and a $\lambda/4$ plate 35 together by such means as bonding.

36, 37 denote respectively focusing coils each wound nearly in a ring form. 38, 39 denote tracking coils each wound nearly in a ring form, similarly to the focusing coil 36, 37. These focusing coils 36, 37 and tracking coils 38, 39 are also fixed in the holder cylinder by adhesive or the like. 40, 41 are suspension wires. The suspension wires 40, 41 connect between the objective-lens holder cylinder 36 and the suspension holder 42. At least the objective-lens holder cylinder 36 is displaceable relative to the suspension holder 42 in a predetermined range. The suspension wire 40, 41 has both ends respectively fixed to the objective-lens holder cylinder 36 and the suspension holder 42 by insert-molding. The focusing coils 36, 37 are also connected to the suspension wire 40 by soldering or the like while the tracking coils 38, 39 are also connected to the suspension wire 41 by soldering or the like. The suspension wire 40 is preferably constituted by six or more round wires, leaf springs or the like such that it can supply power to the respective focusing coils 36, 37 and series-connected tracking coils 38, 39.

The suspension holder 42 is fixed with a flexible board 43 by bonding or the like, in order for fixing by soldering. 44, 45 denotes focusing magnets structured smaller in widthwise of magnet (in tracking direction) than the focusing coil 36, 37. The focusing magnet 44 outer of the optical disk 1 than the coil center position of the focusing coil 36, 37 is oppositely arranged in a position close to the outer periphery while the focusing magnet 45 inner of the optical disk 1 is oppositely arranged in a position close to the inner periphery. 46, 47 denotes tracking magnets arranged oppositely to the tracking coils 38, 39. Meanwhile, the focusing magnet 44, 45 has magnetic poles segmented in the focusing direction while the tracking magnet 46, 47 has those segmented in the tracking direction. Those are arranged such that one pole is opposed to one piece nearly in a ring form of the focusing coil 36, 37 and tracking coil 38, 39 while the other pole is opposed to the other part nearly in the ring form of the focusing coil 36, 37 and tracking coil 38, 39. At this time, the focusing magnets 44, 45 and the magnetic yoke 48 respectively constitute focus circuits while the tracking magnets 46, 47 and the magnetic yoke 48 respectively constitute tracking circuits. This realizes a structure that the focusing magnetic circuits are respectively arranged therein with each one focusing coil 36, 37 while the tracking magnetic circuits are respectively arranged therein with each one focusing coil 36, 37. By energizing each of the coils, each can be controlled independently. Incidentally, although the embodiment explains to control the focus coils 36, 37 independently, the focusing coils 36, 37 and the tracking coils 38, 39 may be all controlled independently. In this case, the suspension wires 40 and 41 are required at least eight in total. However, where any one of the pairs, e.g. the focusing coils 36, 37 only, are controlled independently, the suspension wires 40 and 41 are satisfactorily needed at least six in the number.

In the meanwhile, the focusing magnet 44, 45 and tracking magnet 46, 47 when segmented is made in a type that magnets having respective single magnetic poles are separated and bonded together instead of multi-pole magnetization of the magnet, thereby making it possible to suppress a neutral zone caused between the poles. This can suppress to the minimum extent the deterioration in magnetic circuit characteristic due to focusing shift and tracking shift of each coil. In order for control of a high-density optical disk narrow in tilt margin, such bonding of single-poled magnets is requisite because of improving accuracy.

The suspension wires 40, 41 are in an inverted converge form and applied with a tension, in order to reduce size and decrease resonance in the buckling direction of the suspension wire 40, 41. Meanwhile, a magnetic yoke 48 magnetically plays a role of a magnetic yoke for the focusing magnets 44, 45 and tracking magnets 46, 47, and structurally serves a function to hold and fix the suspension holder 42. It is also utilized in fixing suspension holder 42 by adhesive or the like. In the suspension wire 40, 41, a damper gel for damping is filled on a side close to a suspension holder 42. The damper gel uses a material to change into a gel state by means of UV or the like. Incidentally, the part constituted by the objective-lens holder cylinder 36, the focusing coil 36, the focusing coil 37, the tracking coil 38, the tracking coil 39, the objective lenses 32, 33, the aperture filter with λ/4 plate 34 and the λ/4 plate 35 is hereinafter referred to as an optical pickup actuator movable part.

49 denotes a laser driver, which is to operate for causing the semiconductor laser having a wavelength of 780 nm and wavelength 660 nm incorporated within the laser part 101 to emit a beam of light. This further has a function to apply a superposition for reducing noise to each wavelength. Meanwhile, the laser driver 49 is made in a structure capable of effectively dissipate heat by a contact state with a cover metal (not shown) arranged over/under the carriage. Meanwhile, 50 denotes also a laser driver, which is to operate for causing the semiconductor laser having a wavelength of 405 nm incorporated within the laser part 81 to emit a beam of light. This further has a function to apply a superposition for reducing noise to each wavelength. Meanwhile, similarly to the laser driver 49, this is made in a structure capable of effectively dissipate heat by a contact state with a cover metal (not shown) arranged over/under the carriage.

Now explanation is made on the optical structure of the optical pickup in this embodiment.

First of all, a wavelength of 405 nm is explained.

The scattering laser light 84 having a wavelength of 405 nm emitted from the laser part 81 is nearly collimated by the collimator lens 11, to pass the beam shaper prism 12 and reach an aberration correcting mirror 14 having a reflection minor function through the critical angle prism 13. The laser light 84 reflected from the aberration correcting mirror 14 again enters the critical angle prism 13. At this time, the incident light and the reflection light that are to enter the aberration correcting mirror 14 are arranged to have an inclination of several degrees around the critical angle of the critical angle prism 13. Meanwhile, a gap is provided between the beam shaper prism 12 and the critical angle prism 13. This arrangement can efficiently separate a laser light 84 having a wavelength 405 nm by the utilization of the critical angle. Meanwhile, light transmission efficiency can be improved by such means as a dielectric multi-layer film on the both surfaces of the beam shaper prism 12 and critical angle prism 13 opposed to the gap. Then, the laser light 84 exited from the critical angle prism 13 passes the beam splitter 27 and enters the erecting prism 31 through the concave lens 29 and convex lens 30, to pass the first surface 311 into incidence upon the second surface 312. The reflected laser light 84 passed the λ/4 plate and changed into a circular polarization, and then focused by the objective lens 33 thus forming a light spot on the optical disk 1. The laser light 84 returning from the optical disk 1 takes a path reverse to the outgoing path. By passing the λ/4 plate, it is shifted a polarization direction by approximately 90 degrees relative to the outgoing path. This finally is separated by a beam splitter of within the prism 83 and guided to the light-receiving element 82a of within the light-receiving element part 82 by the diffraction grating configured to the light-receiving element section 82, to generate at least a spherical-aberration error signal. At a wavelength of 405 nm, because the wavelength is shorter as compared to the conventional, there is an increase of spherical aberration to be caused upon a change in protection layer thickness of the optical disk 1, greatly impairing recording/reproducing quality. Accordingly, depending upon the above spherical-aberration detection signal, the aberration correcting mirror 14 is driven to deform the reflection surface into a somewhat spherical surface, whereby a spherical aberration can be suppressed. Meanwhile, although spherical aberration is to be corrected this time by use of the aberration correcting mirror 14, spherical aberration can be corrected by moving at least one of the concave lens 29 and the convex lens 30 in the optical axis direction.

Now explained is a wavelength of 660 nm. The laser light 106 having a wavelength of 660 nm emitted from the laser diode 103 of the laser part 101 passes the beam combiner 109 and the diffraction grating for forming three beams exclusive for 660 nm. Through the beam-splitting prism 105 and the polarizing-hologram diffraction grating 107, this is nearly collimated by the collimator lens 28. This is reflected and changed in direction by the beam splitter 27 and then incident upon the erecting prism 31 through the concave lens 29 and convex lens 30, thus being reflected upon the first surface 311. The reflected laser light 106 passes the λ/4 plate and turns into circular polarization light, thus being focused by the objective lens 32 and formed as a light spot on the optical disk 1. At this time, the polarizing-hologram diffraction grating 107 does not act on a P wave of outgoing light but acts on an S wave on the incoming path. The laser light 106 returning from the optical disk 1 takes a path reverse to the outgoing path. By passing the λ/4 plate, it is shifted a polarization direction by approximately 90 degrees relative to the outgoing path. The laser light 106, diffracted by the polarizing-hologram diffraction grating 107 into required light, is finally separated by the beam splitter within the prism 105 and guided to the light detector of within the light-receiving element 100.

Subsequently explained is a wavelength of 780 nm. The laser light 106 having a wavelength of 780 nm emitted from the laser diode 104 of the laser part 101 is diffracted by the beam combiner 109 and passed through the diffraction grating for forming three beams exclusive for 780 nm, and nearly collimated by the collimator lens 28 through the beam-splitting prism 105 and the polarizing-hologram diffraction grating 107. This is reflected and changed in direction by the beam splitter 27 and then incident upon the erecting prism 31 through the concave lens 29 and convex lens 30, thus reflected upon the first surface 311. The reflected laser light 106 passes the aperture filter with λ/4 plate 34 and turns into circular polarization light having a desired numerical aperture, thus being focused by the objective lens 32 and formed as a light spot on the optical disk 1. At this time, the polarizing-hologram diffraction grating 107 has a less effect upon the wavelength of 780 nm. The laser light 106 returning from the optical disk 1 takes a path reverse to the outgoing path. By passing the λ/4 plate, it is shifted a polarization direction by approximately 90 degrees relative to the outgoing path. This is finally separated by the beam splitter within the prism 105 and guided to the light detector of within the light-receiving element 102 constituted by the diffraction grating with the light-receiving element 102.

With this optical structure, the aberration correcting mirror 14 for correcting for spherical aberration and the collimator lens 11 are arranged between the beam expander function configured by the concave lens 29 and convex lens 30 and the integrated device 8, thereby realizing reduction in component size of the aberration correcting mirror 14. Because each gap between the collimator lens 11 and 28 and the integrated device 8 and 10 can be shortened, it is possible to realize the reduction in size and thickness of the optical pickup.

Now explanation is made on the operation of the optical pickup actuator movable part of this embodiment. Power is supplied from a not shown power source to the focusing coils A36, B37 and tracking coils A38, B39 through the flexible board 43 attached on the suspension holder 42 and the suspension wire 40 and 41 connected to the same. The suspension wires 40 and 41 are provided at least six or more in total. Two of those are connected to the tracking coils A38, B39 provided in series while the two of among the remaining four are connected to the focusing coil A36 and the remaining two are connected to the focusing coil B37. This makes it possible to control the energization of the focusing coils A36, B37, independently.

In case a current is caused to flow to the focusing coils 36, 37 both in the positive direction (or in the negative direction), a focusing magnetic circuit is formed for movement in a focusing direction, from the arrangement relationship of the focusing coils 36, 37 and the focusing magnets 44, 45 and the relationship of the polarities of the magnetic poles segmented into two. This enables control in the focusing direction depending upon a direction and amount of current flow. Then, in case a current is caused to flow in the positive direction (or in the negative direction) to the tracking coils 38, 39, a tracking magnetic circuit is formed for movement in a tracking direction from the arrangement relationship of the tracking coils 38, 39 and the tracking magnets 46, 47 and the relationship of the polarities of the magnetic poles segmented into two. This enables control in the tracking direction.

In the meanwhile, in this embodiment, current can be caused to flow independently to the focusing coil 36 and the focusing coil 37, as noted before. Accordingly, when the current flowing to one coil is inverted in direction, the focusing coil 36 is acted upon by a force in a direction toward the optical disk 1 while the focusing coil 37 is by a force in a direction away from the optical disk 1. As a result, by the opposite forces, a moment for radial rotation takes place on the optical pickup actuator movable part, casing a tilt to a balanced position with a twist moment acting on the six suspension wires 40 and 41. Tilt direction is possible to control depending upon a direction and amount of a current flow to the focus coils 36, 37.

Now explained is the objective lenses 32, 33.

When the objective lens 32 has a maximum thickness t1 and the objective lens 33 has a maximum thickness t2 as shown in FIG. 10, t2/t1=1.05-3.60 is preferred. Namely, in case t2/t1 is smaller than 1.05, the objective lens 33 must be increased in diameter. The optical pickup 3 would be increased in size, disabling size reduction. Meanwhile, in case t2/t1 is greater than 3.60, the objective lens 33 becomes excessively great in thickness, being not suited for reduction in thickness.

By thus structuring the objective lens 33 corresponding to a short wavelength greater in thickness than the objective lens 32 for a short wavelength, the device can be reduced in size or the like. Moreover, by defining the thickness ratio as above, thickness and size reduction of the device are realized.

Now explanation is made on the amount of projection toward the optical disk 1 greater on the objective lens 33 than on the objective lens 32. On an optical disk device in a thickness of 13 mm or smaller, the gap is very narrow between the objective lens 32, 33 and the optical disk 1 attached. Accordingly, it has been fount that the projection amount t3 shown in FIG. 10 is preferably given 0.05-0.62 mm when considering the objective lens 32 as a reference. The projection amount is represented as a difference between a maximum projection point of the objective lens 32 on the side the optical disk 1 is attached and a maximum projection point of the objective lens 33 on the side the optical disk 1 is attached. In ease t3 is smaller than 0.05 mm, any one of the object lens 32, 33 must be increased in diameter, which is not suited for size reduction. In case t3 is projected greater than 0.62 mm, there is an increasing probability to contact with the optical disk 1.

In this manner, size reduction or reliability improvement is possible by making project the objective lens 33 corresponding to a shorter wavelength of light.

Meanwhile, as shown in FIG. 1, it is preferred to structure such that the objective lens 32 at its center is aligned along a moving direction of the carriage 4 and moreover on the centerline M passing the center of the spindle motor 2. Namely, by means of such a structure, it is possible to employ the three-beam DPP (differential push-pull) scheme greatest in practical showings.

Explanation is made on the spot diameter of a light incident on the objective lens 32, 33.

When the diameter of a light spot incident on the objective lens 32 shown in FIG. 2 is taken t4 while the diameter of a light spot incident on the objective lens 33 is taken t5, size reduction is made easy to realize by satisfying the relationship of t5≦t4. Meanwhile, considering lens design and the like, t5/t4=0.4-1.0 is preferred. In ease t5/t4 is smaller than 0.4, the objective lens 33 is not easy to fabricate. Moreover, the objective lens 32 increases in size, thus not suited in size reduction. If greater than 1.0, the objective lens 33 increases in thickness, thus not suited in size reduction.

The present invention is structured comprising: a first optical unit for emitting a first wavelength of light; a second optical unit for emitting at least one or more of wavelengths of light longer than the first wavelength of light; light-receiving means for receiving a light reflected from an optical disk; correcting means for correcting for spherical aberration of the first wavelength; optical means for guiding the first wavelength of light and the wavelength of light longer than the first wavelength of light to substantially a same optical path; and focusing means for focusing a light of from the optical means; whereby the first wavelength of light emitted from the first optical unit is passed through the correcting means and the optical means, and then focused by the focusing means and illuminated onto the optical disk while the first wavelength of light reflected upon the optical disk is passed through the focusing means, the optical means and the correcting means, and then entered to the light-receiving element. By entering and exiting the first wavelength of light to and from the first optical unit through correcting means, it is possible to use an optical system common to the other wavelength of light. Moreover, because the second optical unit can mount a plurality of light sources approximate to the wavelength, structure can be made easy. It is possible to realize at least one of size reduction and thickness reduction of the device.

Embodiment 2

Figure 13:
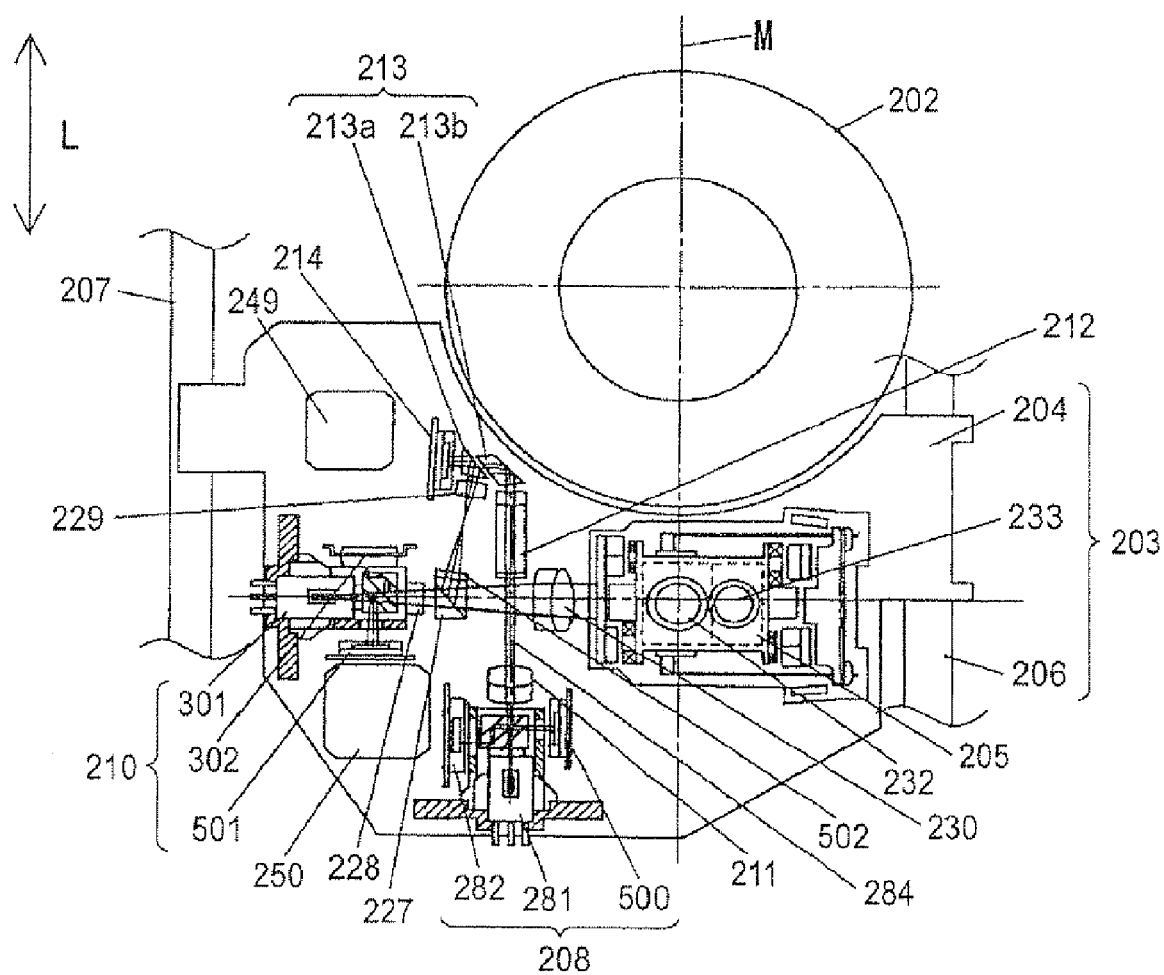
FIG. 13 is a plan view showing an optical pick-up device according to an embodiment of the invention.

An optical pick-up device according to an embodiment of the invention will be described below with reference to the drawings. FIG. 13 is a plan view showing the optical pick-up device according to the embodiment of the invention and FIG. 14 is a side view showing the optical pick-up device according to the embodiment of the invention.

Figure 14:
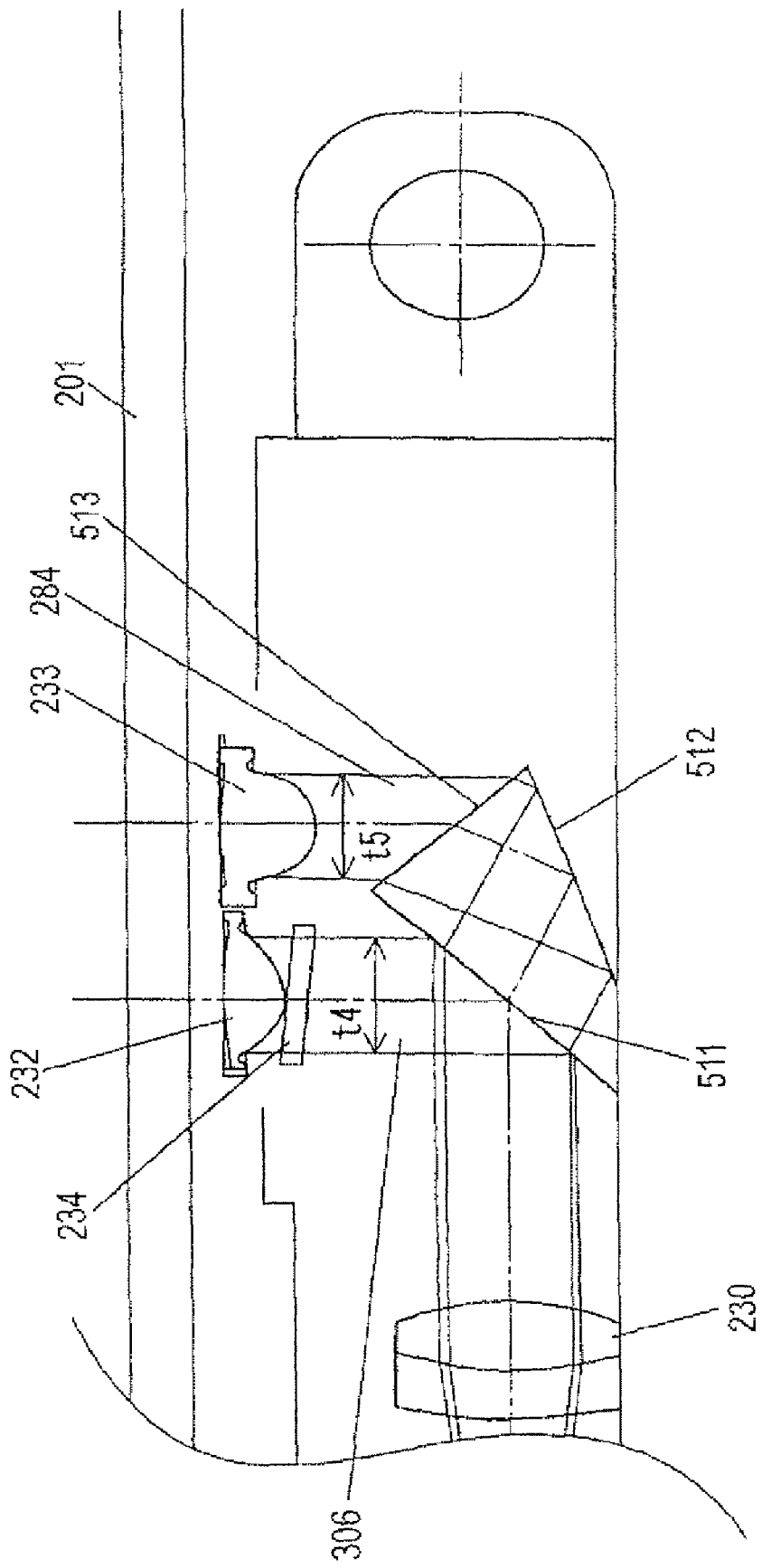
FIG. 14 is a side view showing the optical pick-up device according to the embodiment of the invention.

In FIGS. 13 and 14, 201 denotes an optical disk. The optical disk 201 can irradiate a light, thereby carrying out at least one of the reproduction of information and the recording of the information. More specifically, for the optical disk 201, it is possible to suitably use a CD-ROM disk and a DVD-ROM disk which can only reproduce information, a CD-R disk and a DVD-R disk which can record information in addition to the reproduction of information, and a CD-RW disk, a DVD-RW disk and a DVD-RAM disk which can record/erase information in addition to the reproduction of information. Moreover, the optical disk 201 which can be used includes a recording layer capable of carrying out at least one of the recording and reproduction of information with an almost red light, a recording layer capable of recording or reproducing information with an almost infrared light and a recording layer capable of recording or reproducing information with a light ranging from an almost blue color to an almost violet color. Furthermore, the optical disk 1 can take the shape of a disk having various diameters. It is preferable that the shape of a disk having a diameter of 3 cm to 12 cm should be used. In addition, a medium taking an external shape other than a circular shape, for example, a square or an ellipse can also be used. In this case, in the medium, a recording region on which information is to be recorded is formed almost circularly.

202 denotes a spindle motor for rotating the optical disk 201. The spindle motor 202 is provided with a chucking part (not shown) for holding the optical disk 201. The spindle motor 202 can rotate the optical disk 201 at a constant angular velocity or can variably rotate the angular velocity. How to carry out a control at a constant angular velocity or variably is changed over by spindle motor driving means which is not shown and the control part of an optical disk device depending on a situation. While the spindle motor 202 is used as the rotation driving means of the optical disk 201 in the embodiment, the optical disk 201 may be rotated and driven by using other kinds of motors or other means.

203 denotes an optical pick-up for irradiating a light on the optical disk 201, thereby carrying out at least one of an operation for recording information on the optical disk 201 and an operation for reading information from the optical disk 201.

204 denotes a carriage to be the base of the optical pickup 203 and 205 denotes an optical pick-up actuator for almost three-dimensionally moving an objective lens which will be described below. The carriage 204 is supported by at least a support shaft 206 and a guide shaft 207, and can be moved between the inner and outer peripheries of the optical disk 201. Moreover, the carriage 204 mounts the optical pick-up actuator 205 and an optical part or a light source.

208 denotes an integrated device comprising a laser part 281 for a violet color, a photoreceptor part 282 and a forward light monitoring part 500, and details thereof will be described with reference to FIG. 15. The laser part 81 has a laser diode 281a for generating a laser beam having a wavelength of approximately 405 nm, and the laser diode 281a is provided in a space constituted by a base 281b.

While the laser diode 281a for emitting a light having a violet color is used in the embodiment, it is also possible to use a laser diode for emitting lights ranging from a blue color to a violet color. In such a laser diode for emitting a laser beam having a short wavelength which is to be suitably used, an active layer obtained by adding a light emitting center such as In to GaN is interposed between a p-type layer containing GaN as a principal component and doped with a p-type impurity and an n-type layer containing GaN as a principal component and doped with an n-type impurity. A so-called nitride semiconductor laser is used suitably.

Moreover, a plurality of terminals 281c is erected on the base 281b. The terminal 81c is constituted by a ground terminal and a terminal for supplying a current to the laser diode 281a.

283 denotes a prism attached directly onto the base 281b by a method such as an adhesion, which serves to transmit a laser beam 284 emitted from the laser diode 281a to generate a light to be irradiated on the optical disk 201, and furthermore, serves to guide a return light from the laser disk 201 to the photoreceptor part 282. The prism 283 has a polymer film provided on a slant surface 283c in order to monitor the laser beam 284, and a part of the laser beam emitted from the laser diode 281a is reflected by the polymer film provided on the slant surface 283c and is guided to the forward light monitoring part 500 so that the output level of the laser beam 284 can be monitored. Moreover, a diffraction grating or a hologram (not shown) for dividing the laser beam 284 having a wavelength of approximately 405 nm is provided in a position guided toward the photoreceptor part 282 side (a slant surface 283b), and serves to detect a focus, tracking, a spherical aberration and a signal recorded on the optical disk 201 and to fetch a controlling signal. In the embodiment, a transparent cover member 283a is provided between the prism 283 and the base 281b. The cover member 283a is directly bonded onto the base 281b by using a method such as an adhesion. The prism 283 is provided with slant surfaces 283b to 283d which are slanted in almost parallel with each other, and the slant surfaces 283b to 283d are provided with a beam splitter film or an optical unit such as a hologram or a diffraction grating. The slant surfaces 283b to 283d correspond to the bonded surfaces of transparent glass blocks or resin blocks. More specifically, the slant surface 283b is provided with a hologram or a diffraction grating for detecting a focus, tracking, a spherical aberration and a signal recorded on the optical disk 201 and fetching a controlling signal. The slant surface 283c is provided with a polarization beam splitter film which reflects a part of a P wave by several % to several tens % in order to guide the same part to the forward light monitoring part 500. The slant surface 283*d* is provided with a film for perfectly transmitting a light having a wavelength of 405 nm. While the three slant surfaces are provided in the embodiment, moreover, at least one slant surface may be provided. In a diffraction grating to be provided on the cover member 283*a*, furthermore, the distribution of the intensity of a light emitted from the laser diode 281*a* may be nonuniform (for example, a luminance may be low in the central part of a light spot and be high in an outer peripheral part). Moreover, the diffraction grating may be provided on the slant surface 283*c* or the slant surface 283*d* in place of the cover member 283*a*. When the prism 283 is attached onto the cover member 283*a* by a method such as an adhesion, furthermore, it is possible to relieve an adhesive protruded outward from the slant surfaces 283*b* to 283*d* to be the bonded surfaces or a concave part generated on the slant surfaces 283*b* to 283*d*. In other words, when a light emitted form the laser diode 81*a* hits on a concave part or a convex part which is formed on the outer surface parts of the slant surfaces 283*b* to 283*d* as described above by an optical design, recording/reproducing characteristics are influenced. By providing the cover member 283*a* on the laser diode 281*a* side of the prism 283, accordingly, it is possible to relieve the concavo-convex part even if the concave or convex part is formed. Therefore, it is possible to prevent a deterioration in the recording characteristics.

The photoreceptor part 282 is constituted to cover a photoreceptor 282*a* and a surface thereof with a transparent glass board 282*b*. In addition, a terminal (not shown) to be electrically connected to the photoreceptor 282*a* is led from the case 282*c* to the surface of the case 282*c*. In addition, it is apparent that the photoreceptor 282*a* can be maintained to be covered with a transparent member which is not deteriorated with a wavelength of 405 nm (a light ranging from a blue color to a violet color).

285 denotes a coupling member which serves to position the laser part 281 and the photoreceptor part 282 and to position the forward light monitoring part 500. A flexible board 286 is bonded to a terminal (not shown) of the photoreceptor part 282, and is coupled to a laser flexible board 209 through soldering.

210 denotes an integrated device comprising a red and infrared laser part 301, a photoreceptor part 302 and a forward light monitoring part 501, and detailed thereof will be described with reference to FIG. 16. The laser part 301 has a laser diode 303 for emitting a laser beam having a wavelength of approximately 660 nm and a laser diode 304 for emitting a laser beam having a wavelength of approximately 780 nm. The laser diodes 303 and 304 are provided in a space constituted by a base 301*a*.

While the laser diodes 303 and 304 are provided as separate light emitting blocks in the space respectively in the embodiment, it is also possible to employ a structure in which a plurality of light emitting layers is provided in one light emitting block and the light emitting block is provided in the space. While the two laser diodes having different wavelengths are mounted in the embodiment, moreover, it is also possible to employ a structure in which at least three laser diodes having different wavelengths are provided in the space.

Moreover, a plurality of terminals 301*b* is erected on the base 301*a*. The terminal 301*b* is constituted by a ground terminal, a terminal for supplying a current to the laser diodes 303 and 304, and an output terminal for a monitor light. 305 denotes a prism for transmitting a laser beam 306 and guiding a return light to the photoreceptor 302. A polymer film is provided on a slant surface 305*c* of the prism 305. The polymer film provided on the slant surface 305*c* has such a structure as to reflect a part of the laser beam 306 toward a forward light monitoring part 501 and to monitor the output level of the laser beam 306. Moreover, a diffraction grating (not shown) for dividing the laser beam 306 having a wavelength of 780 nm is provided in a position guided toward the photoreceptor 302 side, and can detect a focus, tracking, a signal recorded on the optical disk 201 and a control signal. The prism 305 is provided with slant surfaces 305*a* to 305*c* which are inclined in almost parallel with each other. The slant surfaces 305*a* to 305*c* are provided with optical units such as a beam splitter film, a hologram and a diffraction grating. More specifically, the slant surface 305*a* is provided with a diffraction grating (not shown) formed optimally for a wavelength of 780 nm, the slant surface 305*b* is provided with a film for transmitting a P wave light and reflecting an S wave light through a polarization beam splitter for the wavelength of 780 nm and for transmitting the same lights for a wavelength of 660 nm, and the slant surface 305*c* is provided with a film for reflecting and transmitting a part of a P wave through a beam splitter for the wavelength of 780 nm, reflecting and transmitting a part of the P wave through the polarization beam splitter for the wavelength of 660 nm, and totally reflecting an S wave. A part of the P wave having the wavelengths of 780 nm and 660 nm is guided to the forward light monitor.

The slant surfaces 305*a* to 305*c* correspond to the bonded surfaces such as transparent glass blocks or resin blocks. While the three slant surfaces are provided in the embodiment, at least one slant surface may be provided.

Moreover, a diffraction grating (not shown) for constituting three beams is created on the laser part 101 side of the prism 305 if necessary, and a 3-beam diffraction grating utilizing a polarization is formed in such a manner that one of laser wavelengths is not influenced by the other wavelength, for example.

308 denotes a coupling member for positioning the laser part 301 and the photoreceptor part 302 and for positioning the forward light monitoring part 501.

309 denotes a diffraction grating having a beam combiner function, and does not act on the wavelength of 660 nm but acts on the wavelength of 780 nm. The apparent virtual light emitting point having the wavelength of 780 nm is coincident with the virtual light emitting point having the wavelength of 660 nm. Moreover, a diffraction grating 309 can also be permitted optically even if it does not have the beam combiner function.

The diffraction grating 309 has such a structure that a plurality of plate-shaped members is laminated. The grating is provided on at least one of the plate-shaped members. Moreover, the diffraction grating 309 is directly bonded to the base 301*a* by a method such as an adhesion.

A light emitted from either of the laser diodes 303 and 304 is guided to the optical disk 1 through the diffraction grating 309 and the prism 305, and a light reflected by the optical disk 201 is guided to the photoreceptor part 302 through the prism 305. At this time, the light reflected from the optical disk 201 in the prism 305 is reflected between the slant surfaces 305*a* and 305*b*, and is thus incident on the photoreceptor part 302.

In the photoreceptor part 302, a photoreceptor 302*a* is covered with a case 302*b* including a transparent member. In addition, a terminal 302*c* connected electrically to the photoreceptor 302*a* is led from the case 302*b* toward the outside of the case 302*b*.

A flexible board (not shown) is connected to the terminal 302*c* of the photoreceptor part 302 and the terminal 302*c* is coupled to the laser flexible board 209 through soldering.

211 denotes a collimator lens for a wavelength of 405 nm which is used for changing the laser beam 284 output and diverged from the laser part 281 to be an almost parallel beam. Moreover, the collimator lens 211 also has a function of correcting a color aberration generated by the influence of a fluctuation in a wavelength and a change in a temperature. 212 denotes a beam shaping prism which serves to correct the intensity distribution of the laser beam 284 to be almost circular. 213 denotes a critical angle prism which is used for separating the laser beam 284. 214 denotes an aberration correcting mirror which is used for correcting a spherical aberration generated due to an error in the thickness of the optical disk 201.

The aberration correcting mirror 214 will be described with reference to FIGS. 17 to 20.

FIGS. 17(a) to 17(c) are a schematic plan view (an uppermost surface) showing the aberration correcting mirror 214 to be used in an optical pick-up according to the embodiment, a sectional view taken along a broken line A-B, and a sectional view in a plan view (a lowermost surface), respectively. A lower electrode 216, a piezoelectric member 217, upper electrodes 218 and 219, and an elastic member 220 are formed on a substrate 215. The substrate 215 has a circular cavity part 221 on a back side (a lower side in the drawing), and a reflecting film 222 is formed thereon. The lower electrode 216 is subjected to patterning and is wired around an electrode pad 223. Similarly, the upper electrodes 218 and 219 are subjected to the patterning and are wired around electrode pads 224 and 225 respectively.

Figure 18:
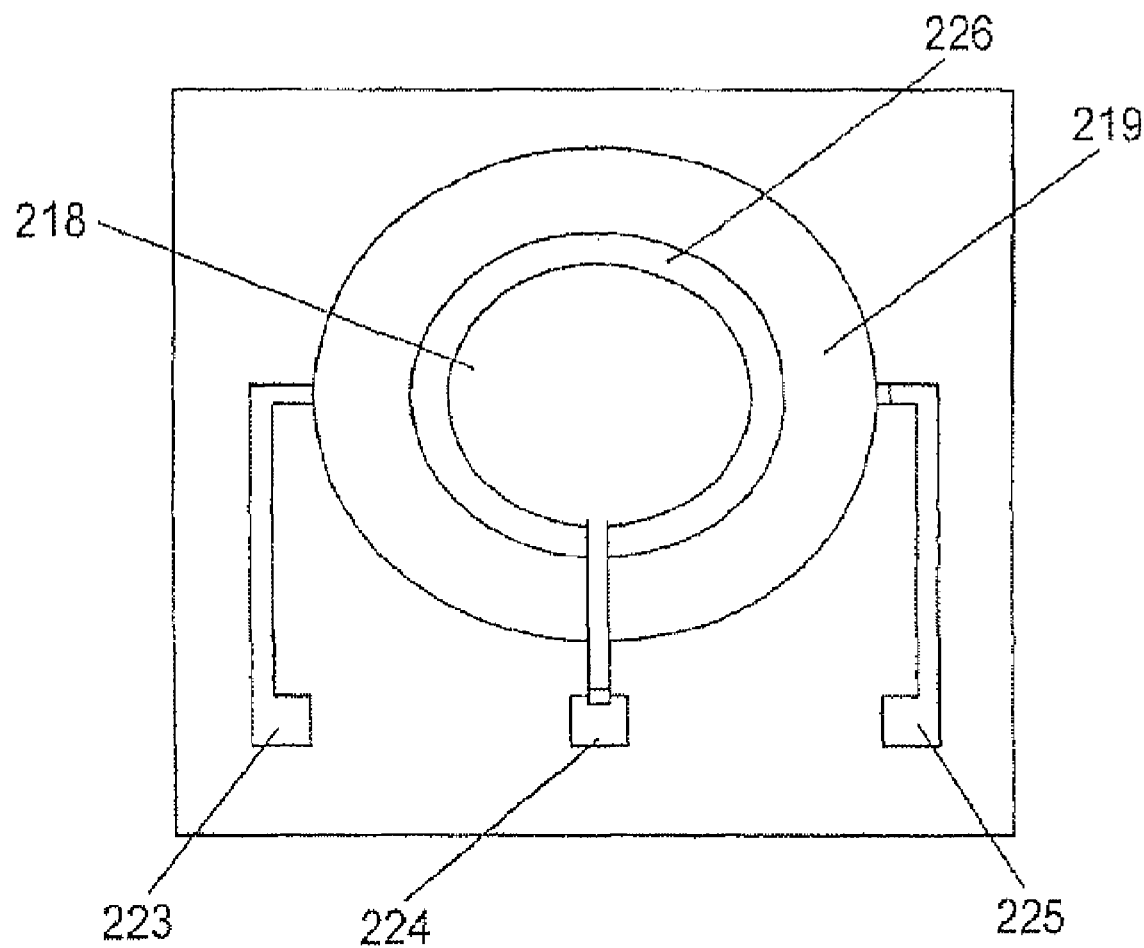
FIG. 18 is a view showing the aberration correcting mirror to be used in the optical pick-up device according to the embodiment of the invention.

FIG. 18 shows the structures of the upper electrodes 218 and 219. The upper electrodes 218 and 219 are insulated from each other by an insulating part 226. In this example, the upper electrode 218 is circular and the upper electrode 219 is a ring electrode having a center which is almost the same as the center of the upper electrode 218. A wiring is installed from the upper electrode 218 and is connected to an electrode pad 224. Similarly, a wiring is installed from the upper electrode 219 to an electrode pad 225. While the division into the two parts, that is, the upper electrodes 218 and 219 is carried out in the embodiment, a division into at least three parts may be performed. In addition, while the upper electrodes 218 and 219 are constituted to take circular external shapes in the embodiment, the external shapes may be square, polygonal or triangular.

Figure 19:
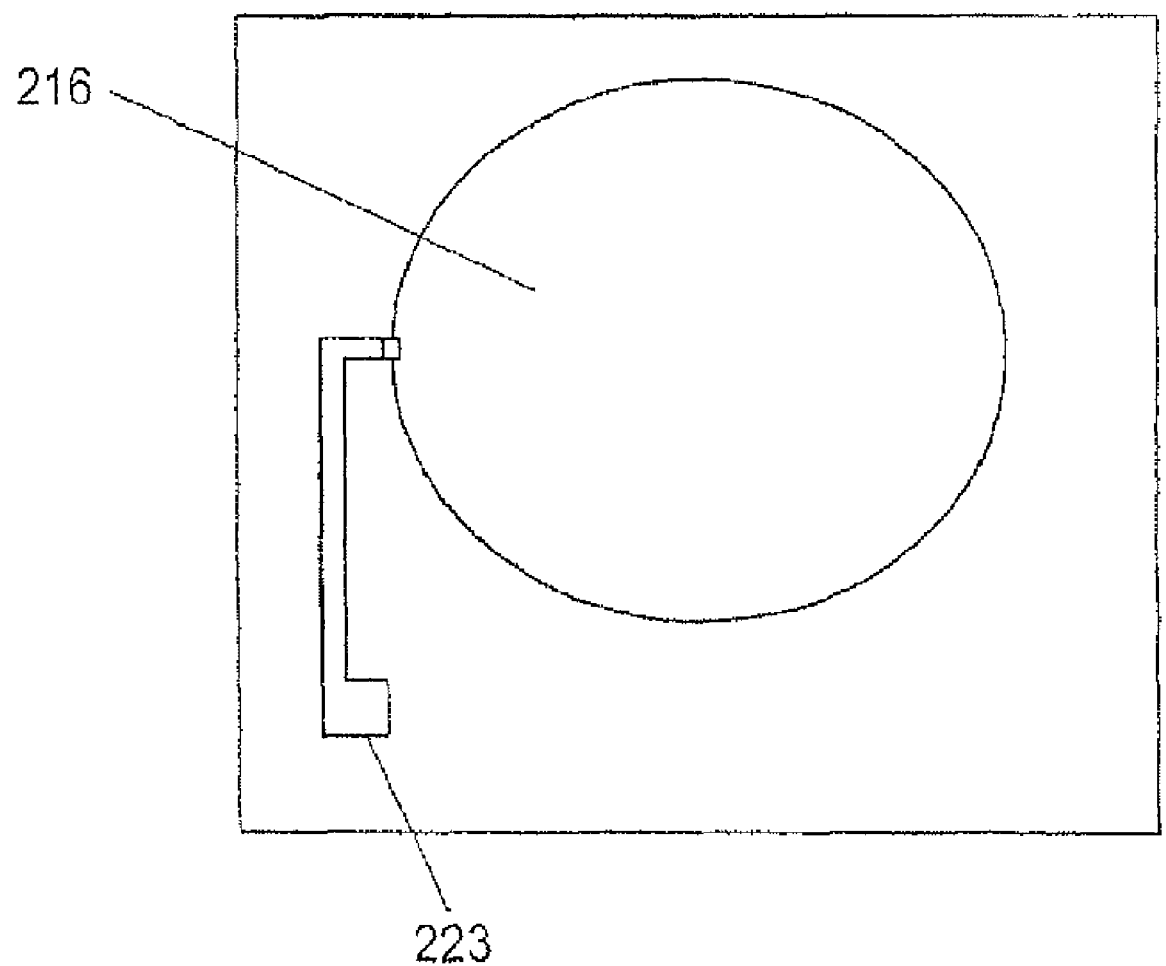
FIG. 19 is a view showing the aberration correcting mirror to be used in the optical pick-up device according to the embodiment of the invention.
Figure 20:
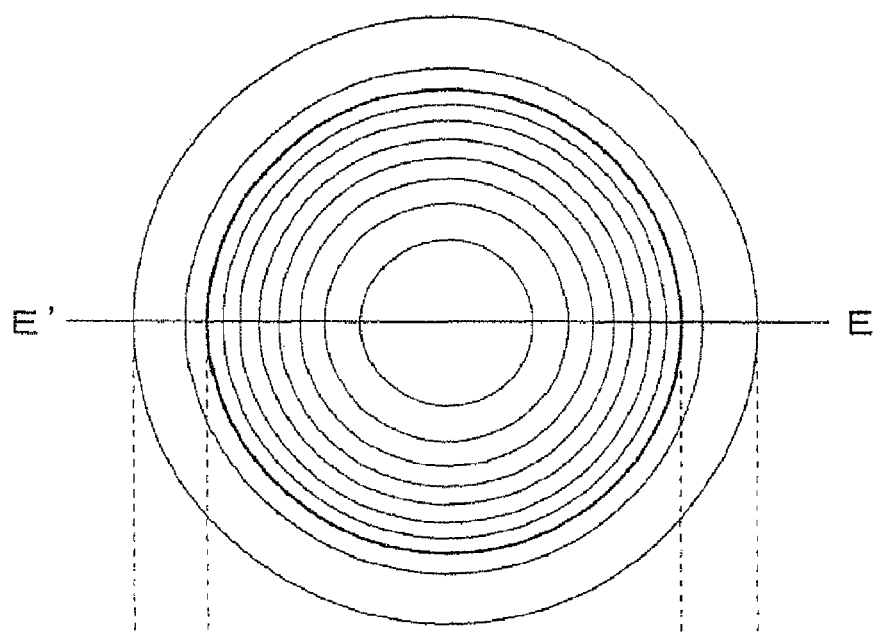
FIG. 20 is a view showing the aberration correcting mirror to be used in the optical pick-up device according to the embodiment of the invention.
Figure 20:
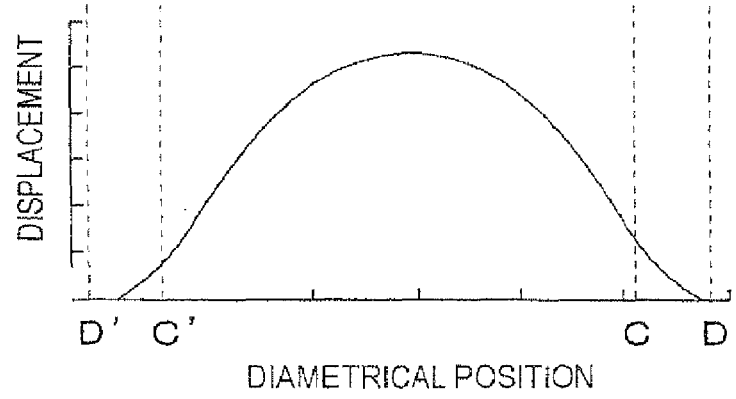

FIG. 19 shows the structure of a lower electrode. The lower electrode 216 is interposed by the piezoelectric member 217 together with the upper electrodes 218 and 219. In addition, the lower electrode 216 is wired to the electrode pad 223.

FIG. 20(a) shows the contour line of a displacement in the reflecting film 222 and FIG. 20(b) shows the displacement in the case in which the lower electrode 216 is grounded, a positive voltage is applied to the upper electrode 218 and a negative voltage is applied to the upper electrode 219 in the structure. In the drawings, C, C', D and D' correspond to the positions of the outer peripheral parts of the insulating part 226 and the cavity part 221, respectively. The positions of D and D' correspond to the outer peripheral part of the cavity part 221. Since the outer peripheral part is restrained, the displacement is zero. The displacement is downward convex in the ring parts corresponding to C-D and C'-D', and a part corresponding to the diameter of C-C' with C and C' set to be boundaries is upward convex. In general, a non-spherical shape is required for correcting a spherical aberration, and a curved shape in C-C' is exactly non-spherical. In the invention, accordingly, the curved part in C-C', that is, the reflecting film 222 part corresponding to the shape of the upper electrode 218 or an inside thereof is used. Consequently, the aberration correcting mirror 214 is a functional component capable of implementing an aberration correction with very high precision. While the aberration correcting mirror 214 using the piezoelectric member 217 formed to be a thin film is provided in the embodiment, it may be constituted by a bulk-shaped piezoelectric member. Alternatively, the aberration correcting mirror 214 may be driven by using another displaceable member. Moreover, it is possible to correct a spherical aberration by combining a plurality of lenses and moving at least one of them without using the piezoelectric member 217.

227 denotes a beam splitter having such a structure as to separate and couple the laser beams 284 and 306 which are emitted from the integrated devices 8 and 10 respectively and to align a phase with respect to the laser beam 284. Moreover, a λ/4 plate 502 for a wavelength of 405 nm is stuck to the integrated device 208 side by means such as an adhesion.

229 denotes a convex lens having a positive power and 230 denotes a convex lens having a positive power. The beam splitter 227 is provided between the convex lens 229 and the convex lens 230. The combination of the convex lens 229 and the convex lens 230 enlarges the laser beam 284 to have a desirable beam diameter. Moreover, the laser beam 284 is once focused between the convex lenses 229 and 230. By once focusing the laser beam 284 between the convex lens 229 and the convex lens 230 and setting the focal length of the convex lens 229 and a distance between the convex lens 229 and the aberration correcting mirror 214 to be almost coincident with each other, thus, it is possible to suppress a fluctuation in an FFP distribution in the objective lens part by a diverged light or a converged light which is generated for a spherical aberration correction by the aberration correcting mirror 214. 228 denotes a relay lens for wavelengths of 660 nm and 780 nm which is used for changing a laser beam 306 output and diverged from the laser part 301 to be an almost parallel beam by a combination with the convex lens 230. Moreover, it is also possible to have the function of correcting a color aberration generated by the influence of a fluctuation in a wavelength and a change in a temperature.

231 denotes a erecting prism which is provided with a dielectric multilayer film having the function of reflecting the laser beam 306 having the wavelengths 660 nm and 780 nm by a first surface 511 and the function of transmitting and refracting a laser beam having a wavelength of 405 nm. Moreover, a second surface 512 has such a structure that the laser beam having a wavelength of 405 nm can be reflected and a phase is also aligned. By constituting the erecting prism 231 with one prism, thus, it is also possible to increase the rigidity of an actuator which will be described below. 232 denotes an objective lens for the optical disk (DVD) 1 corresponding to the wavelength of 660 nm which has a function capable of focusing a parallel beam into a desirable recording position with respect to the optical disk (CD) 1 corresponding to the wavelength of 780 nm. 233 denotes an objective lens for the optical disk 201 corresponding to the wavelength of 405 nm. In the embodiment, the objective lens 232 is provided in a spindle motor center position and the objective lens 233 is provided on the opposite side of the convex lens 230 with respect to the objective lens 232, that is, in a tangential direction with respect to the optical disk 201. Moreover, the objective lens 233 is constituted in such a manner that a thickness thereof is greater than the thickness of the objective lens 232. As in the embodiment, there is employed a structure in which a light emitted from a light source first causes a light having a comparatively long wavelength to rise over the first surface 511 and causes a light having a comparatively short wavelength to rise over the second surface 512 after a passage through the first surface 511, that is, a structure in which the objective lens 232 corresponding to a long wavelength is provided on each of the laser part 281 and 301 sides in the structure shown in FIG. 13 and the objective lens 233 is provided in a distant position from the objective lens 232. Consequently, it is possible to comparatively increase a path for leading a light before an incidence on the erecting prism 231. Thus, an optical design can easily be carried out.

Figure 23:
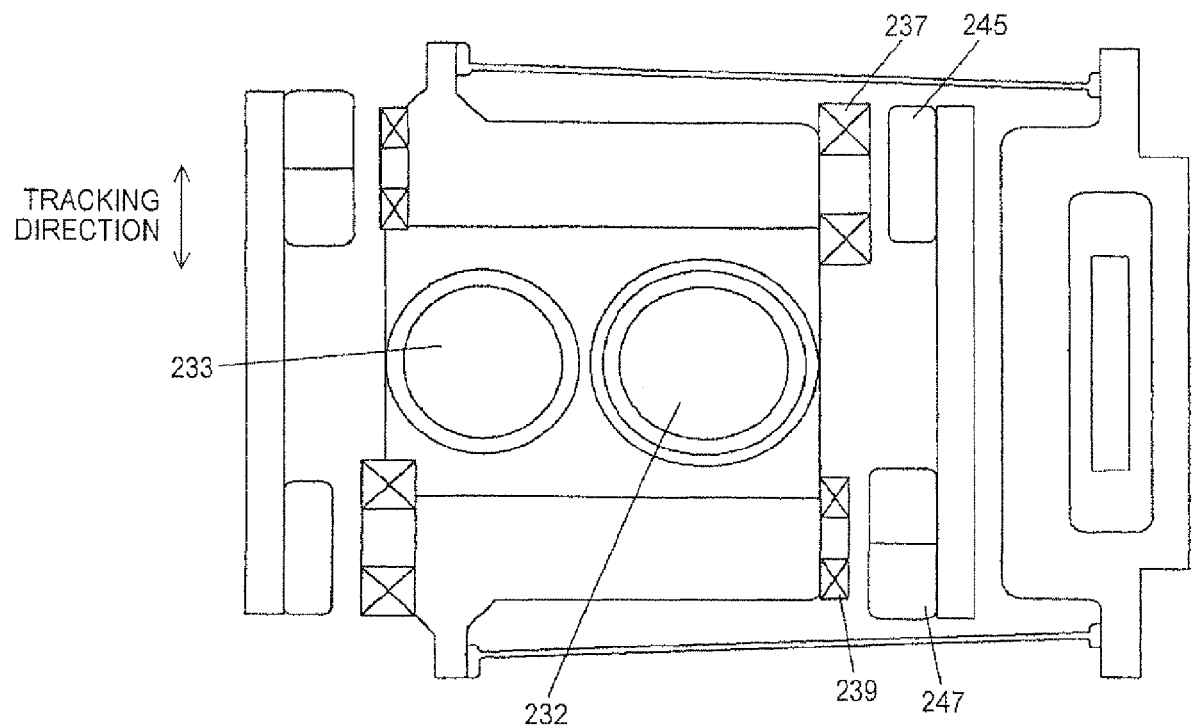
FIG. 23 is a front view showing the actuator in the optical pick-up device according to the embodiment of the invention.
Figure 24:
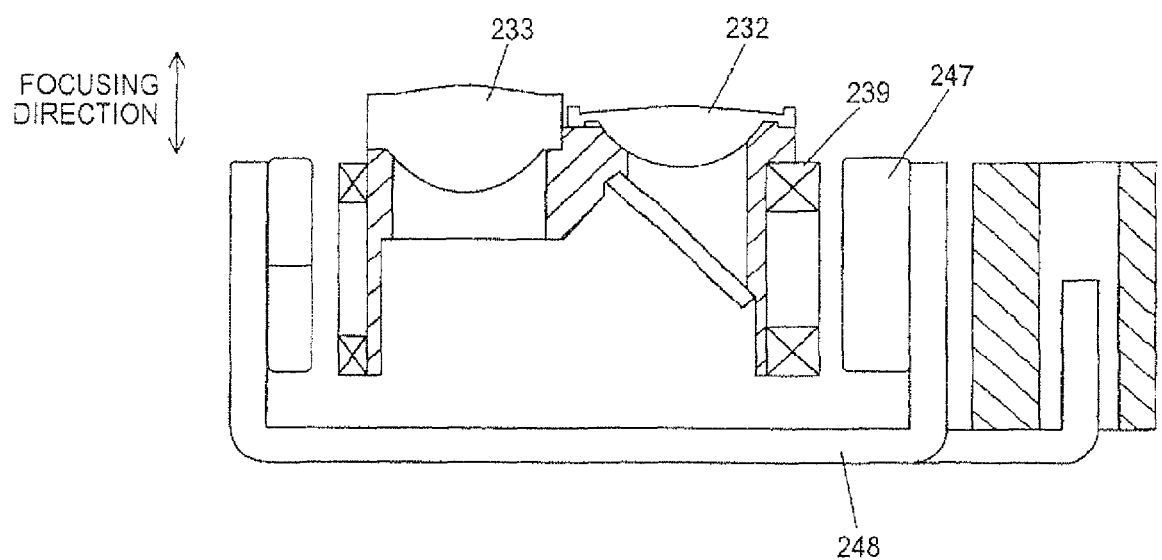
FIG. 24 is a sectional view showing the actuator in the optical pick-up device according to the embodiment of the invention.

With such a structure that the first surface 511 of the erecting prism 231 transmits the laser beam 306 having the wavelengths of 660 nm and 780 nm and reflects the laser beam 284 having the wavelength of 405 nm and the second surface 512 reflects the laser beam 306 having the wavelengths of 660 nm and 780 nm, however, the objective lens 233 may be provided on the laser side with respect to the objective lens 232 (see FIGS. 23 and 24).

234 denotes an opening filter for implementing a necessary numerical aperture to correspond to the optical disks of a CD and a DVD and a polarizing hologram to react to the light of the DVD. The opening filter is implemented by means such as a dielectric multilayer film or a hologram opening. For the light of the DVD, it is possible to detect a focus, tracking and a signal described on the optical disk 201. Moreover, a λ/4 plate corresponding to the wavelengths of 660 nm and 780 nm is formed integrally with the opening filter 234 and a polarizing direction is polarized at approximately 90 degrees in going and returning paths.

Figure 21:
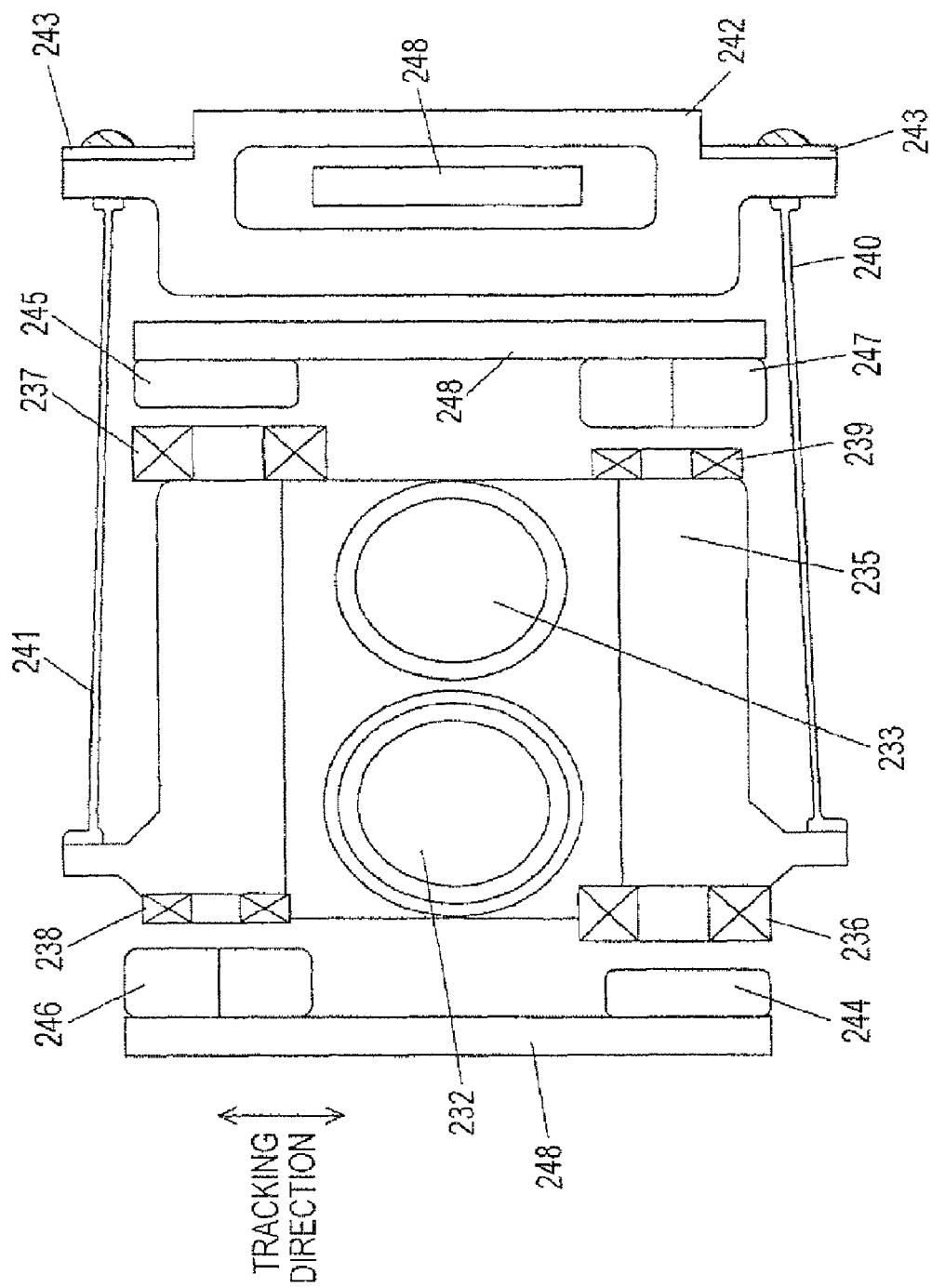
FIG. 21 is a front view showing an actuator in the optical pick-up device according to the embodiment of the invention.

Next, the actuator for holding the objective lenses 232 and 233 will be described with reference to FIGS. 21 and 22. FIG. 21 is a front view showing the actuator of the optical pick-up device according to the embodiment of the invention and FIG. 22 is a sectional view showing the same.

Figure 22:
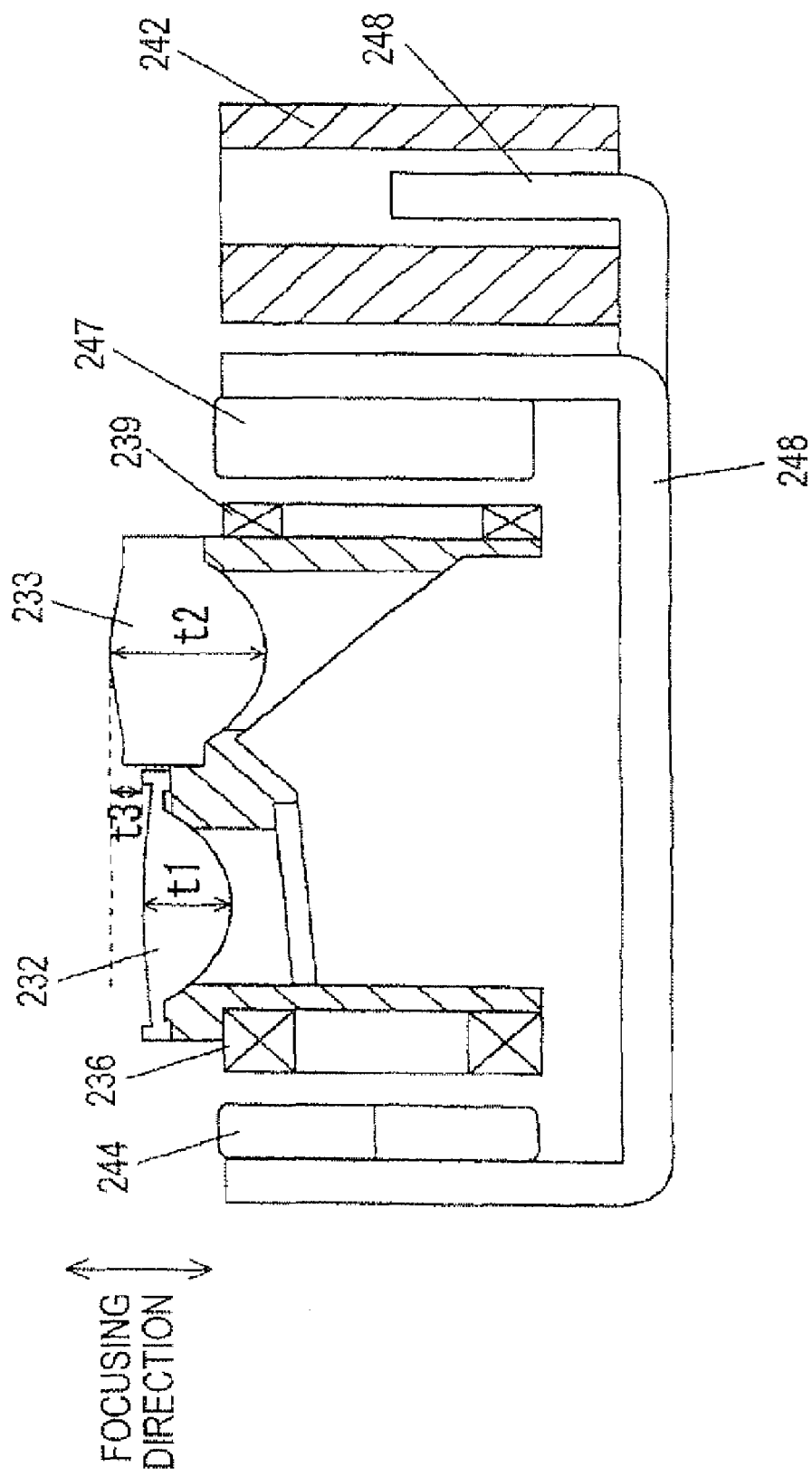
FIG. 22 is a sectional view showing the actuator in the optical pick-up device according to the embodiment of the invention.

In FIGS. 21 and 22, 235 denotes an objective lens holding cylinder capable of fixing the objective lenses 232 and 233, the λ/4 plate, the opening filter and the polarizing hologram 234 to react to the light of the DVD by means such as an adhesion.

236 and 237 denote focus coils respectively which are wound to be almost ring-shaped, respectively. 238 and 239 denote a tracking coil which is wound to be almost ring-shaped in the same manner as the focus coils 236 and 237 in the same manner, respectively. The focus coils 236 and 237 and the tracking coils 238 and 239 are also fixed to the objective lens holding cylinder 235 with an adhesion. 240 and 241 denote a suspension wire. The suspension wires 240 and 241 couple the objective lens holding cylinder 235 to the suspension holder 242, and at least the objective lens holding cylinder 235 can be displaced with respect to the suspension holder 242 within a predetermined range. Both ends of each of the suspension wires 240 and 241 are fixed to the objective lens holding cylinder 235 and the suspension holder 242 through an insert mold, respectively. The focus coils 236 and 237 are also fixed to the suspension wire 240 through soldering, and the tracking coil 238 and the tracking coil 239 are also connected electrically to the suspension wire 241 through the soldering. Suspension wires 240 and 241 are preferably constituted by at least six round wires or a leaf spring in such a manner that a power can be supplied to each of the focus coils 236 and 237, and furthermore, each of the tracking coils 238 and 239 bonded in series.

A fixation to the suspension holder 242 is carried out through the soldering. Therefore, the flexible board 243 is fixed through the adhesion. 244 and 245 denote focus magnets which are constituted to be smaller than the focus coils 236 and 237 in the direction of the width of a magnet (a tracking direction). The focus magnet 244 on the outer peripheral side of the optical disk 201 is opposed close to the outer periphery from the positions of the coil centers of the focus coils 236 and 237, and the focus magnet 245 on the inner peripheral side of the optical disk 201 is opposed close to the inner periphery from the positions of the coil centers of the focus coils 236 and 237. 246 and 247 denote tracking magnets which are provided opposite to the tracking coils 238 and 239. Moreover, the focus magnets 244 and 245 have magnetic poles divided in a focus direction and the tracking magnets 246 and 247 have magnetic poles divided in the tracking direction respectively, and are provided in such a manner that one of the poles is opposed to one almost ring-shaped piece of each of the focus coils 236 and 237 and the tracking coils 238 and 239 and the other pole side is opposed to the other almost ring-shaped part in each of the focus coils 236 and 237 and the tracking coils 238 and 239. At this time, a focus magnetic circuit is constituted by the focus magnets 244 and 245 and a magnetic yoke 248 respectively, and a tracking magnetic circuit is constituted by the tracking magnets 246 and 247 and the magnetic yoke 248 respectively. It is possible to implement a structure in which the focus coils 236 and 237 are provided one by one in the focus magnetic circuit respectively and the tracking coils 238 and 239 are provided one by one in the tracking magnetic circuit respectively. An electricity is given to the respective coils so that they can be independently controlled, respectively. While the description has been given to the independent control of the focus coils 236 and 237 in the embodiment, all of the focus coils 236 and 237 and the tracking coils 238 and 239 may be controlled independently. In this case, at least eight suspension wires 240 and 241 are required in total. In case of the independent control of one of the pairs, for example, only the focus coils 236 and 237, at least six suspension wires 240 and 241 are enough.

By setting the focus magnets 244 and 245 and the tracking magnets 246 and 247 to have types in which the magnetization of magnets is not multimagnetization but each of magnets having a single magnetic pole is separated and stuck in a division, it is possible to suppress a neutral zone generated between the poles, thereby minimizing a deterioration in the characteristics of the magnetic circuit with the focus and tracking shifts of each coil. In order to control a high density optical disk having a small tilt margin, thus, it is essential to stick magnets having a single pole together in order to increase precision.

A tension is applied in the shape of an inverted fan shape to the suspension wires 240 and 241 in order to decrease a size and to reduce a resonance in the buckling direction of the suspension wires 240 and 241. Moreover, the magnetic yoke 248 serves as the magnetic yoke of each of the focus magnets 244 and 245 and the tracking magnets 246 and 247 in a magnetic aspect and has the function of holding and fixing the suspension holder 242 in a structural aspect, and is also utilized for fixing the suspension holder 242 with an adhesive. In the suspension wires 240 and 241, a damper gel for carrying out damping is filled on the suspension holder 242 side. A material to be changed into a gel with UV is used for the damper gel. A part constituted by the objective lens holding cylinder 235, the focus coil 236, the focus coil 237, the tracking coil 238, the tracking coil 239, the objective lenses 232 and 233, the λ/4 plate, the opening filter, and the polarizing hologram 234 reacting to a DVD light will be hereinafter referred to as an optical pick-up actuator moving part.

249 denotes a laser driver which is operated for emitting a light from a semiconductor laser having wavelengths of 780 nm and 660 nm which is provided in the laser part 301, and furthermore, has the function of superposing each wavelength in order to reduce a noise. Moreover, the laser driver 249 has such a structure as to maintain a contact state with the carriage 204 or a cover metal plate (not shown) provided above and below the carriage 204, thereby radiating heat effectively. Moreover, 250 denotes a laser driver which is operated for emitting a light from a semiconductor laser having a wavelength of 405 nm which is provided in the laser part 281, and furthermore, has the function of superposing each wavelength in order to reduce a noise. In addition, the laser driver 249 similarly has such a structure as to maintain a contact state with the carriage 204 or a cover metal plate (not shown) provided above and below the carriage 204, thereby radiating heat effectively.

Next, the optical structure of the optical pick-up according to the embodiment will be described.

First of all, description will be given to the wavelength of 405 nm.

The diverged laser beam 284 having the wavelength of 405 nm which is emitted from the laser part 281 is caused to be almost parallel by means of the collimator lens 211, and passes through the beam shaping prism 212 and reaches the aberration correcting mirror 214 having a reflecting mirror function through the critical angle prism 213. The laser beam 284 reflected by the aberration correcting mirror 214 is incident on the critical angle prism 213 again. At this time, lights which are incident on and reflected by the aberration correcting mirror 214 have inclinations of several degrees to the critical angle of the critical angle prism 213. Moreover, a gap is provided between critical angle prisms 213a and 213b. With such a structure, it is possible to efficiently separate the laser beam 284 having the wavelength of 405 nm by utilizing a critical angle. In addition, it is also possible to enhance a light transmitting efficiency over both surfaces of each of the critical angle prisms 213a and 213b which are opposed to the gap by means such as a dielectric multilayer film. Next, the laser beam 284 emitted from the critical angle prism 213 is converged by the convex lens 229 having a positive power, and passes through the $\lambda/4$ plate 502 as a diverged light again and is thus changed into a circularly polarized light. Subsequently, the same light passes through the beam splitter 227 and is incident on the erecting prism 231 through the convex lens 230, passes through the first surface 511 and is thus refracted, and is reflected by the second surface 512 and passes through a third surface 513 and is thus refracted. The laser beam 284 thus reflected is focused by the objective lens 233, thereby forming a light spot on the optical disk 201. The laser beam 284 returned from the optical disk 201 passes reversely to the going path and passes through the $\lambda/4$ plate 502, and is thus polarized in a polarizing direction at approximately 290 degrees with respect to the going path, and is finally separated through the beam splitter in the prism 283 and is guided to the photoreceptor 282a in the photoreceptor part 282 by means of a diffraction grating constituted together with the photoreceptor 282, thereby generating at least a spherical aberration error signal. The wavelength of 405 nm is smaller than that in the conventional art, resulting in an increase in a spherical aberration generated when the thickness of the protecting layer of the optical disk 1 is changed. As a result, the quality of recording and reproduction is greatly damaged. Accordingly, the aberration correcting mirror 214 is driven in response to the spherical aberration detection signal and the reflecting surface is slightly deformed to be a spherical surface so that the spherical aberration thus generated can be suppressed. At this time, moreover, the spherical aberration is corrected by using the aberration correcting mirror 214. By moving at least one of the convex lens 229 and the convex lens 230 in the direction of an optical axis, similarly, it is possible to correct the spherical aberration.

Next, description will be given to the wavelength of 660 nm. The laser beam 306 having the wavelength of 660 nm which is emitted from the laser diode 303 of the laser part 101 passes through the diffractive grating 309 and is caused to be almost in parallel by the relay lens 228 and the convex lens 230 through the prism 305 for separating a beam. The beam splitter 227 is provided between the relay lens 228 and the convex lens 230 so that the laser beam 306 is caused to be almost coaxial with the laser beam 284 having the wavelength of 405 nm. The laser beam 306 to be the almost parallel light emitted from the convex lens 230 is reflected by the first surface 311 of the erecting prism 231. The laser beam 306 thus reflected passes through the opening filter, the polarizing hologram and the $\lambda/4$ plate in this order and is thus changed into a circularly polarized light and is focused by the objective lens 232 to form a light spot on the optical disk 201. At this time, the polarizing hologram does not act on a P wave to be a going light but an S wave to be a returning light. The laser beam 306 returning from the optical disk 1 passes reversely to the going path and passes through the $\lambda/4$ plate 502, and is thus polarized in a polarizing direction of approximately 90 degrees with respect to the going path. The laser beam 306 diffracted by a light through the polarizing hologram if necessary is finally separated by the polarizing beam splitter 305c in the prism 305 and is thus guided to an optical detector in the photoreceptor 302.

Subsequently, description will be given to the wavelength of 780 nm. The laser beam 306 having the wavelength of 780 nm which is emitted from the laser diode 304 of the laser part 301 is diffracted by the diffractive grating 309 and passes through a diffractive grating for forming 3 beams which is special for 780 nm, and is caused to be almost parallel by the relay lens 228 and the convex lens 230 through the prism 305 for separating a beam. The beam splitter 227 is provided between the relay lens 228 and the convex lens 230 so that the laser beam 306 is caused to be almost coaxial with the laser beam 284 having the wavelength of 405 nm. The laser beam 306 to be the almost parallel light emitted from the convex lens 230 is reflected by the first surface 511 of the erecting prism 231. The laser beam 306 thus reflected passes through the opening filter, the polarizing hologram and the $\lambda/4$ plate in this order and is thus changed into a circularly polarized light, and is focused by the objective lens 232 to form a light spot on the optical disk 201. At this time, the polarizing hologram rarely influences the wavelength of 780 nm. The laser beam 106 returning from the optical disk 201 passes reversely to the going path and passes through the $\lambda/4$ plate, and is thus polarized in a polarizing direction of approximately 90 degrees with respect to the going path. The laser beam 306 is finally separated by the polarizing beam splitter 305b in the prism 305 and is thus guided to an optical detector in the photoreceptor 302 by a diffracting grating (not shown) constituted together with the photoreceptor 302.

With such an optical structure, the aberration correcting mirror 214 for correcting a spherical aberration and the collimate lens 11 are provided between a beam expander function constituted by the convex lens 229 and the convex lens 230 and the integrated device 208. Consequently, the size of a component in the aberration correcting mirror 214 can be reduced and a gap between the collimate lens 11 and the integrated device 208 can be decreased. Since the convex lens 230 is set to be a collimate lens in a part of the lasers 303 and 304 in the integrated device 210, it is possible to reduce the size and thickness of the optical pickup 203.

Next, description will be given to the operation of the moving part of the optical pick-up actuator 205 according to the embodiment. By a power source which is not shown, a power is supplied to the focus coils 236 and 237 and the tracking coils 238 and 239 through the flexible board 243 attached to the suspension holder 242 and the suspension wires 240 and 241 connected thereto. At least six suspension wires 240 and 241 are provided in total, and two of them are connected to the tracking coils 238 and 239 provided in series, and two of the residual four suspension wires 240 and 241 are connected to the focus coil 236 and the other two are connected to the focus coil 237. Consequently, it is possible to independently control the conduction of the focus coils 236 and 237, respectively.

When a current is caused to flow to both of the focus coils 236 and 237 in a positive direction (or a negative direction), a focus magnetic circuit which can be moved in a focus direction is formed based on the relationship of an arrangement between the focus coils 236 and 237 and the focus magnets 244 and 245 and the relationship of a polarity between the magnetic poles divided into two parts, and it is possible to carry out a control in the focus direction corresponding to the direction of the flow of the current and the amount of the flow. When the current is caused to flow to the tracking coils 238 and 239 in the positive direction (or the negative direction), subsequently, a tracking magnetic circuit which can be moved in a tracking direction is formed based on the relationship of an arrangement between the tracking coils 238 and 239 and the tracking magnets 246 and 247 and the relationship of the polarity between the magnetic poles divided into two parts, and it is possible to carry out a control in the tracking direction.

In the embodiment, the current can be caused to independently flow to the focus coils 236 and 237 respectively as described above. When the direction of the current to flow in one of the coils is inverted, accordingly, a force in such a direction as to approach the optical disk 201 is applied to the focus coil 236 and a force in such a direction as to separate from the optical disk 201 is applied to the focus coil 237. As a result, a moment for rotating in a radial direction is generated in the moving part of the optical pick-up actuator 205 by the forces which are contrary to each other and is tilted to a position in which it is balanced with a force for a torsional moment applied to the six suspension wires 240 and 241. A tilt direction can be controlled corresponding to the direction and amount of the flow to the focus coils 236 and 237.

The objective lenses 232 and 233 will be described below.

When the maximum thickness of the objective lens 232 is represented by t1 and the maximum thickness of the objective lens 233 is represented by t2 as shown in FIG. 22, it is preferable that t2/t1=1.05 to 3.60 should be set. More specifically, when t2/t1 is smaller than 1.05, the diameter of the objective lens 233 is to be increased so that the size of the optical pickup 203 is increased and a reduction in the size cannot be carried out. When t2/t1 is greater than 3.60, moreover, the thickness of the objective lens 33 is excessively increased, which is not suitable for a reduction in a thickness.

By constituting the thickness of the objective lens 233 corresponding to a light having a short wavelength which is greater than that of the objective lens 232 having a long wavelength, thus, it is possible to reduce the size of the device. In addition, it is possible to particularly implement a reduction in the thickness and size of the device by defining the ratio of the thickness.

Next, description will be given to the amount of the protrusion of the objective lens 233 from the objective lens 232 toward the optical disk 201 side. In an device in which the thickness of the optical disk device is equal to or smaller than 13 mm, an interval between the objective lenses 32 and 33 and the optical disk 201 which is attached is very small. Accordingly, it is apparent that a protrusion amount t3 shown in FIG. 22 is preferably set to be 0.05 mm to 0.62 mm on the basis of the objective lens 232. The protrusion amount is represented by a difference between the maximum protruded part of the objective lens 232 at a side on which the optical disk is attached and the maximum protruded part of the objective lens 233 at a side on which the optical disk 201 is attached. When t3 is smaller than 0.05 mm, the lens diameter of either of the objective lenses 232 and 233 is to be increased, which is not suitable for a reduction in the size. When t3 is greater than 0.62 mm, a probability of a contact with the optical disk 1 is increased.

By protruding the objective lens 233 corresponding to the light having a short wavelength as described above, thus, it is possible to enhance a reduction in a size or a reliability.

As shown in FIG. 13, moreover, it is preferable that the center of the objective lens 232 corresponding to a long wavelength should be almost coincident with a centerline M passing through the center of the spindle motor 202 in a moving direction L of the carriage 204. More specifically, with such a structure, it is possible to employ a 3-beam DPP (differential push-pull) method having most achievements in a conventional optical detecting method.

Description will be given to the diameter of the spot of a light incident on each of the objective lenses 232 and 233.

When the diameter of the spot of the light incident on the objective lens 232 is represented by t4 and the diameter of the spot of the light incident on the objective lens 233 is represented by t5 as shown in FIG. 14, it is possible to easily implement a reduction in a size by satisfying a relationship of t5/t4. In consideration of a lens design, moreover, it is preferable that t5/t4=0.4 to 1.0 should be set. When t5/t4 is smaller than 0.4, the objective lens 33 is fabricated with difficulty, and furthermore, the size of the objective lens 232 is increased, which is not suitable for a reduction in the size. When t5/t4 is greater than 1.0, the thickness of the objective lens 233 is excessively increased, which is not suitable for a reduction in the size.

Another embodiment of the actuator moving part will be described below in detail.

Figure 16:
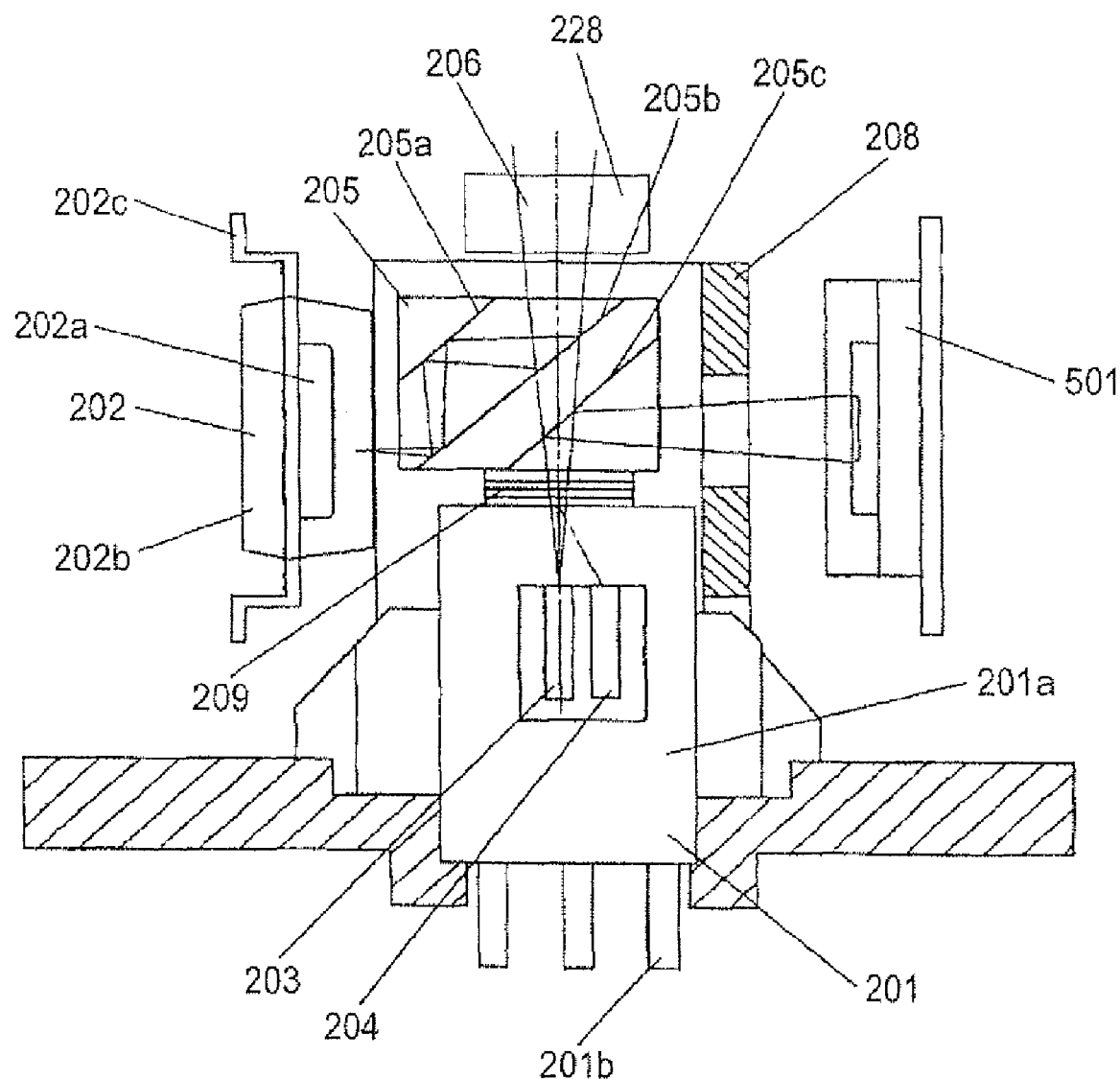
FIG. 16 is a partial enlarged view showing the optical pick-up device according to the embodiment of the invention.
Figure 17:
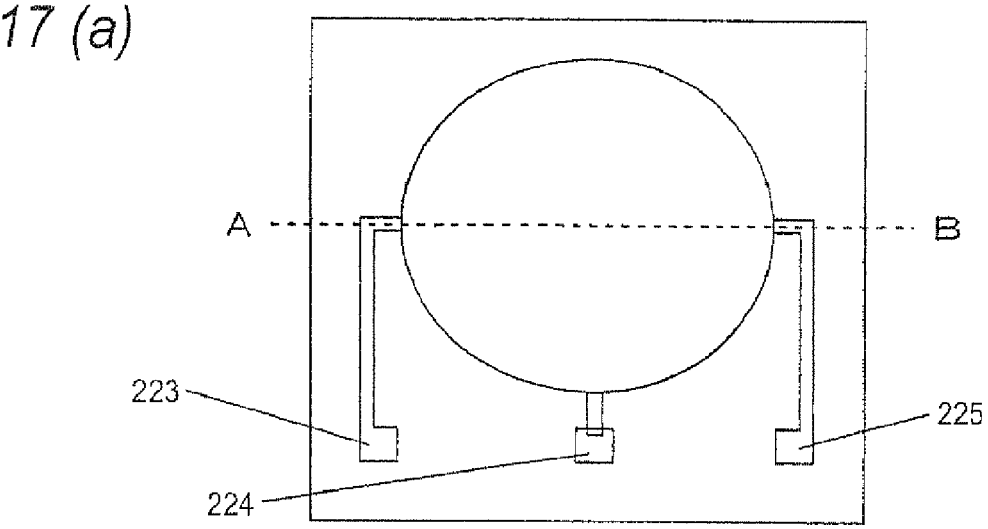
FIG. 17 is a view showing an aberration correcting mirror to be used in the optical pick-up device according to the embodiment of the invention.
Figure 17:
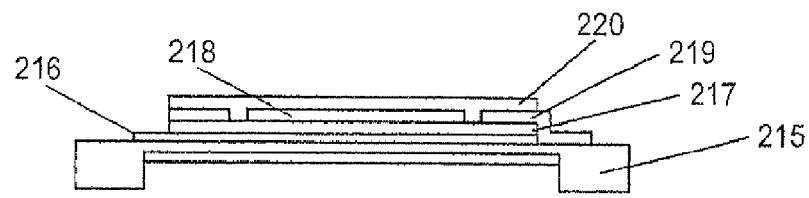
Figure 17:
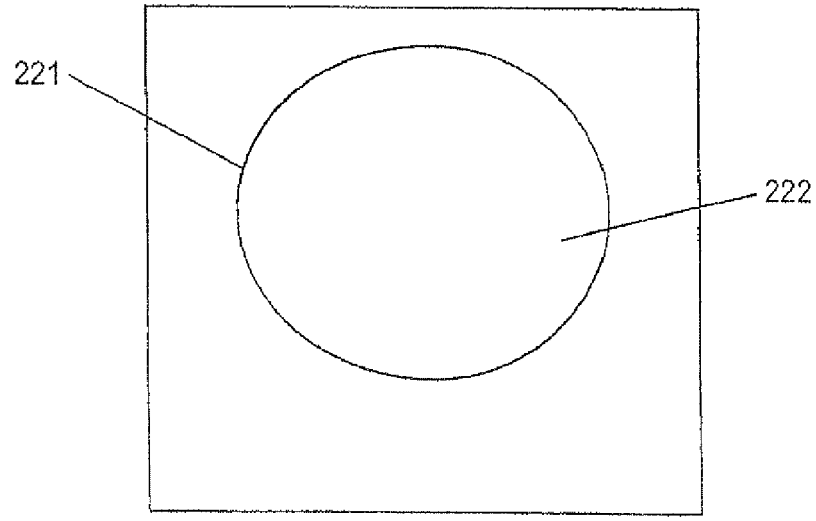
Figure 25:
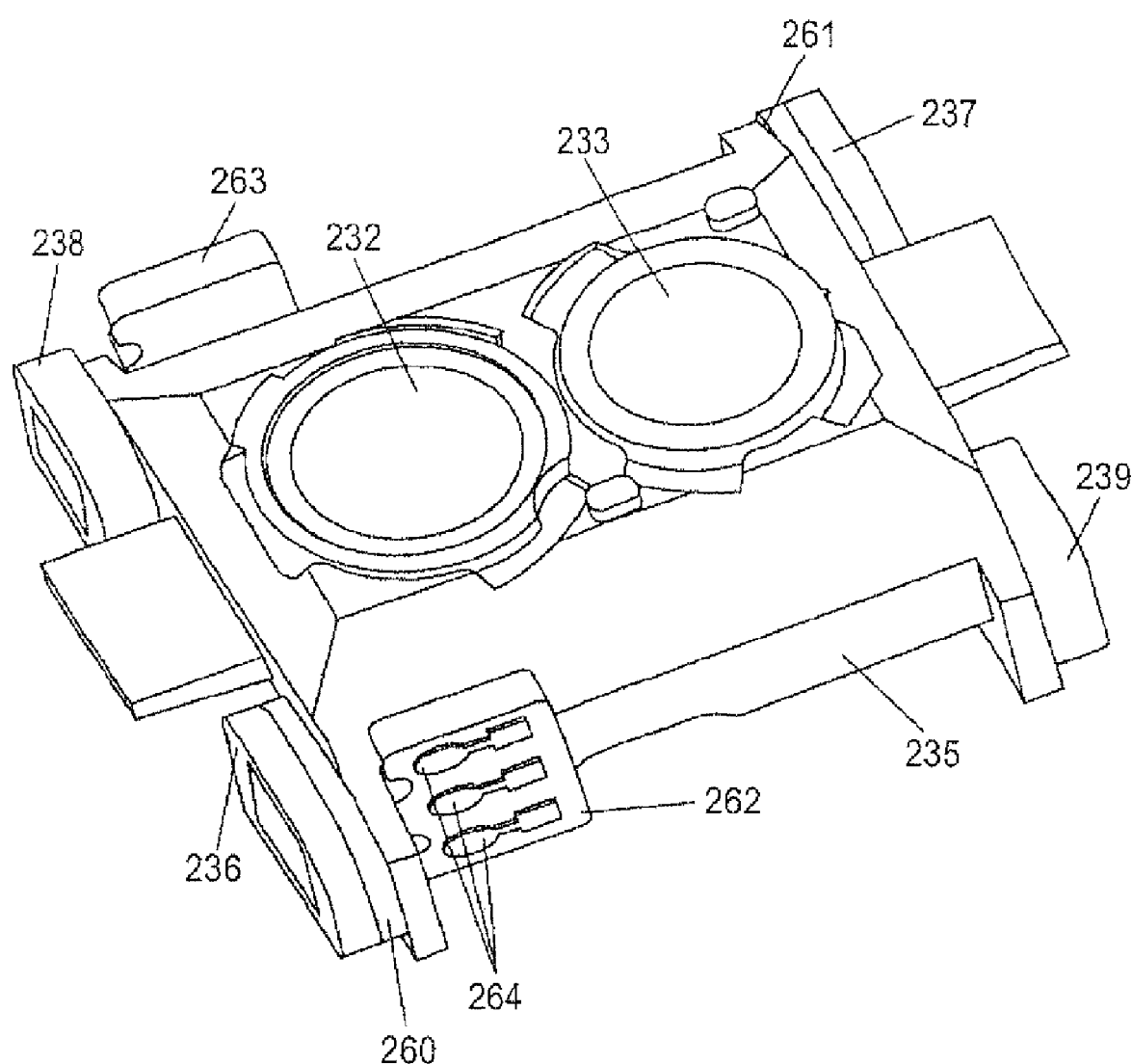
FIG. 25 is a perspective view showing the actuator in the optical pick-up device according to the embodiment of the invention.

FIG. 25 is a perspective view showing the actuator moving part of the optical pick-up device according to the embodiment of the invention, FIG. 16 is a plan view showing the optical pick-up actuator 205 in the optical pick-up device according to the embodiment of the invention, and FIG. 17 is a sectional view showing the main part of the optical pick-up actuator 205 in the optical pick-up device according to the embodiment of the invention. Main differences from the example shown in FIG. 21 include the addition of tracking subcoils 260 and 261 to the moving part of the optical pick-up actuator 205 and the addition of spring boards 262 and 263.

Figure 15:
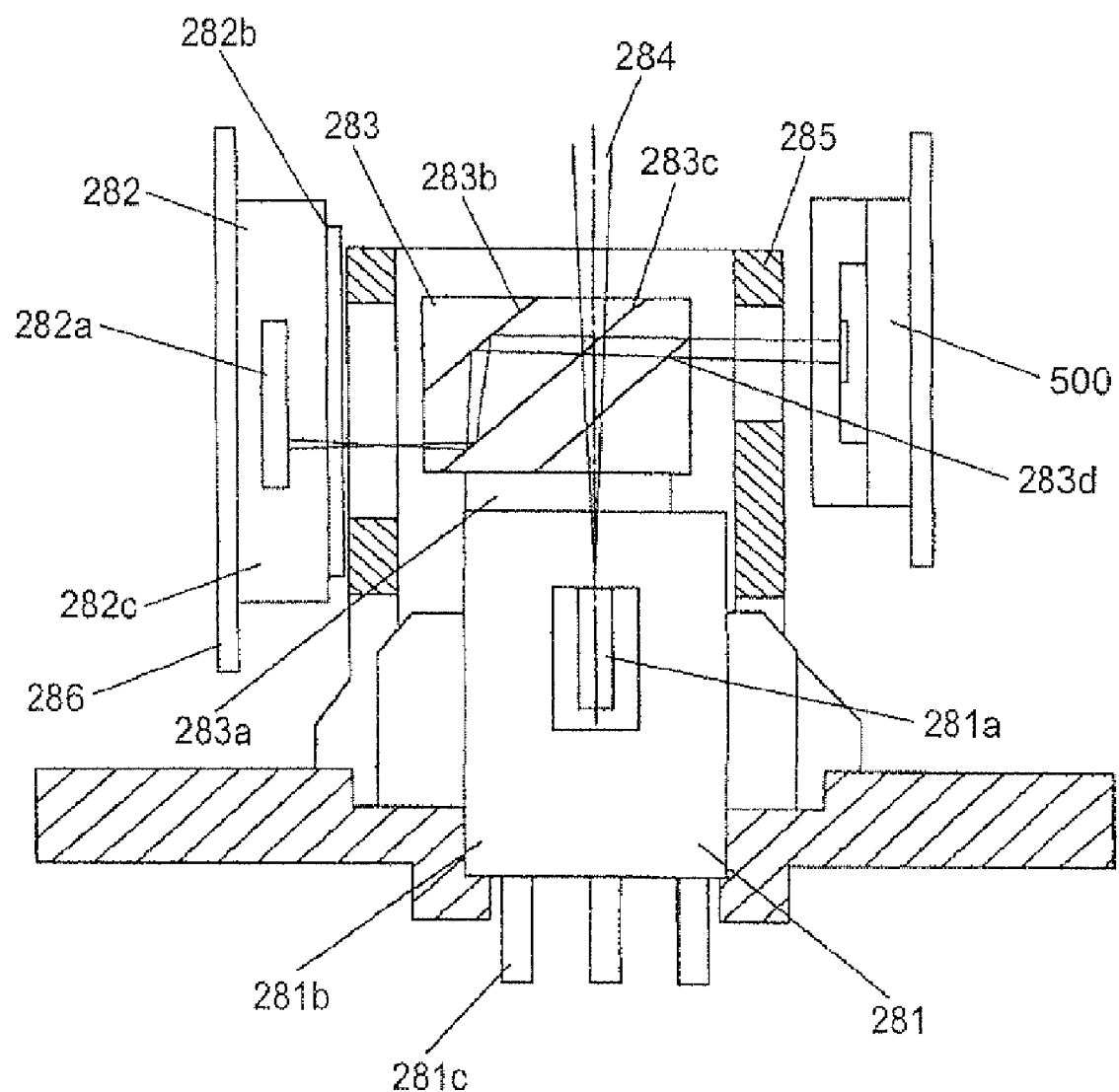
FIG. 15 is a partial enlarged view showing the optical pick-up device according to the embodiment of the invention.

In FIG. 15, the tracking subcoils 260 and 261 are provided between the focus coils 236 and 237 and the objective lens holding cylinder 235. The spring boards 262 and 263 are fixed to the objective lens holding cylinder 235 through an adhesion. Moreover, the spring boards 262 and 263 have a spring board pattern 264 for electrically connecting the suspension wires 240 and 241 and the focus coils 236 and 237 and tracking coils 238 and 239, and the suspension wires 240 and 241 and the focus coils 236 and 237 and tracking coils 238 and 239 are electrically connected to the spring board pattern 264 through soldering (not shown).

Figure 26:
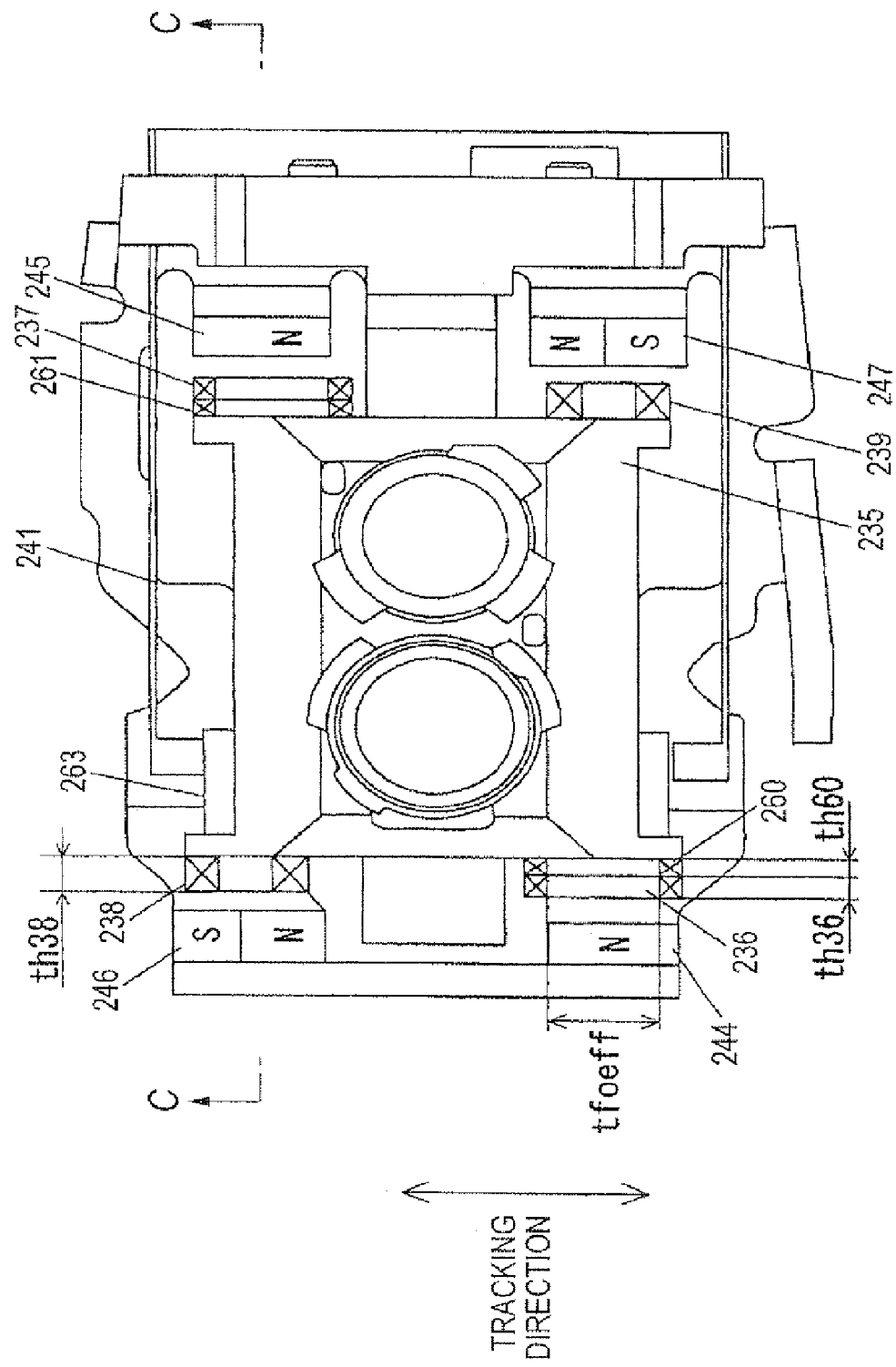
FIG. 26 is a plan view showing the actuator in the optical pick-up device according to the embodiment of the invention.
Figure 27:
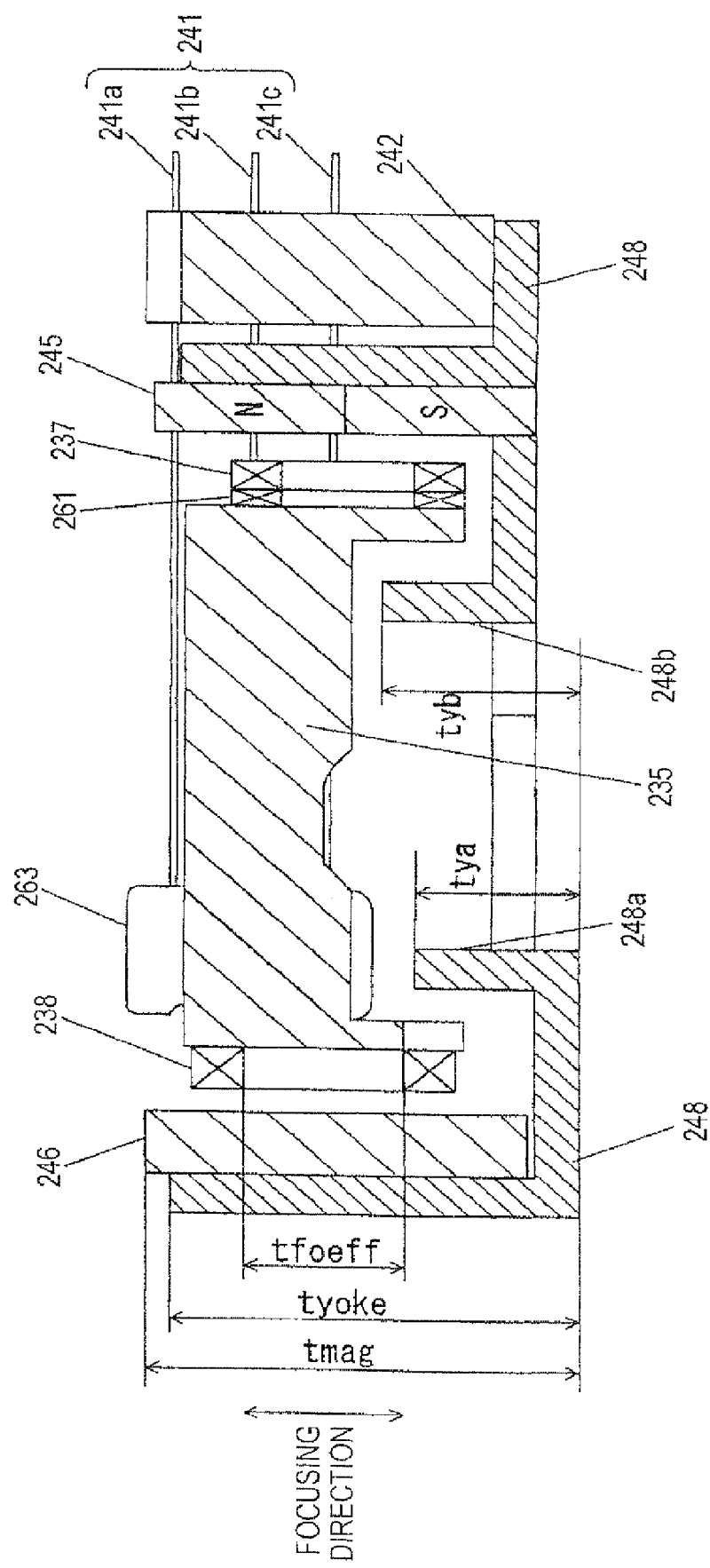
FIG. 27 is a sectional view showing the main part of the actuator in the optical pick-up device according to the embodiment of the invention.

In FIG. 26, tfoeff represents the effective length of the focus coil 236 for generating a thrust to drive the moving part of the optical pick-up actuator 205 in a focus direction (see FIG. 27).

In the example, the shapes of the focus coil 236 and the tracking subcoil 260 are set to be almost identical to each other, and the focus coil 236 and the tracking subcoil 260 are provided in almost the same positions in the objective lens holding cylinder 235. Therefore, tfoeff also represents the effective length of the tracking subcoil 260 for generating a thrust to drive the moving part of the optical pick-up actuator 205 in the focus direction.

In FIG. 27, ttreff represents the effective length of the tracking coil 238 for generating a thrust to drive the moving part of the optical pick-up actuator 205 in a tracking direction (see FIG. 26), and the suspension wire 241 includes an upper suspension wire 241a, a middle suspension wire 241b and a lower suspension wire 241e in descending order in the drawing.

In the example, the tracking subcoils 260 and 261 are electrically connected to the tracking coils 238 and 239 in series.

Moreover, the magnetic yoke 248 has a magnetic yoke protrusion 248a to be opposed to the tracking magnet 246 and a magnetic yoke protrusion 248b to be opposed to the focus magnet 245. The magnetic yoke protrusion 248a receives a magnetic flux from the tracking magnet 246 more efficiently so that an enhancement in the thrust of the tracking coil 238 can be improved. Similarly, the magnetic yoke protrusion 248b receives a magnetic flux from the focus magnet 245 more efficiently so that an enhancement in the thrust of the focus coil 237 can be implemented. While the magnetic yoke protrusions 248a and 248b are opposed to the tracking magnet 246 and the focus magnet 245 respectively in the example, the same magnetic yoke protrusions (not shown) as the magnetic yoke protrusions 248a and 248b are opposed to the tracking magnet 247 and the focus magnet 244, respectively.

Figure 28:
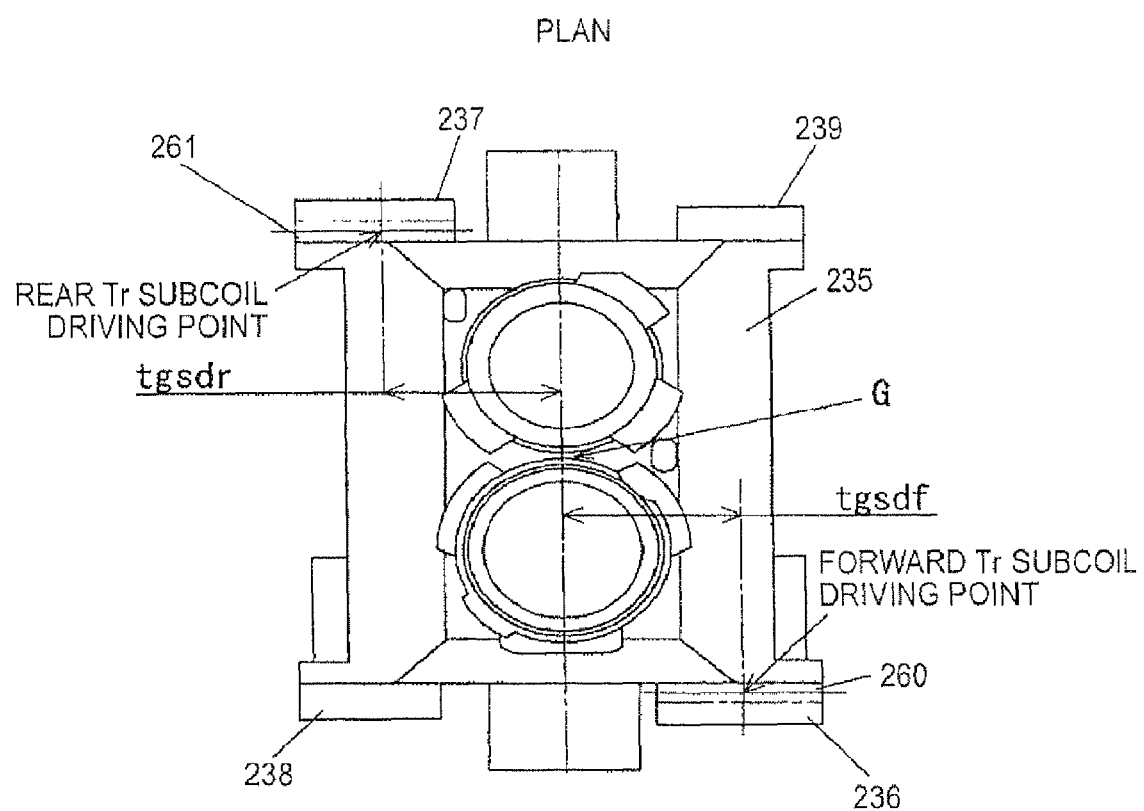
FIG. 28 is a plan view showing the moving part of the actuator in the optical pick-up device according to the embodiment of the invention.
Figure 29:
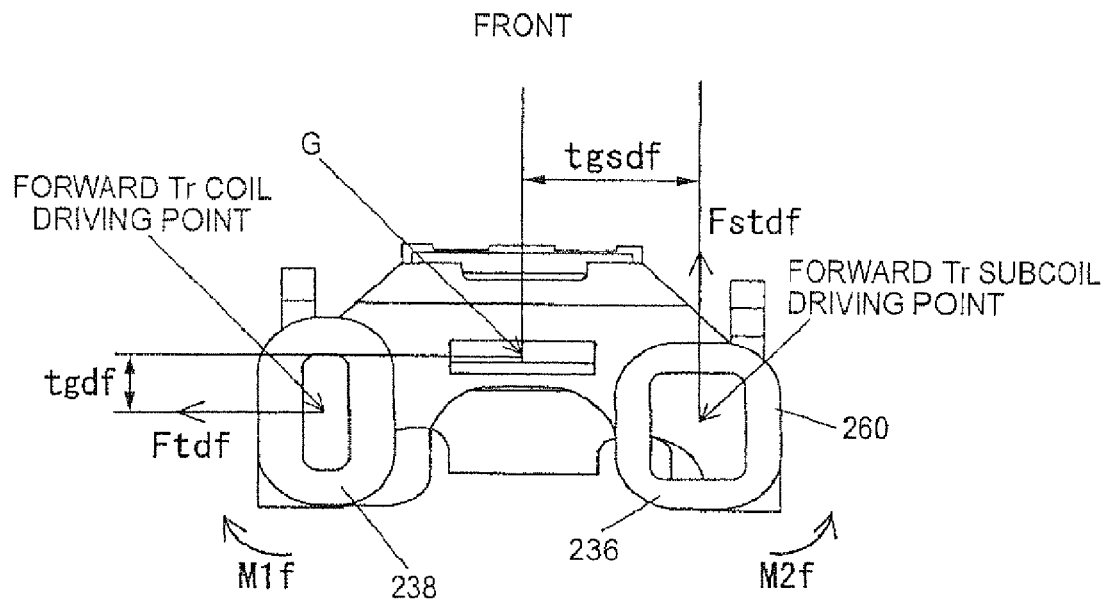
FIG. 29 is a front view showing the moving part of the actuator in the optical pick-up device according to the embodiment of the invention.
Figure 30:
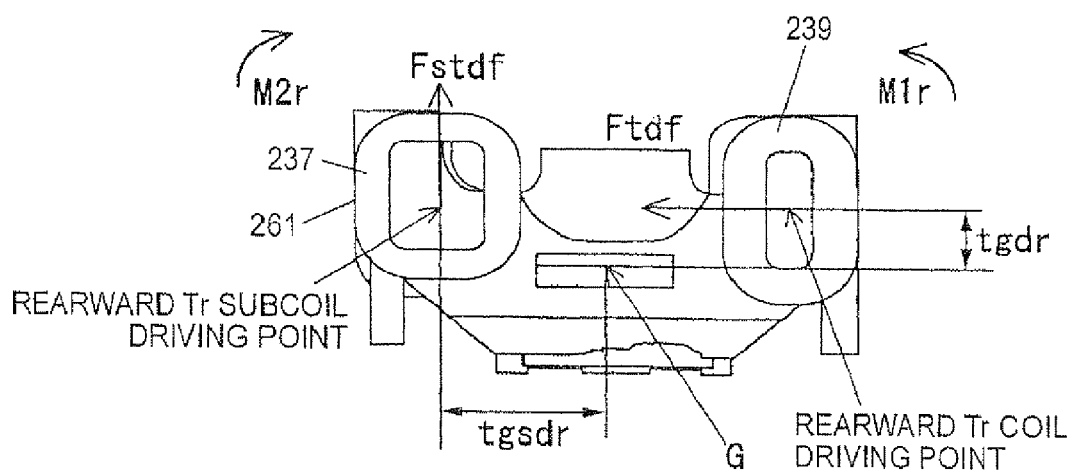
FIG. 30 is a rear view showing the moving part of the actuator in the optical pick-up device according to the embodiment of the invention.

In the example shown in FIG. 25, a thrust center and an inertia center are not identical to each other. In the case in which the tracking coil 238 is driven, therefore, an unnecessary moment around the inertia center is generated from the tracking coil 238. As a result, an AC tilt is generated. With reference to FIGS. 28 to 30, detailed description will be given to a moment cancel around the inertia center of the moving part of the optical pick-up actuator 205 through the tracking subcoils 260 and 261.

FIG. 28 is a plan view showing the moving part of the optical pick-up actuator 205 in the optical pick-up device according to the embodiment of the invention, FIG. 29 is a front view showing the moving part of the optical pick-up actuator 205 in the optical pick-up device according to the embodiment of the invention, which is a front view of FIG. 28, and FIG. 30 is a rear view showing the moving part of the optical pick-up actuator 205 in the optical pick-up device according to the embodiment of the invention, which is a rear view of FIG. 28.

In FIG. 28, G denotes the inertia center of the actuator moving part, and there are shown a forward TR subcoil driving point to be the thrust center of the tracking subcoil 260 and a rearward TR subcoil driving point to be the thrust center of the tracking subcoil 261, and a distance tgsdf between the inertia center G and the forward TR subcoil driving point and a distance tgsdr between the inertia center G and the rearward TR subcoil driving point.

In FIG. 29, G denotes the same inertia center of the moving part of the optical pick-up actuator 205 as that in FIG. 28, and there are shown a forward Tr subcoil driving point and a forward Tr coil driving point to be the thrust center of the tracking coil 238, and a distance tgsdf between the inertia center G and the forward Tr subcoil driving point and a distance tgdf between the inertia center G and the forward Tr coil driving point.

In FIG. 29, the tracking subcoil 260 takes almost the same shape as that of the focus coil 236. For this reason, the tracking subcoil 260 is hidden by the focus coil 236 and is not shown.

As will be described below, the shape of the tracking subcoil 260 is not restricted to be almost identical to that of the focus coil 236 in the example.

When a driving current is applied to the tracking coil 238 to generate a force Ftdf, a moment M1f around the inertia center G is generated.

More specifically, $$M1f = Ftdf \times tgdf \tag{1}$$

On the other hand, the tracking subcoil 260 is connected to the tracking coil 238 in series. When a driving current is applied to the tracking coil 238, the driving current is also applied to the tracking subcoil 260 so that a force Fstdf is generated. Thus, a moment M2f around the inertia center G is generated.

More specifically, $$M2f = Fstdf \times tgsdf \tag{2}$$

The thrust center of the tracking coil 238 and the inertia center G are not placed in the same position. The moment M1f generated by the thrust of the tracking coil 238 is celled with the moment M2f generated by the thrust of the tracking subcoil 260 as follows, $$M1f - M2f = 0 \tag{3}$$

From the equations (1), (2) and (3), the following equation is obtained.

$$Ftdf \times tgdf = Fstdf \times tgsdf \tag{4}$$

It is preferable to design the moving part of the optical pick-up actuator 205 so as to satisfy the equation (4).

In FIG. 30, G denotes the same inertia center of the moving part of the optical pick-up actuator 205 as that in FIG. 28, and there are shown a rearward Tr subcoil driving point and a rearward Tr coil driving point to be the thrust center of the tracking coil 239, and a distance tgsdr between the inertia center G and the rearward Tr subcoil driving point and a distance tgdr between the inertia center G and the rearward Tr coil driving point.

When a driving current is applied to the tracking coil 239 to generate a force Ftdr, a moment M1r around the inertia center G is generated.
More specifically, $$M1r = Ftdr \times tgdr \tag{5}$$

The tracking subcoil 261 is connected to the tracking coil 239 in series. When a driving current is applied to the tracking coil 239, it is also applied to the tracking subcoil 261 so that a force Fstdr is generated. Thus, a moment M2r around the inertia center G is generated.

More specifically, the following equation is obtained.

$$M2r = Fstdr \times tgsdr \tag{6}$$

In order to suppress the AC tilt of the moving part of the optical pick-up actuator 205, it is preferable to design the moving part of the optical pick-up actuator 205 so as to obtain the following equation even if the thrust center is not identical to the inertia center.

$$M1r - M2r = 0 \tag{7}$$

$$Ftdr \times tgdr = Fstdr \times tgsdr \tag{8}$$

More specific examples include the shapes of the tracking coils 238 and 239 and the tracking subcoils 260 and 261, the shape of the objective lens holding cylinder 235, and the shapes of the focus magnets 244 and 245 and the tracking magnets 246 and 247 shown in FIG. 26.

Even if the inertia center is not coincident with the thrust center in the example, the moment around the inertia center can be cancelled by the effects of the tracking subcoils 260 and 261. Therefore, it is possible to easily increase an effective length ttreff (see FIG. 27) of the tracking coils 38 and 39. Thus, a thrust in the tracking direction can easily be designed at a maximum.

Furthermore, it is possible to design the objective lens holding cylinder 235 without considering the inertia center G. Thus, a rigidity can easily be increased.

In addition, it is possible to design the moving part of the optical pick-up actuator 205 without considering the inertia center G. Thus, the rigidity can easily be increased.

As a result, it is possible to easily implement the moving part of the optical pick-up actuator 205 with a high rigidity and a high thrust (a high sensitivity).

It is apparent from the equations (4) and (8) that the shapes of the focus coil 236 and the tracking subcoil 260 do not need to be identical to each other in the invention. Similarly, the arrangements of the focus coil 236 and the tracking subcoil 260 for the objective lens holding cylinder 235 are not restricted to be almost identical in the invention.

In the moving part of the conventional optical pick-up actuator 205, tgdf and tgdr are designed to be 0 mm, and the tolerance of the component of the optical pick-up actuator and the tolerance of an assembly thereof are set to be smaller than ±0.05 mm together. In the example, the values of tgdf and tgdr may be designed to be equal to or greater than 0.05 mm.

On the other hand, the overall height of a general optical disk drive device is 41.2 mm and the thickness of an optical disk is 1.2 mm. For this reason, it is desirable that the values of tgdf and tgdr should be equal to or smaller than 40 mm.

In the example, the tracking coil, the tracking subcoil and the focus coil are provided in the forward and rearward parts of the moving part of the optical pick-up actuator 205. Therefore, the moving part of the optical pick-up actuator 205 is designed to satisfy the equations (4) and (8) described above. However, this does not restrict the arrangements of the tracking coil, the tracking subcoil and the focus coil as in the example shown in FIG. 25. More specifically, with the structure of the moving part of the optical pick-up actuator 205 in which an unnecessary moment around the inertia center is canceled by a force generated from the subcoil, the arrangements of the focus coil and the tracking coil are not limited.

In order to more simplify the equations (4) and (8), there will be considered the case in which the shape and position of each of the coils provided in the forward part is identical to the shape and position of each of the coils provided in the rearward part.

More specifically, in the case in which the shapes of the tracking coil 238 and the tracking coil 239 are identical to each other, the shapes of the tracking subcoil 260 and the tracking subcoil 261 are identical to each other, the positional relationships between the tracking coils 238 and 239 and the moving part of the optical pick-up actuator 205 are identical to each other, the positional relationships between the tracking subcoils 260 and 261 and the moving part of the optical pick-up actuator 205 are identical to each other, and the shapes of the focus magnets 244 and 245 and the tracking magnets 246 and 247 and the positional relationship between the magnets are identical, the following equations are obtained.

$$Ftdr = Ftdf \tag{9}$$

$$Fstdr = Fstdf \tag{10}$$

$$tgsdr = tgsdf \tag{11}$$

$$tgdr = tgdf \tag{12}$$

By substituting the equations (9), (10), (11) and (12) for the equations (5) and (6), it is possible to obtain the following equations.

$$M1r = M1f \tag{13}$$

$$M2r = M2f \tag{14}$$

More specifically, the following equation is obtained.

$$M1f = M2f \tag{15}$$

The equation (15) is identical to the equation (3) obtained previously. Consequently, the equation (4) is obtained from the equation (15).

In other words, it is preferable to design the moving part of the optical pick-up actuator 205 in order to satisfy the equation (4).

In the example shown in FIG. 25, the thrust center and the inertia center are not identical to each other. Therefore, the tracking subcoil 260 is added to correct the moment around the inertia center G, thereby achieving a high rigidity and a high sensitivity. In the case in which the tracking coil 238 is to be driven, an unnecessary moment around an elastic support center is generated from the tracking subcoil 260. As a result, a DC tilt is generated.

As described above, the DC tilt can be cancelled (controlled) by utilizing a difference in a driving voltage between the focus coils 236 and 237.

However, it is also possible to suppress the unnecessary moment by optimally designing the position of the elastic support center.

Figure 31:
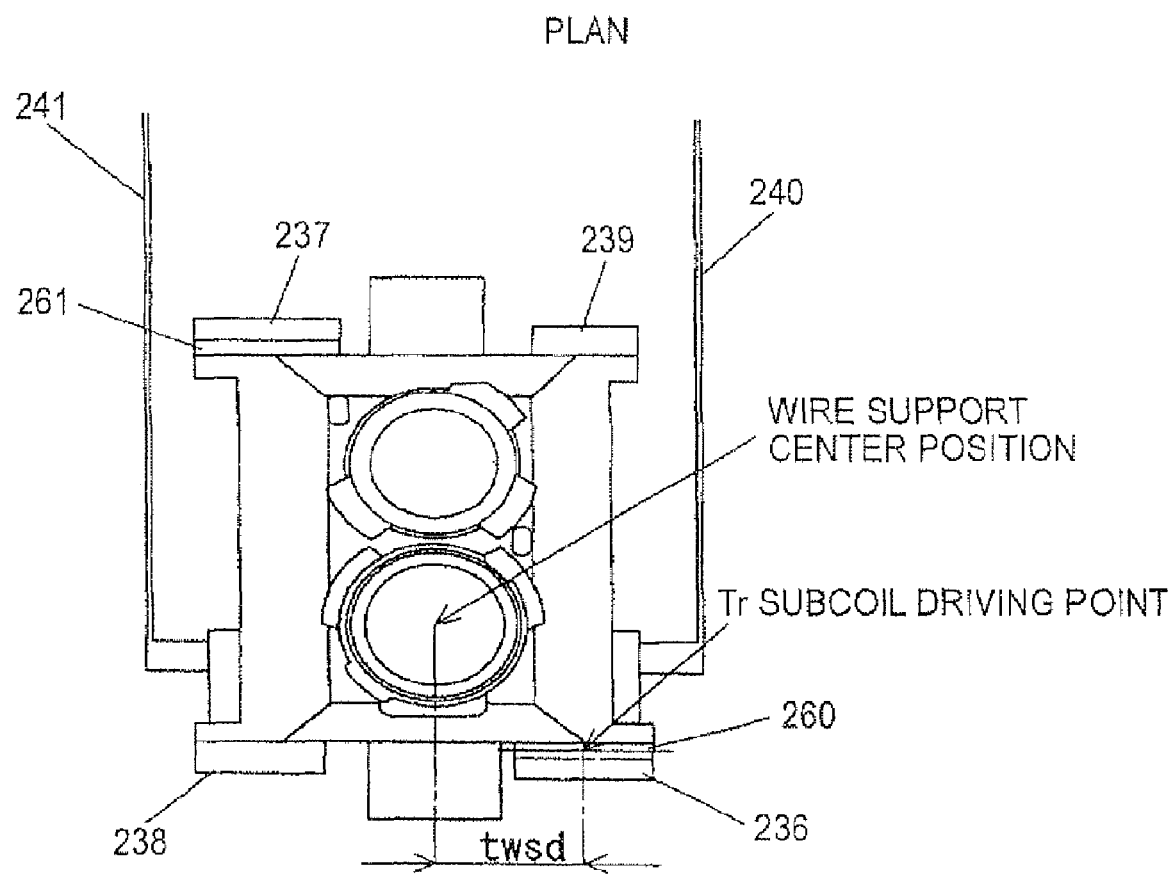
FIG. 31 is a plan view showing the moving part of the actuator in the optical pick-up device according to the embodiment of the invention.
Figure 32:
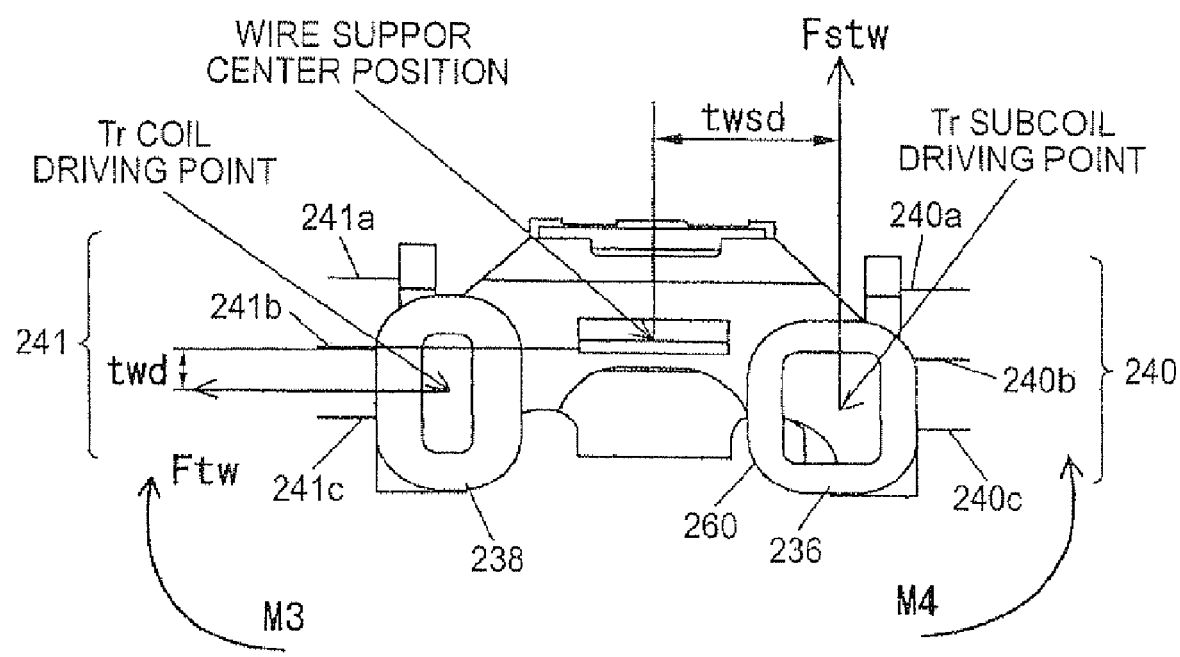
FIG. 32 is a front view showing the moving part of the actuator in the optical pick-up device according to the embodiment of the invention.

With reference to FIGS. 31 and 32, detailed description will be given to the cancel of the moment around the elastic support center of the moving part of the optical pick-up actuator 205.

FIG. 31 is a plan view showing the actuator moving part of the optical pick-up device according to the embodiment of the invention, and FIG. 32 is a front view showing the actuator moving part of the optical pick-up device according to the embodiment of the invention, which is a front view of FIG. 31.

FIG. 31 shows the position of a wire support center to be the elastic support center, a Tr subcoil driving point to be the thrust center of the tracking subcoil 60, and a distance twsd between the wire support center position and the Tr subcoil driving point.

In FIG. 32, the suspension wire 240 is constituted by an upper suspension wire 240a, a middle suspension wire 240b and a lower suspension wire 240c in descending order, and similarly, the suspension wire 241 is constituted by an upper suspension wire 241a, a middle suspension wire 241b and a lower suspension wire 241c in descending order, and the optical pick-up moving part is elastically supported by six suspension wires in total.

In the example shown in FIG. 32, an interval between the upper suspension wire 240a and the middle suspension wire 240b is set to be equal to an interval between the middle suspension wire 240b and the lower suspension wire 240c, and an interval between the upper suspension wire 241*a* and the middle suspension wire 241*b* is set to be equal to an interval between the middle suspension wire 241*b* and the lower suspension wire 241*c*, and the respective intervals are equal to each other.

Accordingly, the position of the wire support center to be the elastic support center is placed on a straight line connecting a center in the focus direction of the middle suspension wire 240*b* to a center in the focus direction of the middle suspension wire 241*b*.

FIG. 32 shows a Tr subcoil driving point, a Tr coil driving point to be the thrust center of the tracking coil 238, a distance twsd between the position of the wire support center and the Tr subcoil driving point, and a distance twd between the position of the wire support center and the Tr coil driving point.

The shapes of the tracking coil 238 and the tracking coil 239 are set to be identical to each other, the shapes of the tracking subcoil 260 and the tracking subcoil 261 are set to be identical to each other, the positional relationships between the tracking coils 238 and 239 and the moving part of the optical pick-up actuator 205 are identical to each other, and the positional relationships between the tracking subcoils 260 and 261 and the moving part of the optical pick-up actuator 205 are identical to each other, and a rear view of FIG. 32 is not particularly given.

In FIG. 32, the tracking subcoil 260 takes almost the same shape as that of the focus coil 236. For this reason, the tracking subcoil 260 is hidden by the focus coil 236 and is not shown.

The tracking subcoil 260 is connected to the tracking coil 238 in series. When a driving current is applied to the tracking coil 238, therefore, it is also applied to the tracking subcoil 260 so that a force Fwtd is generated. Thus, a moment M4 around the position of the wire support center is generated.

More specifically, the following equation is obtained.

$$M4 = Fstw \times twsd \quad (16)$$

On the other hand, when the driving current is applied to the tracking coil 38 to generate a force Ftw, a moment M3 around the position of the wire support center is generated.

More specifically, the following equation is obtained.

$$M3 = Ftw \times twd \quad (17)$$

In order to cancel the unnecessary moment M4, it is preferable to satisfy the following equation.

$$M3 - M4 = 0 \quad (18)$$

From the equations (16), (17) and (18), the following equation is obtained.

$$Ftw \times twd = Fstw \times twsd \quad (19)$$

In other words, it is preferable that twd should be designed to satisfy the equation (19).

In great consideration of FIGS. 29 and 32, however, it is found that the force generated in the tracking coil 238 and the force generated in the tracking subcoil 260 are equal to each other and the distance tgsdf between the inertia center G and the forward Tr subdriving point and the distance twsd between the point of the wire support center and the Tr subdriving point are equal to each other.

More specifically, the following equations are obtained.

$$Ftdf = Ftw \quad (20)$$

$$Fstdf = Fstw \quad (21)$$

$$tgsdf = twsd \quad (22)$$

From the equations (4) and (19), the following equation is obtained.

$$tgdf = twd \quad (23)$$

In other words, in order to suppress the DC tilt from the equation (23), it is preferable to design the moving part of the optical pick-up actuator 205 in order to identically satisfy the inertia center G and the position of the wire support center to be the elastic support center.

When the moving part of the optical pick-up actuator 205 is designed to satisfy the equation (23), there is not required a control circuit for varying the amounts of voltages to be applied to the focus coil 236 and the focus coil 237 described above, thereby controlling the DC tilt. Consequently, the DC tilt can be controlled at a low cost.

In the moving part of the conventional optical pick-up actuator 205, twd is designed to be 0 mm, and the tolerance of the component of the optical pick-up actuator and the tolerance of an assembly thereof are set to be smaller than ±0.05 mm together. In the example, the value of twd may be designed to be equal to or greater than 0.05 mm.

On the other hand, the overall height of a general optical disk drive device is 41.2 mm and the thickness of an optical disk is 1.2 mm. For this reason, it is desirable that the value of twd should be equal to or smaller than 40 mm.

Figure 33:
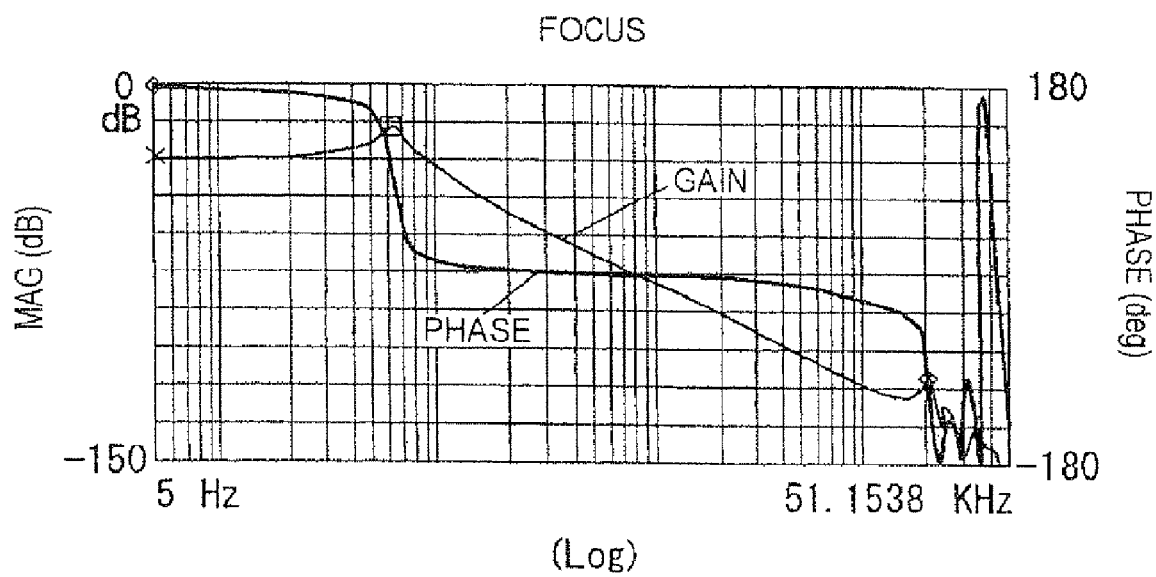
FIG. 33 is a Bode diagram showing a transfer function for a displacement in the focus direction of the moving part of an optical pick-up actuator 5 in the optical pick-up device according to the embodiment of the invention.

FIG. 33 is a Bode diagram showing a transfer function of a displacement in the focus direction of the moving part of the optical pick-up actuator 205 in the optical pick-up device according to the embodiment of the invention.

As shown in FIG. 25, the two objective lenses are provided and a high rigidity is obtained in the moving part of the thin optical pick-up actuator 205 for a notebook PC.

More specifically, the inertia center and the thrust center are not designed identically. Consequently, a secondary resonance frequency is maintained to be approximately 20 kHz and a secondary resonance Q value of 15 dB is achieved. In the focus direction, the moving part of the optical pick-up actuator 205 having a high rigidity can be implemented.

Figure 34:
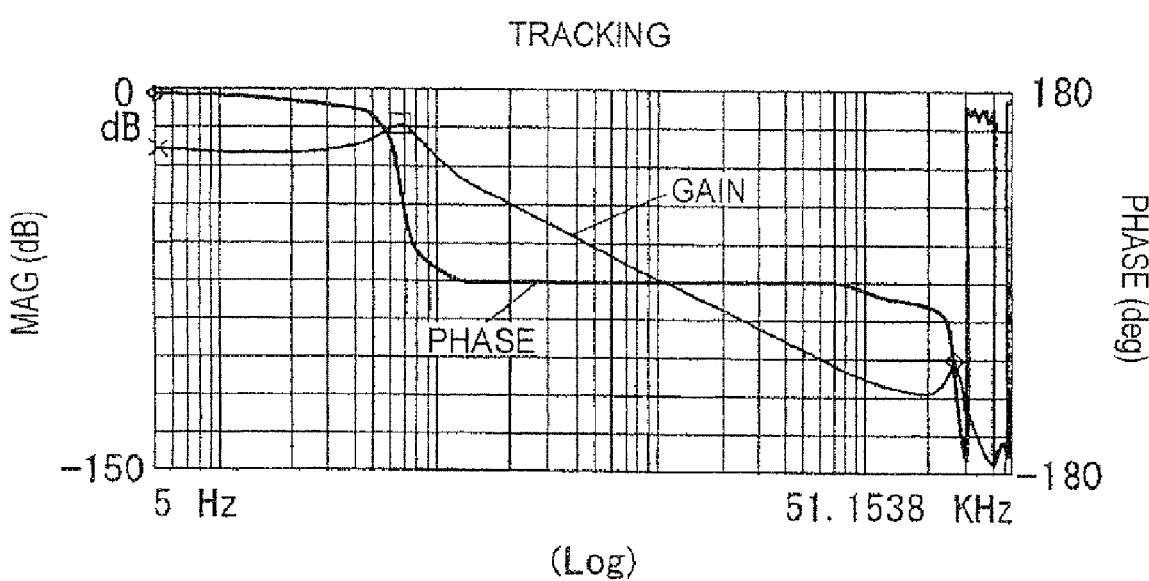
FIG. 34 is a Bode diagram showing a transfer function for a displacement in the tracking direction of the moving part of the optical pick-up actuator 5 in the optical pick-up device according to the embodiment of the invention.

FIG. 34 is a Bode diagram showing a transfer function of a displacement in the tracking direction of the moving part of the optical pick-up actuator 205 in the optical pick-up device according to the embodiment of the invention.

Figure 35:
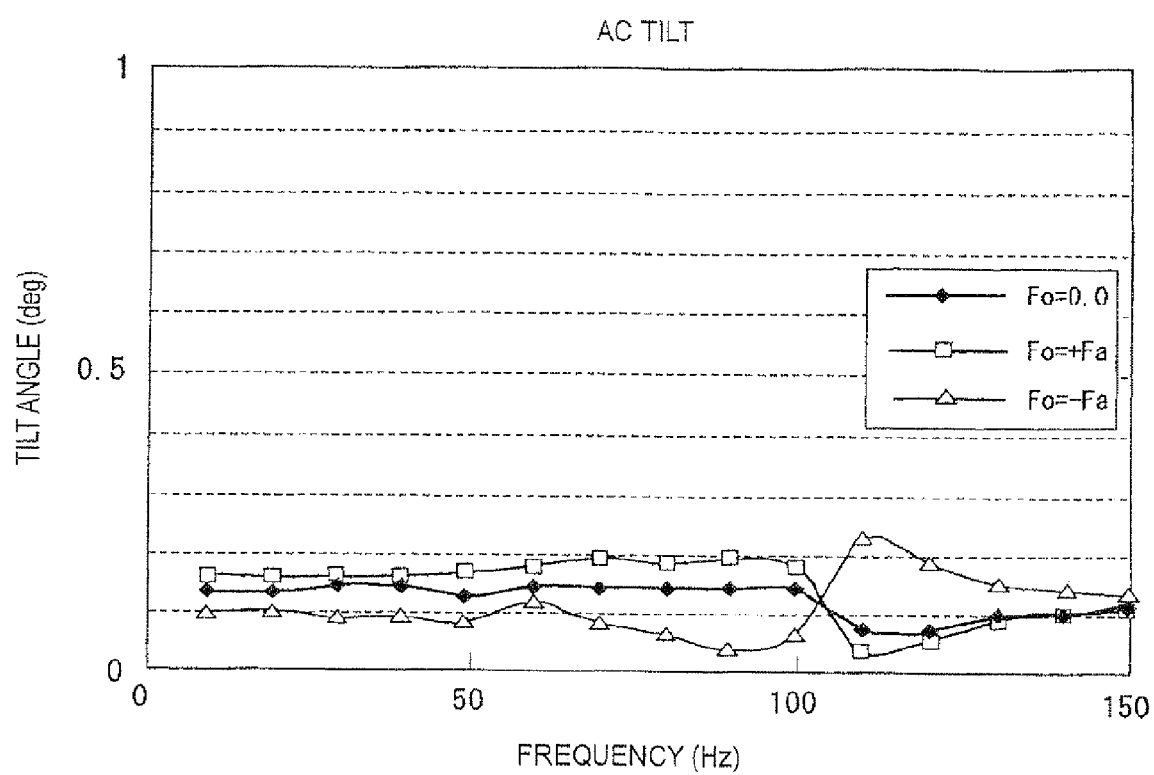
FIG. 35 is a chart showing an AC tilt characteristic in the moving part of the optical pick-up actuator 5 in the optical pick-up device according to the embodiment of the invention.

As shown in FIG. 35, the two objective lenses are provided and a high rigidity is obtained in the moving part of the thin optical pick-up actuator 205 for a notebook PC.

More specifically, the inertia center and the thrust center are not designed identically. Consequently, a secondary resonance frequency is maintained to be approximately 27 kHz and a secondary resonance Q value of 20 dB is achieved. In the tracking direction, similarly, the moving part of the optical pick-up actuator 205 having a high rigidity can be implemented.

FIG. 35 is a chart showing an AC tilt characteristic in the moving part of the optical pick-up actuator 205 in the optical pick-up device according to the embodiment of the invention.

There is shown the inclination of the objective lens in the ease in which a sine wave for reciprocating the moving part of the optical pick-up actuator 205 shown in FIG. 25 by a specific distance (+/−Ta mm) in the tracking direction is applied to the tracking coils 238 and 239 and the tracking subcoils 260 and 261 and a DC voltage for offsetting the moving part of the optical pick-up actuator 205 by a specific distance (+Fa mm, 0 mm, −Fa mm) in an Fo direction is applied to the focus coils 236 and 237.

As is apparent from FIG. 35, it is possible to reduce the AC tilt to be equal to or smaller than approximately 0.1 degree without setting the inertia center and the thrust center to be identical to each other by using the tracking subcoils 260 and 261.

Figure 36:
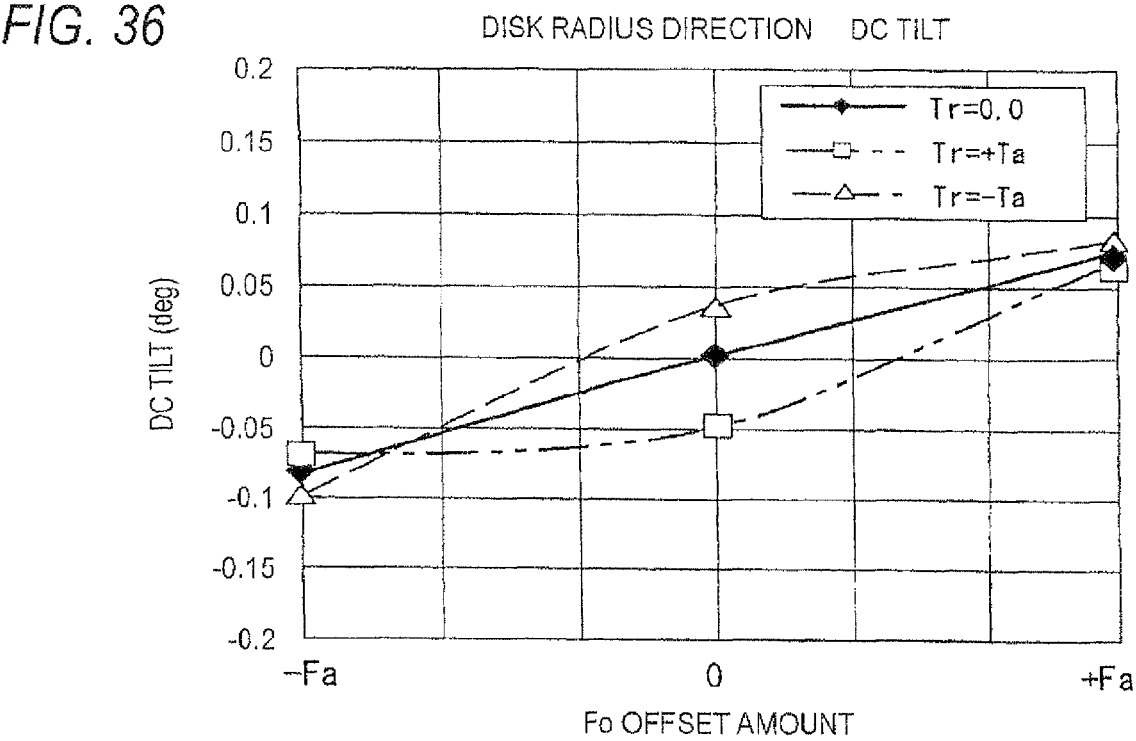
FIG. 36 is a chart showing a DC tilt characteristic in the disk radius direction of the moving part of the optical pick-up actuator 5 in the optical pick-up device according to the embodiment of the invention.

FIG. 36 is a chart showing a DC tilt characteristic in the disk radius direction of the moving part of the optical pick-up actuator 205 in the optical pick-up device according to the embodiment of the invention.

There is shown the inclination of the disk radius direction of the objective lens in the case in which a DC voltage for offsetting the moving part of the optical pick-up actuator 205 shown in FIG. 25 by a specific distance (+Ta mm, 0 mm, −Ta mm) in the tracking direction is applied to the tracking coils 238 and 239 and the tracking subcoils 260 and 261 and a DC voltage for offsetting the moving part of the optical pick-up actuator 205 by a specific distance (+Fa mm, 0 mm, −Fa mm) in the Fo direction is applied to the focus coils 236 and 237.

Figure 37:
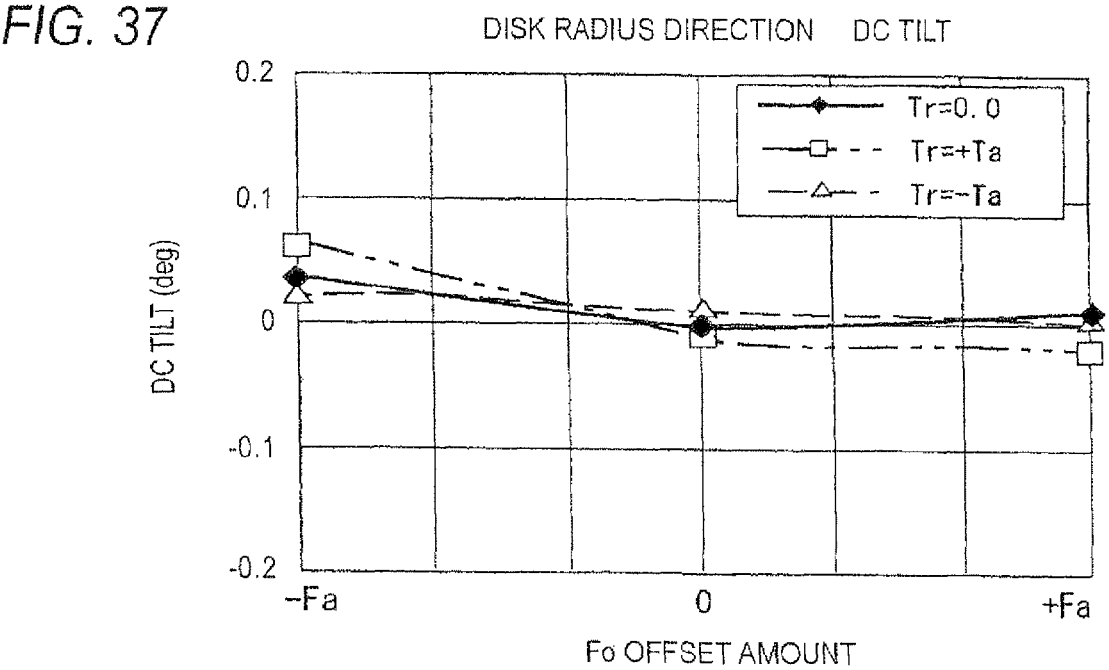
FIG. 37 is a chart showing a DC tilt characteristic in the disk rotating direction of the moving part of the optical pick-up actuator 5 in the optical pick-up device according to the embodiment of the invention.

FIG. 37 is a chart showing a DC tilt characteristic in the disk rotating direction of the moving part of the optical pick-up actuator 205 in the optical pick-up device according to the embodiment of the invention.

There is shown the inclination of the disk rotating direction of the objective lens in the case in which the DC voltage for offsetting the moving part of the optical pick-up actuator 205 shown in FIG. 25 by the specific distance (+Ta mm, 0 mm, −Ta mm) in the tracking direction is applied to the tracking coils 238 and 239 and the tracking subcoils 260 and 261 and the DC voltage for offsetting the moving part of the optical pick-up actuator 205 by the specific distance (+Fa mm, 0 mm, −Fa mm) in the Fo direction is applied to the focus coils 236 and 237.

As is apparent from FIGS. 36 and 37, it is possible to reduce the DC tilt to be equal to or smaller than approximately 0.1 degree by setting the inertia center and the elastic support center in an unnecessary moment generated from each of the tracking subcoils 260 and 261.

As described with reference to FIGS. 25 to 37, the moving part of the optical pick-up actuator 205 is provided with the tracking subcoils 260 and 261, and the inertia center and the elastic support center are set to be identical to each other. Consequently, the thrust center and the inertia center (or the elastic support center) do not need to be identical to each other. Consequently, it is possible to easily implement the moving part of a high performance optical pick-up actuator 205 having a high rigidity and a high propulsive force (a high sensitivity).

Although the objective lens holding cylinder 235, the tracking subcoils 260 and 261 and the focus coils 236 and 237 are provided in this order in the example of FIG. 25, the advantages of the invention can be obtained even if the objective lens holding cylinder 235, the focus coils 236 and 237 and the tracking subcoils 260 and 261 are provided in this order as is apparent from the equation (13).

While the description has been given to the moving part of the optical pick-up actuator 205 having the two objective lenses, that is, the objective lens 232 and the objective lens 233 in the example of FIG. 25, moreover, it is also apparent that the example can be applied to the moving part of the optical pick-up actuator 205 having one objective lens.

Figure 38:
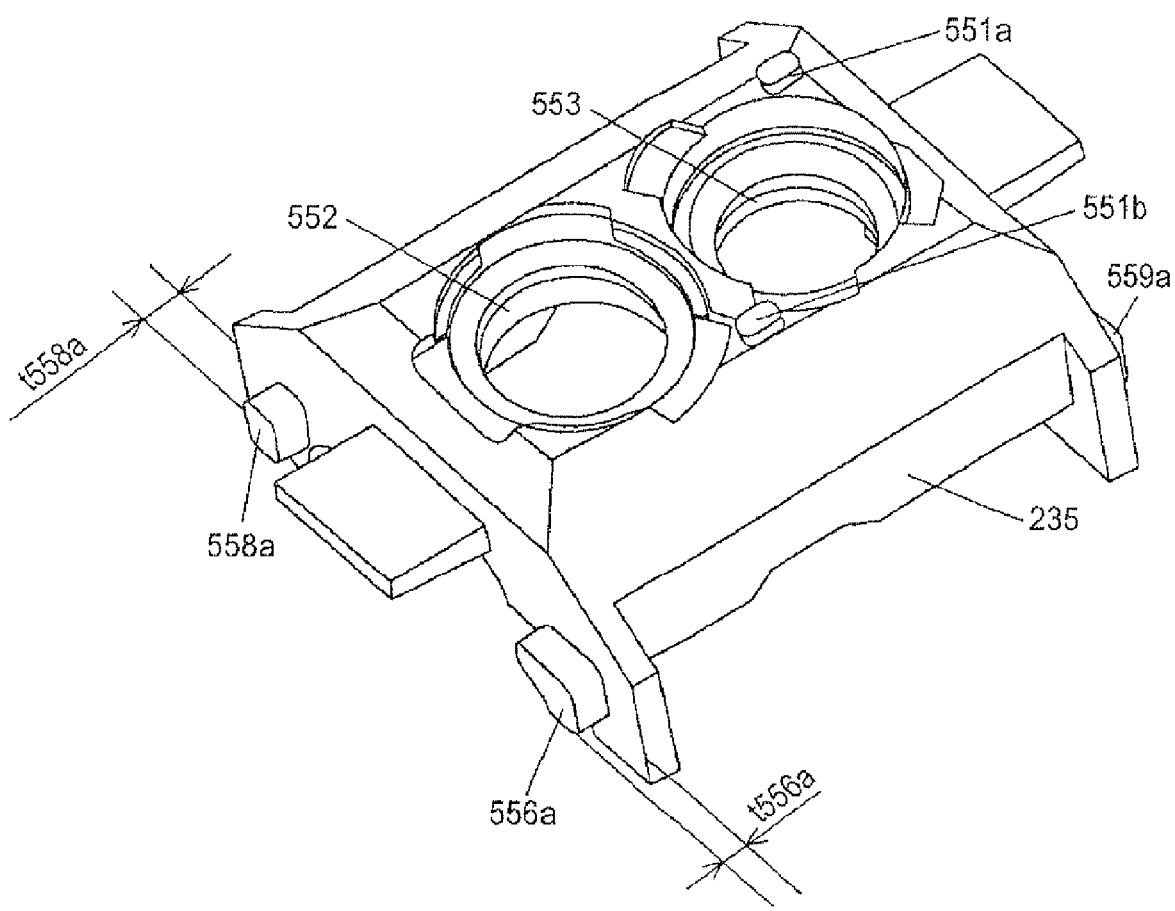
FIG. 38 is a perspective view showing the objective lens holding cylinder of the optical pick-up device according to the embodiment of the invention.

FIG. 38 is a perspective view showing the objective lens holding cylinder 235 of the optical pick-up device according to the embodiment of the invention, in which the objective lens holding cylinder 235 has an opening part 552 for the objective lens 232 shown in FIG. 25, an opening part 553 for the objective lens 233, collision preventing protruded parts 551a and 551b for preventing the collision of the objective lens 233 with an optical disk (not shown), a tracking coil positioning protruded part 558a for positioning the air-core part of the tracking coil 238 in the objective lens holding cylinder 235, a tracking coil positioning protruded part 559a for positioning the air-core part of the tracking coil 239 in the objective lens holding cylinder 235, and a focus coil positioning protruded part 556a for positioning the air-core part of the focus coil 236 in the objective lens holding cylinder 235.

Because of the perspective view, the focus coil positioning protruded part for positioning the air-core part of the focus coil 237 in the objective lens holding cylinder 235 is not shown.

As shown in FIG. 26, the tracking coil positioning protruded parts 358a and 359a and the focus coil positioning protruded part 356a are provided in the objective lens holding cylinder 235. Consequently, jigs for assembling the tracking coils 238 and 239 and the focus coils 236 and 237 into the objective lens holding cylinder 235 are simplified or are not required. Thus, an assembly cost can be reduced, and furthermore, a reduction in the cost of the optical pick-up device can be realized.

In the example of FIG. 25, the shapes of the tracking subcoils 260 and 261 are set to be almost identical to those of the focus coils 236 and 237. Therefore, the shapes of the air-core parts of the tracking subcoils 260 and 261 are almost identical to those of the air-core parts of the focus coils 236 and 237. Consequently, the focus coil positioning protruded part 556a takes the shape of a simple protrusion. In the ease in which the shapes of the air-core parts of the tracking subcoils 260 and 261 are different from those of the air-core parts of the focus coils 236 and 237, it is preferable that the shape of the focus coil positioning protruded part 356a should be adapted to those of the air-core parts to take the shape of a stepped protrusion.

Figure 39:
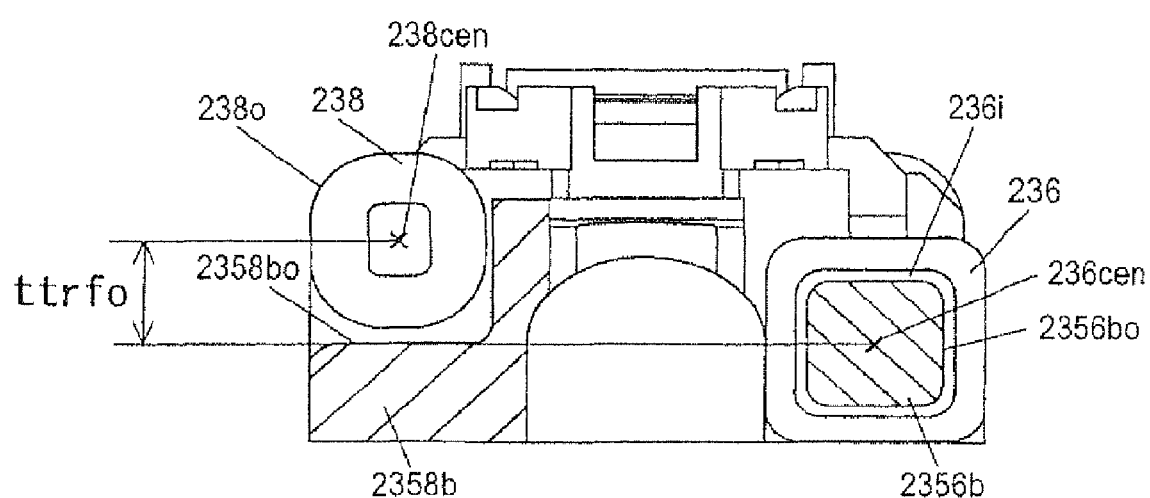
FIG. 39 is a front view showing the moving part of the optical pick-up actuator 5 in the optical pick-up device according to the embodiment of the invention.

FIG. 39 is a front view showing the moving part of the optical pick-up actuator 205 in the optical pick-up device according to the embodiment of the invention, and is different from the example of FIG. 38 in that there is provided a tracking coil external shape positioning protruded part 558b for positioning the external shape of the tracking coil 238 in the objective lens holding cylinder 235. The tracking coil 238 is positioned in the objective lens holding cylinder 235 by a tracking coil external shape 238i to be the external shape of the tracking coil 238 and a tracking coil external shape positioning protruded part external shape 558bo to be the external shape of a tracking coil external shape positioning protruded part 558b to be positioned in the objective lens holding cylinder 235.

A focus coil positioning protruded part 556b has the same function as that in the example shown in FIG. 38, and the focus coil 236 is positioned in the objective lens holding cylinder 235 by using a focus coil air-core internal shape 236i of the focus coil 236 and a focus coil positioning protruded part external shape 556bo of a focus coil positioning protruded part 556b.

In FIG. 39, for simplicity of the description, hatching is added to the tracking coil external shape positioning protruded part 558b and the focus coil positioning protruded part 556b, and an interval between the tracking coil external shape 238i and the tracking coil external shape positioning protruded part external shape 558bo, and an interval between the focus coil air-core internal shape 236i and the focus coil positioning protruded part external shape 556bo are shown to be large.

By utilizing the external shape of the tracking coil 238 and the tracking coil external shape positioning protruded part 558b to position the tracking coil 238 in the objective lens holding cylinder 235, thus, it is possible to obtain the same advantages as those in the example shown in FIG. 38.

While the advantages of the invention have been described by using the air-core coil in the example shown in FIGS. 38 and 39, they can be obtained even if the invention is applied to a coil printed circuit board (not shown) in which a coil is formed on a printed circuit board.

With reference to FIGS. 25 to 37, the description has been given to an optical pick-up device having a high rigidity, a high thrust and a high reliability even if the inertia center and the thrust center are not coincident with each other. The tracking coil positioning protruded part 558a shown in the example of FIG. 38 and the tracking coil external shape positioning protruded part 358b shown in the example of FIG. 39 are not utilized as the function of a mass balance but for a reduction in the cost of the optical pick-up device.

However, it is found that the tracking coil positioning protruded part 558a shown in the example of FIG. 38 and the tracking coil external shape positioning protruded part 558b shown in the example of FIG. 39 can also be applied to the conventional optical pick-up device in which the inertia center and the thrust center are coincident with each other.

More specifically, the tracking coil positioning protruded part 558a and the tracking coil external shape positioning protruded part 558b can also be utilized as the mass balance of the moving part of the objective lens support cylinder 235 or the mass balance of the moving part of the optical pick-up actuator 205.

Figure 40:
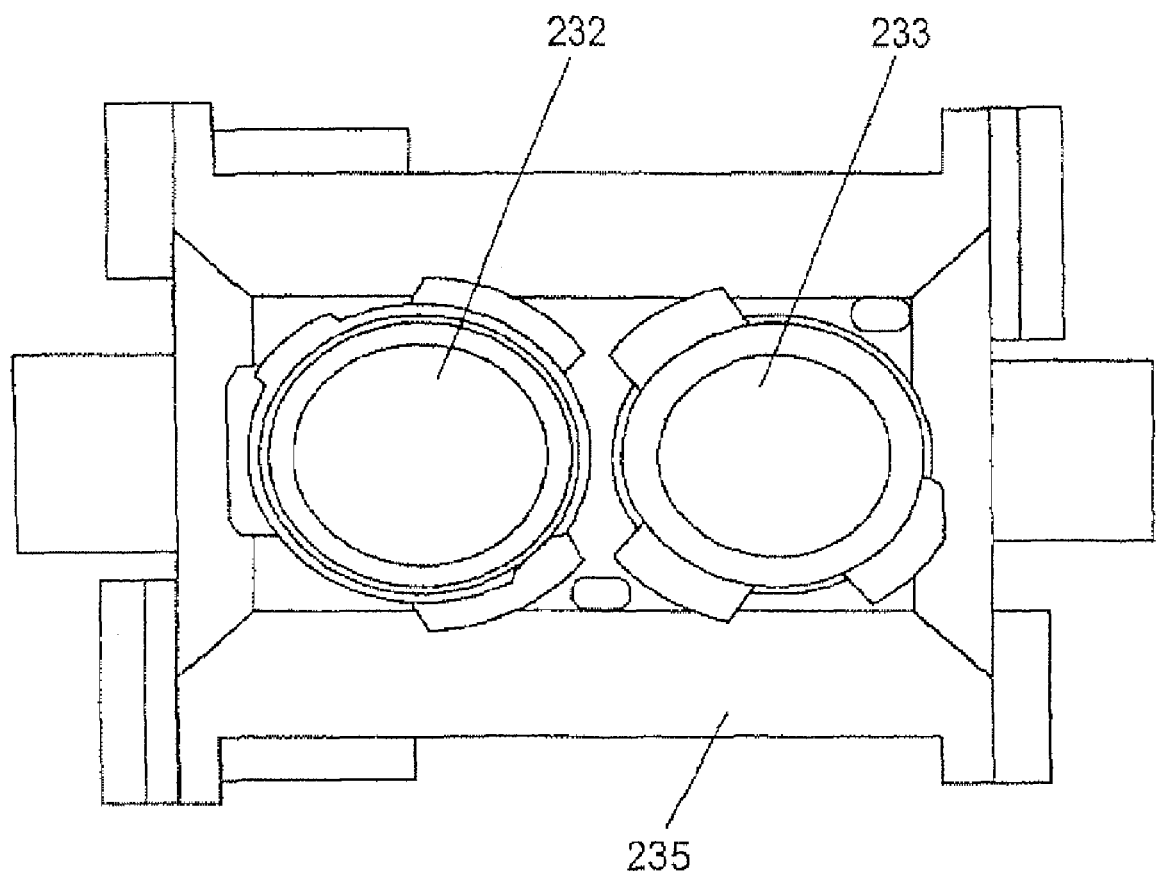
FIG. 40 is a plan view showing the moving part of the optical pick-up actuator 5 in the optical pick-up device according to the embodiment of the invention.

FIG. 40 is a plan view showing the moving part of the optical pick-up actuator 205 in the optical pick-up device according to the embodiment of the invention and is greatly different from the example shown in FIG. 25 in that the objective lens 233 is designed adjustably around a principal point thereof and the objective lens holding cylinder 235 is designed to have an adjustable structure around the principal point of the objective lens 233. In the example shown in FIG. 40, the objective lens 232 is fixed with an inclination within a certain allowance with precision in the component of the objective lens holding cylinder 235 and the relative inclination of the objective lens 233 is caused to be coincident with that of the objective lens 232.

Figure 41:
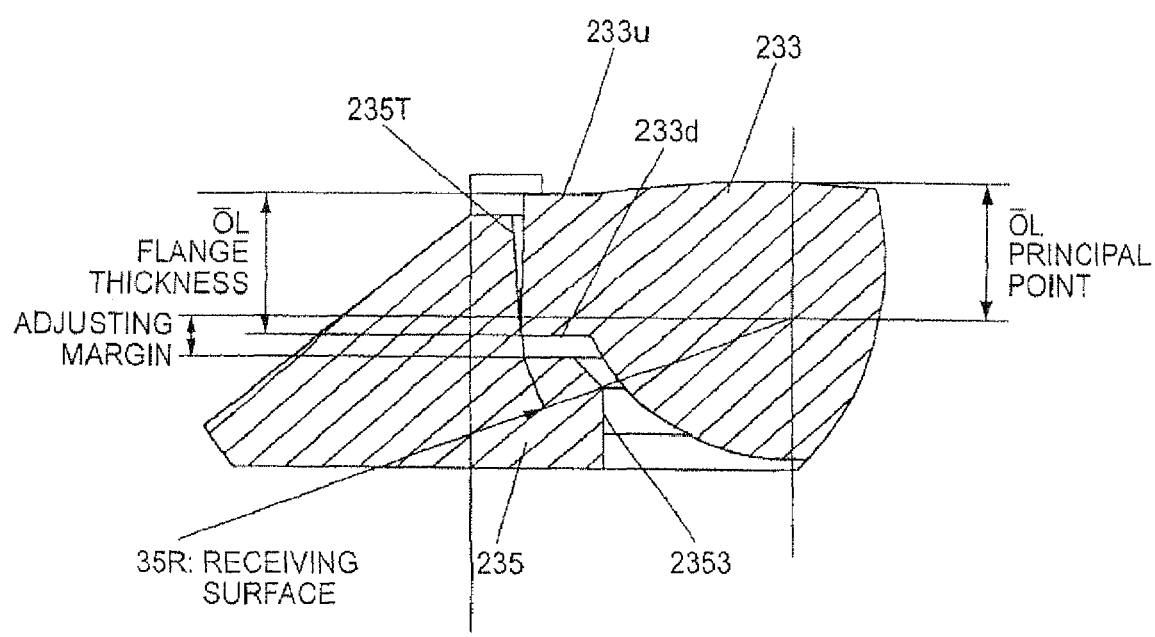
FIG. 41 is a sectional view showing the main part of the moving part of the optical pick-up actuator 5 in the optical pick-up device according to the embodiment of the invention.

FIG. 41 is a sectional view showing the main part of the moving part of the optical pick-up actuator 205 in the optical pick-up device according to the embodiment of the invention, which is a sectional view showing the main part of FIG. 40.

FIG. 41 shows the objective lens 233, an OL principal point to be the position of the principal point of the objective lens 233, a flange upper surface 233u of the objective lens 233, a flange lower surface 233d of the objective lens 233, and an OL flange thickness to be a distance between the flange upper surface 233u and the flange lower surface 233d. The objective lens 233 is designed in such a manner that the position of the OL principal point is placed above the flange lower surface 233d in FIG. 41. On the other hand, the objective lens holding cylinder 235 is provided with a receiving surface 235R which can adjust the objective lens 233 around the principal point, an adjusting margin set within such a range as to adjust the objective lens 233 around the principal point, and a removing taper surface 235T of the objective lens holding cylinder 235.

The receiving surface 235R is provided within the range of the adjusting margin, and the objective lens 233 can be adjusted within the range of the adjusting margin. Moreover, the removing taper surface 235T can remove the objective lens holding cylinder 235 from upper and lower molds.

More specifically, the objective lens 233 is adjusted with respect to inclinations in the optical disk radius direction and optical disk rotating direction of the objective lens 232, and the inclination of the objective lens 233 is caused to be almost coincident with that of the objective lens 232. Consequently, it is possible to maintain the quality of a light passing through the objective lens 232 to be equivalent to that of a light passing through the objective lens 233.

By adjusting the objective lens 233, accordingly, it is possible to maintain the quality of the light in the moving part of the optical pick-up actuator 205. Consequently, it is possible to provide an optical pick-up device having a high reliability.

In the example shown in FIGS. 40 and 41, the OL principal point of the objective lens 45 can be designed to be placed above the flange lower surface 45d. If a more reduction in a thickness is required for the optical pick-up device, however, the thickness of the objective lens cannot be maintained sufficiently so that the OL principal point is to be designed below the flange lower surface.

With reference to FIGS. 42 to 45, description will be given to an example in case of an objective lens in which the OL principal point is placed below the flange lower surface.

Figure 42:
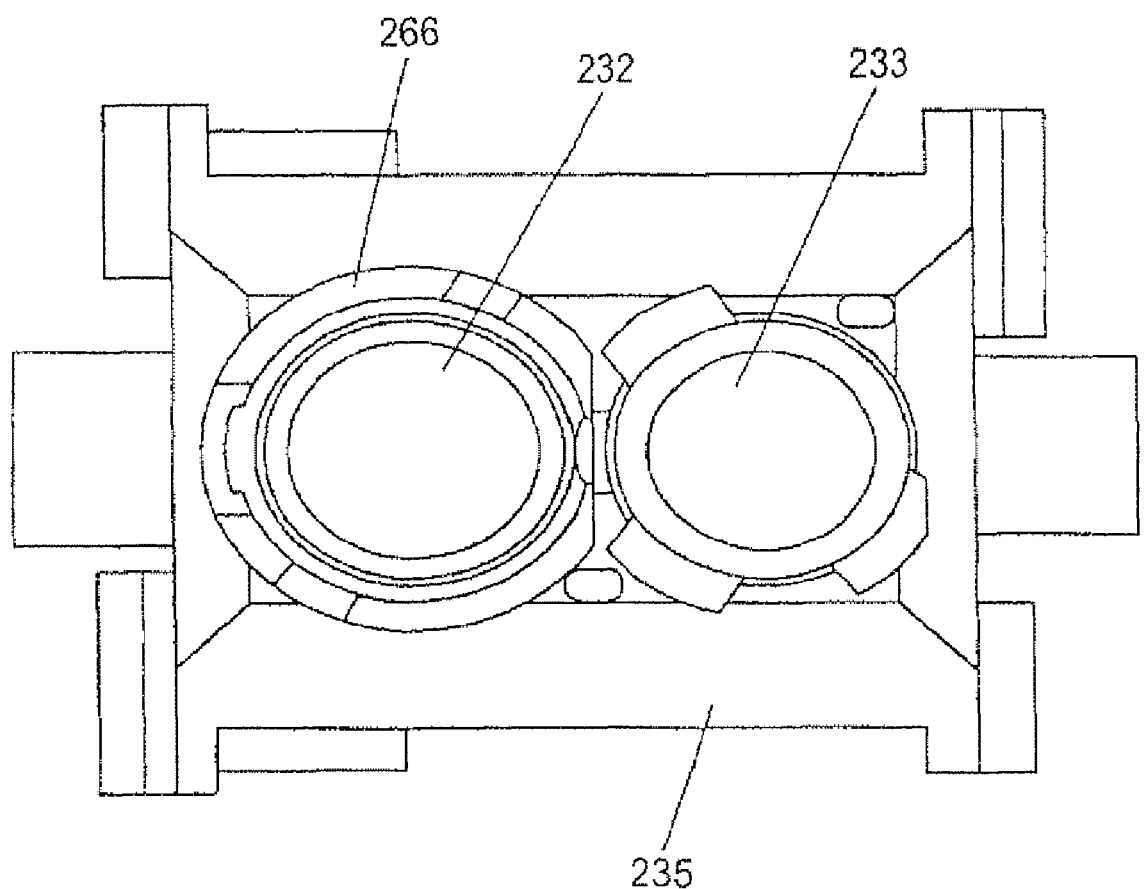
FIG. 42 is a plan view showing the moving part of the optical pick-up actuator 5 in the optical pick-up device according to the embodiment of the invention.

FIG. 42 is a plan view showing the moving part of the optical pick-up actuator 205 in the optical pick-up device according to the embodiment of the invention and is greatly different from the example shown in FIGS. 40 and 41 in that an OL principal point to be the principal point of the objective lens 232 is placed below a flange lower surface 232u in FIG. 45 and an objective lens spacer 266 is additionally provided in order to adjust the objective lens 232 around the principal point. In the example shown in FIG. 42, the objective lens 233 is fixed with an inclination within a certain allowance with precision in the component of the objective lens holding cylinder 235, and the relative inclination of the objective lens 232 is caused to be coincident with that of the objective lens 233.

Figure 43:
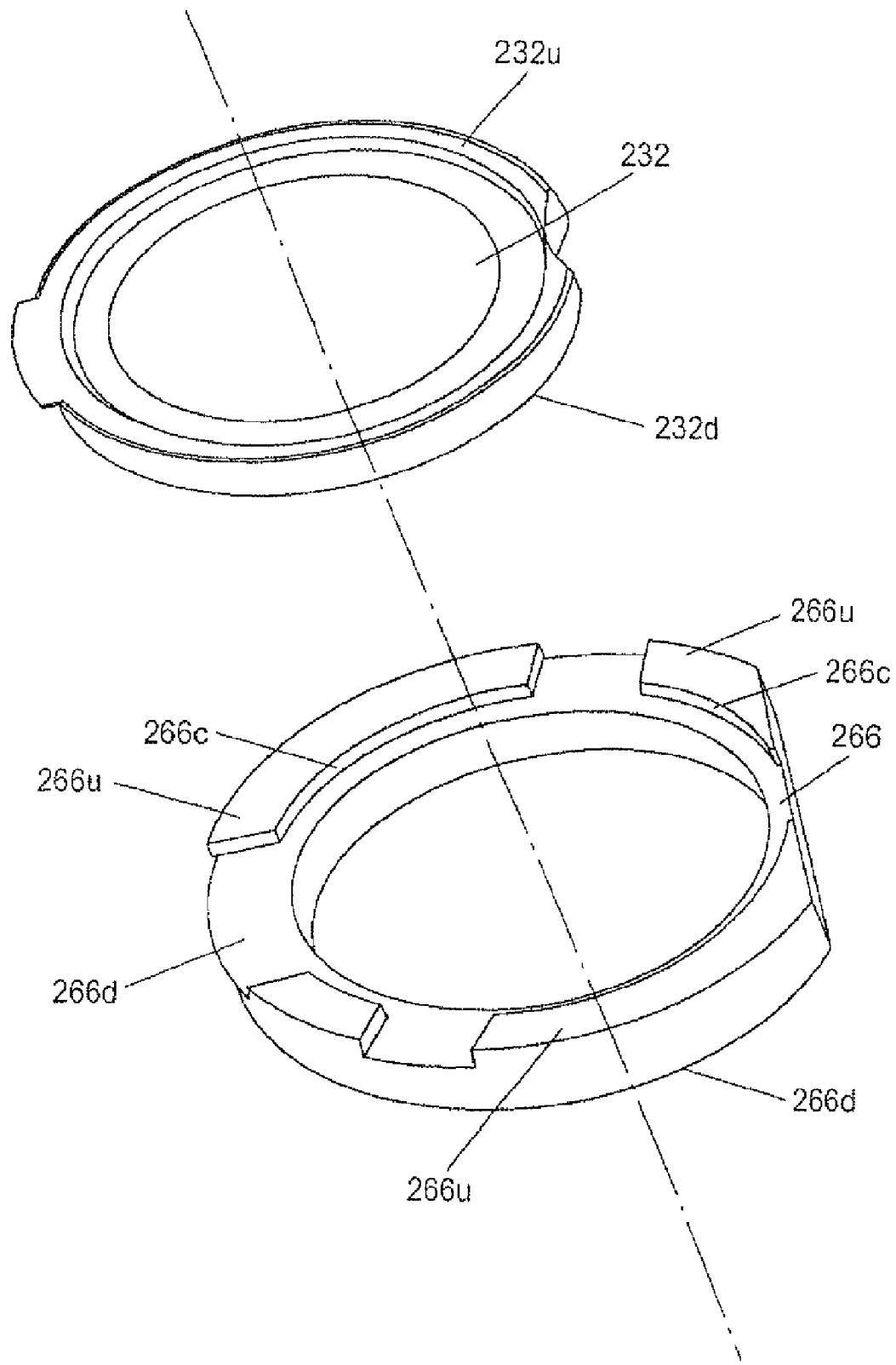
FIG. 43 is an exploded perspective view showing an objective lens and an objective lens spacer in the optical pick-up device according to the embodiment of the invention.
Figure 44:
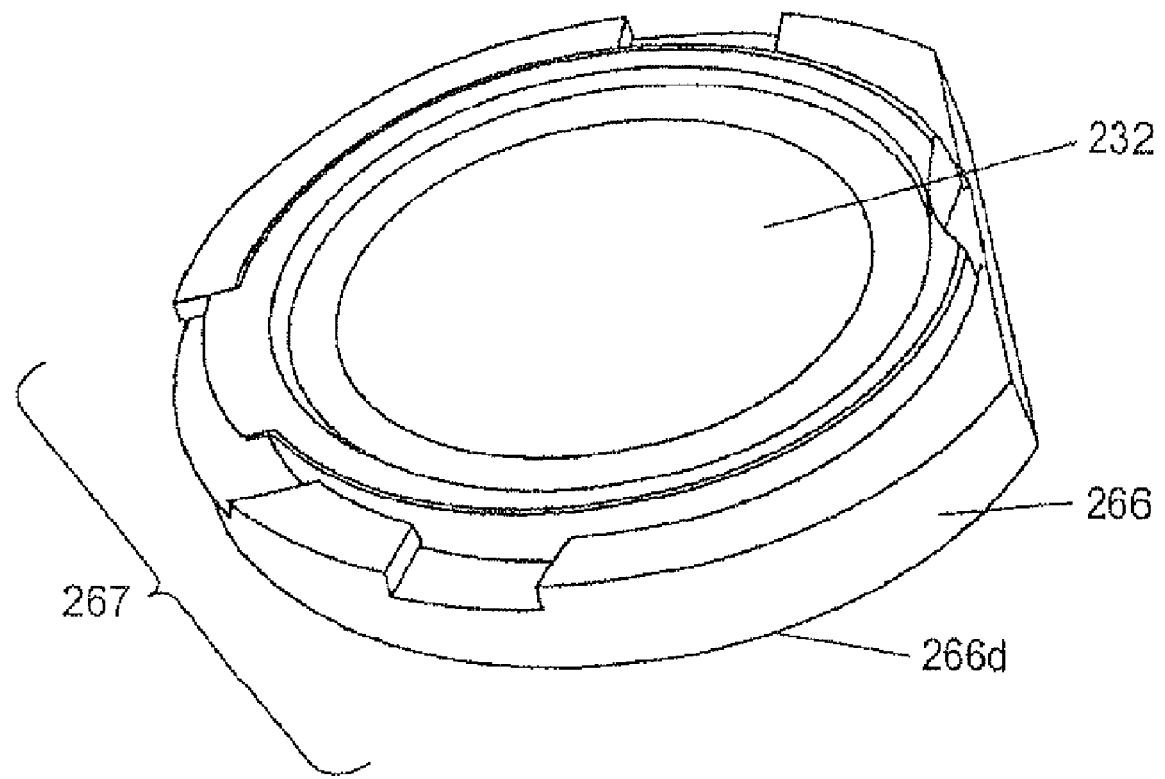
FIG. 44 is a perspective view showing the subassembly of the objective lens and the objective lens spacer in the optical pick-up device according to the embodiment of the invention.
Figure 45:
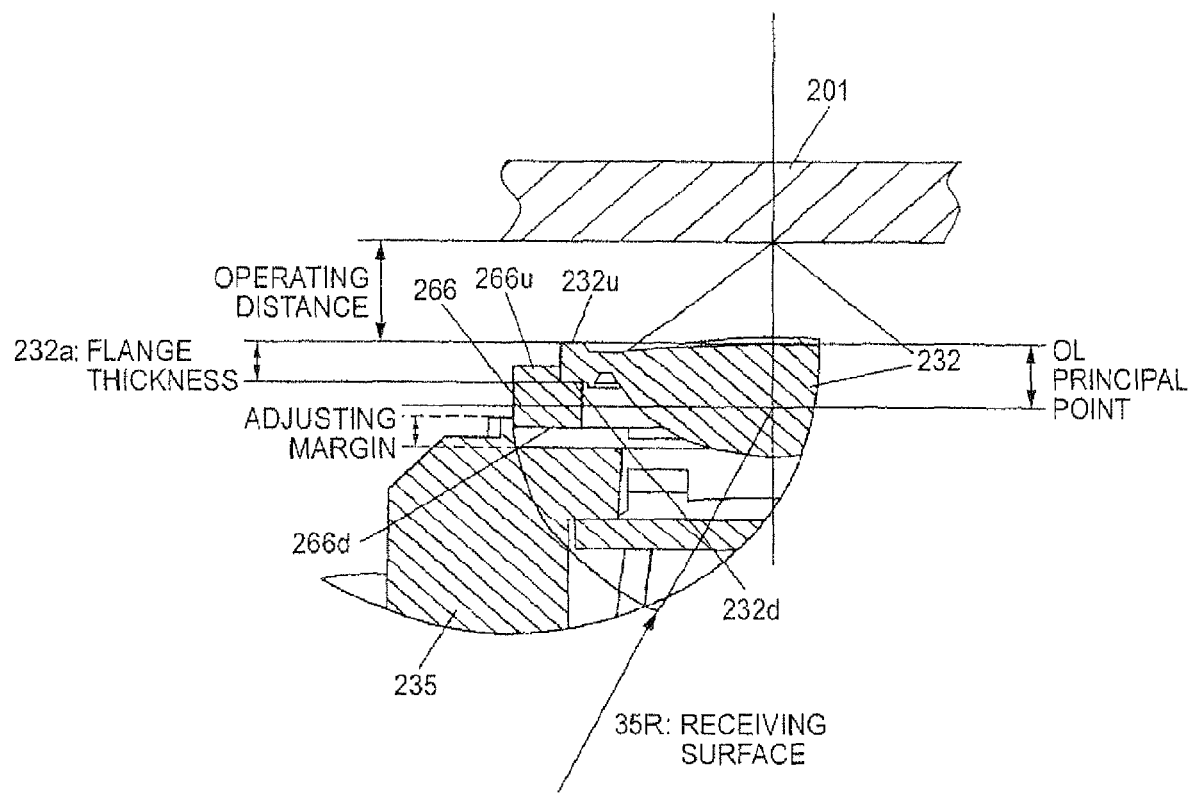
FIG. 45 is a sectional view showing the main part of the moving part of the optical pick-up actuator 5 in the optical pick-up device according to the embodiment of the invention.
Figure 46:
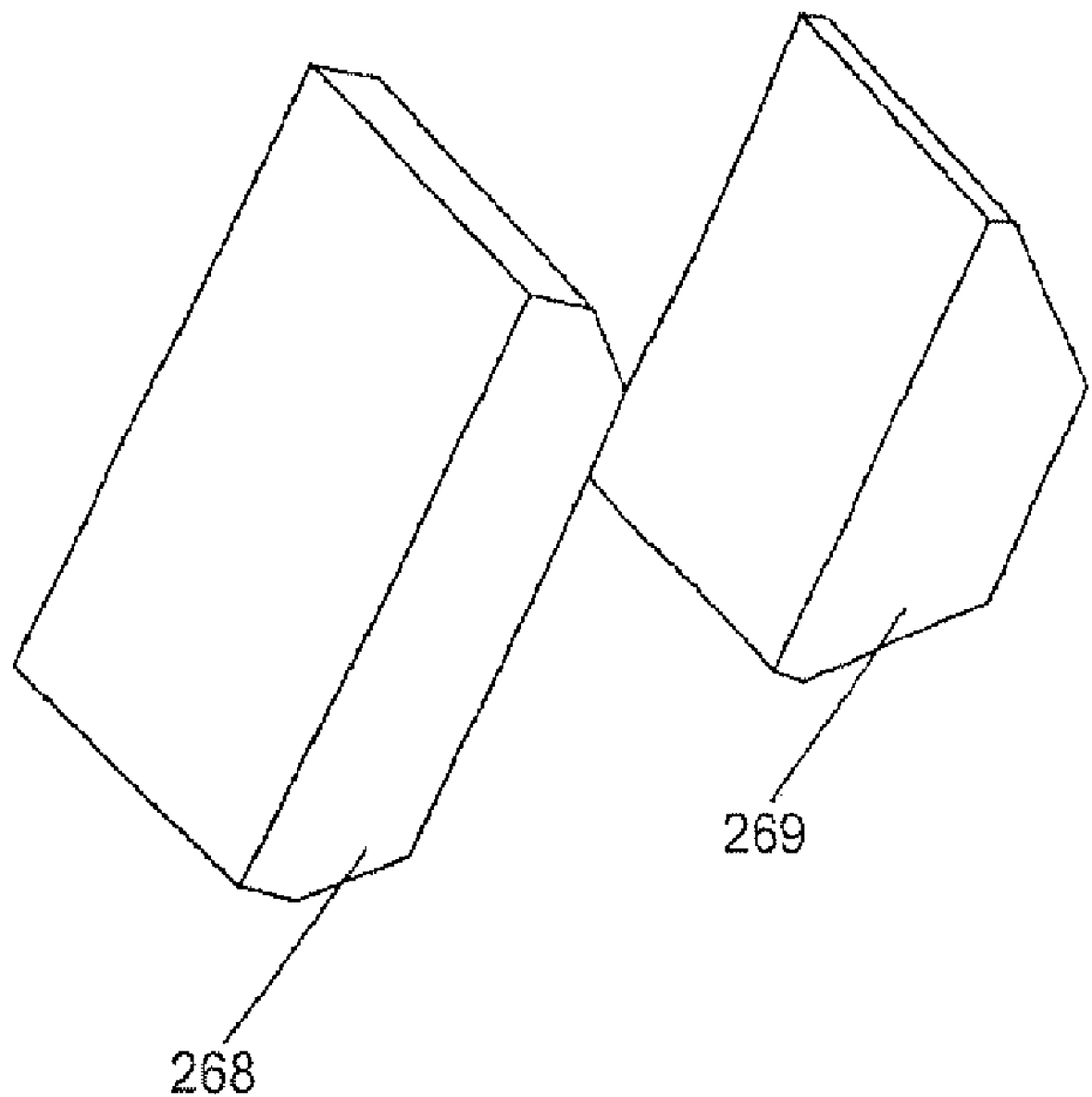
FIG. 46 is a perspective view showing two rising mirrors in the optical pick-up device according to the embodiment of the invention.

FIG. 43 is an exploded perspective view showing an objective lens and an objective lens spacer in the optical pick-up device according to the embodiment of the invention, FIG. 46 is a perspective view showing a subassembly 267 of the objective lens and the objective lens spacer in the optical pick-up device according to the embodiment of the invention, and FIG. 45 is a sectional view showing the main part of the moving part of the optical pick-up actuator 205 in the optical pick-up device according to the embodiment of the invention.

In FIG. 43, the objective lens spacer 266 is provided with a spacer upper surface 266u, an objective lens receiving surface 660L, an objective lens outer peripheral receiving surface 266c for receiving at the outer periphery of the objective lens, and a spacer lower surface 266d. The objective lens 232 is positioned in the objective lens spacer 66 at the flange lower surface 232d of the objective lens 232 and the objective lens receiving surface 660L, and the flange outer periphery of the objective lens 232 and the objective lens outer peripheral receiving surface 266c and is fixed with an adhesive (not shown).

The subassembly 267 (see FIG. 44) of the objective lens 232 and the objective lens spacer 266 is adjusted by the objective lens holding cylinder 235.

In FIG. 45, the objective lens holding cylinder 235 has the adjusting margin and the objective lens receiving surface 235R including the adjusting margin, and the subassembly 267 can be adjusted by the objective lens receiving surface 235R and the outer periphery of the lower surface of the subassembly 267.

By using the example shown in FIG. 45, it is also possible to adjust the objective lens having the center of the principal point placed below the flange lower surface.

It is also possible to cause the spacer upper surface 266u of the objective lens spacer 266 to approach the optical disk 1 from the flange upper surface 232u of the objective lens 232, thereby utilizing the spacer upper surface 266u as a collision preventing stopper of the optical disk 201 and the objective lens 232 for the objective lens spacer 266.

Figure 47:
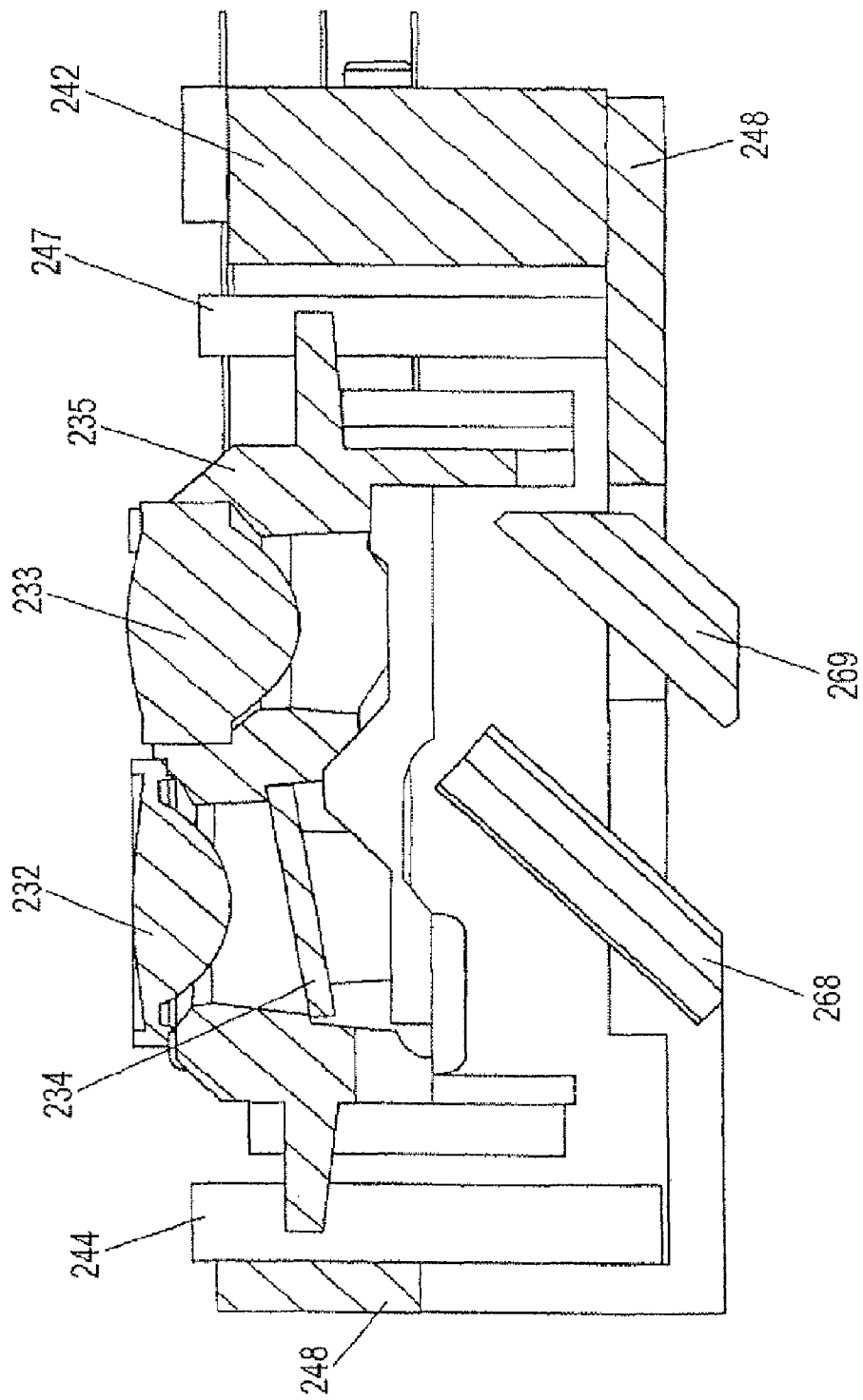
FIG. 47 is a sectional view showing the main part of the optical pick-up device according to the embodiment of the invention.

FIG. 46 is a perspective view showing two rising mirrors in the optical pick-up device according to the embodiment of the invention, and FIG. 47 is a view showing the main section of the optical pick-up device according to the embodiment of the invention. The example shown in FIGS. 46 and 47 is greatly different from the example shown in FIG. 14 in that the rising mirror 268 and the rising mirror 269 are used in place of the erecting prism 231.

In FIG. 14, one erecting prism 231 reflects a light for the objective lens 232 and transmits and reflects a light for the objective lens 233. In the example shown in FIG. 47, it is also possible to employ a structure in which the rising mirror 268 reflects the light for the objective lens 232 and transmits the light for the objective lens 233 and the rising mirror 269 reflects the light for the objective lens 233.

Moreover, it is possible to further reduce the cost of a component by using a flat plate glass for the materials of the rising mirror 268 and the rising mirror 269.

Figure 48:
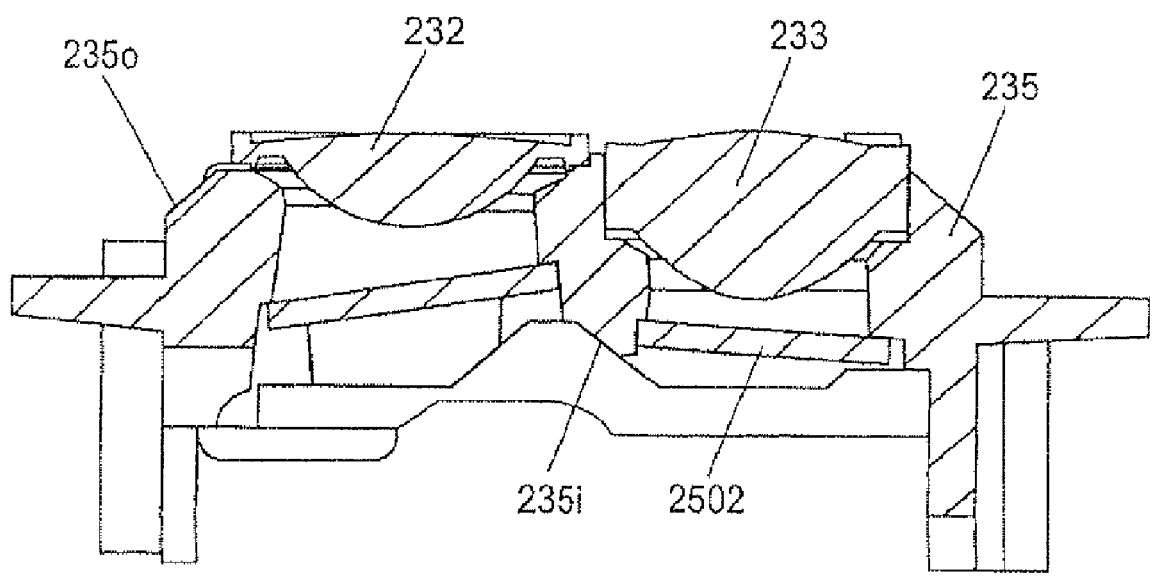
FIG. 48 is a sectional view showing the main part of the moving part of the optical pick-up actuator 5 in the optical pick-up device according to the embodiment of the invention.

FIG. 48 is a sectio9nal view showing the main part of the moving part of the optical pick-up actuator 205 in the optical pick-up device according to the embodiment of the invention and is different from FIG. 13 in that the λ/4 plate 702 is added to the moving part of the optical pick-up actuator 205.

By adding the λ/4 plate 702 to the moving part of the optical pick-up actuator 205, it is possible to reduce a phase difference generated in optical components provided before the light for the objective lens 233 reaches the λ/4 plate 702, for example, the beam splitter 227, the convex lens 230 and the erecting prism 231 (see FIG. 1). Thus, it is also possible to enhance the reliability of the optical pick-up device.

It is also possible to have such a structure that the λ/4 plate 702 is provided in the moving part of the optical pick-up actuator 205.

Also in the case in which the moving part of the optical pick-up actuator 205 is lens shifted, it is possible to implement either an enhancement in signal quality related to a first light or an enhancement in signal quality related to a second light. Consequently, the reliability of the optical pick-up device can be enhanced.

Next, an enhancement in the rigidity of the objective lens holding cylinder 235 will be described with reference to FIG. 49.

FIG. 49 is a material characteristic table for explaining the material of the objective lens holding cylinder in the optical pick-up device according to the embodiment of the invention.

While LCP (Liquid Crystal Polymer) containing a glass fiber having a high specific rigidity or LCP containing a carbon fiber is generally used for the objective lens holding cylinder 235, a ceramics material can also be utilized in order to more enhance the rigidity of the moving part of the optical pick-up actuator 205.

The LCP is referred to as a liquid crystal polymer material. More specifically, for example, there is used total aromatic polyester, aromatic polyazomethine, aromatic aliphatic polyester, aromatic polyester carbonate, or total aromatic or non-total aromatic polyester amide.

FIG. 49 shows a characteristic table for a main ceramics material, LCP containing 30% by weight of a glass fiber and LCP containing 30% by weight of a carbon fiber.

As shown in FIG. 49, ceramics has a greater specific gravity and a greater specific rigidity than those of the LCP. Although the ceramics material has a great specific gravity, it can be molded thinly. Consequently, it is possible to reduce the weight of the objective lens holding cylinder 235 by a reduction in the thickness of the ceramics material. When the weight of the objective lens holding cylinder 235 can be reduced, the weight of the moving part of the optical pick-up actuator 205 can be reduced, and furthermore, the thrust of the moving part of the optical pick-up actuator 205 can be enhanced.

If the average thickness of the objective lens holding cylinder formed by the LCP material is assumed to be 0.5 mm, for example, the average thickness of each ceramics material is 0.12 mm with zirconia having a great specific gravity and 0.38 mm with MAS having a small specific gravity because the LCP material has a specific gravity of approximately 1.5. In consideration of the component tolerance (dimensional tolerance) of the objective lens holding cylinder of ±10%, it is desirable that the average thickness of the objective lens holding cylinder should be 0.11 mm to 0.42 mm.

On the other hand, the ceramics material can be thinned to have a thickness of approximately 0.05 mm. For this reason, it is more desirable that the average thickness of the objective lens holding cylinder 235 should range from approximately 0.05 mm to 0.42 mm when the ceramics material is used.

Moreover, it is possible to reduce the weight of the objective lens holding cylinder 235 by increasing a porosity to be another feature of the ceramics material and decreasing an apparent specific gravity.

If the specific gravity of the objective lens holding cylinder formed by the LCP material is assumed to be 1.5, for example, the porosity of each ceramics material for obtaining an almost equal specific gravity to that of the LCP material is 75% with zirconia having a great specific gravity and 25% with MAS having a small specific gravity. In consideration of the component tolerance (dimensional tolerance) of the objective lens holding cylinder of ±10%, it is desirable that the porosity of the objective lens holding cylinder formed by the ceramics material should range from 15% to 85%.

It is to be noted that an increase in the porosity of the ceramics material reduces the rigidity of the ceramics material exponentially. In general, the following equation (30) has been known.

$$E = E1 \times EXP(-b \times p) \tag{30}$$

E1: rigidity with 0% of porosity
p: porosity
b: constant
E: rigidity with porosity p "b" represents a constant which is varied depending on the shape of the pore of the ceramics material, and description will be given to the case in which a value obtained experimentally, that is, b=5.4 is used in the embodiment.

If a target specific rigidity in the ceramics material is assumed to be 225 in order to achieve the specific rigidity of the LCP or more, a porosity to be required is 5% with the zirconia having a great specific gravity and 0% with the MAS having a small specific gravity, which is unstable. A porosity is approximately 30% with SiC having a great specific rigidity in the ceramics material. While the porosity of each ceramics material is calculated with b=5.4 obtained by an experiment and a specific rigidity of 25 or more, "b" can take a numeric value other than 5.4 because it is greatly changed with a variation in the shape of a pore.

Accordingly, the porosity obtained from a specific gravity for the objective lens holding cylinder formed by the ceramics material ranges from 15% to 85%, and the porosity obtained from a specific rigidity for the objective lens holding cylinder formed by the ceramics material ranges from 5% to 30%. For this reason, it is more desirable that the porosity of the objective lens holding cylinder formed by the ceramics material should range 5% to 85%.

It is a matter of course that the moving part of the optical pick-up actuator 205 having a high rigidity and a high thrust may be implemented by using a reduction in an average thickness and a porosity.

On the other hand, a peculiar tenacity to the ceramics material can be enhanced by coating the objective lens holding cylinder 235 with an adhesive.

The adhesive includes a one-liquid heat hardening type inorganic adhesive and a heat resistant epoxy adhesive. In order to enhance the tenacity, the epoxy adhesive is more preferable.

These adhesives have specific gravities of approximately one. Even if the objective lens holding cylinder 235 is wholly coated with these adhesives, therefore, a reduction in the weight of the objective lens holding cylinder 235 is not greatly hindered.

The surface of the objective lens holding cylinder 235 formed by ceramic may be partially or wholly coated with these adhesives. In particular, it is possible to effectively enhance the tenacity by coating, with these adhesives, a part in which the objective lens holding cylinder 235 formed by ceramics collides with other components of the optical pick-up device, more specifically, the vicinity of the stopper of the objective lens holding cylinder 235 formed by ceramics.

In the case in which the objective lens holding cylinder 235 is provided with a vacancy part such as a pore, alternatively, the pore of the objective lens holding cylinder 235 may be partially or wholly impregnated with these adhesives.

By adding an additive for absorbing a light into these adhesives, furthermore, it is also possible to prevent a stray light from being generated by a light reflected from the surface of the objective lens holding cylinder 235.

For example, it is possible to prevent the stray light by simply blackening these adhesives.

Figure 50:
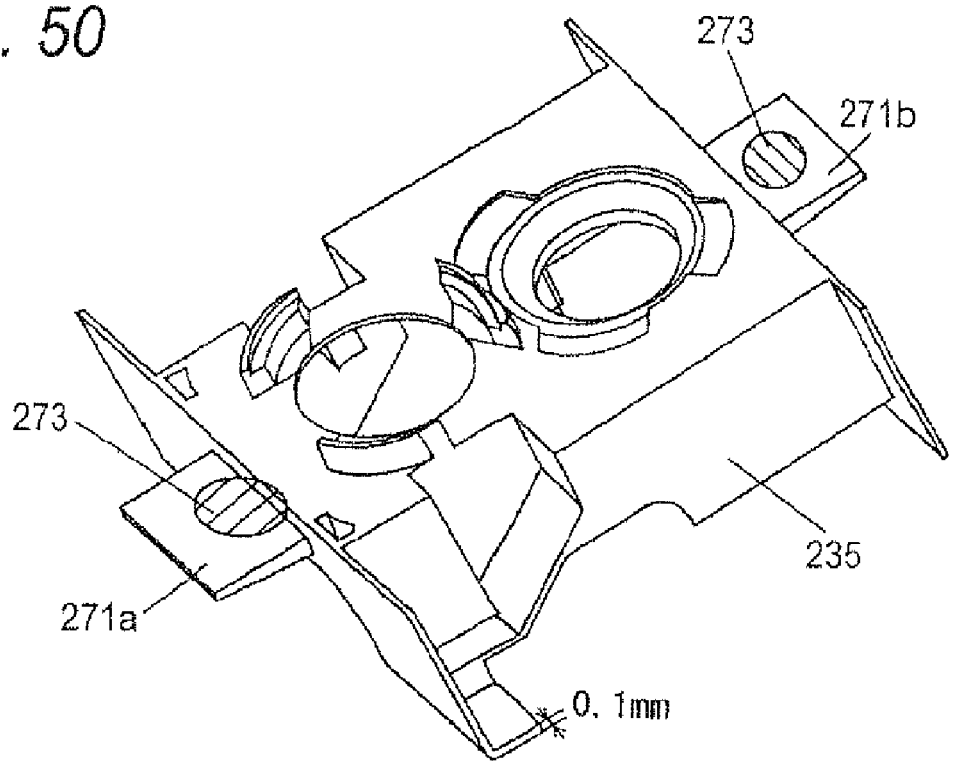
FIG. 50 is a perspective view showing the objective lens holding cylinder in the optical pick-up device according to the embodiment of the invention.
Figure 51:
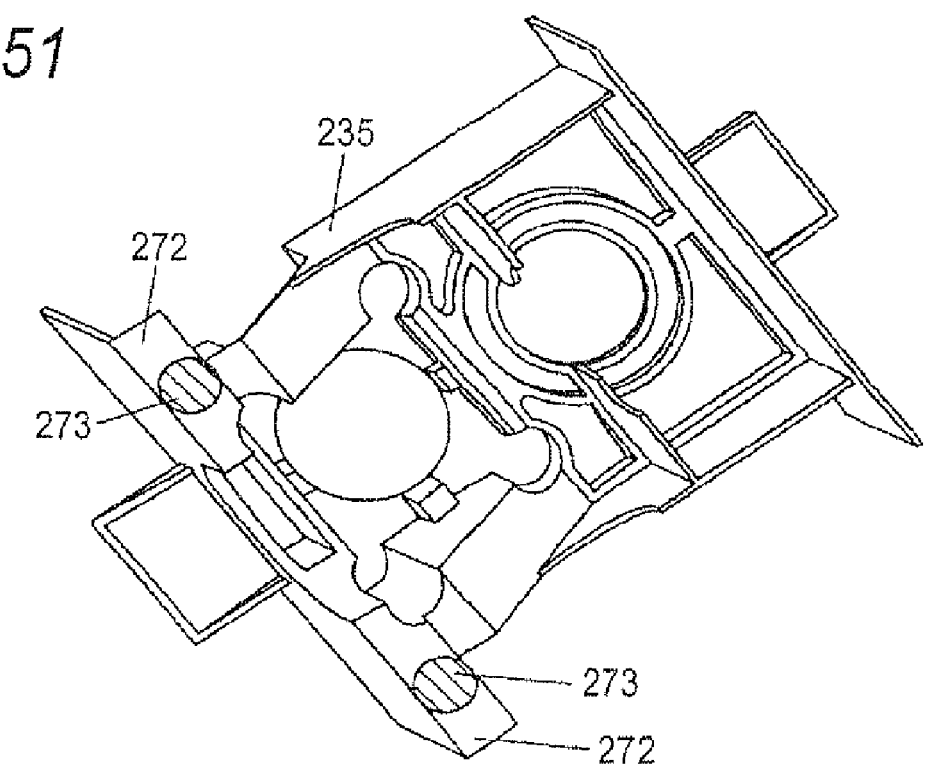
FIG. 51 is a perspective view showing the objective lens holding cylinder in the optical pick-up device according to the embodiment of the invention.

FIG. 50 is a perspective view showing the objective lens holding cylinder of the optical pick-up device according to the embodiment of the invention, and FIG. 51 is also a perspective view showing the objective lens holding cylinder of the optical pick-up device according to the embodiment of the invention, illustrating the objective lens holding cylinder 235 according to the example of FIG. 50 as seen from an opposite side. By using SiC to be silicon carbide as a ceramics material, it is possible to achieve a high rigidity and a high thrust to be desirable characteristics with an average thickness of 0.1 mm in the objective lens holding cylinder 235.

In FIGS. 50 and 51, the objective lens holder 235 is provided with an upper stopper 271 and a lower stopper 272, and an adhesive 273 is applied to the vicinity of the upper stopper 271 and the lower stopper 272. As described above, the whole surface of the objective lens holder 235 may be coated with the adhesive 273. In the case in which the objective lens holder 235 is formed by the ceramics material having a pore, moreover, the pore part may be impregnated with the adhesive 273.

Figure 52:
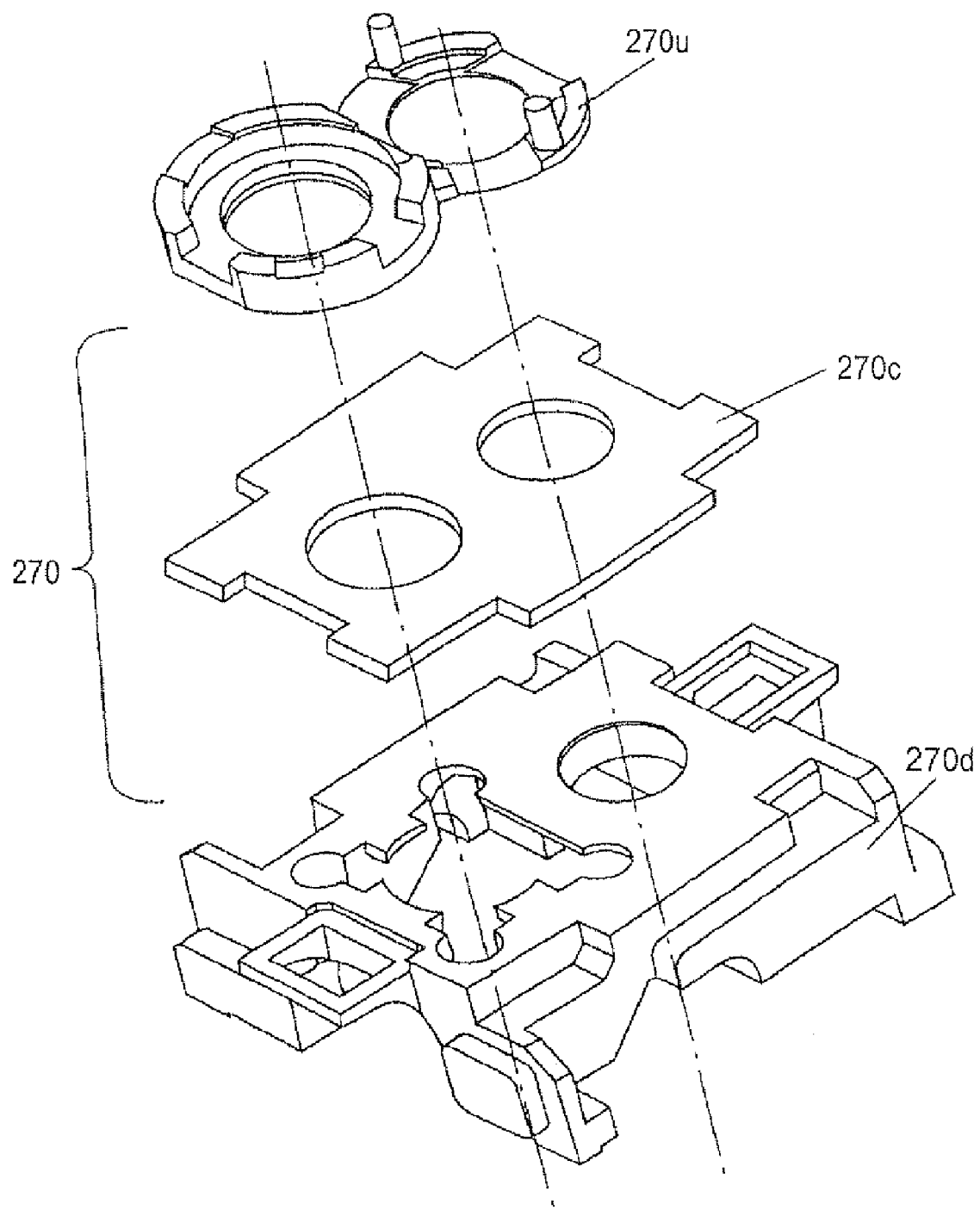
FIG. 52 is an exploded perspective view showing the subassembly of the objective lens holding cylinder in the optical pick-up device according to the embodiment of the invention.

FIG. 52 is an exploded perspective view showing the subassembly of the objective lens holding cylinder in the optical pick-up device according to the embodiment of the invention, in which a subassembly 270 of the objective lens holding cylinder includes upper and lower resins 270u and 270d to be resin members and a ceramics plate 270c formed by a ceramics material, and the upper resin 270u and the lower resin 270d are formed integrally with the ceramics plate 270c through outsert molding.

As described in the example, it is possible to implement the moving part of the optical pick-up actuator 205 having a high rigidity even if a ceramics material having a high rigidity is used for a part of the objective lens holding cylinder.

While the typical ceramics material is employed in FIG. 49, it is also possible to use a mixed material of alumina and zirconia, a mixed material of alumina and other oxides or a ceramics material such as boron nitride, aluminum nitride or magnesia for the objective lens holding cylinder 47 or the ceramics plate 270c in addition to the typical ceramics material.

While the description has been given to the objective lens holding cylinder mounting two objective lenses in the example shown in FIGS. 50 to 52, the advantages of the invention can be obtained even if the invention is applied to an objective lens holding cylinder mounting one conventional objective lens.

Figure 53:
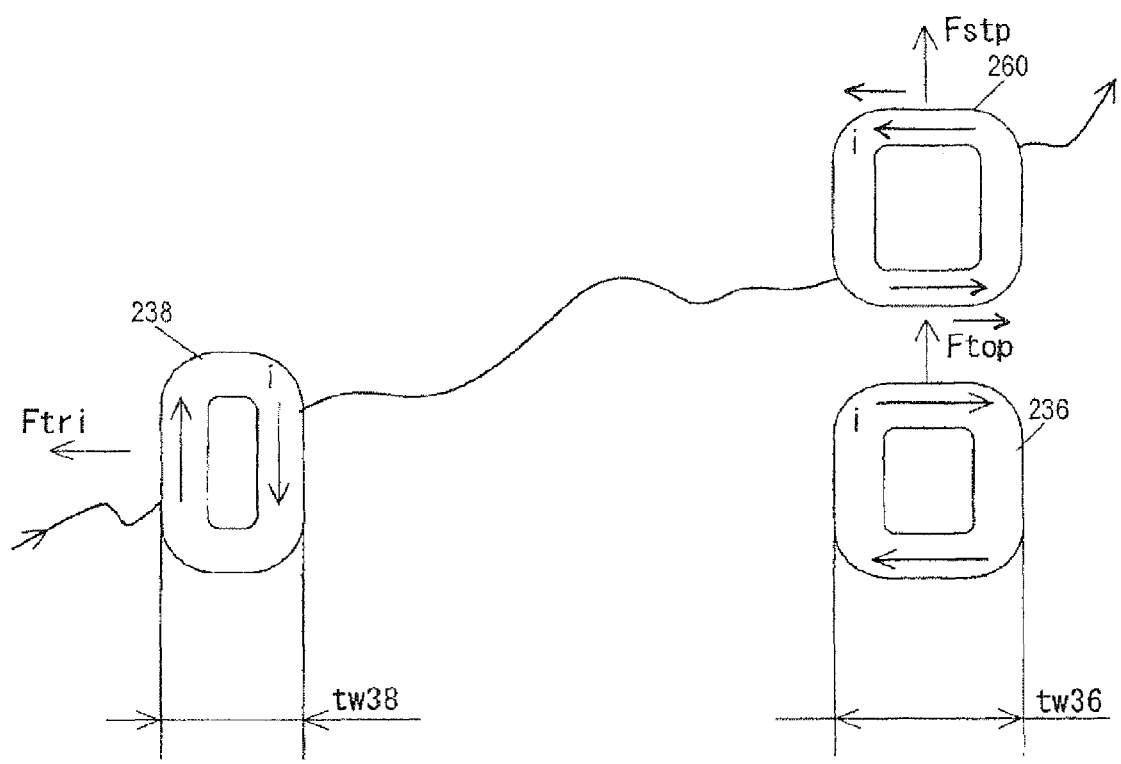
FIG. 53 is a view showing a coil in the optical pick-up device according to the embodiment of the invention.

FIG. 53 is an exploded view showing a coil part according to the example shown in FIG. 25. In FIG. 53, the tracking coil 238 and the tracking subcoil 260 are electrically coupled to each other. In the case in which the tracking coil 238 generates a force in a direction Ftri, a force Fstp is generated in the tracking subcoil 260. Currents flowing to the tracking coil 238 and the tracking subcoil 260 are shown in an arrow.

Similarly, the direction of a current flowing to the focus coil 236 in the generation of a force Ffop on the focus coil 236 is shown in an arrow.

The focus coil 236 can be driven independently of the tracking coil 238.

Accordingly, it is possible to optionally design the direction of the winding of the tracking subcoil 260 and that of the winding of the focus coil 236.

If the direction of the winding of the tracking subcoil 260 is designed to be identical to that of the winding of the tracking coil 236, however, it is easy to ascertain whether or not a worker assembles a coil correctly in a coil assembling work. Consequently, a tact time in a coil assembling process can be shortened. As a result, the price of the optical pick-up device can be reduced.

In order to maximize a force in the focus direction of the moving part of the optical pick-up actuator, a focus coil width tw236 is set to be the width of the focus coil 236. The focus coil width tw236 is designed at a maximum within the moving range of the moving part of the optical pick-up actuator.

On the other hand, a tracking coil width tw238 to be the width of the tracking coil 238 does not contribute to a force for generating a force in the tracking direction. For this reason, the tracing coil width tw238 is designed at a minimum within the moving range in the tracking direction of the moving part of the optical pick-up actuator.

For reference, the tracking coil effective length Ttreff shown in FIG. 27 maximizes the force generated by the tracking coil 238.

In case of an optical pick-up actuator requiring a reduction in a size and a thickness for a notebook PC as shown in FIG. 53, accordingly, it is desirable that the focus coil width tw236 should be smaller than the tracking coil width tw238.

In the example shown in FIG. 53, moreover, the tracking coil 238 has a diameter of 0.9 mm and the focus coil 236 has a diameter of 0.6 mm, and the number of turns of the tracking coil 238 is 242, the number of turns of the tracking subcoils 260 is 20 and the number of turns of the focus coil 236 is 48. In the case in which the moving part of the optical pick-up actuator in which a thrust center and an inertia center are not coincident with each other is to be driven by the tracking coil 238 in the tracking direction, an unnecessary moment around the inertia center is generated in the moving part of the optical pick-up actuator. The unnecessary moment is cancelled by the tracking subcoil 260. For this reason, it is desirable that the number of turns of the tracking coil 238 should be larger than that of turns of the tracking subcoil 260.

For the same reason, it is preferable that the number of turns of the focus coil 236 should be larger than that of turns of the tracking subcoil 260.

FIG. 26 shows a thickness th260 of the tracking subcoil 260, a thickness th236 of the focus coil 236 and a thickness th238 of the tracking coil 238. The shape of the magnetic yoke 248 is caused to take a complicated shape having a step, the thickness of the focus magnet 244 is caused to be different from that of the tracking magnet 246, or the attachment position of each coil in the objective lens holding cylinder 235 is caused to take a complicated shape, and the sum of the thickness th236 of the focus coil 236 and the thickness th260 of the tracking subcoil 260 does not need to be almost equal to the thickness th38 of the tracking coil 238, which is not shown.

In case of the optical pick-up actuator requiring a reduction in a size and a thickness for a notebook PC, however, it is desirable that the sum of the thickness th236 of the focus coil 236 and the thickness th60 of the tracking subcoil 260 should be almost equal to the thickness th238 of the tracking coil 238 in such a manner that the shape of the magnetic yoke 248 can be simplified.

FIG. 27 shows a height tya of the magnetic yoke protruded part 48a, a height tyb of the magnetic yoke protruded part 248b, a magnetic yoke height tyoke of the magnetic yoke 248, and a magnet height tmag of the tracking magnet 246.

In order to efficiently transmit the magnetic flux of each magnet to each coil, it is desirable that the heights tya and tyb of the magnetic yoke protruded part 248a should be almost equal to at least the magnetic yoke height tyoke.

It is further desirable that the heights tya and tyb of the magnetic yoke protruded parts 248a and 248b should be almost equal to the magnet height tmag.

In the example, a step difference is provided between the magnetic yoke height tyoke of the magnetic yoke 248 and the magnet height tmag of the tracking magnet 246, and the step part is coated with an adhesive to firmly fix the magnet, thereby enhancing the reliability of the optical pick-up actuator.

FIG. 39 shows a height ttrfo between a center 38cen of the tracking coil 238 and a center 236cen of the focus coil 236. In the example, the focus coil 236 is utilized as a counter mass in case of the moving part of the conventional optical pick-up actuator which does not use a tracking subcoil. Accordingly, it is desirable that ttrfo should be greater in order to utilize the focus coil 236 as the counter mass.

The invention has such a structure that a special converging part for a blue light and a converging part for red and infrared lights are provided. Consequently, each light can be reliably focused on an optical disk. In addition, the structure of the converging part can be simplified. Consequently, the invention can be applied to an optical pick-up device and an optical disk device which can implement at least one of a reduction in a thickness, a decrease in a size and the suppression of a deterioration in characteristics corresponding to laser beams various wavelengths including a blue laser beam.

Embodiment 3

Figure 54:
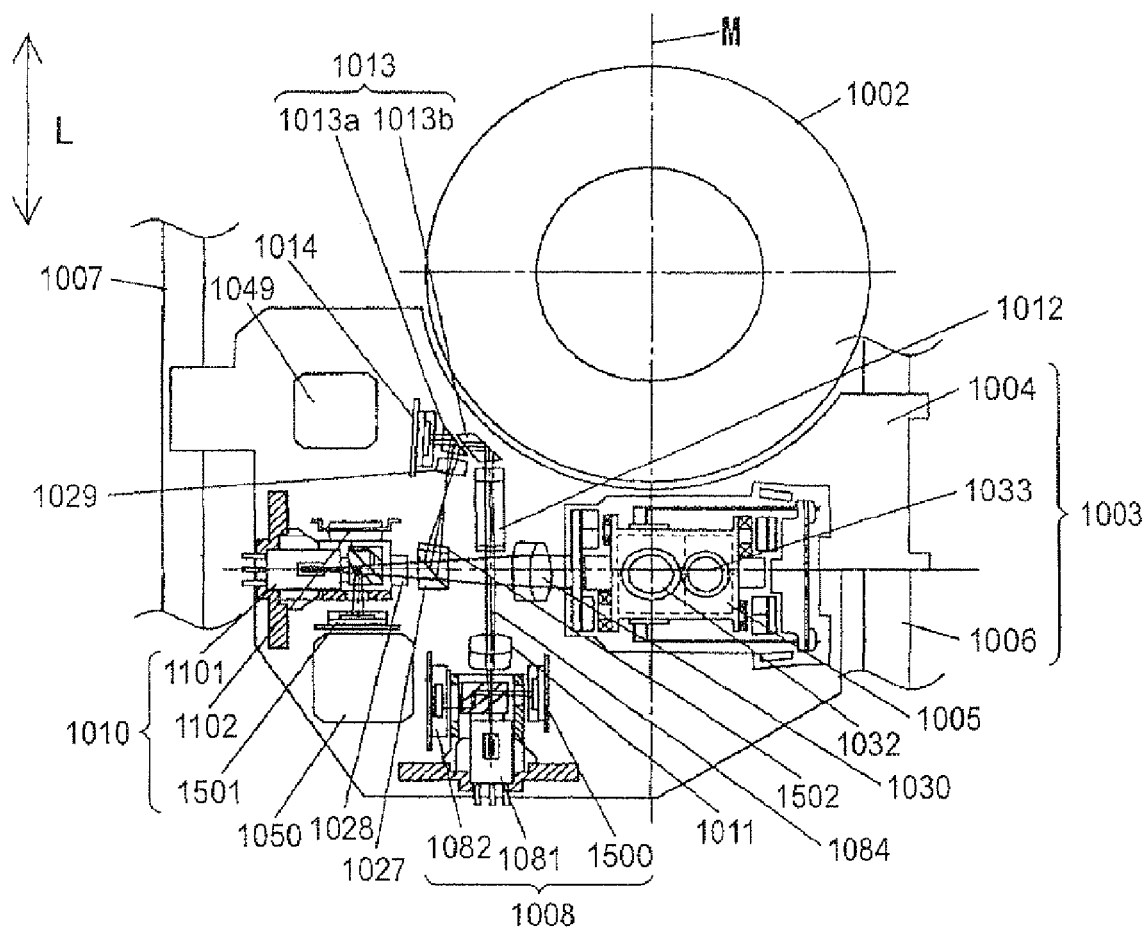
FIG. 54 is a plan view showing the optical pickup device according to an embodiment of the present invention.

An optical pickup device according to Embodiment 3 of the present invention will be hereinafter described with reference to the drawings. FIG. 54 is a plan view showing the optical pickup device according to an embodiment of the present invention, and FIG. 55 is a side view showing the optical pickup device according to the embodiment of the present invention.

Figure 55:
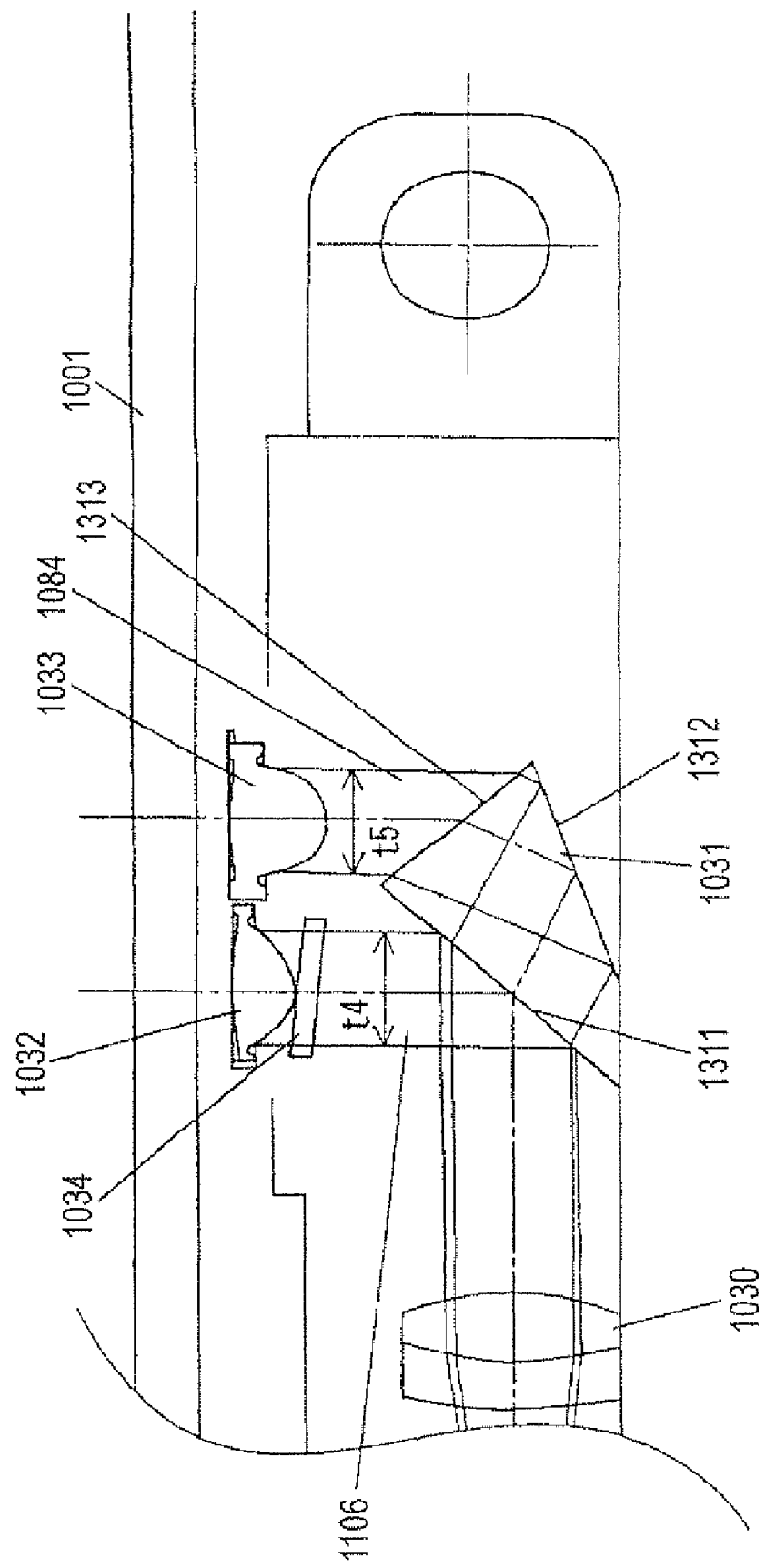
FIG. 55 is a side view showing the optical pickup device according to the embodiment of the present invention.

In FIG. 54 and FIG. 55, 1001 denotes an optical disk, which can perform at least either of data reproduction and data recording by projecting a light beam. Concretely, CD-ROM disks, DVD-ROM disks, etc., that can perform only data reproduction, CD-R disks, DVD-R disks, etc., that can perform data recording in addition to data reproduction, and CD-RW disks, DVD-RW disks, DVD-RAM disks, etc., that can perform data recording/deletion in addition to data reproduction are suitably used as the optical disk 1001. Additionally, a disk having a recording layer on which at least either of data recording and data reproduction can be performed with substantially red light, a disk having a recording layer on which data recording or data reproduction can be performed with substantially infrared light, and a disk having a recording layer on which data recording or data reproduction can be performed with substantially blue light to substantially violet light can be used as the optical disk 1001. Concerning the size of the optical disk 1001, a disk-like plate having various diameters can be used, and, preferably, a disk-like plate having a diameter of 3 cm to 12 cm is suitably used.

1002 denotes a spindle motor for rotating the optical disk 1001. The spindle motor 1002 is provided with a chucking part (not shown) used to hold the optical disk 1001. The spindle motor 1002 can rotate the optical disk 1001 at a constant angular speed or variable angular speed. A control unit (not shown) of a spindle motor driving means and of an optical disk device performs the switching between the constant angular speed and the variable angular speed in accordance with circumstances. Although the spindle motor 1002 is used as a means for rotating and driving the optical disk 1001 in this embodiment, another type motor or another means may be used to rotate and drive it.

1003 denotes an optical pickup used to record data in the optical disk 1001 and read data from the optical disk 1001 by projecting a light beam onto the optical disk 1001.

1004 denotes a carriage serving as a base of the optical pickup 1003, and 1005 denotes an optical-pickup actuator that substantially three-dimensionally moves an objective lens described later. The carriage 1004 is supported by at least a supporting shaft 1006 and a guide shaft 1007, and can move between the inner periphery and the outer periphery of the optical disk 1001. The carriage 1004 is provided with the optical-pickup actuator 1005 and an optical part or a light source.

1008 denotes an integrated device having a violet laser part 1081, a light-receiving element part 1082, and a front light monitor part 1500, and a detailed description thereof will be given with reference to FIG. 56. The laser part 1081 has a laser diode 1081a that generates a laser beam of approximately 405 nm. The laser diode 1081a is disposed in a space formed by a base 1081b.

Although the laser diode 1081a that emits violet light is used in this embodiment, it is permissible to use a laser diode that emits light ranging from blue light to purple light having a shorter wavelength. A laser diode, in which an active layer in which a luminescence center, such as In, is added to GaN is sandwiched between a p-type layer that is composed chiefly of GaN and that is doped with p-type impurities and an n-type layer that is composed chiefly of GaN and that is doped with n-type impurities, is suitably used as a laser diode that emits a laser beam having such a shorter wavelength. A so-called nitride semiconductor laser is suitably used.

A plurality of terminals 1081c are erected on the base 1081b. The terminals 1081c are made up of ground terminals, terminals to supply an electric current to the laser diode 1081a, etc. The laser part 1081 is used by covering the laser diode 1081a, such as a flame laser, with a protective film or by forming the base 1081b to have a sealed space and containing the laser diode 1081a in the space.

1083 denotes a prism attached directly to or through another member to the base 1081*b* according to a bonding method or the like on the base 1081*b*. The prism 1083 transmits a laser beam 1084 emitted from the laser diode 1081*a* so as to be projected onto the optical disk 1001, and guides return light returning from the optical disk 1001 to the light-receiving element part 1082. A diffraction grating or hologram (not shown) that divides a laser beam 1084 of a wavelength of approximately 405 nm is additionally provided on the side of the light-receiving element part 1082 of the prism 1083 so that focus detection, tracking detection, spherical aberration detection, or detection of a signal or the like recorded on the optical disk 1001 can be performed and so that a control signal can be extracted. In this embodiment, a transparent optical member 1083*a* is provided between the prism 1083 and the base 1081*b*. The prism 1083 and the optical member 1083*a* constitute an optical guide member. This optical member 1083*a* is joined directly to or through another member to the base 1081*b* according to a bonding method or the like. The prism 1083 has inclined-faces 1083*b* to 1083*d* that are substantially parallel to each other and are inclined. Optical elements, such as a beam splitter film and a hologram or diffraction grating, are disposed on the inclined faces 1083*b* to 1083*d*. The inclined faces 1083*b* to 1083*d* correspond to joint surfaces where transparent glass blocks or resin blocks are joined together. In more detail, at least a hologram is formed for focus detection, tracking detection, spherical aberration detection, or detection of a signal or the like recorded on the optical disk 1001 and for extraction of a control signal. At least a polarization beam splitter film and a diffraction grating are formed on the inclined face 1083*e*. A film that completely transmits light having a wavelength of 405 nm is applied to the inclined face 1083*d*. Although the three inclined faces are provided in this embodiment, the number of inclined faces may be one or more. The optical member 1083*a* is provided with a rim filter 1623. The rim filter 1623 is disposed on the side of the prism 1083 of the optical member 1083*a* so as to come in contact with the outer peripheral part of the prism 1083. Although the optical member 1083*a* is provided in this embodiment, the optical member 1083*a* may not be provided depending on specifications. When the optical member 1083*a* is not provided, the rim filter 1623 is disposed at a part on which light emitted from the laser diode 1081*a* in the outer peripheral surface of the prism 1083 is made incident.

Although the rim filter 1623 is used in this embodiment, another member can be used if there is provided a means for realizing light intensity distribution correction by which a light intensity distribution becomes different in a part so that, for example, the brightness of the center of a light spot becomes low whereas the brightness of the outer peripheral part thereof becomes high. In this embodiment, light emitted from the laser diode 1081*a* is made incident on the rim filter 1623 from the optical member 1083*a* as shown in FIG. 56. A transmission type hologram or a diffraction grating is formed at the center of the rim filter 1623. Light emitted from the laser diode 1081*a* is divided into at least two light beams by means of the rim filter 1623. In this embodiment, light emitted therefrom is divided into two light beams. That is, the two light beams are a laser beam 1084 proceeding to the optical disk 1001 and a monitor light beam 1084*a* proceeding to the front light monitor 1500. A center part of light admitted to the rim filter 1623 is diffracted by a transmission type hologram or a diffraction grating disposed at the rim filter 1623, then proceeds in a direction differing from that of the laser beam 1084, and is extracted as the monitor light beam 1084*a*. The monitor light beam 1084*a* from the rim filter 1623 is reflected by a thin optical film or a reflective film disposed on the inclined face 1083*d*, and is guided to the front light monitor 1500. In the front light monitor 1500, received light is converted into an electric signal, and the electric signal is sent to a laser driving means not shown, whereby the laser driving means adjusts an electric current to be applied to the laser diode 1081*a* so as to obtain a predetermined quantity of light. The laser beam 1084 proceeding to the optical disk 1001 from the rim filter 1623 has low brightness in its center part and has high brightness in its outer peripheral part since all or part of light of the center part of incident light on the rim filter 1623 is used as the monitor light beam 1084*a* by means of the rim filter 1623 as mentioned above. Since light emitted from the laser diode 1081*a* can be divided into the laser beam 1084 and the beam having an optical axis inclined with respect to the direction of the optical axis of the laser beam 1084 relatively early after the emission by providing the rim filter 1623 in this manner, the monitor light 184*a* to be obtained becomes excellent. Additionally, a small light spot can be formed on the optical disk, and light intensity on the disk can be heightened by lowering the brightness of the center part of the laser beam 1084, for example, as violet light having a shorter wavelength. Additionally, since this operation can be achieved by one optical component, device size reduction, thickness reduction, etc., can be realized.

Figure 72:
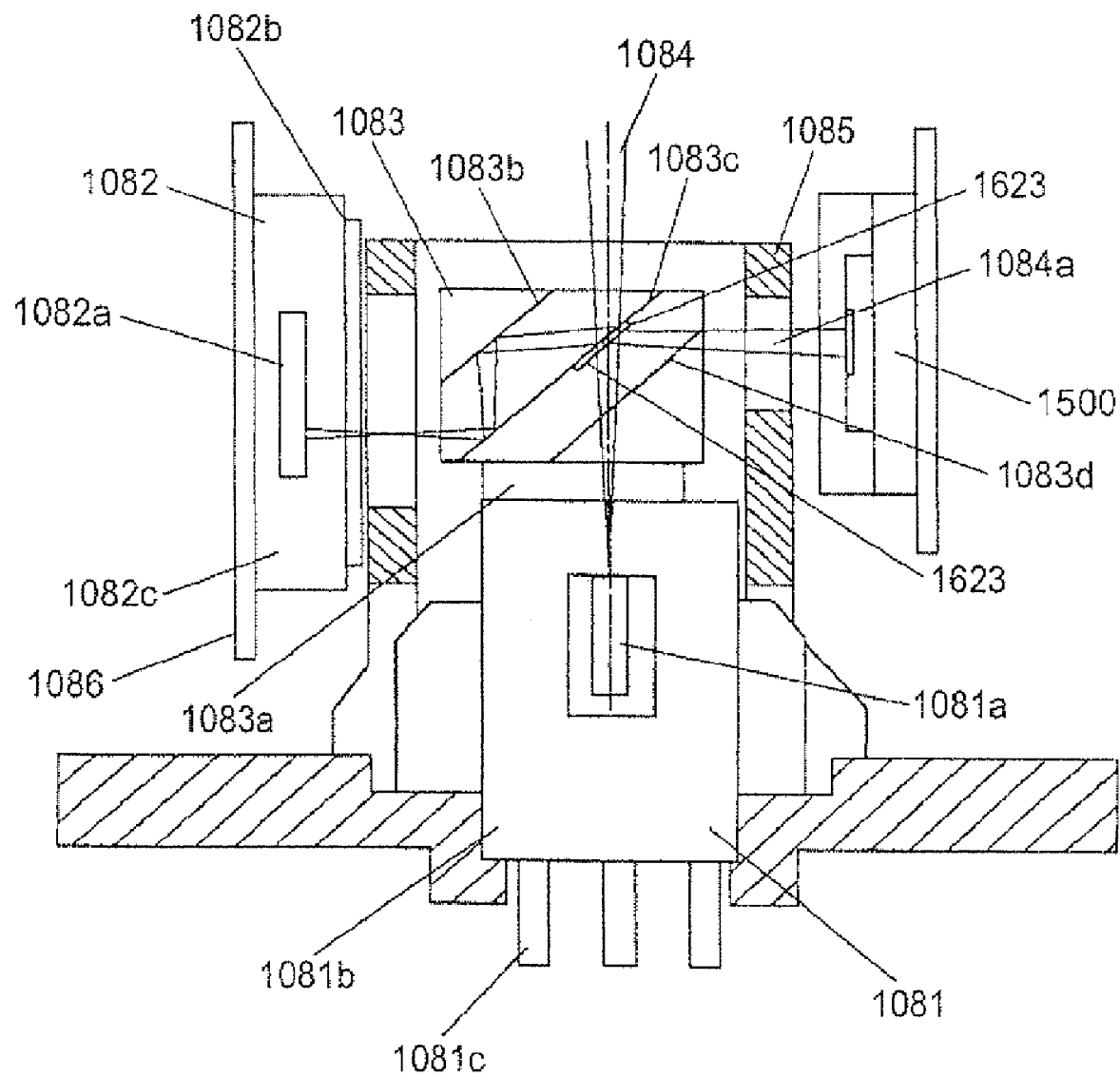
FIG. 72 is a partially enlarged view showing the optical pickup device according to the embodiment of the present invention.

A member that can perform intensity distribution correction like the rim filter 1623 may be disposed on the inclined face 1083*c*, i.e., may be contained in the prism 1083 as shown in FIG. 72. In this case, the rim filter 1623 is provided to face a polarization beam splitter disposed on the inclined face 1083*c*. At this time, the rim filter 1623 is provided with a reflective film, a reflection type diffraction grating, or a reflection type hologram so as to reflect at least a part of incident light. Therefore, when light from the laser diode 1081*a* is made incident on the inclined face 1083*e*, at least a part of the light of its center part is reflected by the rim filter 1623 and is changed into monitor light 1084*a*, and is allowed to be made incident on the front light monitor 1500. Thereafter, light having low brightness at the center part passes through a polarization beam splitter film, and is changed into a laser beam 1084.

Figure 73:
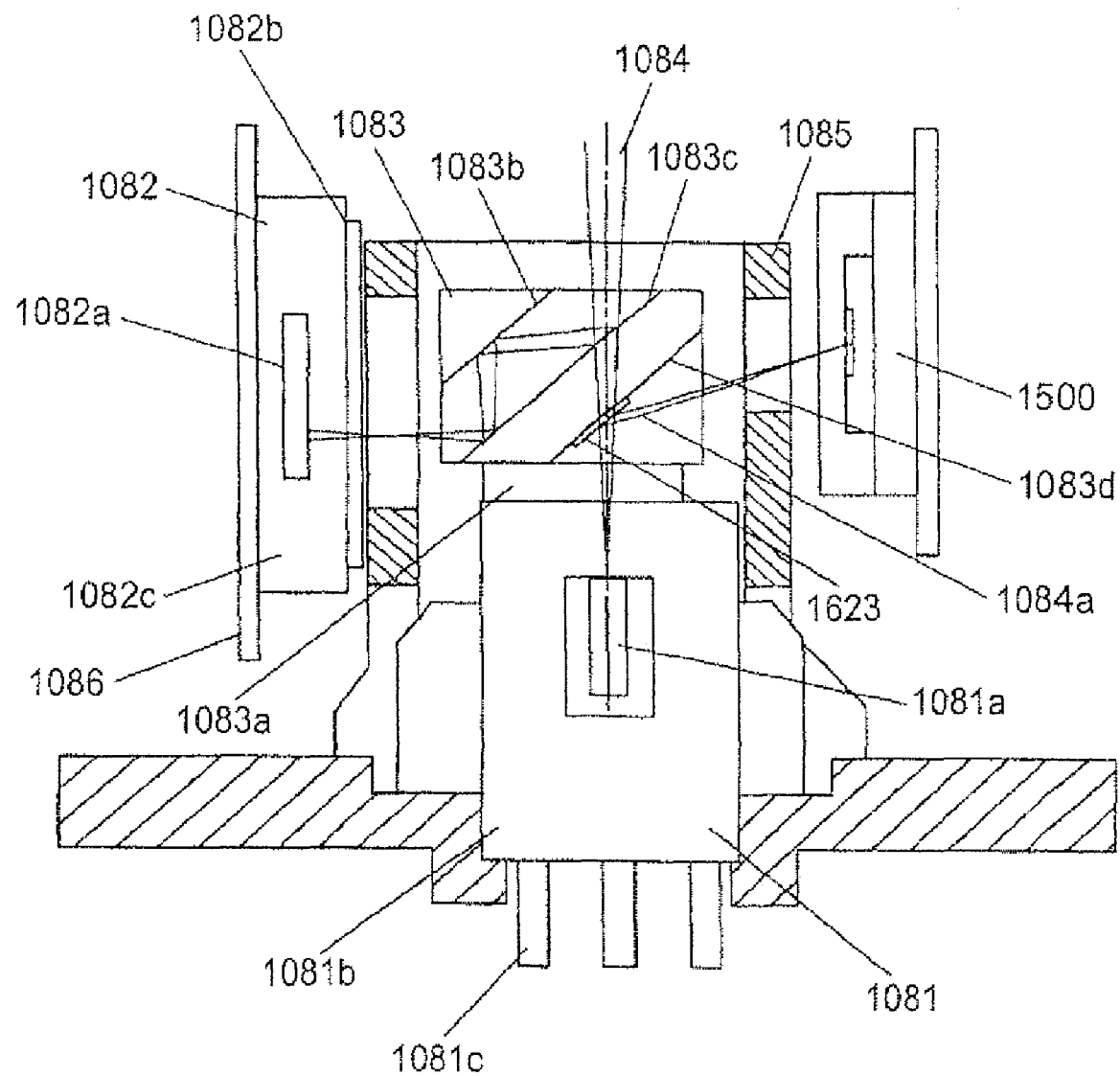
FIG. 73 is a partially enlarged view showing the optical pickup device according to the embodiment of the present invention.

Further, as shown in FIG. 73, the rim filter 1623 may be disposed on the inclined face 1083*d* so as to be contained in the prism 1083. The rim filter 1623 is provided with a reflective film, a reflection type diffraction grating, or a reflection type hologram so as to reflect at least a part of incident light. Therefore, when light from the laser diode 1081*a* is made incident on the inclined face 1083*d*, at least a part of the light at the center part is reflected by the rim filter 1623, is then changed into monitor light 1084*a*, and is allowed to be made incident on the front light monitor 1500. Thereafter, light having low brightness at the center part passes through a polarization beam splitter film, and is changed into a laser beam 1084.

Figure 56:
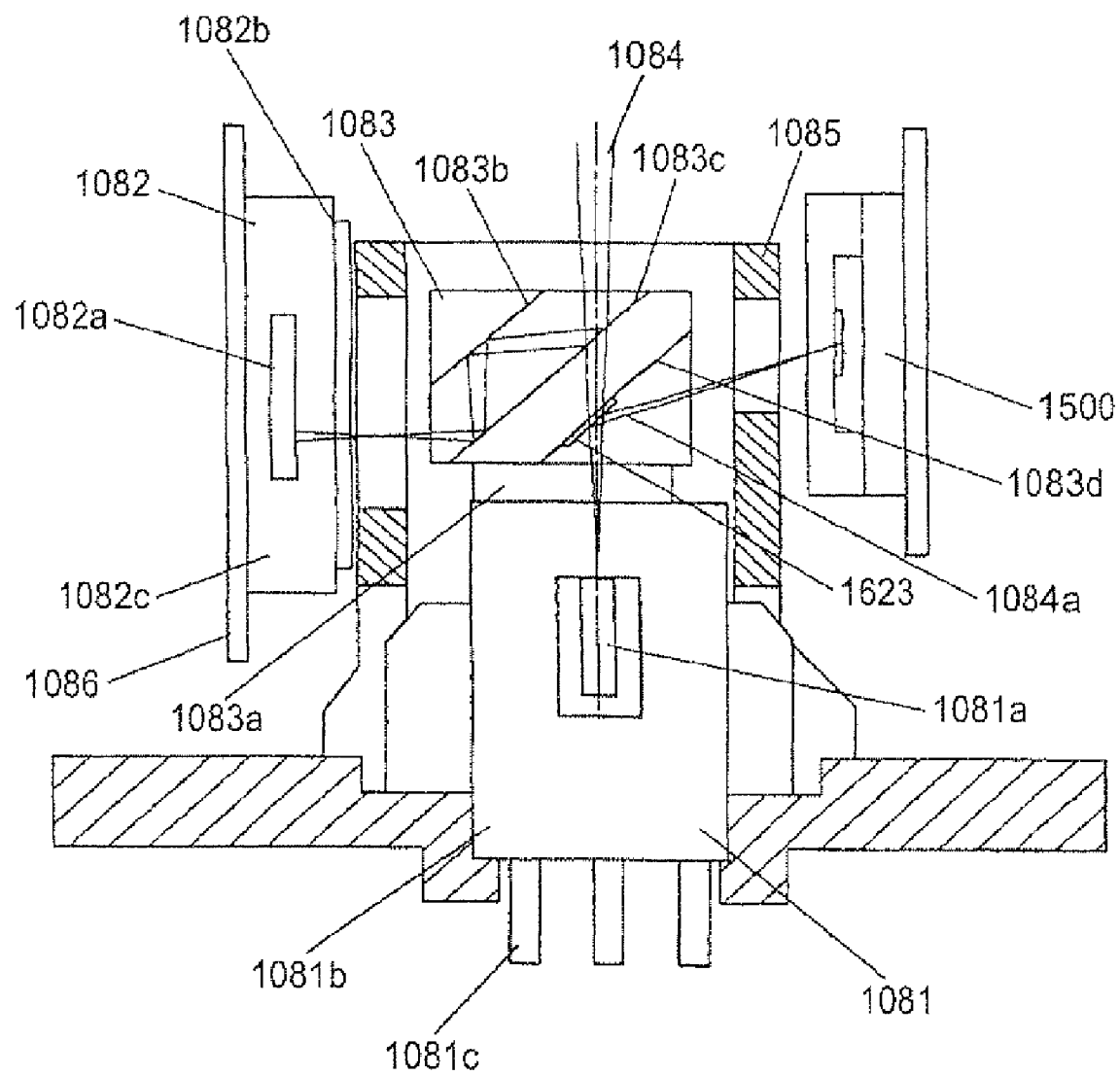
FIG. 56 is a partially enlarged view showing the optical pickup device according to the embodiment of the present invention.

Although the reflection type or transmission type diffraction grating or the hologram is provided at the center part of the rim filter 623 so as to use monitor light in the embodiment shown in FIG. 56, FIG. 72, and FIG. 73, the reflection type or transmission type diffraction grating or the hologram may be provided annularly on the outer peripheral part of the rim filter 1623. Alternatively, a plurality of diffraction gratings or holograms may be provided apart from each other according to specifications of the optical pickup so as to be various in shape or in number.

An adhesive protruding outward from the inclined faces 1083*b* to 1083*d* that are joint surfaces or a recess generated on the inclined faces 1083*b* to 1083*d* can be moderated by attaching the prism 1083 onto the optical member 83*a* according to a bonding method or the like. In other words, when light emitted from the laser diode 1081*a* strikes a concave part and a convex part formed on the outer surfaces of the inclined faces 1083*b* to 1083*d* as mentioned above by optical design or the like, an influence is exerted on recording/reproducing characteristics. Therefore, since the rugged part can be moderated by providing the optical member 1083*a* on the side of the laser diode 1081*a* of the prism 1083 even if the concave part and the convex part are formed thereon, a deterioration in recording characteristics and the like can be prevented.

The light-receiving element part 1082 is structured so as to cover the light-receiving element 1082*a* and cover its surface with a transparent glass board 1082*b*. Moreover, a terminal (not shown) used to be electrically connected to the light-receiving element 1082*a* is guided from a case 1082*c* to the surface of the case 1082*c*. Besides, it is apparent that the light-receiving element 1082*a* can be disposed in a bare state without providing the light-receiving element part 1082 covered with a transparent member not deteriorated by light having a wavelength of 405 nm (blue light to violet light) or without providing a glass cover.

1085 denotes a connecting member. The connecting member 1085 determines the position of the laser part 1081, the position of the light-receiving element part 1082, and the position of the front light monitor 1500, and then each member is fixed with solder or UV adhesive. A flexible board 1086 is joined to a terminal (not shown) of the light-receiving element part 1082. The flexible board 1086 is connected to another flexible board with solder or the like.

Figure 57:
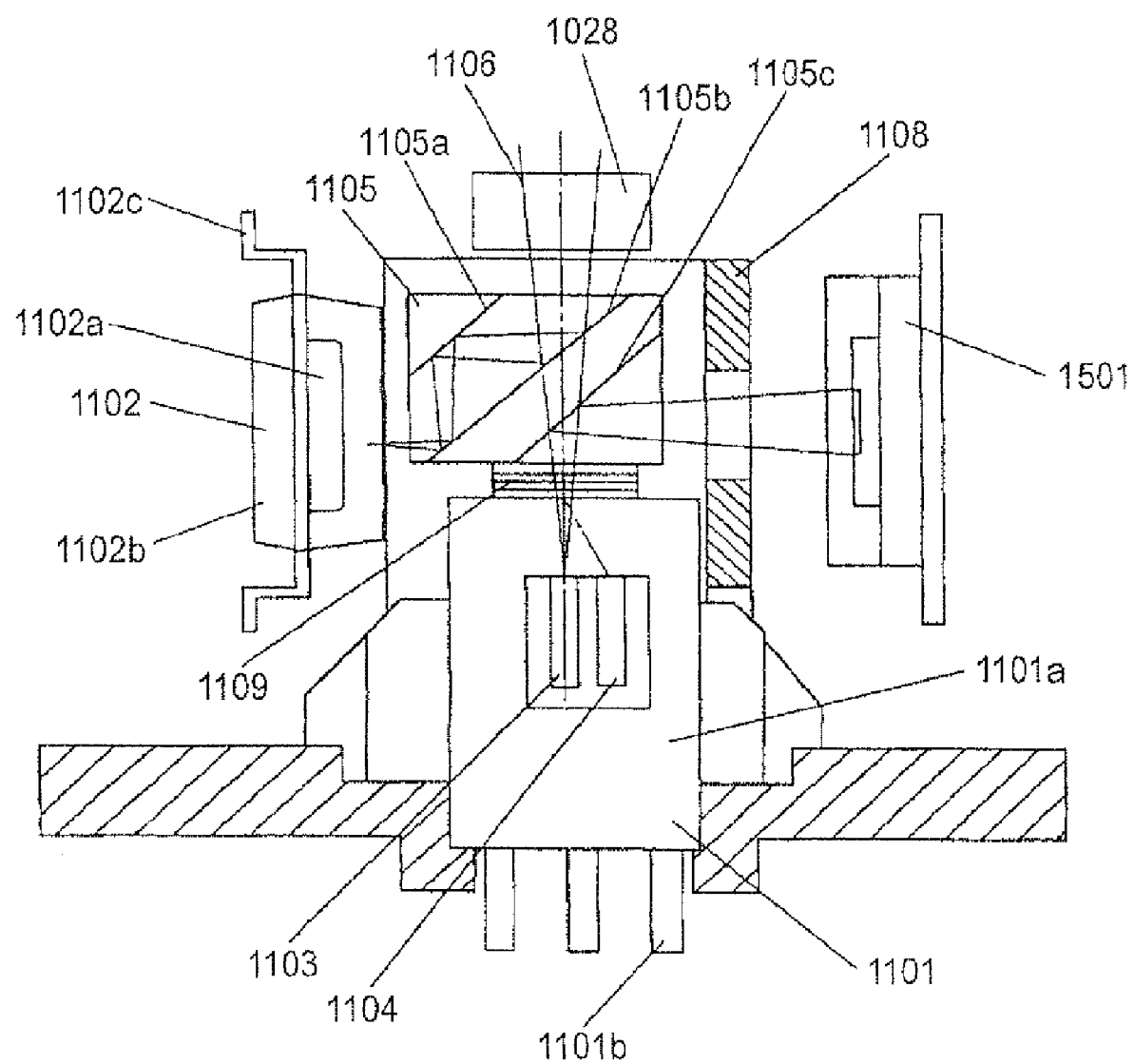
FIG. 57 is a partially enlarged view showing the optical pickup device according to the embodiment of the present invention.

1010 denotes an integrated element including a red, infrared laser part 1101, a light-receiving element part 1102, and a front light monitor 1501. A detailed description of this will be given with reference to FIG. 57. The laser part 1101 has a laser diode 1104 that emits a laser beam having a wavelength of approximately 660 nm and a laser diode 1104 that emits a laser beam having a wavelength of approximately 780 nm. These laser diodes 1103 and 1104 are disposed in a space formed by the base 1101*a*.

Although the laser diodes 1103 and 1104 are disposed as mutually different illuminant blocks in the space in this embodiment, a structure may be formed such that a plurality of luminescent layers are provided in one illuminant block, and one illuminant block is disposed in the space. Additionally, although the laser diodes respectively having the two different wavelengths are mounted in this embodiment, laser diodes respectively having three or more different wavelengths may be mounted.

A plurality of terminals 1101*b* are erected on the base 1101*a*. The terminals 1101*b* are a ground terminal, a terminal that supplies an electric current to the laser diodes 1103 and 1104, an output terminal of monitor light, etc. 1105 denotes a prism that transmits a laser beam 1106 and guides return light to the light-receiving element part 1102. The prism 1105 has a polymer membrane provided on the inclined face 1105*c*, so that an output level of the laser beam 1106 can be monitored by reflecting a part of the laser beam 1106 to the front light monitor 1501. A diffraction grating (not shown) that divides the laser beam 1106 having a wavelength of 780 nm is additionally provided at a position where light is guided toward the light-receiving element part 1102, so that focus detection, tracking detection, and detection of a signal recorded on the optical disk 1001 and a control signal can be performed. The prism 1105 is provided with inclined faces 1105*a* to 1105*c* that are substantially parallel to each other and are inclined. Optical elements, such as a beam splitter membrane and a hologram, are disposed on the inclined faces 1105*a* to 1105*e*.

In more detail, the inclined face 1105*a* has a diffraction grating (not shown) formed most suitably for a wavelength of 780 nm, the inclined face 1105*b* has a membrane that transmits P-wave light and reflects S-wave light by means of a polarization beam splitter with respect to a wavelength of 780 nm and that transmits light with respect to a wavelength of 660 nm, and the inclined face 1105*e* has a membrane that reflects and transmits a part of P-wave light by the beam splitter with respect to a wavelength of 780 nm and that reflects and transmits a part of P-wave light by the polarization beam splitter and totally reflects S-wave light with respect to a wavelength of 660 nm.

The inclined faces 1105*a* to 1105*c* correspond to joint surfaces where a transparent glass block, a resin block, etc., are joined together. Although the three inclined faces are provided in this embodiment, one or more inclined faces may be provided.

A diffraction grating (not shown) to form three beams is disposed on the side of the laser part 1101 of the prism 1105 when necessary. For example, a three-beam diffraction grating using polarization is disposed so that a laser wavelength is not affected by another wavelength.

1108 denotes a connecting member by which the position of the laser part 1101, the position of the light-receiving element part 1102, and the position of the front light monitor 1501 are determined. 1109 denotes a diffraction grating that has a beam combiner function. The diffraction grating does not act on a wavelength of 660 nm and acts on a wavelength of 780 nm, so that a dummy, virtual light emitting point of the wavelength 780 nm coincides with a virtual light emitting point of the wavelength 660 nm. The diffraction grating 1109 is optically allowed even if it does not have the beam combiner function.

The diffraction grating 1109 is formed by superposing a plurality of planar bodies on each other. At least one of the planar bodies is provided with a grating. The diffraction grating 1109 is joined directly to the base 1101*a* according to a bonding method or the like.

Light emitted from either the laser diode 1103 or the laser diode 1104 passes through the diffraction grating 1109 and the prism 1105, and is guided to the optical disk 1001. Light reflected by the optical disk 1001 passes through the prism 1105, and is guided to the light-receiving element part 1102. At this time, in the prism 1105, the reflected light from the optical disk 1001 is reflected between the inclined face 1105*a* and the inclined face 1105*b*, and is made incident on the light-receiving element part 1102.

The light-receiving element part 1102 is covered with a case 1102*b* containing a transparent member and the light-receiving element 1102*a*. A terminal 1102*c* electrically connected to the light-receiving element 1102*a* is guided from the case 1102*b* outward.

A flexible board (not shown) is connected to the terminal 1102*c* of the light-receiving element part 1102, and is joined to another flexible boards with solder or the like.

Likewise, the rim filter 1623 may be used in the integrated element 1010. Although monitor light is obtained, for example, by providing a polymer membrane on the inclined face 1105*c*, the rim filter 1623 may be used instead of the polymer membrane, or the rim filter 1623 may be disposed at the position shown in FIG. 56 or FIG. 72. In other words, monitor light may be guided by using the rim filter 1623 in at least either of the integrated device 1008 and 1010. Preferably, the rim filter 1623 is provided especially in an integrated element that manages a light source having a shorter wavelength.

1011 denotes a collimator lens for a wavelength of 405 nm. The collimator lens 1011 is used to change a divergent laser beam 1084 output from the laser part 1081 into substantially parallel light. The collimator lens 1011 also has a function to correct chromatic aberrations caused by the influence of wavelength variations, temperature changes, etc. 1012 denotes a beam shaping prism by which the intensity distribution of the laser beam 1084 is substantially circularly corrected. 1013 denotes a critical angle prism that is used to separate the laser beam 1084. 1014 denotes an aberration correcting mirror that is used to correct spherical aberrations caused by, for example, a thickness error of the optical disk 1001.

Herein, the aberration correcting mirror will be described with reference to FIG. 58 to FIG. 61.

Figure 58:
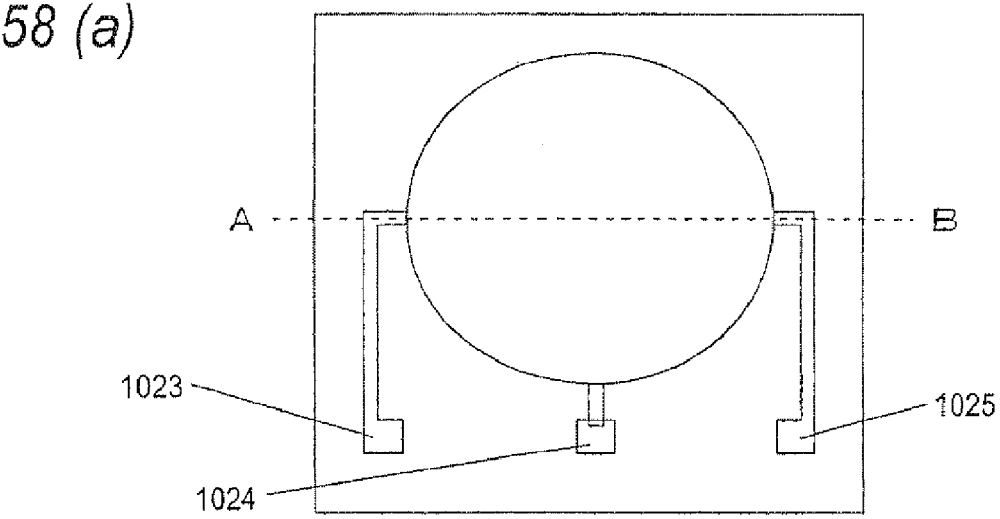
FIG. 58 is a view showing an aberration correcting mirror used in the optical pickup device according to the embodiment of the present invention.
Figure 58:
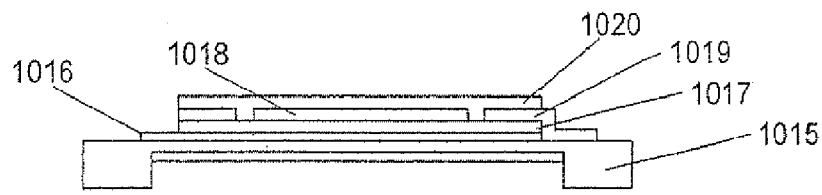
Figure 58:
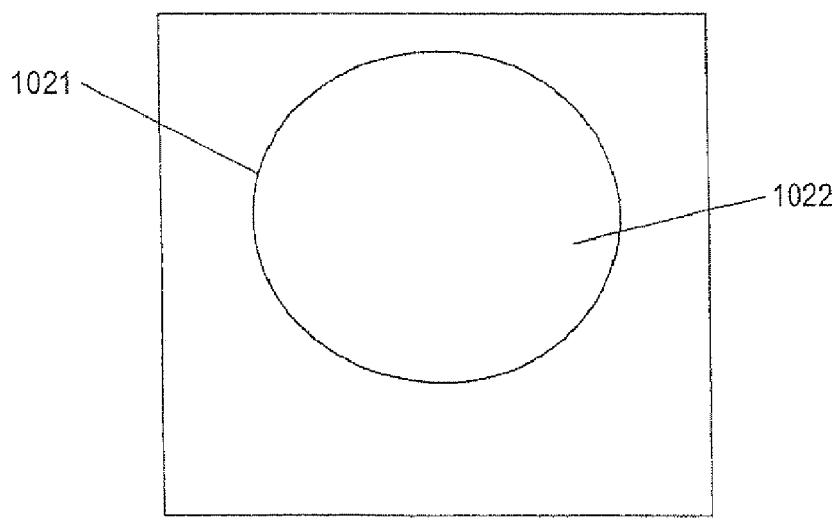

FIG. 58(*a*) to FIG. 58(*c*) are a schematic plan view (uppermost surface) of the aberration correcting mirror used in the optical pickup according to this embodiment, a sectional view along broken line A-B, and a sectional view in the plan view (lowermost surface), respectively. A lower electrode 1016, a piezoelectric substance 1017, upper electrodes 1018 and 1019, and an elastic body 1020 are formed on the board 1015. The board 1015 has a circular cavity part 1021 on the reverse side (lower side of the drawing), where a reflective film 1022 is formed. The lower electrode 1016 is subjected to patterning and is drawn around by an electrode pad 1023. Likewise, the upper electrodes 1018 and 1019 are subjected to patterning and are drawn around by electrode pads 1024 and 1025, respectively.

Figure 59:
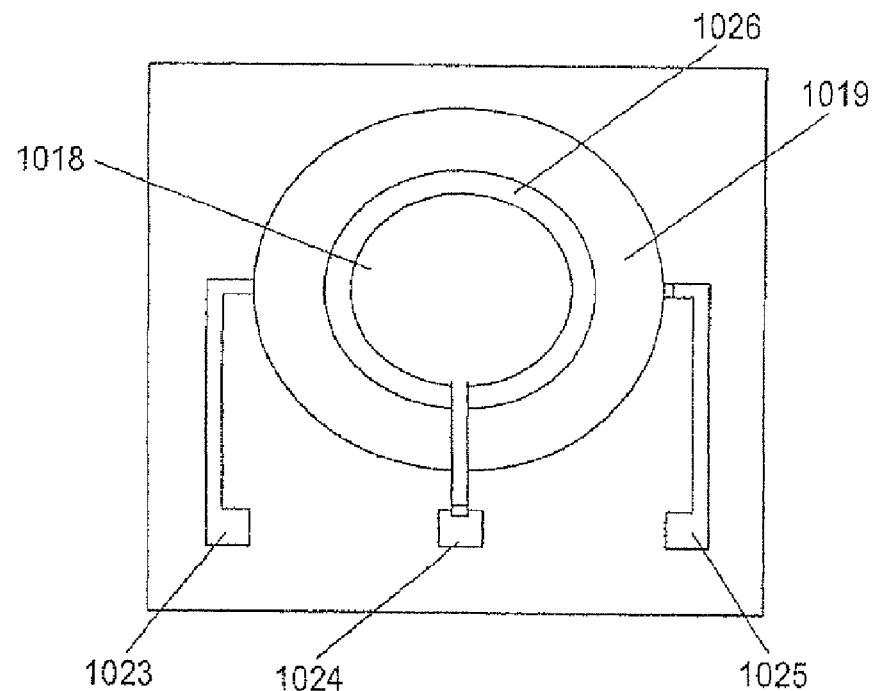
FIG. 59 is a view showing the aberration correcting mirror used in the optical pickup device according to the embodiment of the present invention.

The structure of the part electrodes 1018 and 1019 is shown in FIG. 59. The upper electrodes 1018 and 1019 are insulated from each other by an insulating part 1026. In this example, the upper electrode 1018 is circular and is an annular electrode whose center substantially coincides with that of the upper electrode 1019. A wire is drawn around from the upper electrode 1018 and connects to the electrode pad 1024. Likewise, a wire is drawn around from the upper electrode 1019 to the electrode pad 1025. Although a two-division is applied as in the upper electrodes 1018 and 1019 in this embodiment, a three-division may be applied. Moreover, although the outline of the upper electrodes 1018 and 1019 is formed to be circular in this embodiment, it is possible to employ a polygonal shape, such as a square or a shape farmed by four or more line segments, or a triangle.

Figure 60:
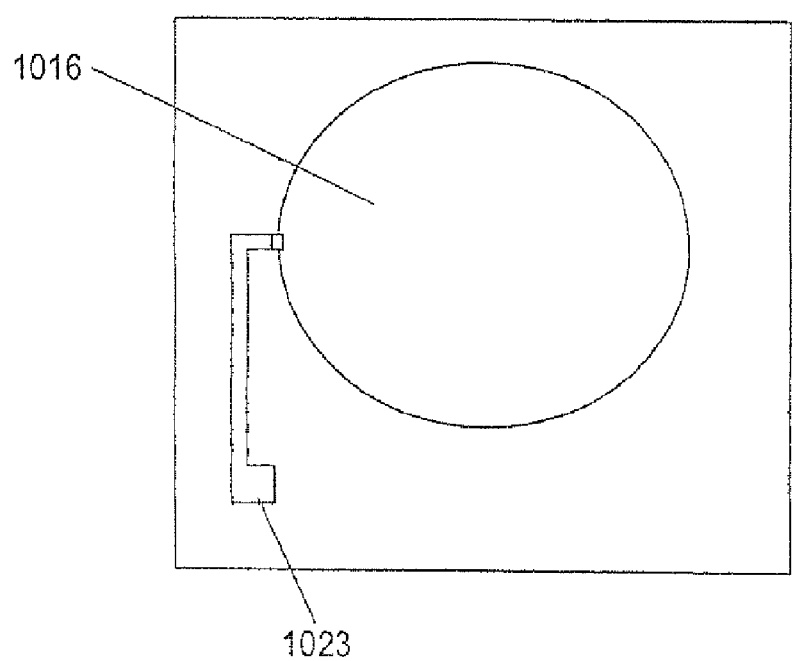
FIG. 60 is a view showing the aberration correcting mirror used in the optical pickup device according to the embodiment of the present invention.

The structure of the lower electrode is shown in FIG. 60. The lower electrode 1016 is placed so that the piezoelectric substance 1017 is sandwiched between the lower electrode 1016 and the upper electrodes 1018 and 1019. The lower electrode 1016 is wired to the electrode pad 1023.

Figure 61:
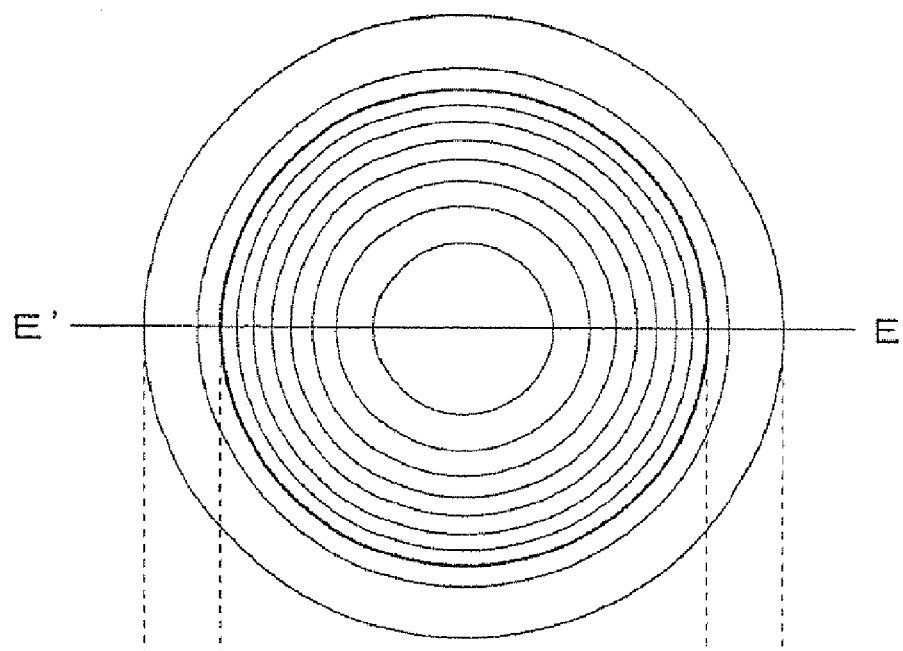
FIG. 61 is a view showing the aberration correcting mirror used in the optical pickup device according to the embodiment of the present invention.
Figure 61:
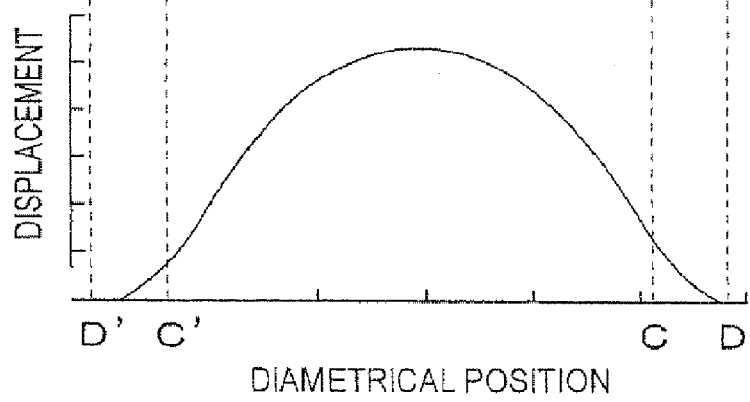

Contour lines (a) of the displacement of the reflective film 1022 and a displacement view (b) are shown in FIG. 61 in a case in which the lower electrode 1016 is grounded, and positive voltage is applied to the upper electrode 1018 whereas negative voltage is applied to the upper electrode 1019 in this structure. In the figures, C, C' and D, D' correspond to the position of the insulating part 1026 and the position of the outer peripheral part of the cavity part 1021, respectively. The position of D, D' is the outer peripheral part of the cavity part 1021, and displacement is zero since this outer peripheral part is constrained. The displacement is convex downwards in annular parts corresponding to C-D and C'-D', and is convex upwards in the part corresponding to the diameter C-C' with the boundary of C and C' as a border. Although an aspherical shape is generally needed to correct spherical aberrations, a curved surface shape in C-C' is exactly aspherical. Therefore, a curved surface part in C-C, i.e., the part of the reflective film 1022 corresponding to the shape of the upper electrode 1018 or the inside thereof is used in the present invention. Accordingly, the aberration correcting mirror is a functional component that can correct aberrations with very high accuracy. Although the aberration correcting mirror that uses the piezoelectric substance 1017 formed like a thin membrane is provided in this embodiment, the aberration correcting mirror may use a bulky piezoelectric substance, or the aberration correcting mirror may be driven by use of another displaceable member. Additionally, spherical aberrations can be corrected by combining a plurality of lenses together and by moving at least one of the plurality of lenses without using the piezoelectric substance 1017.

1027 denotes a beam splitter by which laser beams 1084 and 1106 emitted from the integrated device 1008 and 1110 are split and combined. A phase is also uniformed with respect to the laser beam 1084. A λ/4 wavelength plate 1502 with respect to a wavelength of 405 nm is affixed by a bonding means or the like on the side where light emitted from the integrated device 1008 of the beam splitter 1027 is made incident.

Although the rim filter 1623 and the front light monitor 1500 are incorporated into the integrated device 1008 and 1110 in this embodiment, these may be disposed outside the integrated device 1008 and 1110. If so, the rim filter 1623 can be disposed between the integrated devices 1008 and 1010 and the beam splitter 1027, and the front light monitor 1500 can be disposed in the vicinity thereof.

1029 denotes a convex lens having positive power, and 1030 denotes a convex lens having positive power. The beam splitter 1027 is disposed between the convex lenses 1029 and 1030. The laser beam 1084 is enlarged to have a desired beam diameter by a combination of the convex lenses 1029 and 1030. The laser beam 1084 is once focused between the convex lenses 1029 and 1030. A variation in FFP distribution in an objective lens part caused by divergent light and convergent light generated by the aberration correcting mirror 1014 for correcting the spherical aberration can be controlled by being once focused between the convex lenses 1029 and 1030 in this way and by making the focal length of the convex lens 1029 substantially equal to the distance between the convex lens 1029 and the aberration correcting mirror 1014. 1028 denotes a relay lens for wavelengths of 660 nm and 780 nm. The relay lens 1028 is used to change a divergent laser beam 1106 output from a laser part 1101 into substantially parallel light by a combination with the convex lens 1030. The relay lens 1028 can additionally have a function to correct chromatic aberrations generated by the influences of wavelength variations and temperature changes.

1031 denotes an erecting prism whose first surface 1311 is formed of a multi-layer film having a function to reflect the laser beam 1106 having wavelengths of 660 nm and 780 nm and to transmit and refract the laser beam 1106 having a wavelength of 405 nm. A second surface 1312 thereof can reflect the laser beam 1106 having a wavelength of 405 nm, and the phase is also uniformed. The rigidity of an actuator described later can be increased by forming the erecting prism 1031 out of one prism in this way. 1032 denotes objective lens used in an optical disk (DVD) 1001 for a wavelength of 660 nm. The objective lens 1032 has a function to be able to make the focus upon a desired recording position with parallel light also in an optical disk (CD) 1001 for a wavelength of 780 nm. 1033 denotes an objective lens used in an optical disk 1001 for a wavelength of 405 nm. In the embodiment, the objective lens 1032 is disposed at the center position of the spindle motor, and the objective lens 1033 is disposed on the side opposite to the convex lens 1030 with respect to the objective lens 1032, i.e., is disposed in the tangential direction with respect to the optical disk 1001. The objective lens 1033 is formed larger in thickness than the objective lens 1032. In this embodiment, a structure is formed so that light emitted from the light source first raises light having a relatively long wavelength on the first surface 1311, and light having a relatively short wavelength passes through the first surface 1311 and is then risen on the second surface 1312. In other words, in the structure shown in FIG. 54*d*, the objective lens 1032 for a long wavelength is disposed on the side of the laser parts 1081 and 1101, and the objective lens 1033 is disposed at a more distant position than the objective lens 1032, whereby a path where light is drawn around until the light is made incident on the erecting prism 1031 can be made relatively long, and optical design can be simplified.

However, if the first surface 1311 of the erecting prism 1031 transmits the laser beam 1106 having wavelengths of 660 nm and 780 nm and reflects the laser beam 1084 having a wavelength of 405 nm and if the second surface 1312 thereof reflects the laser beam 1106 having wavelengths of 660 nm and 780 nm, the objective lens 1033 can be disposed on the side of the laser with respect to the objective lens 1032 (not shown).

1034 denotes an aperture holo-wave plate. The aperture holo-wave plate 1034 is made up of an aperture filter used to realize a numerical aperture needed to correspond to the optical disks of CDs and DVDs, a polarization hologram that is sensitive to the light of DVDs, and a λ/4 plate, and is realized by a means such as a dielectric multi-layer film or a hologram aperture, in which focus detection, tracking detection, and detection of a signal recorded on the optical disk 1001 can be performed with respect to the light of DVDs. Further, it corresponds to) λ/4 plate wavelengths of 660 nm and 780 nm, and approximately 90-degree polarization is formed in the polarization direction in a outward path and a return path.

Figure 62:
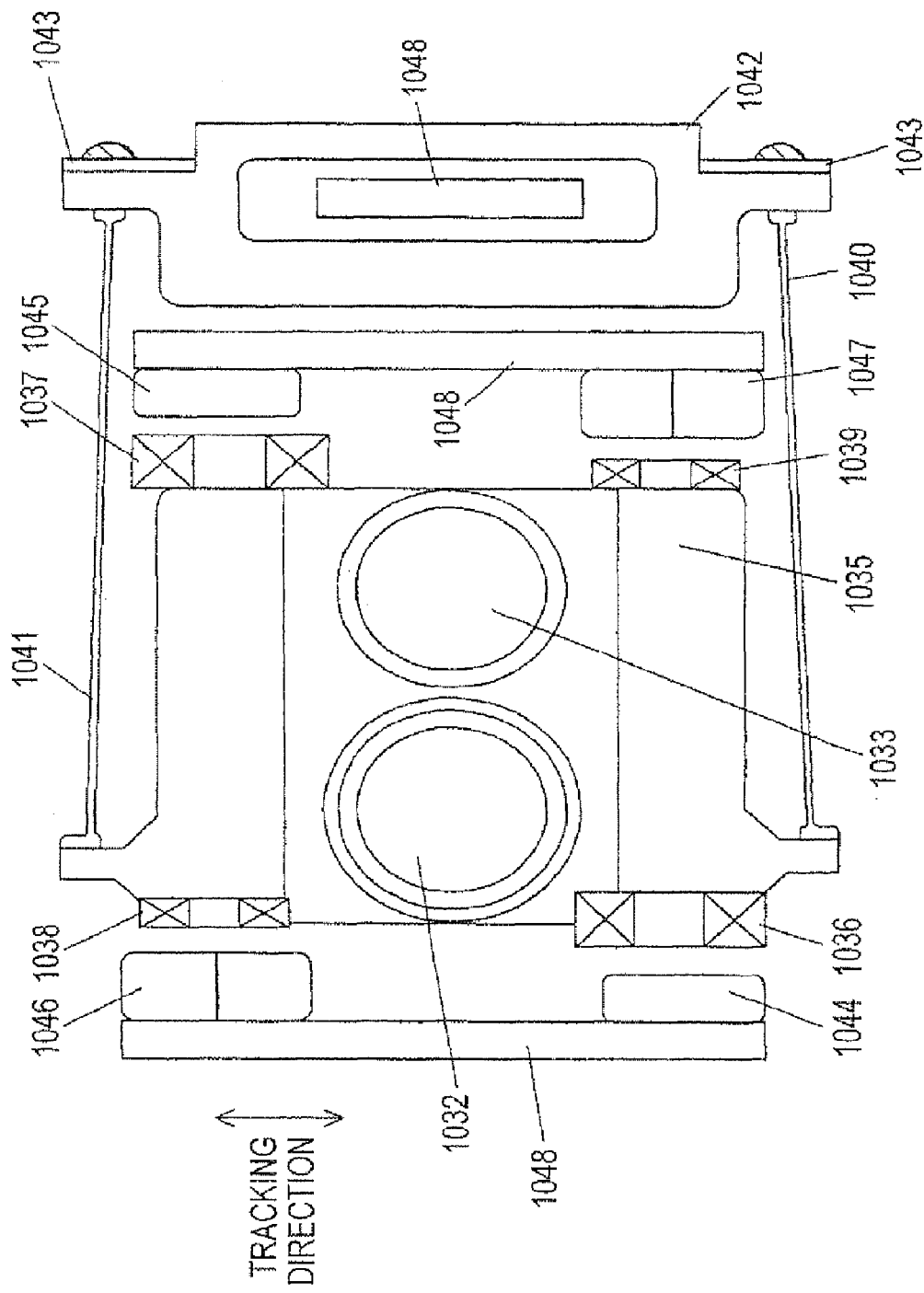
FIG. 62 is a front view showing an actuator of the optical pickup device according to the embodiment of the present invention.
Figure 63:
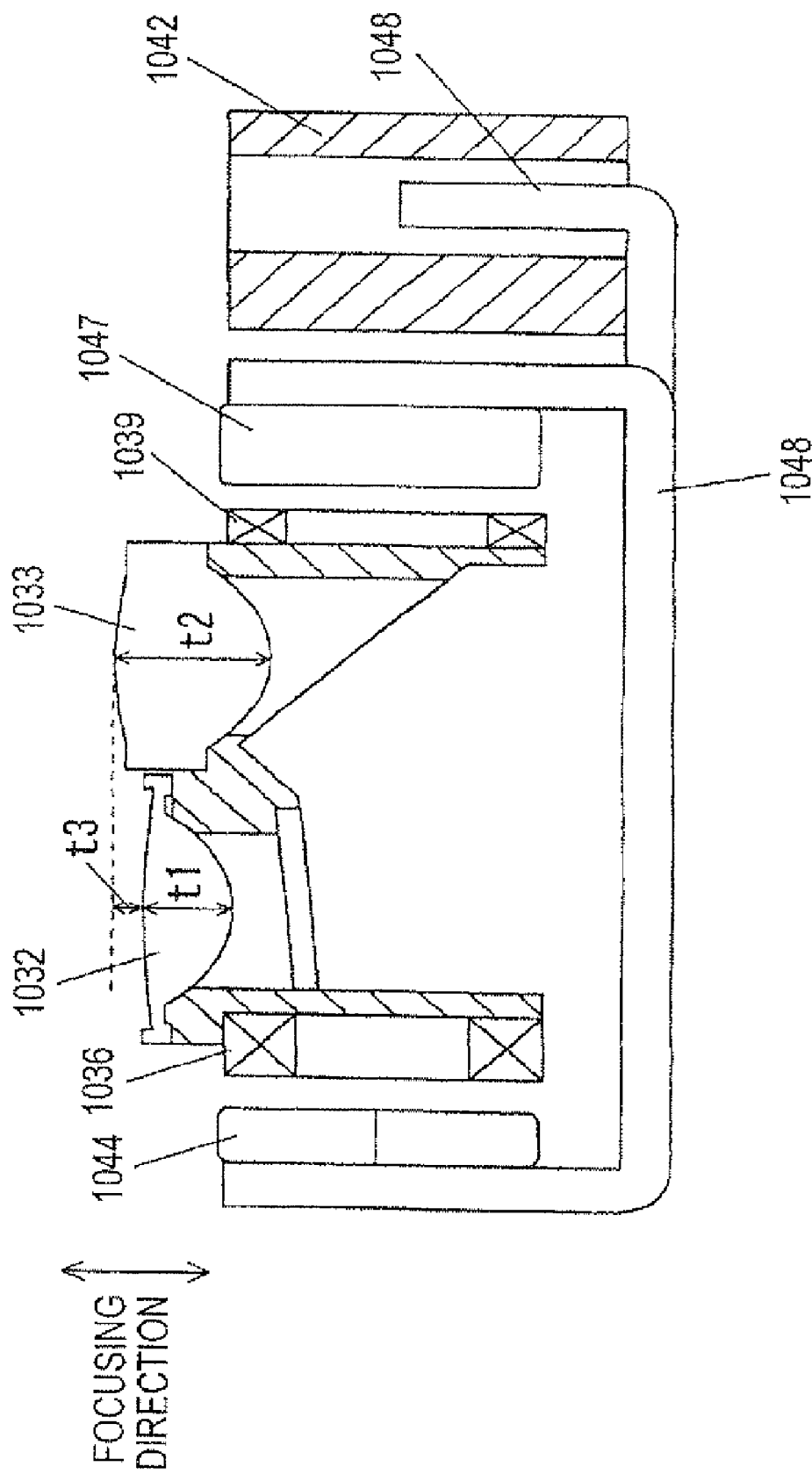
FIG. 63 is a sectional view showing the actuator of the optical pickup device according to the embodiment of the present invention.

Next, with reference to FIG. 62 and FIG. 63, a description will be given of an actuator that holds the objective lenses 1032 and 1033, FIG. 62 is a front view showing the actuator of the optical pickup device according to an embodiment of the present invention, and FIG. 63 is a sectional view thereof.

In FIG. 62 and FIG. 63, 1035 denotes an objective-lens holding tube that can fix the objective lenses 1032 and 1033 and the aperture holo-wave plate 1034 by means of, for example, an adhesive.

1036 and 1037 each denote a focus coil that is wound substantially like a ring. 1038 and 1039 each denote a tracking coil that is wound substantially like a ring in the same way as the focus coils 1036 and 1037. These focus coils 1036 and 1037 and the tracking coils 1038 and 1039 are likewise fixed to the objective-lens holding tube 1035 with an adhesive or the like. 1040 and 1041 each denotes a suspension wire. The suspension wires 1040 and 1041 connect the objective-lens holding tube 1035 to a suspension holder 1042. At least the objective-lens holding tube 1035 is displaceable within a predetermined range with respect to the suspension holder 1042. Both ends of the suspension wires 1040 and 1041 are fixed to the objective-lens holding tube 1035 and to the suspension holder 1042 by means of insert molding. The focus coils 1036 and 1037 are likewise fixed to the suspension wire 1040 with solder or the like. Likewise, the tracking coils 1038 and 1039 are electrically connected to the suspension wire 1041 with solder or the like. The suspension wires 1040 and 1041 are each made up of round wires or leaf springs, preferably six or more round wires or leaf springs, so that electric power can be supplied to the focus coils 1036 and 1037 and to the tracking coils 1038 and 1039 joined in series.

A flexible board 1043 is fixed to the suspension holder 1042 with an adhesive or the like in order to fix it with solder or the like. 1044 and 1045 each denote focus magnet. The focus magnets 1044 and 1045 are formed to be smaller in magnet width direction (tracking direction) than the focus coils 1036 and 1037. The focus magnet 1044 closer to the outer periphery of the optical disk 1001 than to the coil center position of the focus coils 1036 and 1037 is facingly disposed near the outer periphery, and the focus magnet 1045 on the side of the inner periphery of the optical disk 1001 is facingly disposed near the inner periphery. 1046 and 1047 each denote a tracking magnet. The tracking magnets 1046 and 1047 are disposed to face the tracking coils 1038 and 1039, respectively. The focus magnets 1044 and 1045 have their magnetic poles divided in the focus direction, and the tracking magnets 1046 and 1047 have their magnetic poles divided in the tracking direction. One pole thereof faces a substantially ring-shaped piece of the focus coils 1036 and 1037 and the tracking coils 1038 and 1039, and the other pole faces another substantially ring-shaped part of the focus coils 1036 and 1037 and the tracking coils 1038 and 1039. At this time, the focus magnets 1044 and 1045 and a magnetic yoke 1048 constitute a focus magnetic circuit, and the tracking magnets 1046 and 1047 and the magnetic yoke 1048 constitute a tracking magnetic circuit. It is possible to form a structure in which the focus coils 1036 and 1037 are disposed in the focus magnetic circuit one by one and in which the tracking coils 1038 and 1039 are disposed in the tracking magnetic circuit one by one, and it becomes possible to control the coils independently of each other by applying an electric current to each coil. Although a description is given of the fact that the focus coils 1036 and 1037 are controlled independently of each other in this embodiment, all of the focus coils 1036 and 1037 and the tracking coils 1038 and 1039 may be controlled independently of each other. If so, the number of the suspension wires 1040 and 1041 to be required are at least eight as a whole, but, when either of a focus pair, e.g., only the coils 1036 and 1037 are controlled independently, the number of the suspension wires 1040 and 1041 is only six or more.

Moreover, the focus magnets 1044 and 1045 and the tracking magnets 1046 and 1047 can restrict a neutral zone generated between the poles by separating the magnets each of which has a single magnetic pole and by being stuck without allowing the magnets to be magnetized in the form of multipole magnetization when divided, and a deterioration in magnetic circuit characteristics caused by the focus shift and the tracking shift of each coil can be restricted to the minimum. In order to control a high-density optical disk whose tilt margin is narrow, it is indispensable to stick the single-pole magnets to each other in this way so as to improve accuracy.

In order to reduce the size and reduce the resonance in the buckling direction of the suspension wires 1040 and 1041, tension is applied to the suspension wires 1040 and 1041 in the V-shape. The magnetic yoke 1048 serves as the magnetic yoke of the focus magnets 1044 and 1045 and the tracking magnets 1046 and 1047 from the viewpoint of a magnetic feature, and serves to hold and fix the suspension holder 1042 from the viewpoint of a structural feature, and is also used to fix the suspension holder 1042 with an adhesive or the like. In the suspension wires 1040 and 1041, a space on the side of the suspension holder 1042 is filled with a damper gel for damping. A material that is gelled by, for example, UV is used as the damper gel. A part composed of the objective-lens holding tube 1035, the focus coil 1036, the focus coil 1037, the tracking coil 1038, the tracking coil 1039, the objective lenses 1032 and 1033, and the aperture holo-wave plate 1034 will be hereinafter referred to as "optical pickup actuator movable part."

1049 denotes a laser driver. The laser driver 1049 operates for the light emission of a semiconductor laser having wavelengths of 780 nm and 660 nm that is built in the laser part 1101, and has a function to apply superposition so as to reduce noise with respect to each wavelength. The laser driver 1049 is in contact with a carriage 1004 or with cover metal sheets (not shown) disposed on and under the carriage 1004, so that heat can be effectively dissipated. 1050 denotes a laser driver. The laser driver 1050 likewise operates for the light emission of a semiconductor laser having a wavelength of 405 nm that is built in the laser part 1081, and has a function to apply superposition so as to reduce noise with respect to each wavelength. Like the laser driver 1049, the laser driver 1050 is in contact with the carriage 1004 or with the cover metal sheets (not shown) disposed on and under the carriage 1004, so that heat can be effectively dissipated.

Next, a description will be given of an optical structure of the optical pickup in this embodiment.

First, the wavelength 405 nm will be described.

A divergent laser beam 1084 having a wavelength of 405 nm that has been emitted from the laser part 1081 is changed into substantially parallel light by means of the collimator lens 1011, then passes through the beam shaping prism 1012, and reaches the aberration correcting mirror 1014 having a reflecting mirror function via the critical angle prism 1013. The laser beam 1084 reflected by the aberration correcting mirror 1014 again is made incident on the critical angle prism 1013. At this time, incident light and reflected light that enter the aberration correcting mirror 1014 have a slant of several degrees near the critical angle of the critical angle prism 1013. An air gap is provided between the critical angle prisms 1013$a$ and 1013$b$. This arrangement makes it possible to efficiently divide the laser beam 1084 having a wavelength of 405 nm by use of the critical angle. Additionally, the optical transmission efficiency can be improved by applying a dielectric multi-layer film or the like onto both sides of the critical angle prisms 1013$a$ and 1013$b$ that face the air gap. The laser beam 1084 emitted from the critical angle prism 1013 is then condensed by the convex lens 1029 having positive power, and again passes through the $\lambda/4$ wavelength plate 1502 as divergent light, and becomes circularly polarized light. Thereafter, the beam passes through the beam splitter 1027, then is made incident on the erecting prism 1031 via the convex lens 1030, then refractively passes through the first surface 1311, is then reflected by the second surface 1312, and refractively passes through the third surface 1313. The reflected laser beam 1084 is condensed by the objective lens 1033, and forms a light spot on the optical disk 1001. The laser beam 1084 returning from the optical disk 1001 proceeds contrary to the outward path, then passes through the $\lambda/4$ plate, is thereby polarized in the polarization direction of approximately 90 degrees with the outward path, is finally split by the beam splitter in the prism 1083, is then guided into the light-receiving element 1082$a$ disposed in the light-receiving element part 1082 by a diffraction grating formed at the light-receiving element part 1082, and generates at least a spherical-aberration error signal. Since the wavelength is shorter than a conventional one in the wavelength 405 nm, spherical aberrations caused when, for example, the thickness of the protective layer of the optical disk 1001 changes become large, and recording and reproduction quality is remarkably impaired. Therefore, the generated spherical aberrations are controlled by driving the aberration correcting mirror 1014 in accordance with the aforementioned spherical aberration detection signal so as to deform the reflective surface slightly spherically. Although the spherical aberration is corrected by using the aberration correcting mirror 1014 this time, the spherical aberration can be also corrected by moving at least either of the convex lenses 1029 and 1030 in the direction of the optical axis.

Next, the wavelength 660 nm will be described. A laser beam 1106 having a wavelength of 660 nm emitted from the laser diode 1103 of the laser part 1101 passes through the diffraction grating 1109 having a beam combiner function, and is changed into substantially parallel light by the relay lens 1028 and the convex lens 1030 via the prism 1105 that divides a beam. The beam splitter 1027 is disposed between the relay lens 1028 and the convex lens 1030 so as to be substantially coaxial with the aforementioned laser beam 1084 having a wavelength of 405 nm. The substantially parallel laser beam 1106 emitted from the convex lens 1030 is reflected by the first surface 1311 of the erecting prism 1031. The reflected laser beam 1106 passes through the aperture filter of the aperture holo-wave plate 1034, through the polarization hologram, and through the $\lambda/4$ plate in this order, then becomes circularly polarized light, is then condensed by the objective lens 1032, and forms a light spot on the optical disk 101. At this time, the polarization hologram of the aperture holo-wave plate 1034 does not act on the P wave of outward-path light but acts on the S wave of return-route light. The laser beam 1106 returning from the optical disk 1001 proceeds contrary to the outward path, then passes through the $\lambda/4$ plate of the aperture holo-wave plate 1034, and thereby is polarized in the polarization direction of approximately 90 degrees with the outward path. The laser beam 1106 diffracted to become light according to need by the polarization hologram is finally split by the polarization beam splitter disposed on the inclined face 1105$c$ of the prism 1105, and is guided to a photodetector disposed in the light-receiving element part 1102.

Next, the wavelength 780 nm will be described. The laser beam 1106 having a wavelength of 780 nm emitted from the laser diode 1104 of the laser part 1101 is diffracted by the diffraction grating 1109 that has a beam combiner function, then passes through the diffraction grating that forms three beams exclusive to 780 nm, and is changed into substantially parallel light by the relay lens 1028 and the convex lens 1030 via the beam splitting prism 1105. The beam splitter 1027 is disposed between the relay lens 1028 and the convex lens 1030 so as to be substantially coaxial with the aforementioned laser beam 1084 having a wavelength of 405 nm. The substantially parallel laser beam 1106 emitted from the convex lens 1030 is reflected by the first surface 1311 of the erecting prism 1031. The reflected laser beam 1106 passes through the aperture filter of the aperture holo-wave plate 1034, through the polarization hologram, and through the $\lambda/4$ plate in this order, then becomes circularly polarized light, is then condensed by the objective lens 1032, and forms a light spot on the optical disk 1001. At this time, the polarization hologram of the aperture holo-wave plate 1034 hardly affects the wavelength 780 nm. The laser beam 1106 returning from the optical disk 1001 proceeds contrary to the outward path, then passes through the $\lambda/4$ plate, is thereby polarized in the polarization direction of approximately 1090 degrees with the outward path, is finally split by the polarization beam splitter disposed on the inclined face 1105$b$ of the prism 1105, and is guided to the photodetector in the light-receiving element part 1102 by the diffraction grating (not shown) formed at the light-receiving element part 1102.

The beam expander function composed of the convex lens 1029 and the convex lens 1030 is achieved by this optical structure, and a reduction in the component size of the aberration correcting mirror 1014 can be realized by disposing the aberration correcting mirror 1014 that corrects spherical aberrations and the collimator lens 1011 at the integrated devices 1008. Accordingly, a gap between the collimator lens 1011 and the integrated device 1008 can be shortened, and a size reduction and a thickness reduction of the optical pickup 1003 can be realized since the convex lens 1030 is used as a part of the collimating lens of the laser diodes 1103 and 1104 in the integrated element 1010.

Next, a description will be given of the operation of the optical pickup actuator movable part in this embodiment. Electric power is supplied to the focus coils 1036 and 1037 and to the tracking coils 1038 and 1039 from an electric power source not shown through the flexible board 1043 attached to the suspension holder 1042 and through the suspension wires 1040 and 1041 connected thereto. The number of the suspension wires 1040 and 1041 provided here is at least six in total. Two thereof are connected to the tracking coils 1038 and 1039 provided in series, and two of the remaining four are connected to the focus coil 1036, and the remaining two are connected to the focus coil 1037. As a result, the focus coils 1036 and 1037 can control current application independently of each other.

When an electric current is applied to both of the focus coils 1036 and 1037 in a positive direction (or negative direction), a focus magnetic circuit movable in a focus direction can be formed, and a current-passing direction and the focus direction in accordance with a quantity can be controlled from the arrangement relationship between the focus coils 1036 and 1037 and the focus magnets 1044 and 1045 and from the polar relationship between bisected magnetic poles. On the other hand, when an electric current is applied to the tracking coils 1038 and 1039 in the positive direction (or negative direction), a tracking magnetic circuit movable in the tracking direction can be formed, and the tracking direction can be controlled from the arrangement relationship between the tracking coils 1038 and 1039 and the tracking magnets 1046 and 1047 and from the polar relationship between bisected magnetic poles.

Moreover, in the embodiment, an electric current can be applied to the focus coil 1036 and to the focus coil 1037 independently of each other as mentioned above. Therefore, when the direction of an electric current to be applied to either of the coils is inverted, a force in a direction approaching the optical disk 1001 is applied to the focus coil 1036, and a force in a direction receding from the optical disk 1001 is applied to the focus coil 1037. As a result, the moment that rotates in a radial direction is generated in the optical pickup actuator movable part by means of an opposing force, and a tilt is taken up to a position where a force is balanced with the twist moment acting on the six suspension wires 1040 and 1041. The tilting direction can be controlled in accordance with the direction and quantity where an electric current is applied to the focus coils 1036 and 1037.

The objective lenses 1032 and 1033 will be hereinafter described.

As shown in FIG. 63, preferably, t2/t1=1.05 to 3.60 where t1 is the maximum thickness of the objective lens 1032, and t2 is the maximum thickness of the objective lens 1033. In more detail, if t2/t1 is smaller than 1.05, the diameter of the objective lens 1033 must be enlarged, thus enlarging the optical pickup 1003 and making a size reduction impossible. On the other hand, if t2/t1 is larger than 3.60, the thickness of the objective lens 1033 will become excessively large and become unsuitable for a thickness reduction.

A size reduction of the device can be achieved by forming the objective lens 1033 corresponding to a light beam having a shorter wavelength so as to be thicker than the objective lens 1032 used for a longer wavelength in this manner, and especially a thickness reduction and a size reduction of the device can be realized by specifying the thickness ratio as mentioned above.

Next, a description will be given of a projection quantity by which the objective lens 1033 projects toward the optical disk 1001 from the objective lens 1032. If the thickness of the optical disk device is equal to 13 mm or less, an interval between the objective lenses 1032 and 1033 and the optical disk 1001 becomes very narrow. Therefore, it was understood that the projection quantity t3 shown in FIG. 63 should be preferably set at 0.05 mm to 0.62 mm when the objective lens 1032 is considered as a basis. The projection quantity is expressed by a difference between the maximum projection part on the side of the objective lens 1032 where the optical disk 1001 is mounted and the maximum projection part on the side of the objective lens 1033 where the optical disk 1001 is mounted. If t3 is smaller than 0.05 mm, the lens diameter of either of the objective lenses 1032 and 1033 must be enlarged. This is unsuitable for a size reduction. If t3 greatly exceeds 0.62 mm, the probability of coming in contact with the optical disk 1001 will increase.

Thus, a size reduction or reliability can be improved by projecting the objective lens 1033 corresponding to light having a shorter wavelength as mentioned above.

Additionally, it is preferable to form a structure so that the center of the objective lens 1032 corresponding to a long wavelength coincides substantially with a center line M passing through the center of the spindle motor 1002 along the moving direction L of the carriage 1004 as shown in FIG. 54. That is, this structure makes it possible to employ a three-beam DPP (Differential Push-Pull) method that is most fruitful in conventional light detection methods.

A description will be given of the spot diameter of light incident on the objective lenses 1032 and 1033.

A size reduction can be easily achieved by satisfying the relationship of t5/t4 shown in FIG. 55 where t4 is the diameter of a light spot incident on the objective lens 1032, and t5 is the diameter of a light spot incident on the objective lens 1033. Preferably, t5/t4=0.4 to 1.0, in consideration of lens design and the like. If t5/t4 is smaller than 0.4, the objective lens 1033 will have difficulty in being made, and the objective lens 1032 is enlarged, which is unsuitable for a size reduction. If t5/t4 is greater than 1.0, the thickness of the objective lens 1033 becomes excessively great. This is unsuitable for a size reduction.

Figure 64:
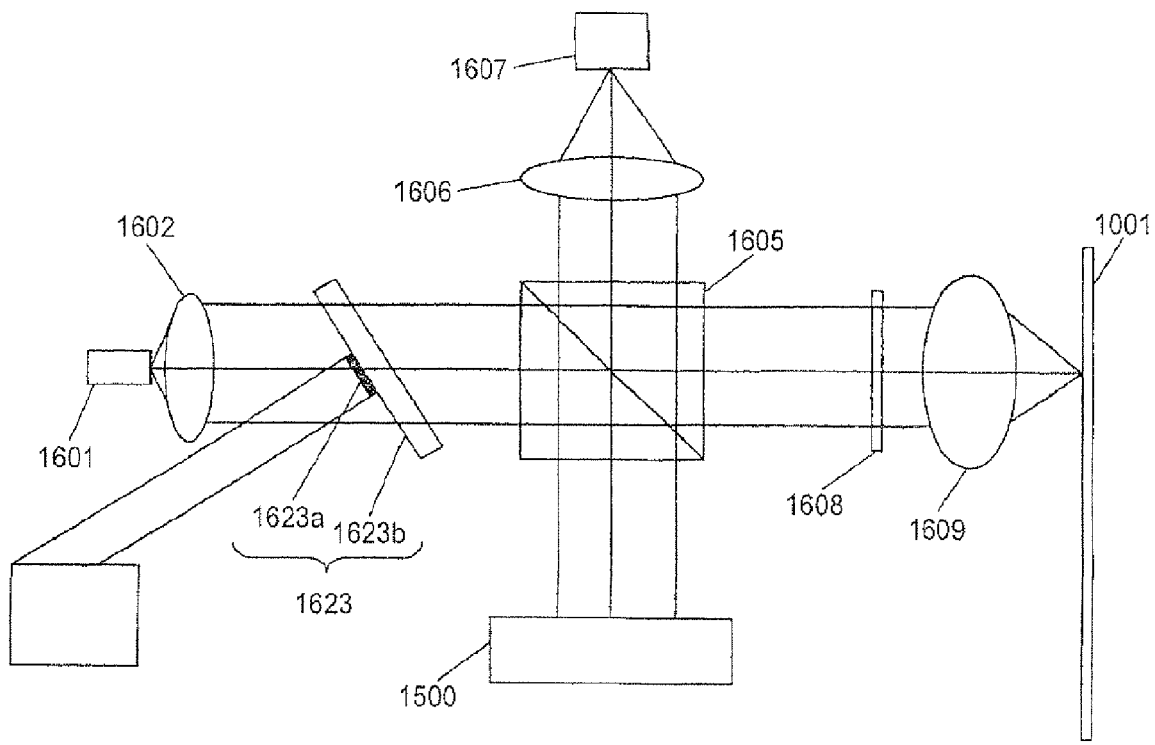
FIG. 64 is a schematic view showing an optical arrangement of a conventional optical pickup device.

One embodiment of the present invention is as above, and an important part of the present invention will be described in detail as follows. FIG. 64 is a schematic view showing an optical arrangement of the conventional optical pickup device, and FIG. 65 is a schematic view showing an optical arrangement of the optical pickup device according to an embodiment of the present invention.

Figure 65:
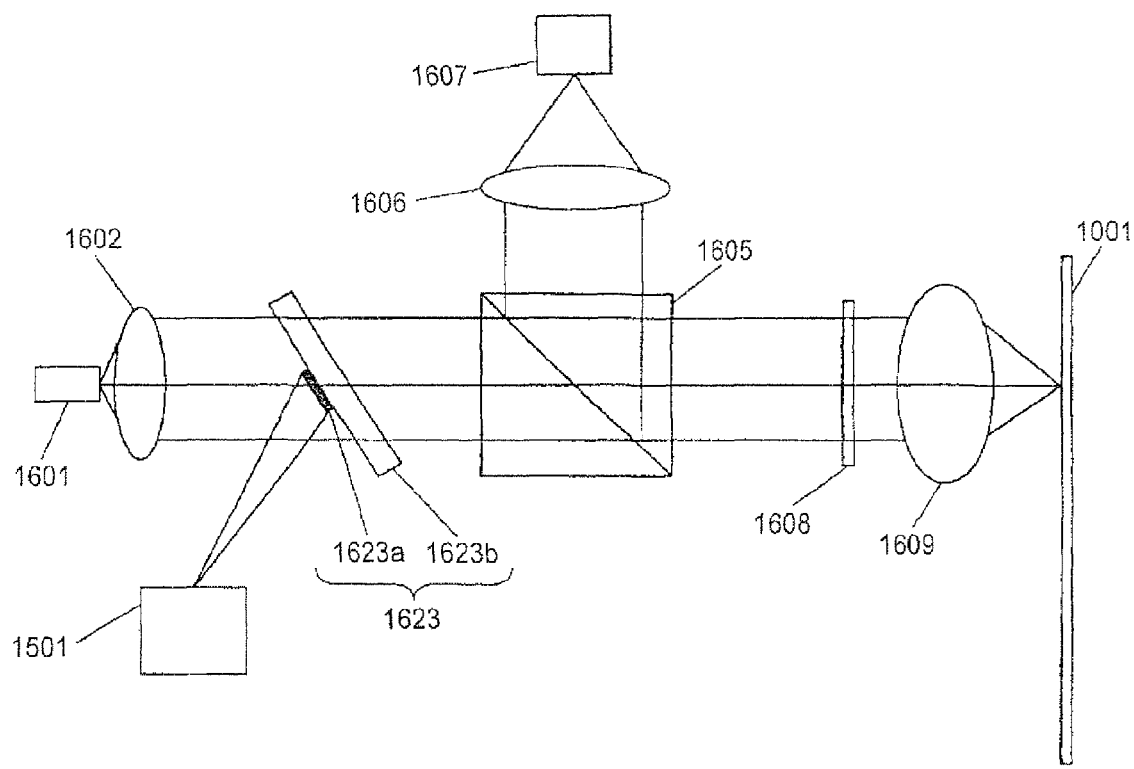
FIG. 65 is a schematic view showing an optical arrangement of the optical pickup device according to the embodiment of the present invention.

In FIG. 64 and FIG. 65, 1601 denotes an optical unit. Herein, this is a laser diode which oscillates violet light having a wavelength of approximately 405 nm. A red laser having a wavelength of approximately 660 nm or an infrared laser having a wavelength of approximately 780 nm is suitably used as the laser diode 1601. Although the laser diode 1601 that emits violet light is used in this embodiment, a laser diode that emits blue to purple light may be used. A laser diode, in which an active layer in which a luminescence center, such as In, is added to GaN is sandwiched between a p-type layer that is composed chiefly of GaN and that is doped with p-type impurities and an n-type layer that is composed chiefly of GaN and that is doped with n-type impurities, is suitably used as the laser diode 1601 that emits light. A so-called nitride semiconductor laser is suitably used. 1602 denotes a lens called a collimator lens. Although the collimator lens 1602 is made of glass, it may be made of plastic or resin. The collimator lens 1602 is disposed in front of the laser diode 1601 and is used to change light emitted from the laser diode 1601 into substantially parallel light. In this case, this light is not necessarily required to be substantially parallel light and is sometimes divergent light or convergent light.

1623 denotes an optical element called a rim filter that is used to correct a light intensity distribution. The Gauss type light distribution is corrected by using the rim filter 1623, and, as a result, the quantity of light reaching the optical disk 1 can be increased, and the spot size on the optical disk 1001 can be reduced. The rim filter 1623 is made up of a light quantity correcting part 1623a or a diffraction type light quantity correcting part 1623c and a transparent planar member 1623b. The transparent planar member 1623b is made of an optically transparent material such as glass or plastic. Although the light quantity correcting part 1623a or the diffraction type light quantity correcting part 1623c is made of an optically transparent material, such as glass or plastic, in the same way as the transparent planar member 1623b, a metal film or a dielectric multi-layer film is sometimes applied onto its surface or interior.

Figure 69:
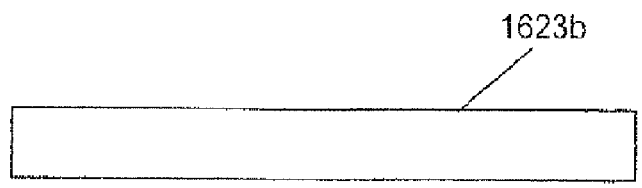
FIG. 69 is a view showing a method for producing the rim filter used in the optical pickup device according to the embodiment of the present invention.
Figure 69:
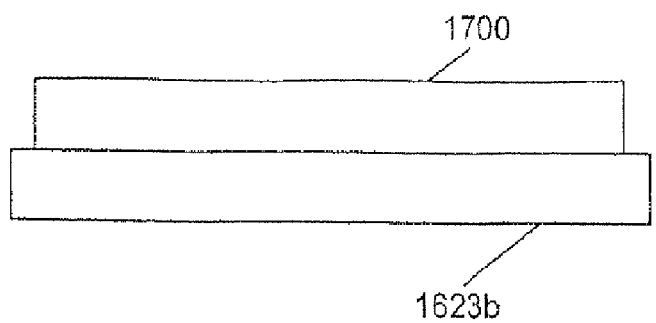
Figure 69:
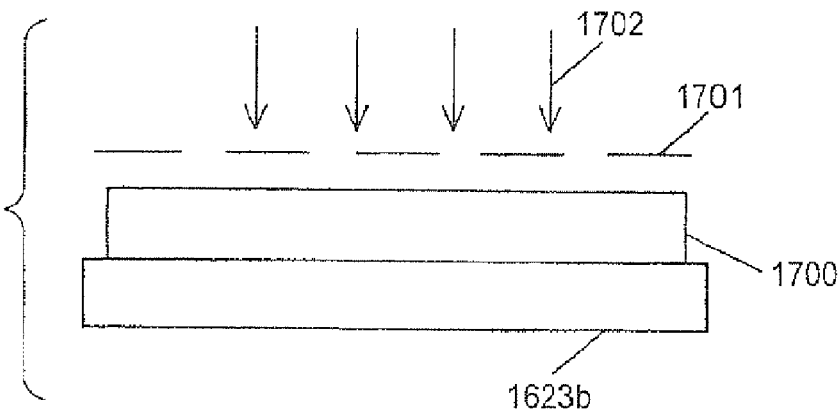
Figure 69:
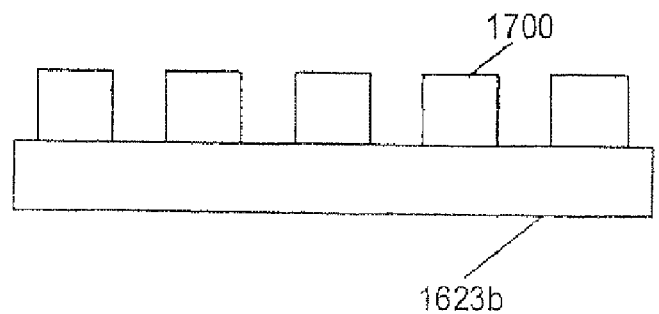
Figure 70:
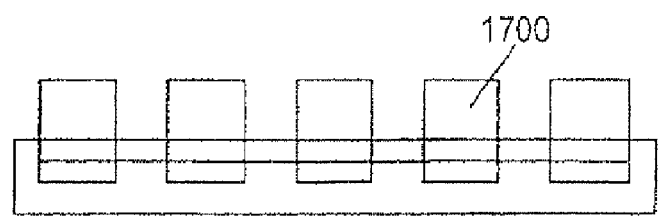
FIG. 70 is a view showing a method for producing the rim filter used in the optical pickup device according to the embodiment of the present invention.
Figure 70:
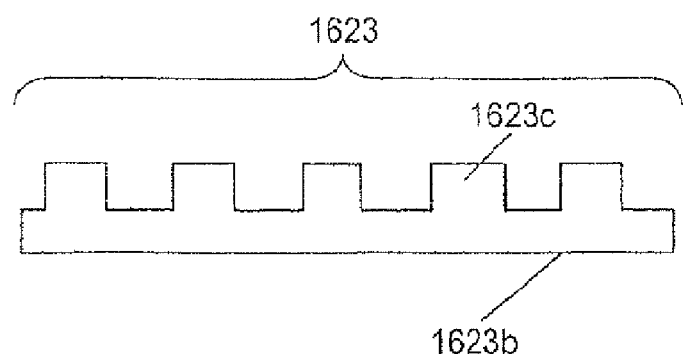
Figure 70:
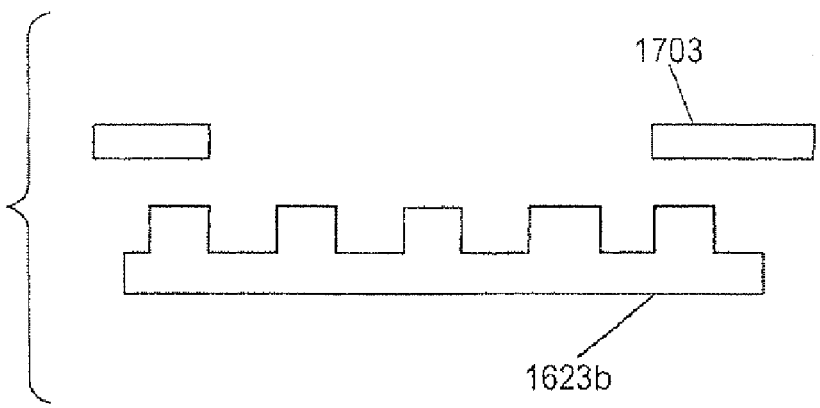
Figure 70:
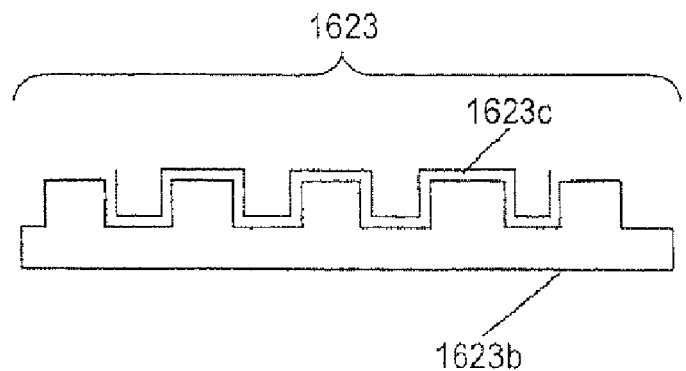
Figure 71:
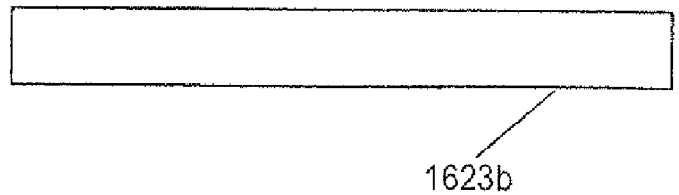
FIG. 71 is a view showing a method for producing the rim filter used in the optical pickup device according to the embodiment of the present invention.
Figure 71:
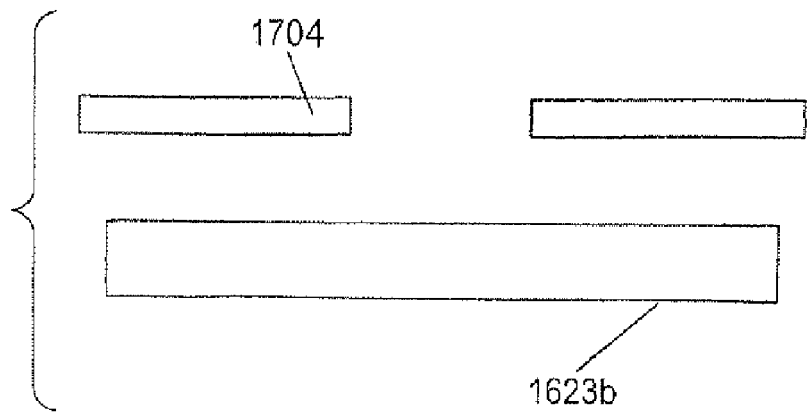
Figure 71:
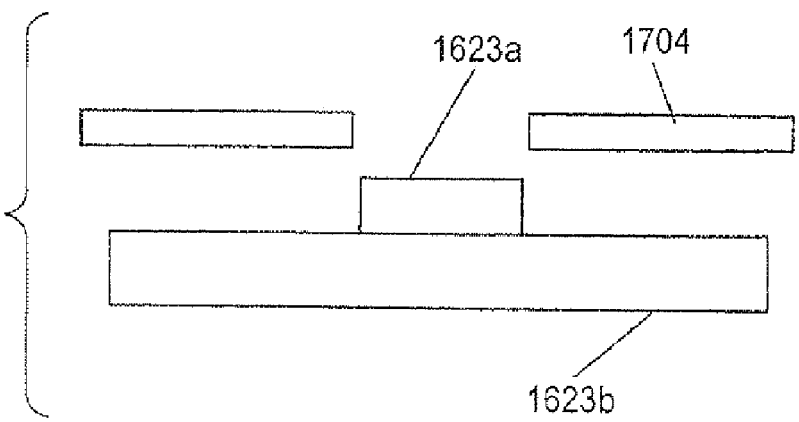

With reference to FIG. 69 to FIG. 71, a description will be given of a method of producing the rim filter 1623. First, a description will be given of the rim filter 1623 having the diffraction type light quantity correcting part 1623c. The transparent planar member 1623b is prepared in FIG. 69(a), and a resist 1700 is applied to the transparent planar member 1623b in FIG. 69(b). A photomask 1701 is applied in FIG. 69(e), and light is projected. Thereupon, the resist 1700 onto which light has been projected becomes concave, and a part where light has not been projected remains as it is, and, as a result, a rugged part is generated on the surface as shown in FIG. 69(d). Thereafter, an operation called "edging" is performed using an alkaline water solution or the like in FIG. 70(a) so as to remove the resist 1700. The resist 1700 is removed in FIG. 70(b), and the rim filter 1623 is completed. This is the light transmission type rim filter 1623 having the diffraction type light quantity correcting part 1623c. If the diffraction type light quantity correcting part 1623c is of a light reflection type, a masking jig 1703 is further attached in FIG. 70(c) following the operation of FIG. 70(b), and a metal film or a dielectric multi-layer film is deposited in FIG. 70(d). The rim filter 1623 that has the diffraction type light quantity correcting part 1623c of the light reflection type can be produced in this way. In the case of the rim filter 1623 having the light quantity correcting part 1623a, the transparent planar member 1623b is first prepared in FIG. 71(a), a masking jig 1704 is then attached in FIG. 71(b), and a metal film or a dielectric multi-layer film is deposited in FIG. 71(c).

The rim filter 1623 has two characteristics, one of which is an optical characteristic by which light with a certain wavelength is reflected or transmitted, and the other one is a positional characteristic by which light is reflected or transmitted depending on a predetermined location of the rim filter 1623. In this embodiment, the light quantity correcting part 1623a and the diffraction type light quantity correcting part 1623c in the vicinity of a center part of the rim filter 1623 are each structured to have a balance in which approximately 15% of light is reflected, and approximately 85% of the light is transmitted. The balance between transmission and reflection can be adjusted to have various values in accordance with the wavelength or the power of the laser diode 1601. The optical element used to correct the quantity of light is not limited to the rim filter, and what is required of the optical element is to fulfill the aforementioned function.

Figure 68:
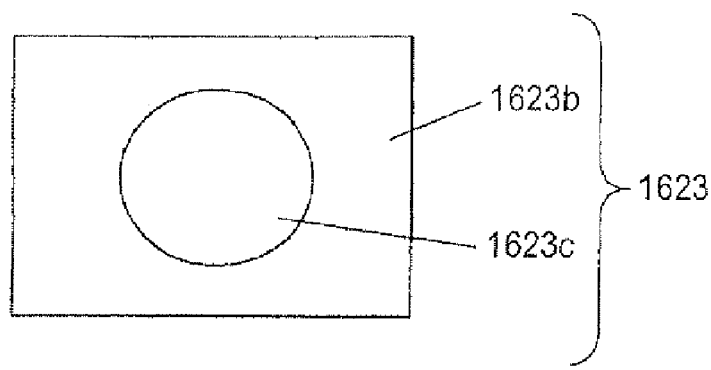
FIG. 68 is a view showing the rim filter used in the optical pickup device according to the embodiment of the present invention.
Figure 68:
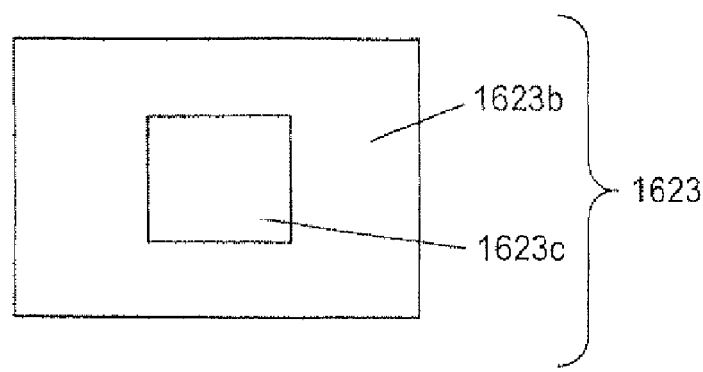
Figure 68:
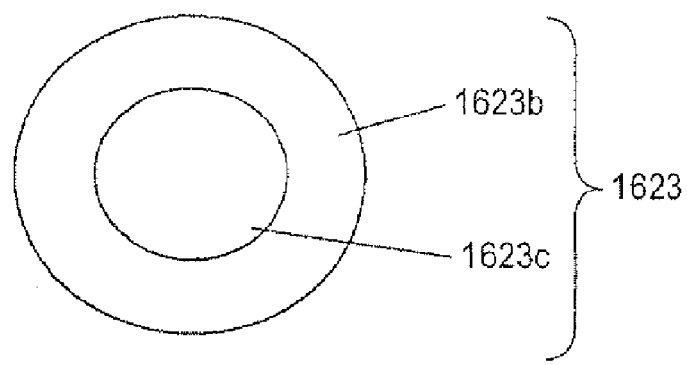
Figure 68:
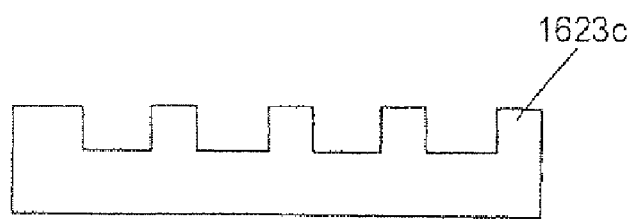

As shown in FIG. 68, in this embodiment, the rim filter 1623 is formed of the diffraction type light quantity correcting part 1623c. In FIG. 58(a), the transparent planar member 1623b is substantially rectangular, and the diffraction type light quantity correcting part 1623c is substantially circular. In FIG. 68(b), the transparent planar member 1623b is substantially rectangular, and the diffraction type light quantity correcting part 1623c is substantially rectangular. In FIG. 68(c), the transparent planar member 1623b is substantially circular, and the diffraction type light quantity correcting part 1623c is substantially circular. As is understood from this, the transparent planar member 1623b and the diffraction type light quantity correcting part 1623c shown in FIG. 68 may assume any shape. Although one diffraction type light quantity correcting part 1623c is provided here, a plurality of diffraction type light quantity correcting parts 1623c may be provided. Additionally, although the diffraction type light quantity correcting part 1623c is convex toward the transparent planar member 1623b in this embodiment, this may be concave, or the diffraction type light quantity correcting part 1623c and the transparent planar member 1623b may be shaped to be sandwiched between optically transparent materials. FIG. 68(d) is a cross section of the diffraction type light quantity correcting part 1623c. The diffraction type light quantity correcting part 1623c has a diffracting function by being provided with a rugged part on its surface, and can guide a light beam in a direction differing from that of another light beam by using this function. Additionally, the rim filter 1623 oscillates violet light having a wavelength of approximately 405 nm, and is also suitably used for a red laser having a wavelength of approximately 660 nm or an infrared laser having a wavelength of approximately 780 nm. A laser diode that emits blue to purple light may be used.

Figure 66:
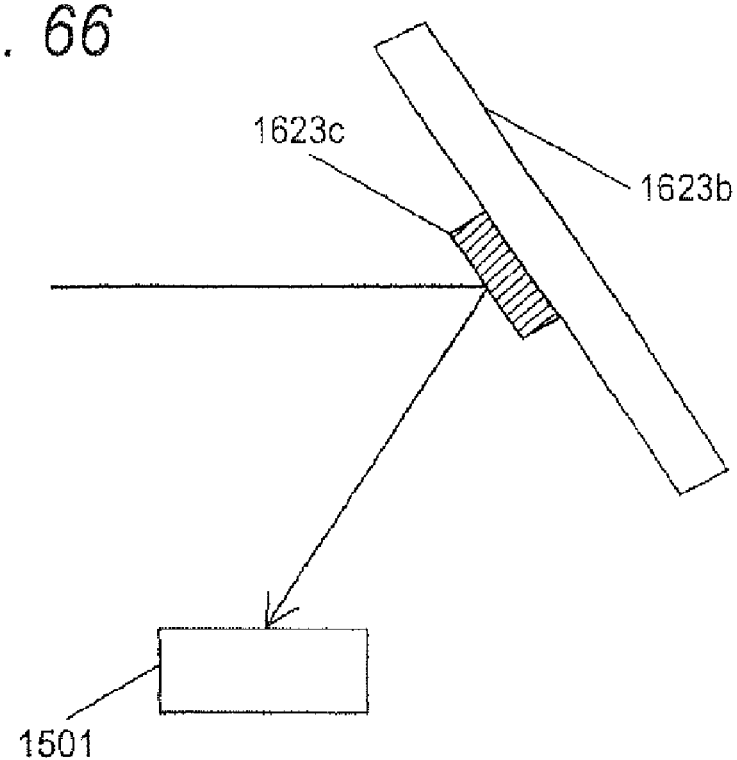
FIG. 66 is a view showing a rim filter used in the optical pickup device according to the embodiment of the present invention.
Figure 67:
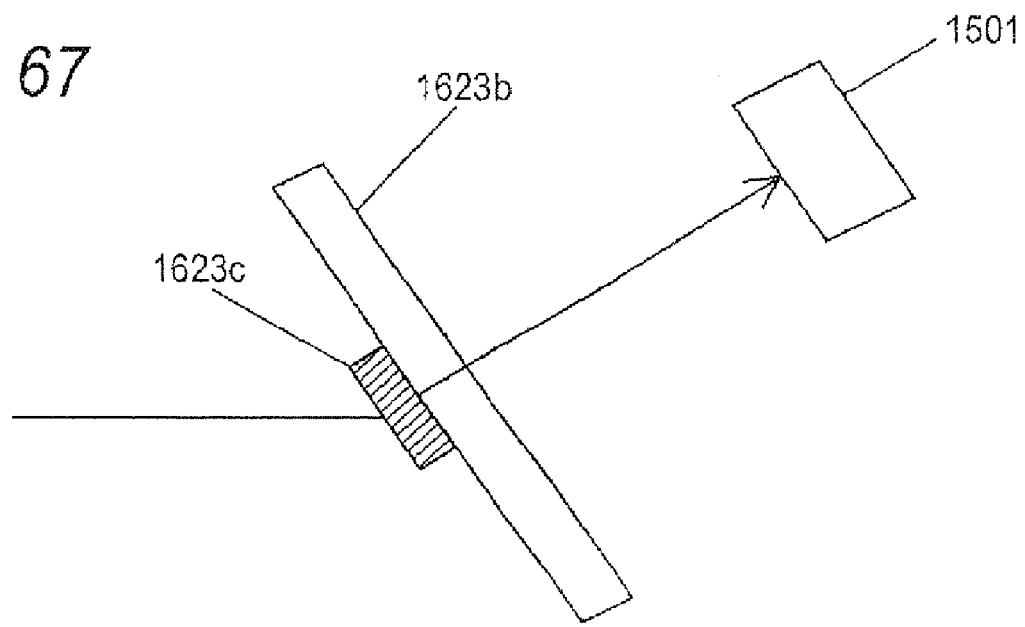
FIG. 67 is a view showing the rim filter used in the optical pickup device according to the embodiment of the present invention.

FIG. 66 and FIG. 67 show an embodiment of the rim filter 1623, and the light quantity correcting part 1623a shown in FIG. 64 differs from the diffraction type light quantity correcting part 1623c shown in FIG. 65. That is, in the structure shown in FIG. 65, the diffraction type light quantity correcting part 1623c is provided with a hologram. The following two possible methods can be mentioned as a method for providing the hologram. One of the two methods is to provide a reflection type hologram in the diffraction type light quantity correcting part 1623e as shown in FIG. 66. The other is to provide a transmission type hologram in the diffraction type light quantity correcting part 1623c as shown in FIG. 67. According to either of the reflection type and the transmission type, the S/N ratio of a signal is raised, and, accordingly, accuracy and reliability in data readout and in data writing are improved. Additionally, the coefficient of utilization of light can be raised. Not only the hologram but also a polarizing filter or a half mirror can be used in the diffraction type light quantity correcting part 1623c.

1500 and 1501 each denotes a front light monitor for light detection. The front light monitors 1500 and 1501 are each a light-receiving element composed of at least one, and is characterized by measuring the intensity of light. In FIG. 64, the front light monitor 1500 is disposed to monitor a light beam that comes from a beam splitter 1605 described later, and, in FIG. 65, the front light monitor 1501 is disposed to monitor a light beam that comes from the rim filter 1623.

In FIG. 64 and FIG. 65, 1605 denotes a beam splitter, which is a polarization beam splitter in this embodiment. The beam splitter 1605 transmits a laser beam emitted from the laser diode 1601 so as to be used as projection light onto the optical disk 1001, and guides light returning from the optical disk 1001 to the light-receiving element part 1607. A diffraction grating (not shown) that divides a laser beam is additionally provided at the position where light is guided toward the light-receiving element part 1607, so that focus detection, tracking detection, spherical aberration detection, and detection of a signal recorded on the optical disk 1001 can be performed, and a control signal can be extracted. The beam splitter is provided with a polarization film (dielectric multi-layer film coat), so that light of an electric oscillation surface (P wave light) parallel to an incidence surface is characteristically transmitted, and light of an electric oscillation surface (S wave light) perpendicular to the incidence surface is characteristically reflected. Although one inclined face is provided in this embodiment, a plurality of inclined faces may be provided.

1606 denotes a lens, and 1607 denotes a light-receiving element part. Although the lens 1606 is made of glass, it may be made of resin. The lens 1606 has a function to gather light on the light-receiving element part 1607. The light-receiving element part 1607 is a light-receiving element composed of at least one, and its structure is formed as mentioned above.

1608 denotes a quarter-wave plate. The quarter-wave plate 1608 is made of a birefringent crystal such as quartz crystal, and is used to convert linearly polarized light into circularly polarized light and convert circularly polarized light into linearly polarized light. Light emitted from the laser diode 1601 passes through the beam splitter 1605, and passes through the quarter-wave plate 1608. Thereafter, light that has been reflected by and has come out from the optical disk 1001 again passes through the quarter-wave plate 1608. The P wave light of polarized light is converted into the S wave light by allowing the forward light and the return light to pass therethrough twice in this way.

1609 denotes an objective lens. Although the objective lens 1609 is made of glass, it may be made of resin. The objective lens 1609 has a function to gather light on the optical disk 1001. The numerical aperture of the lens at this time is approximately 0.45 in CDs, approximately 0.6 in DVDs or AODs, and approximately 0.85 in Blu-Rays. The periphery of the objective lens 1609 is enclosed with mutually independent circular coils (not shown), and, when an electric current is applied thereto, a force propartal to, for example, the number of rolls of the coils is generated. A tracking or focusing adjustment is performed by using this force.

1001 denotes an optical disk. The optical disk 1001 can perform at least either of data reproduction and data recording by projecting a light beam. Concretely, CD-ROM disks, DVD-ROM disks, etc., that can perform only data reproduction, CD-R disks, DVD-R disks, etc., that can perform data recording in addition to data reproduction, and CD-RW disks, DVD-RW disks, DVD-RAM disks, etc., that can perform data recording/deletion in addition to data reproduction are suitably used as the optical disk 1001. Additionally, a disk having a recording layer on which at least either of data recording and data reproduction can be performed with substantially red light, a disk having a recording layer on which data recording or data reproduction can be performed with substantially infrared light, and a disk having a recording layer on which data recording or data reproduction can be performed with substantially blue light to substantially violet light can be used as the optical disk 1001. Concerning the size of the optical disk 1001, a disk-like plate having various diameters can be used, and, preferably, a disk-like plate having a diameter of 3 cm to 12 cm is suitably used.

In the rim filter 1623 of the present invention, the light quantity correcting part 1623$a$ can be used merely as a half mirror, for example, as shown in FIG. 64, or can be used as the diffraction type light quantity correcting part 1623$c$ as shown in FIG. 65. By employing this structure, light that has been conventionally thrown away for the correction of a light intensity distribution is guided to the front light monitor 1501, whereby the light quantity of the laser beam can be monitored. The light quantity of the laser beam in the conventional optical pickup has been measured by observing a part of light of the beam splitter 1605 by means of the front light monitor 1500. However, this is inferior in optical usability and inferior in S/N of a signal. Since the intensity in the vicinity of the center of light is measured in the light quantity correcting part 1623$a$ or in the diffraction type light quantity correcting part 1623$c$ in this embodiment, the S/N ratio of a signal is raised, and, accordingly, accuracy and reliability in data readout and in data writing are improved. The coefficient of utilization of light can also be improved. Additionally, if the structure shown especially in FIG. 65 is employed, the guided light can be changed into convergent light by using the diffraction, and the front light monitor 1501 can be made smaller than the front light monitor 1500, and therefore a size reduction and a thickness reduction of the device can be realized.

The present invention can realize at least one of signal sensibility improvement, optical usability improvement, device size reduction, and thickness reduction in any wavelength, and is applicable to an optical pickup device used for recording and reproduction in a high-density recording disk, such as a DVD, or in an optical disk, such as a compact disk.

The invention is an optical pickup device wherein a collimator lens is provided between the first optical unit and the correcting means. Because the light exited from the first optical unit can be changed into a nearly collimated light, light loss is comparatively less even if optical path is made comparatively long.

The invention is an optical pickup device wherein a beam shaping means for shaping a light beam is provided between the first optical unit and the correcting means. Recording or reproducing characteristic can be improved.

The invention is an optical pickup device wherein critical-angle optical means is provided between the first optical unit and the correcting means. The light exited from the first optical unit is guided by the critical-angle optical means to the correcting means where it is corrected for spherical aberration, and thereafter guided by the critical-angle optical means toward the optical disk. The light reflected from the optical disk can be structurally entered by the critical-angle optical means to the correcting means and thereafter returned to the first optical unit. Thus, spherical aberration can be positively corrected. Furthermore, it is possible to realize an optical pickup well in light utilization efficiency.

The invention is an optical pickup device wherein beam-diameter expanding means is provided between the correcting means and the focusing means. This makes it possible to reduce the spacing between each optical unit and the collimator lens, enabling size reduction of the optical pickup. Furthermore, because the correcting means part can be reduced in light diameter, structure can be provided by small-sized correcting means. Thus, it is possible to realize an optical pickup device small in size and thickness and low in cost.

The invention is an optical pickup device wherein the correcting means is a reflective mirror, the reflective mirror is deformable. Spherical aberration can be easily corrected by arbitrarily deforming a mirror part of the reflection mirror.

The invention is an optical pickup device wherein the reflective mirror is to be displaced by means of a piezoelectric element. The mirror part can be driven with accuracy. Spherical aberration can be corrected positively.

The invention is an optical pickup device wherein the light-receiving means is divided into at least two, first light-receiving means being mounted on the first optical unit and to receive a first wavelength of light while second light-receiving means being mounted on a second optical unit and to receive a longer wavelength of light than the first wavelength. Because a preferable form of light-receiving means can be taken for each of light, it is possible to obtain a correct RF signal, focus-error signal, tracking-error signal, and spherical-aberration correcting signal.

The invention is an optical pickup device wherein the focusing means has a first focusing part for focusing mainly at least the first wavelength of light and a second focusing part for focusing mainly the longer wavelength of light than the first wavelength. This facilitate to design the focusing means, thus simplifying the structure.

The invention is an optical pickup device wherein the first focusing part and the second focusing part are juxtaposed in order of from a side of the first and second optical units. It is possible to reduce the size of the focusing means or so.

The invention is an optical pickup device further comprising raise-up means having at least first and second slant surfaces between the focusing means and the optical means, the first slant surface allowing to pass one of the first wavelength of light and the longer wavelength of light than the first wavelength, the second slant surface reflecting the one of those of light, the light reflected on the first and second slant surfaces is entered to one of the first focusing part and second focusing part. It is possible to positively guide a light to predetermined focusing means, realizing size reduction.

The invention is an optical pickup device comprising drive means for driving the optical disk and a carriage mounted with an optical pickup device and attached movable relative to the drive means. This can realize at least one of thickness reduction and size reduction.

The invention is directed to an optical pick-up device comprising an objective lens holding cylinder capable of holding an objective lens and moving in a tracking direction and a focus direction, a first coil capable of generating a thrust for driving the objective lens holding cylinder in the tracking direction, a second coil capable of generating a thrust for driving the objective lens holding cylinder in the focus direction, an optical pick-up actuator moving part including the objective lens, the objective lens holding cylinder, the first coil and the second coil, an elastic support member for supporting the optical pick-up actuator moving part and supplying a power to the first coil and the second coil, and a third coil, the third coil being provided close to either the first coil or the second coil. The thrust of the optical pick-up actuator moving part can be enhanced and the performance of the optical pick-up device can be improved.

The invention is directed to the optical pick-up device, wherein a product of a distance from a thrust center of the first coil to an inertia center of the optical pick-up actuator moving part and a thrust of the first coil is almost equal to a product of a distance from a thrust center of the third coil to an inertia center of the optical pick-up actuator moving part and a thrust of the third coil. An unnecessary moment around the inertia center of the optical pick-up actuator moving part can be cancelled. Therefore, the amount of an AC tilt can be controlled and the reliability of the optical pick-up device can be enhanced.

The invention is directed to the optical pick-up device wherein a product of a distance from the thrust center of the first coil to an elastic support center of the optical pick-up actuator moving part and the thrust of the first coil is almost equal to a product of a distance from the thrust center of the third coil to the elastic support center of the optical pick-up actuator moving part and the thrust of the third coil. An unnecessary moment around the elastic support center of the optical pick-up actuator moving part can be cancelled. Therefore, the amount of the AC tilt can be controlled and the reliability of the optical pick-up device can be enhanced.

The invention is directed to the optical pick-up device, wherein the distance from the thrust center of the first coil to the inertia center of the optical pick-up actuator moving part is 0.05 mm to 40 mm. An unnecessary moment around the inertia center of the optical pick-up actuator moving part can be cancelled. Therefore, the amount of the AC tilt can be controlled and the reliability of the optical pick-up device can be enhanced, and furthermore, the thickness of the optical pick-up device can be reduced.

The invention is directed to the optical pick-up device according to any of the first to fourth aspects of the invention, wherein the distance from the thrust center of the first coil to the elastic support center of the optical pick-up actuator moving part is 0.05 mm to 40 mm. An unnecessary moment around the elastic support center of the optical pick-up actuator moving part can be cancelled. Therefore, the amount of the AC tilt can be controlled and the reliability of the optical pick-up device can be enhanced, and furthermore, the thickness of the optical pick-up device can be more reduced.

The invention is directed to the optical pick-up device according to any of the first to fifth aspects of the invention, wherein the distance from the thrust center of the first coil to the inertia center of the optical pick-up actuator moving part is almost equal to the distance from the thrust center of the first coil to the elastic support center of the optical pick-up actuator moving part. An unnecessary moment around the inertia center of the optical pick-up actuator moving part can be cancelled. Therefore, the amount of the AC tilt can be controlled and the reliability of the optical pick-up device can be enhanced. In addition, an unnecessary moment around the elastic support center of the optical pick-up actuator moving part can be cancelled. Therefore, the amount of a DC tilt can also be controlled and the reliability of the optical pick-up device can be enhanced.

The invention is directed to an optical pick-up device comprising an objective lens holding cylinder capable of holding an objective lens and moving in a tracking direction and a focus direction, a first coil capable of generating a thrust for driving the objective lens holding cylinder in the tracking direction, a second coil capable of generating a thrust for driving the objective lens holding cylinder in the focus direction, an optical pick-up actuator moving part including the objective lens, the objective lens holding cylinder, the first coil and the second coil, and an elastic support member for supporting the optical pick-up actuator moving part and supplying a power to the first coil and the second coil, wherein the objective lens holding cylinder has a coil positioning part, and at least one of the first coil and the second coil is positioned by the coil positioning part. The objective lens holding cylinder and a coil assembling jig can be simplified or are not required. Therefore, an assembly cost can be reduced, and furthermore, the cost of the optical pick-up device can be cut down.

The invention is directed to the optical pick-up device according to the seventh aspect of the invention, wherein the coil positioning part serves as a mass balance of the optical pick-up actuator moving part. The coil positioning part serves as the mass balance. Consequently, the mass balance is not required so that the cost of the optical pick-up device can be reduced.

The invention is directed to an optical pick-up device comprising an objective lens holding cylinder capable of holding an objective lens and moving in a tracking direction and a focus direction, a first coil capable of generating a thrust for driving the objective lens holding cylinder in the tracking direction, a second coil capable of generating a thrust for driving the objective lens holding cylinder in the focus direction, an optical pick-up actuator moving part including the objective lens, the objective lens holding cylinder, the first coil and the second coil, and an elastic support member for supporting the optical pick-up actuator moving part and supplying a power to the first coil and the second coil, wherein the objective lens holding cylinder is formed by a ceramics material. The rigidity of the objective lens holding cylinder can be enhanced so that the performance of the optical pick-up device can be improved.

The invention is directed to the optical pick-up device, wherein an average thickness of the objective lens holding cylinder is 0.05 mm to 0.42 mm. The weight of the objective lens holding cylinder can be reduced so that the performance of the optical pick-up device can be enhanced.

The invention is directed to the optical pick-up device, wherein the ceramics material of the objective lens holding cylinder has a porosity of 5% to 85%. The weight of the objective lens holding cylinder can be reduced so that the performance of the optical pick-up device can be enhanced.

The invention is directed to the optical pick-up device, wherein the objective lens holding cylinder partially or wholly has an adhesive. The tenacity of the objective lens holding cylinder can be improved so that the reliability of the optical pick-up device can be enhanced.

The invention is directed to the optical pick-up device, wherein the adhesive has an additive for absorbing a light. The reflection of a light in the objective lens holding cylinder can be suppressed so that the reliability of the optical pick-up device can be enhanced.

The invention is directed to an optical pick-up device comprising an objective lens holding cylinder capable of holding an objective lens and moving in a tracking direction and a focus direction, a first coil capable of generating a thrust for driving the objective lens holding cylinder in the tracking direction, a second coil capable of generating a thrust for driving the objective lens holding cylinder in the focus direction, an optical pick-up actuator moving part including the objective lens, the objective lens holding cylinder, the first coil and the second coil, and an elastic support member for supporting the optical pick-up actuator moving part and supplying a power to the first coil and the second coil, wherein the objective lens holding cylinder is constituted to contain a ceramics material and a plastic material. The rigidity of the optical pick-up actuator moving part can be increased so that the performance of the optical pick-up device can be enhanced.

The invention is directed to the optical pick-up device, wherein the plastic material is a liquid crystal polymer material. The rigidity of the optical pick-up actuator moving part can be more increased so that the performance of the optical pick-up device can be enhanced.

The invention is directed to an optical pick-up device comprising a first objective lens for converging a first light, a second objective lens for converging a second light, an objective lens holding cylinder capable of holding the first objective lens and the second objective lens and moving in a tracking direction and a focus direction, a first coil capable of generating a thrust for driving the objective lens holding cylinder in the tracking direction, a second coil capable of generating a thrust for driving the objective lens holding cylinder in the focus direction, an optical pick-up actuator moving part including the first objective lens, the second objective lens, the objective lens holding cylinder, the first coil and the second coil, an elastic support member for supporting the optical pick-up actuator moving part and supplying a power to the first coil and the second coil, a first rising mirror having a reflecting function for reflecting the first light, and a second rising mirror having a reflecting function for reflecting the second light. By dividing components based on the functions of the first rising minor to be a first optical functional component and the second rising mirror to be a second optical functional component, it is possible to enhance a mass production and to reduce the cost of the optical pick-up device.

The invention is directed to the optical pick-up device according to the sixteenth aspect of the invention, wherein the first rising mirror has a transmitting function of transmitting the second light. By providing a transmitting film for transmitting the second light on the reflecting surface of the first rising mirror, it is possible to reduce the size of the optical pick-up device.

The invention is directed to the optical pick-up device, wherein at least one of the first rising mirror and the second rising mirror is a flat plate glass. By setting the rising mirror to be the flat plate glass, it is possible to enhance a workability, resulting in a further reduction in the cost of the optical pick-up device.

The invention is directed to an optical pick-up device comprising a first objective lens for converging a first light, a second objective lens for converging a second light, an objective lens holding cylinder capable of holding the first objective lens and the second objective lens and moving in a tracking direction and a focus direction, a first coil capable of generating a thrust for driving the objective lens holding cylinder in the tracking direction, a second coil capable of generating a thrust for driving the objective lens holding cylinder in the focus direction, an optical pick-up actuator moving part including the first objective lens, the second objective lens, the objective lens holding cylinder, the first coil and the second coil, and an elastic support member for supporting the optical pick-up actuator moving part and supplying a power to the first coil and the second coil, wherein the optical pick-up actuator moving part has at least one of a first wavelength plate for changing a polarizing direction of the first light and a second wavelength plate for changing a polarizing direction of the second light. Either a phase difference generated by other optical components related to the first light or a phase difference generated by other optical components related to the second light can be suppressed so that the reliability of the optical pick-up device can be enhanced.

The invention is directed to the optical pick-up device, wherein the optical pick-up actuator moving part has the first wavelength plate and the second wavelength plate. Both the phase difference generated by other optical components related to the first light and the phase difference generated by other optical components related to the second light can be suppressed so that the reliability of the optical pick-up device can be enhanced.

The invention is directed to the optical pick-up device, wherein at least one of the first wavelength plate and the second wavelength plate has a hologram. Also in the case in which the optical pick-up actuator moving part shifts a lens, it is possible to implement either an enhancement in the quality of a signal related to the first light or an enhancement in the quality of a signal related to the second light. Consequently, it is possible to improve the reliability of the optical pick-up device.

The invention is directed to an optical pick-up device comprising a first objective lens for converging a first light, a second objective lens for converging a second light, an objective lens holding cylinder capable of holding the first objective lens and the second objective lens and moving in a tracking direction and a focus direction, a first coil capable of generating a thrust for driving the objective lens holding cylinder in the tracking direction, a second coil capable of generating a thrust for driving the objective lens holding cylinder in the focus direction, an optical pick-up actuator moving part including the first objective lens, the second objective lens, the objective lens holding cylinder, the first coil and the second coil, and an elastic support member for supporting the optical pick-up actuator moving part and supplying a power to the first coil and the second coil, wherein the objective lens holding cylinder has a receiving surface which can be adjusted around a principal point of the objective lens on at least one of the two objective lenses. The inclinations of the two objective lenses can be caused to be relatively coincident with each other. Consequently, the non-defective ratio of the optical pick-up actuator moving part can be enhanced and the cost of an optical disk drive device can be reduced.

The invention is directed to the optical pick-up device, wherein the optical pick-up actuator moving part has an objective lens spacer in such a manner that the first objective lens can be adjusted. Even if the position of the principal point is placed below the lower surface of a flange, the inclinations of the two objective lenses in the objective lens spacer can be caused to be relatively coincident with each other. Consequently, the non-defective ratio of the optical pick-up actuator moving part can be enhanced and the cost of an optical disk drive device can be reduced.

The invention is directed to an optical disk device comprising optical disk rotation driving means for rotating an optical disk and a carriage mounting the optical pick-up device according to any of the first to twenty-third aspects of the invention and attached movably to the optical disk rotation driving means. It is possible to implement at least one of a decrease in a thickness and a reduction in a size.

The invention is directed to an objective lens having a flange upper surface opposed to an optical disk, a flange lower surface for determining a thickness of a flange, and a principal point for converging a light onto the optical disk, wherein the principal point is provided on the optical disk side from the flange lower surface. The objective lens can easily be adjusted in the lens holding cylinder. Thus, the reliability of the optical disk device can be enhanced.

The invention is directed to an optical pick-up device, wherein an actuator moving part has the objective lens. The objective lens can easily be adjusted in the lens holding cylinder. Thus, the reliability of the optical disk device can be enhanced.

The invention is directed to an optical disk device comprising optical disk rotation driving means for rotating an optical disk and a carriage mounting the optical pick-up device according to the twenty-fifth aspect of the invention and attached movably to the optical disk rotation driving means. It is possible to implement at least one of a decrease in a thickness and a reduction in a size.

The invention is directed to an optical pick-up device comprising a first objective lens for converging a first laser beam onto an optical disk, a second objective lens for converging a second laser beam onto the optical disk, an objective lens holding cylinder for holding the first objective lens and the second objective lens, a focus coil for driving the objective lens in a focus direction, a tracking coil for driving the objective lens in a tracking direction, an elastic member provided with a magnet and a magnetic yoke to be opposed to the focus coil and the tracking coil and supporting a moving part mounting the two objective lenses, and an optical pick-up actuator having a suspension holder for fixing the other end of the elastic member, wherein only one of the focus coil and the tracking coil is provided in a magnetic circuit part constituted by the magnet and the magnetic yoke. The focus coil and the tracking coil can be driven with high precision so that the performance of the optical pick-up device can be enhanced.

The invention is directed to an optical pick-up device comprising a first objective lens for converging a first laser beam onto an optical disk, a second objective lens for converging a second laser beam onto the optical disk, an objective lens holding cylinder for holding the first objective lens and the second objective lens, a focus coil for driving the first objective lens and the second objective lens in a focus direction, a tracking coil for driving the first objective lens and the second objective lens in a tracking direction, an elastic member provided with a magnet to be opposed to the focus coil and the tracking coil and supporting a moving part mounting the first objective lens and the second objective lens, and an optical pick-up actuator having a suspension holder for fixing the other end of the elastic member, wherein the focus coil is constituted by two coils and are provided almost symmetrically about centers of the first objective lens and the second objective lens. The focus coil can be driven with respect to the center of the objective lens with high precision so that the performance of the optical pick-up device can be enhanced.

The invention is directed to an optical pick-up device comprising a first objective lens for converging a first laser beam onto an optical disk, a second objective lens for converging a second laser beam onto the optical disk, an objective lens holding cylinder for holding the first objective lens and the second objective lens, a focus coil for driving the first objective lens and the second objective lens in a focus direction, a tracking coil for driving the first objective lens and the second objective lens in a tracking direction, an elastic member provided with a magnet to be opposed to the respective coils and supporting a moving part mounting the first objective lens and the second objective lens, and an optical pick-up actuator having a suspension holder for fixing the other end of the elastic member, wherein the tracking coil is constituted by two coils and are provided almost symmetrically about centers of the first objective lens and the second objective lens. The tracking coil can be driven with respect to the center of the objective lens with high precision so that the performance of the optical pick-up device can be enhanced.

The invention is directed to the optical pick-up device, wherein each of the focus coil and the tracking coil is constituted by two coils. The focus coil and the tracking coil can be driven with respect to the center of the objective lens with high precision so that the performance of the optical pick-up device can be enhanced.

The invention is directed to the optical pick-up device, wherein a power can be supplied to each of the two focus coils in such a manner that the focus coils can be controlled independently. A DC tilt can be controlled. Consequently, the performance of the optical pick-up device can be enhanced.

The invention is directed to the optical pick-up device, wherein at least six elastic members are provided to supply a power in such a manner that the two focus coils can be controlled independently. A tracking control can be carried out, and furthermore, the DC tilt can also be controlled. Consequently, the performance of the optical pick-up device can be enhanced.

The invention is directed to the optical pick-up device, wherein the focus coil is wound to be almost ring-shaped. The focus coil can be manufactured inexpensively so that the cost of the optical pick-up device can be reduced.

The invention is directed to the optical pick-up device, wherein the tracking coil is wound to be almost ring-shaped. The tracking coil can be manufactured inexpensively so that the cost of the optical pick-up device can be reduced.

The invention is directed to the optical pick-up device, wherein a focus magnet provided opposite to the focus coil wound to be almost ring-shaped is polarized into two parts in the focus direction and one piece of the focus coil and the other surface have different poles from each other. An effective length for generating the thrust of the focus coil can be doubled as compared with a conventional focus coil. Therefore, the thrust can be doubled, and furthermore, the utilization efficiency of the focus coil can also be enhanced so that the performance of the optical pick-up device can be improved.

The invention is directed to the optical pick-up device, wherein a tracking magnet provided opposite to the tracking coil wound to be almost ring-shaped is polarized into two parts in the tracking direction and one piece of the tracking coil and the other surface have different poles from each other. An effective length for generating the thrust of the tracking coil can be doubled as compared with a conventional tracking coil. Therefore, the thrust can be doubled, and furthermore, the utilization efficiency of the focus coil can also be enhanced so that the performance of the optical pick-up device can be improved.

The invention is directed to an optical pick-up device comprising at least one objective lens, an objective lens holding cylinder for holding the objective lens, a focus coil for driving the objective lens in a focus direction, a tracking coil for driving the objective lens in a tracking direction, a tracking subcoil for driving the objective lens in the focus direction, the tracking subcoil being provided close to the focus coil, an elastic member provided with a magnet and a magnetic yoke to be opposed to the focus coil and the tracking coil and supporting a moving part mounting the objective lens, and an optical pick-up actuator having a suspension holder for fixing the other end of the elastic member, wherein only one of the focus coil and the tracking coil is provided in a magnetic circuit part constituted by the magnet and the magnetic yoke. The focus coil and the tracking coil can be driven with high precision so that the performance of the optical pick-up device can be enhanced.

The invention is directed to an optical pick-up device comprising at least one objective lens, an objective lens holding cylinder for holding the objective lens, a focus coil for driving the objective lens in a focus direction, a tracking coil for driving the objective lens in a tracking direction, a tracking subcoil for driving the objective lens in the focus direction, the tracking subcoil being provided close to the focus coil, an elastic member provided with a magnet to be opposed to the focus coil and the tracking coil and supporting a moving part mounting the objective lens, and an optical pick-up actuator having a suspension holder for fixing the other end of the elastic member, wherein the focus coil is constituted by two coils and they are provided almost symmetrically about a center of the objective lens. The focus coil can be driven with respect to the center of the objective lens with high precision so that the performance of the optical pick-up device can be enhanced.

The invention is directed to an optical pick-up device comprising at least one objective lens, an objective lens holding cylinder for holding the objective lens, a focus coil for driving the objective lens in a focus direction, a tracking coil for driving the objective lens in a tracking direction, a tracking subcoil for driving the objective lens in the focus direction, the tracking subcoil being provided close to the focus coil, an elastic member provided with a magnet to be opposed to the focus coil and the tracking coil respectively and supporting a moving part mounting the objective lens, and an optical pick-up actuator having a suspension holder for fixing the other end of the elastic member, wherein the tracking coil is constituted by two coils and they are provided almost symmetrically about a center of the objective lens. The tracking coil can be driven with respect to the center of the objective lens with high precision so that the performance of the optical pick-up device can be enhanced.

The invention is directed to the optical pick-up device, wherein each of the focus coil and the tracking coil is constituted by two coils. The focus coil and the tracking coil can be driven with respect to the center of the objective lens with high precision so that the performance of the optical pick-up device can be enhanced.

The invention is directed to the optical pick-up device, wherein a power can be supplied to each of the two focus coils in such a manner that the focus coils can be controlled independently. A DC tilt can be controlled so that the performance of the optical pick-up device can be enhanced.

The invention is directed to the optical pick-up device, wherein at least six elastic members are provided to supply a power in such a manner that the two focus coils can be controlled independently. A tracking control can be carried out, and furthermore, the DC tilt can also be controlled. Consequently, the performance of the optical pick-up device can be enhanced.

The invention is directed to the optical pick-up device, wherein the focus coil is wound to be almost ring-shaped. The focus coil can be manufactured inexpensively so that the cost of the optical pick-up device can be reduced.

The invention is directed to the optical pick-up device, wherein the tracking coil is wound to be almost ring-shaped. The tracking coil can be manufactured inexpensively so that the cost of the optical pick-up device can be reduced.

The invention is directed to the optical pick-up device, wherein a focus magnet provided opposite to the focus coil wound to be almost ring-shaped is polarized into two parts in the focus direction and one piece of the focus coil and the other surface have different poles from each other. An effective length for generating the thrust of the focus coil can be doubled as compared with a conventional focus coil. Therefore, the thrust can be doubled, and furthermore, the utilization efficiency of the focus coil can also be enhanced so that the performance of the optical pick-up device can be improved.

The invention is directed to the optical pick-up device, wherein a tracking magnet provided opposite to the tracking coil wound to be almost ring-shaped is polarized into two parts in the tracking direction and one piece of the tracking coil and the other surface have different poles from each other. An effective length for generating the thrust of the tracking coil can be doubled as compared with a conventional tracking coil. Therefore, the thrust can be doubled, and furthermore, the utilization efficiency of the focus coil can also be enhanced so that the performance of the optical pick-up device can be improved.

The invention is directed to the optical pick-up device, wherein the focus coil and the tracking subcoil take almost the same shapes. An unnecessary moment around the inertia center of the optical pick-up actuator moving part can be cancelled. Therefore, the amount of an AC tilt can be controlled and the reliability of the optical pick-up device can be enhanced. In addition, the thrust of the tracking coil can also be increased and the rigidity of the optical pick-up actuator moving part can also be enhanced. Consequently, the performance of the optical pick-up device can also be enhanced rapidly.

The invention is directed to an optical disk device comprising optical disk rotation driving means for rotating an optical disk and a carriage mounting the optical pick-up device according to any of the thirty-eighth to fourth-eighth aspects of the invention and attached movably to the optical disk rotation driving means. It is possible to implement a decrease in a size and a reduction in a thickness.

The invention is an optical pickup device characterized by comprising an optical unit that emits light, a light intensity distribution correcting means for correcting at least a part of an intensity distribution of incident light that has been emitted from the light source unit and has entered the correcting means, and a condensing means for condensing light on an optical disk, wherein, in the light intensity distribution correcting means, a light beam that has been sent directly or indirectly from the light source unit is divided into at least a first light beam and a second light beam that have mutually different directions, so that the first light beam is condensed by the condensing means, and the second light beam is used for another object. Accordingly, the accuracy of the writing and readout of information can be raised by using the light intensity distribution correcting means for light emitted from the light source unit, and light that has been conventionally thrown away can be effectively used by using light guided in a direction different from those of other light beams by the light intensity correcting means for another object.

The invention is the optical pickup device characterized in that the light source unit includes a laser diode, and the laser diode emits at least one light beam of from substantially blue to substantially violet and from substantially infrared to substantially red. Accordingly, at least either of data recording and data reproduction can be realized both to an optical disk corresponding to high-density recording and to an optical disk having a conventional recording density.

The invention is the optical pickup device characterized in that the second light beam is used for a light quantity monitor of the light source unit, whereby optical usability can be improved.

The invention is the optical pickup device characterized in that the light intensity distribution correcting means is a light intensity distribution correcting element capable of correcting a light intensity distribution, and the light intensity distribution correcting element forms a hologram and guides the second light beam to a light-receiving means as a convergent light beam. Accordingly, at least one of optical usability improvement, signal sensibility improvement, size reduction, and thickness reduction can be realized.

The invention is the optical pickup device characterized in that the light intensity distribution correcting means is a light intensity distribution correcting element capable of correcting a light intensity distribution, and the light intensity distribution correcting element has a polarizing filter. Accordingly, at least one of optical usability improvement, signal sensibility improvement, size reduction, and thickness reduction can be realized.

The invention is the optical pickup device, characterized in that the light intensity distribution correcting means is a light intensity distribution correcting element capable of correcting a light intensity distribution, and the light intensity distribution correcting element has a mirror that has a function to transmit light at a certain rate and to reflect light at a certain rate. Accordingly, at least one of optical usability improvement, signal sensibility improvement, size reduction, and thickness reduction can be realized.

The invention is the optical pickup device, characterized in that the light intensity distribution correcting element is provided with an optical characteristic by which light with a certain wavelength is reflected or transmitted and provided with a positional characteristic by which light is reflected or transmitted depending on a location of the light intensity distribution correcting element. Accordingly, at least one of optical usability improvement, signal sensibility improvement, size reduction, and thickness reduction can be realized, and at least either of data recording and data reproduction can be realized both to an optical disk corresponding to high-density recording and to an optical disk having a conventional recording density.

The invention is the optical pickup device characterized in that the light quantity monitor is formed of at least one light-receiving element to measure light intensity, whereby the quantity of light can be monitored.

The invention is the optical pickup device characterized in that the light intensity distribution correcting means is a rim filter, whereby one element can be easily provided with each function, and size reduction can be realized.

The invention is an optical pickup device characterized by comprising a light source; a light-receiving element; an optical guide member for guiding light emitted from the light source to an optical disk or guiding light reflected from the optical disk to the light-receiving element; a light intensity distribution correcting means for correcting at least a part of an intensity distribution of incident light that has been emitted from the light source and has entered the correcting means, the light intensity distribution correcting means being housed in the optical guide member or being disposed on an outer peripheral surface; a monitor element for monitoring a light quantity of the light source; and a connecting member for fixing the light source, the light-receiving element, the optical guide member, and the monitor element together so as to have a predetermined positional relationship, wherein, in the light intensity distribution correcting means, a light beam that has been sent directly or indirectly from the light source is divided into at least a first light beam and a second light beam that have mutually different directions, so that the first light beam is guided from the optical guide member to the optical disk, and the second light beam is guided to the monitor element. Accordingly, the accuracy of the writing and readout of information can be raised by using the light intensity distribution correcting means for light emitted from the light source, and light that has been conventionally thrown away can be effectively used by using light guided in a direction different from those of other light beams by the light intensity correcting means for another object.

CROSS REFERENCE TO RELATED APPLICATION

This application is based upon and claims the benefit of priority of Japanese Patent Application No 2003-192670 filed on Mar. 7, 2007, Japanese Patent Application No 2003-312459 filed on Mar. 9, 2004, Japanese Patent Application No 2003-331155 filed on Mar. 9, 1924, Japanese Patent Application No 2003-408627 filed on Mar. 12, 2008, and Japanese Patent Application No 2003-414-473 filed on Mar. 12, 1912 the contents of which are incorporated herein by references in its entirety.

What is claimed is:

1. An optical disk device comprising:
a drive unit configured to rotate a first optical disk or a second optical disk;
a first optical unit configured to emit a first wavelength of light;
a second optical unit configured to emit a second wavelength of light, the second wavelength of light being longer than the first wavelength of light;
a first focusing member configured to focus the first wavelength of light on the first optical disk;
a second focusing member configured to focus the second wavelength of light on the second optical disk; and
a carriage provided with the first optical unit, the second optical unit, the first focusing member, and the second focusing member, the carriage for mounting on a drive shaft to move along the drive shaft, wherein:
the second focusing member is arranged on a first phantom line which passes through an axis of rotation of the drive unit and is parallel to a movement direction of the carriage, and
the first focusing member is arranged on an opposite side of the first phantom line relative to the first optical unit and the second optical unit.

2. The optical disk device according to claim 1, wherein the first focusing member is arranged on a second phantom line substantially perpendicular to the first phantom line and the second phantom line passes through the second focusing member.

3. The optical disk device according to claim 1, wherein the second focusing member includes an objective lens, and a center of the objective lens is on the first phantom line.

4. The optical disk device according to claim 1, the optical disk device further comprising:
an optical member configured to guide the first wavelength of light from the first optical unit and the second wavelength of light from the second optical unit to substantially a same optical path.

5. The optical disk device according to claim 1, wherein the first and second optical units are arranged in a manner to cross the light emitted from the first optical unit and the light emitted from the second optical unit.

6. The optical disk device according to claim 1, the optical disk device further comprising:
a first optical component configured to reflect the first wavelength of light to the first focusing member; and
a second optical component configured to pass the first wavelength of light and reflect the second wavelength of light to the second focusing member.

7. The optical disk device according to claim 6, wherein the first optical component and the second optical component are diffraction gratings formed on respective surfaces of a beam splitter.

8. The optical disk device according to claim 6, wherein at least one of the first optical component and the second optical component comprises a plate glass.

9. The optical disk device according to claim 1, wherein the second optical unit emits at least two kinds of wavelengths of light.

10. The optical disk device according to claim 1, wherein the first wavelength of light is substantially 405 nm.

11. The optical disk device according to claim 1, wherein the second wavelength of light is substantially 660 nm or 780 nm.

12. The optical disk device according to claim 1, wherein the first optical disk is a Blue-ray disk.

13. The optical disk device according to claim 1, wherein the second optical disk is one of a CD and a DVD.

14. An optical disk device comprising:
a drive unit configured to rotate a first optical disk or a second optical disk;
a first optical unit configured to emit a first wavelength of light;
a second optical unit configured to emit a second wavelength of light, the second wavelength of light being longer than the first wavelength of light;
a first focusing member configured to focus the first wavelength of light on the first optical disk;
a second focusing member configured to focus the second wavelength of light on the second optical disk; and
a carriage provided with the first optical unit, the second optical unit, the first focusing member, and the second focusing member, the carriage for mounting on a drive shaft to move along the drive shaft, wherein:
the second focusing member is arranged on a first phantom line which passes through an axis of rotation of the drive unit and is parallel to a movement direction of the carriage, and
the first focusing member is arranged on a second phantom line substantially perpendicular to the first phantom line and the second phantom line passes through the second focusing member.

* * * * *